US012671768B2

(12) United States Patent
Durán Alcaide et al.

(10) Patent No.: US 12,671,768 B2
(45) Date of Patent: Jun. 30, 2026

(54) PROCEDURE CDR GENERATION FOR A RAN PARSER

(71) Applicant: TC France S.A.S., Saint-Jacques de la Lande (FR)

(72) Inventors: Angel Durán Alcaide, Pontevedra (ES); Juan José Rubio Esteban, València (ES); Maria Amparo Navarro Peris, València (ES); Rubén Rosell Saborit, Castellón (ES); Maria José Domenech Benlloch, València (ES); Pau Usach Molina, València (ES); Maria Victoria Bausá Aragonés, València (ES); Xanthos Nicolaos Angelides, Madrid (ES)

(73) Assignee: TC France S.A.S., Saint-Jacques-de-la-Lande (FR)

( * ) Notice: Subject to any disclaimer, the term of this patent is extended or adjusted under 35 U.S.C. 154(b) by 179 days.

(21) Appl. No.: 18/461,039

(22) Filed: Sep. 5, 2023

(65) Prior Publication Data

US 2024/0205339 A1 Jun. 20, 2024

Related U.S. Application Data

(60) Provisional application No. 63/441,927, filed on Jan. 30, 2023, provisional application No. 63/404,448, filed on Sep. 7, 2022.

(51) Int. Cl.
| | |
|---|---|
| *H04M 15/00* | (2024.01) |
| *H04M 3/22* | (2006.01) |
| *H04W 4/24* | (2018.01) |

(52) U.S. Cl.
CPC ......... *H04M 15/41* (2013.01); *H04M 3/2218* (2013.01); *H04W 4/24* (2013.01)

(58) Field of Classification Search
CPC ............................... H04M 15/00; H04M 3/22
See application file for complete search history.

(56) References Cited

U.S. PATENT DOCUMENTS

| | | |
|---|---|---|
| 8,331,907 B2 | 12/2012 | Jiang |
| 8,355,337 B2 | 1/2013 | Raleigh |

(Continued)

OTHER PUBLICATIONS

Unknown Author,, Universal Mobile Telecommunications System (UMTS); Telecommunications Management; Charging and billing; 3G call and event data for the Packet Switched (PS) domain, ETSI TS 132 015 V3.12.0 (Dec. 2003), Technical Specification, Dec. 31, 2003 [online], [retrieved on Sep. 22, 2022]. Retrieved from the Internet <URL: https://www.etsi.org/deliver/etsi_ts/132000_132099/132015/03.12.00_60/ts_132015v031200p.pdf> Part1 and Part 2.

(Continued)

*Primary Examiner* — Myron Wyche
(74) *Attorney, Agent, or Firm* — Baratta Law PLLC; Lawrence A. Baratta, Jr.

(57) ABSTRACT

A method includes reading signaling messages as they arrive in a Radio Access Network (RAN) parser; for each signaling message, assigning the signaling message to a procedure, decoding the signaling message to obtain information required to generate a Call Data Record (CDR), and obtaining information on status of the procedure associated with the signaling message; and based on the status of the procedure, one of (1) waiting on more signaling messages for the procedure and (2) determining the procedure has ended and generating the CDR based on the associated signaling messages.

20 Claims, 120 Drawing Sheets

(56) References Cited

U.S. PATENT DOCUMENTS

| | | | |
|---|---|---|---|
| 9,332,026 | B2 | 5/2016 | Lapsley et al. |
| 11,025,782 | B2 | 6/2021 | Boussac et al. |
| 2001/0021651 | A1 | 9/2001 | Burgaleta-Salinas et al. |
| 2014/0161120 | A1 | 6/2014 | Ikäheimo |
| 2016/0142931 | A1 | 5/2016 | Mondal et al. |
| 2017/0041815 | A1* | 2/2017 | Fernandez Arboleda ................... H04W 24/04 |
| 2020/0186651 | A1* | 6/2020 | Boussac .............. H04M 3/2218 |
| 2022/0248287 | A1 | 8/2022 | Chong et al. |

OTHER PUBLICATIONS

Farooq et al., Mobility Prediction Based Proactive Dynamic Network Orchestration for Load Balancing With QoS Constraint (Opera), IEEE Transactions on Vehicular Technology, vol. 69, No. 3, pp. 3370-3383, Mar. 2020, [retrieved on Sep. 22, 2022]. Retrieved from the Internet <URL: https://ieeexplore.ieee.org/document/8960421> <DOI: 10.1109/TVT.2020.2966725>.

Soyemi et al., Handling Mobile Network Congestion with Assembly line Control Algorithm, International Journal of Computer Science and Information Security (IJCSIS), vol. 17, No. 2, Feb. 2019, pp. 167-174 [online] Paper ID 31121807, [retrieved on Sep. 22, 2022]. Retrieved from the Internet <URL: https://www.academia.edu/38532505/Handling_Mobile_Network_Congestion_with_Assembly_line_Control_Algorithm>.

* cited by examiner

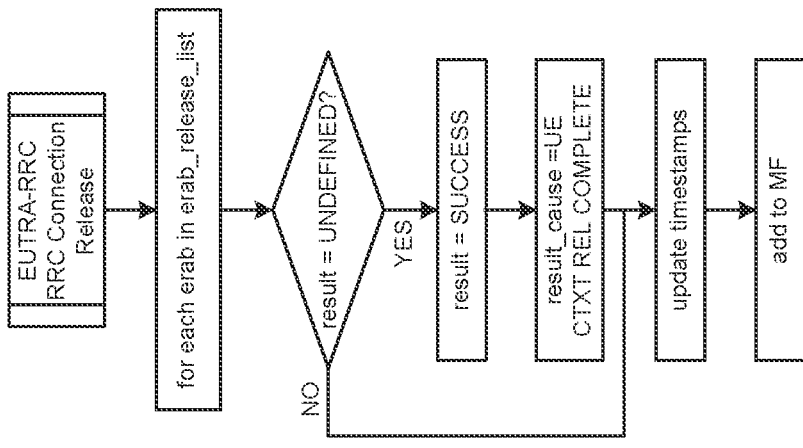
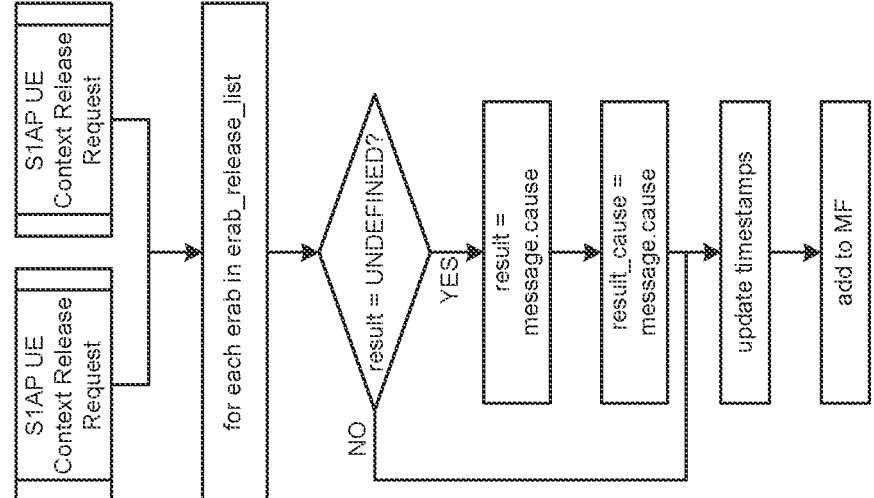
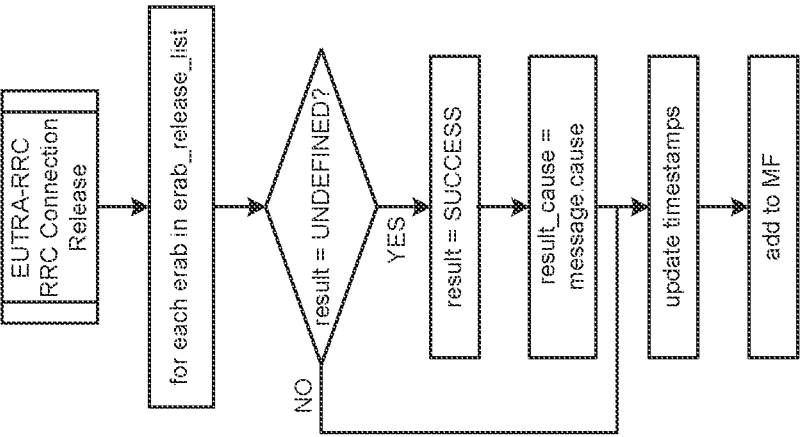
FIG. 14

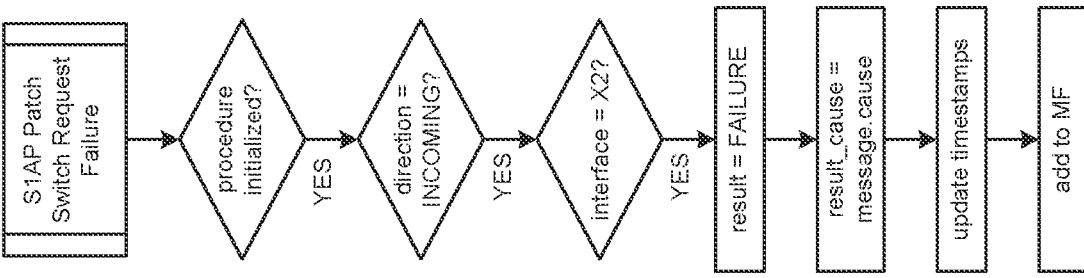
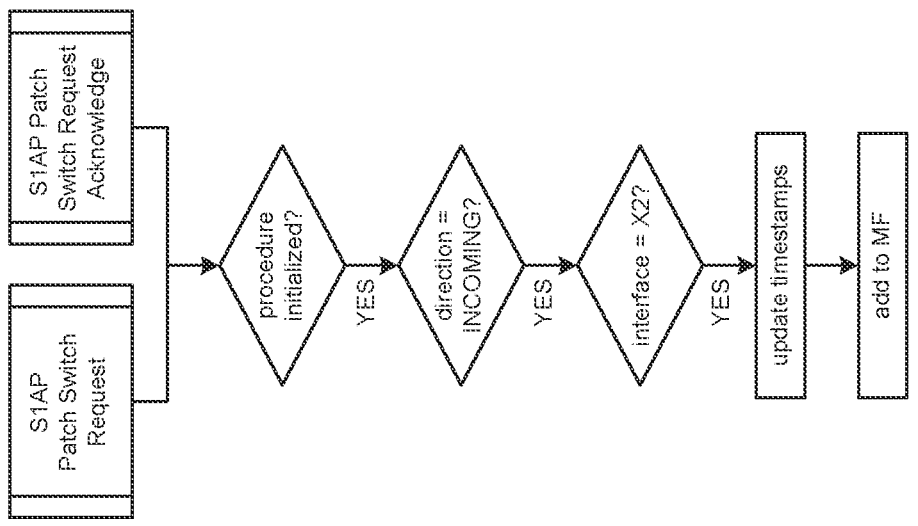
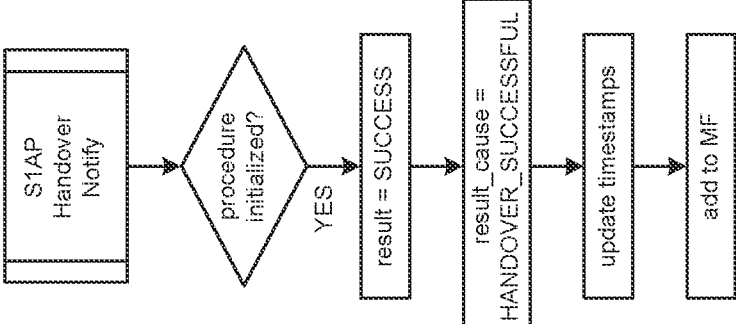
FIG. 39

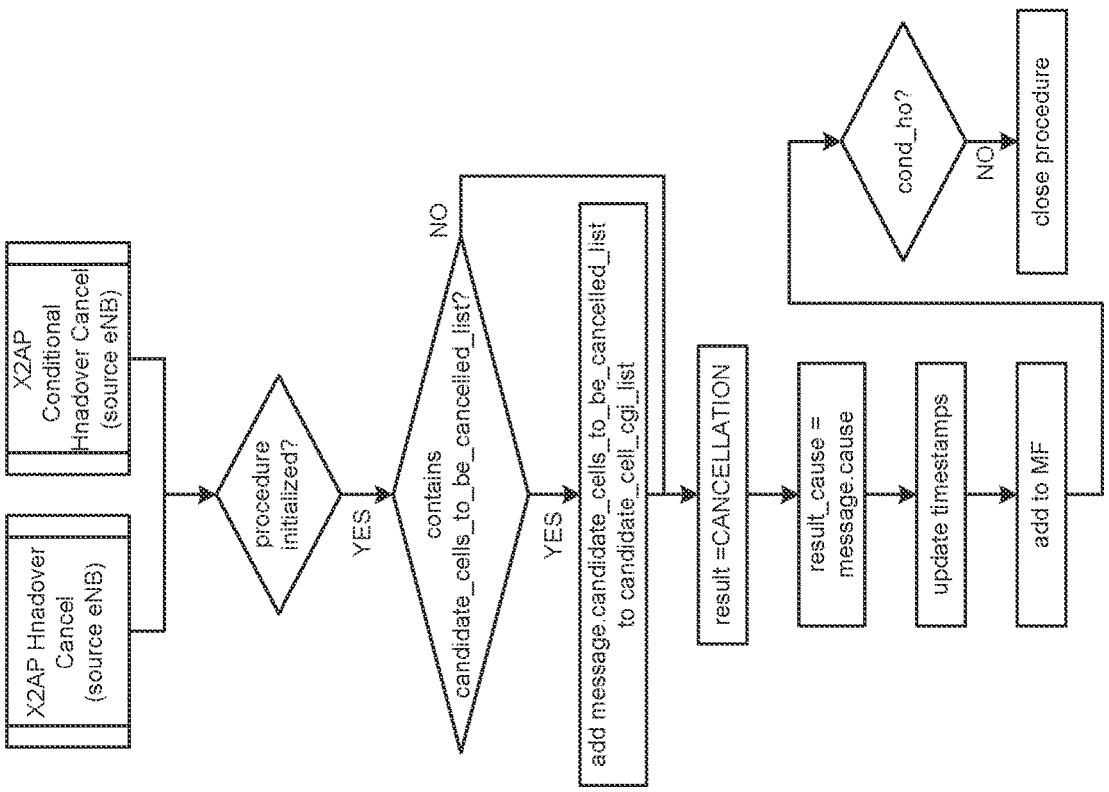
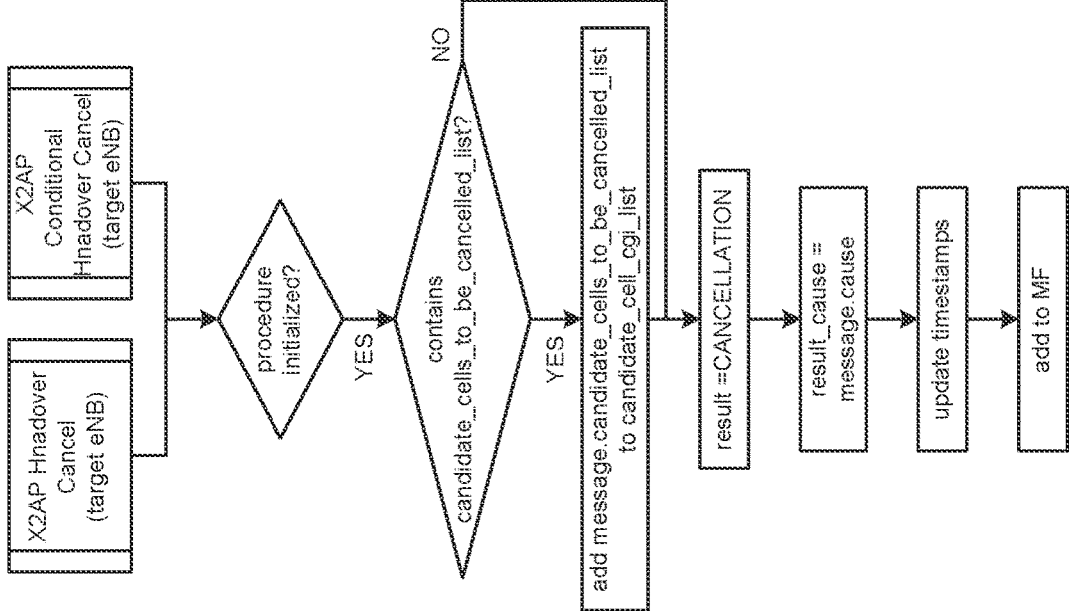
FIG. 47

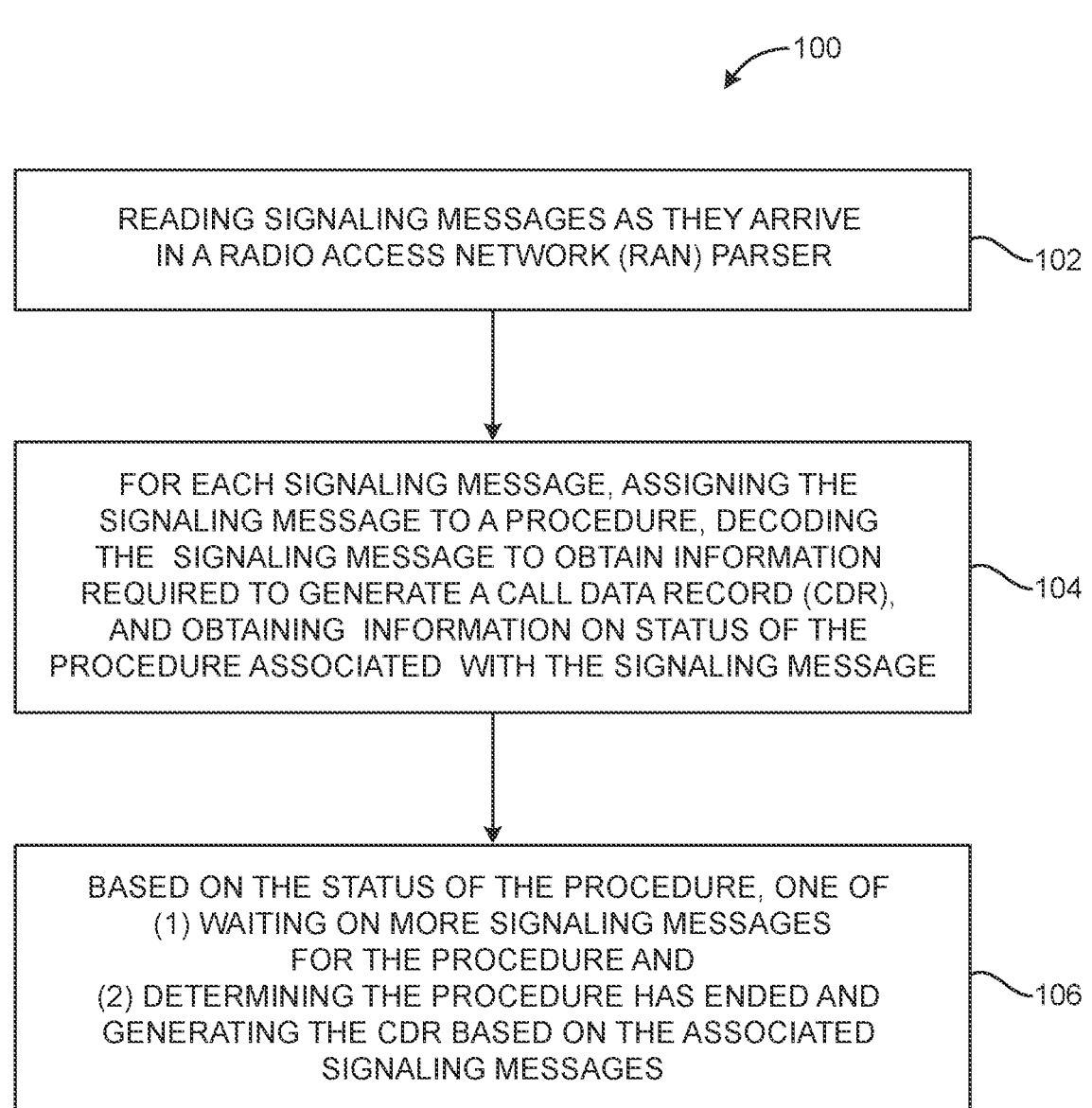

100

READING SIGNALING MESSAGES AS THEY ARRIVE
IN A RADIO ACCESS NETWORK (RAN) PARSER — 102

FOR EACH SIGNALING MESSAGE, ASSIGNING THE
SIGNALING MESSAGE TO A PROCEDURE, DECODING
THE SIGNALING MESSAGE TO OBTAIN INFORMATION
REQUIRED TO GENERATE A CALL DATA RECORD (CDR),
AND OBTAINING INFORMATION ON STATUS OF THE
PROCEDURE ASSOCIATED WITH THE SIGNALING MESSAGE — 104

BASED ON THE STATUS OF THE PROCEDURE, ONE OF
(1) WAITING ON MORE SIGNALING MESSAGES
FOR THE PROCEDURE AND
(2) DETERMINING THE PROCEDURE HAS ENDED AND
GENERATING THE CDR BASED ON THE ASSOCIATED
SIGNALING MESSAGES — 106

FIG. 53

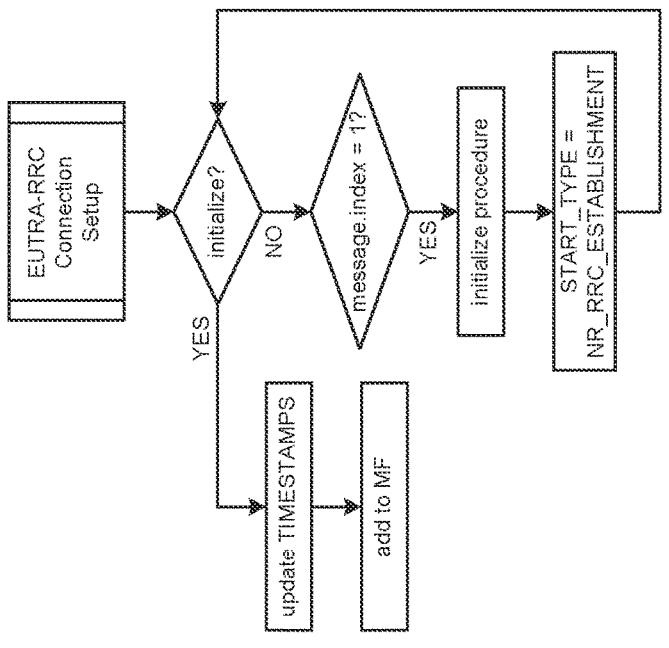
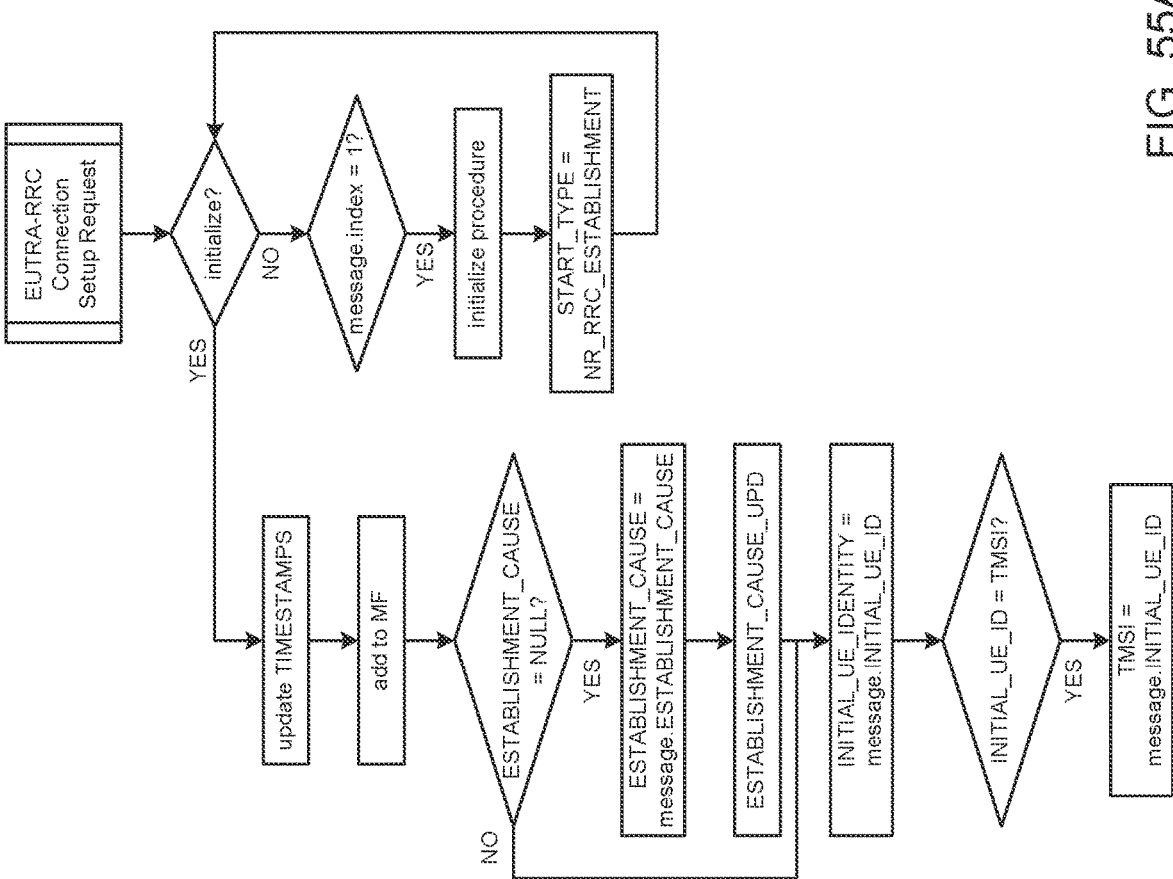
FIG. 55A

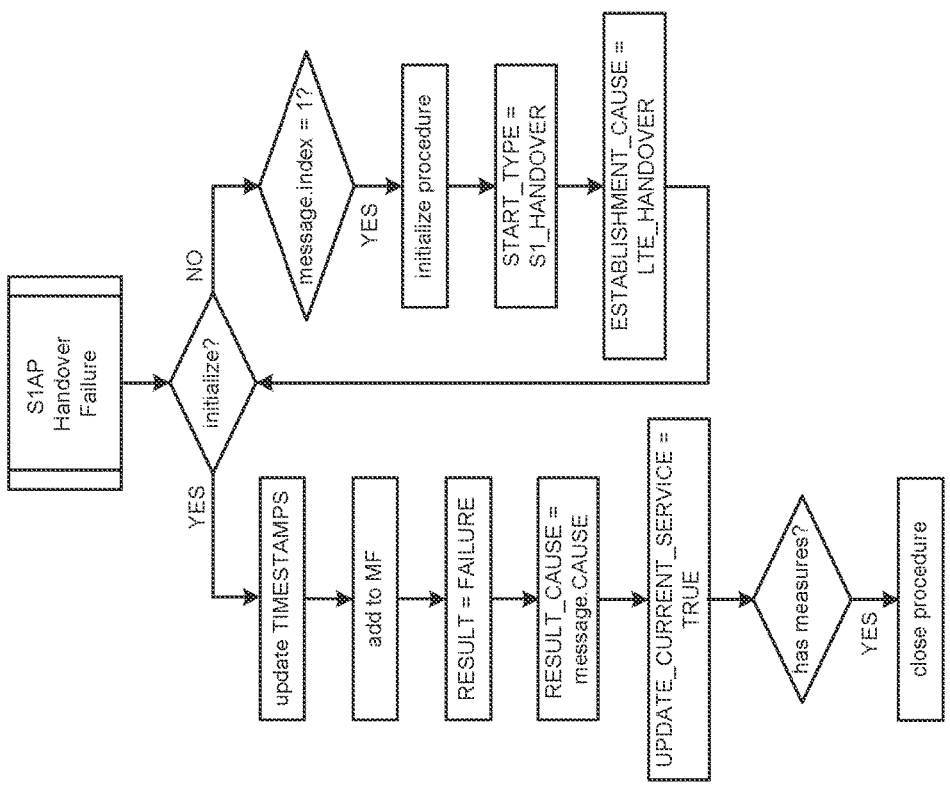
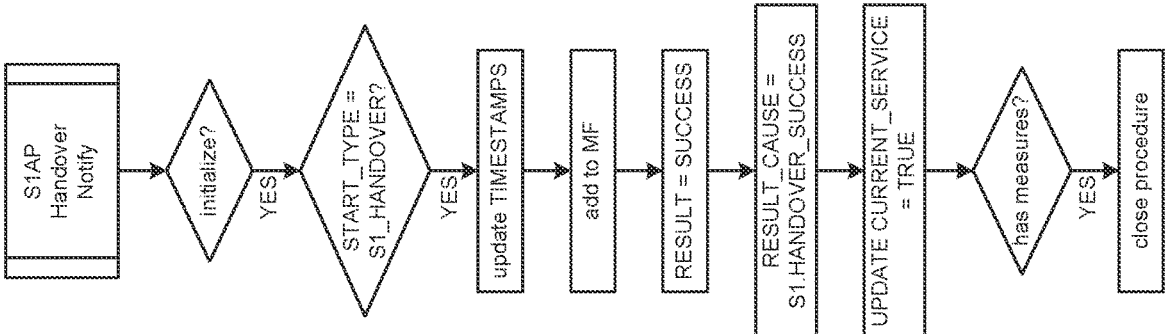
FIG. 59B

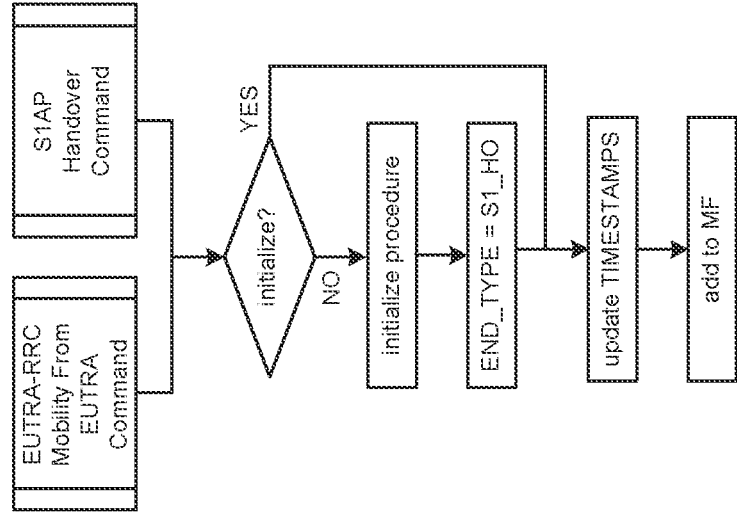
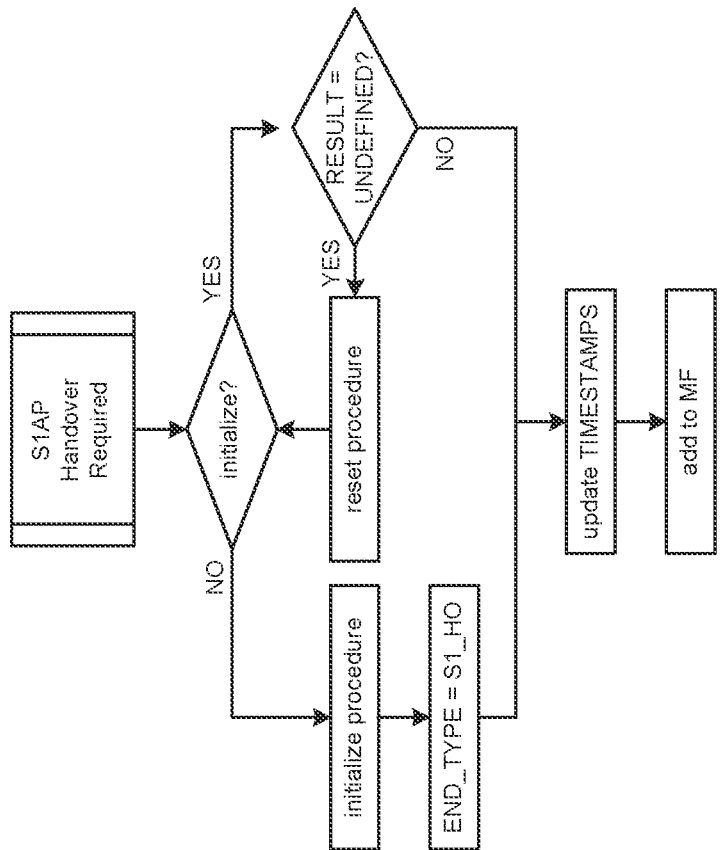
FIG. 67A

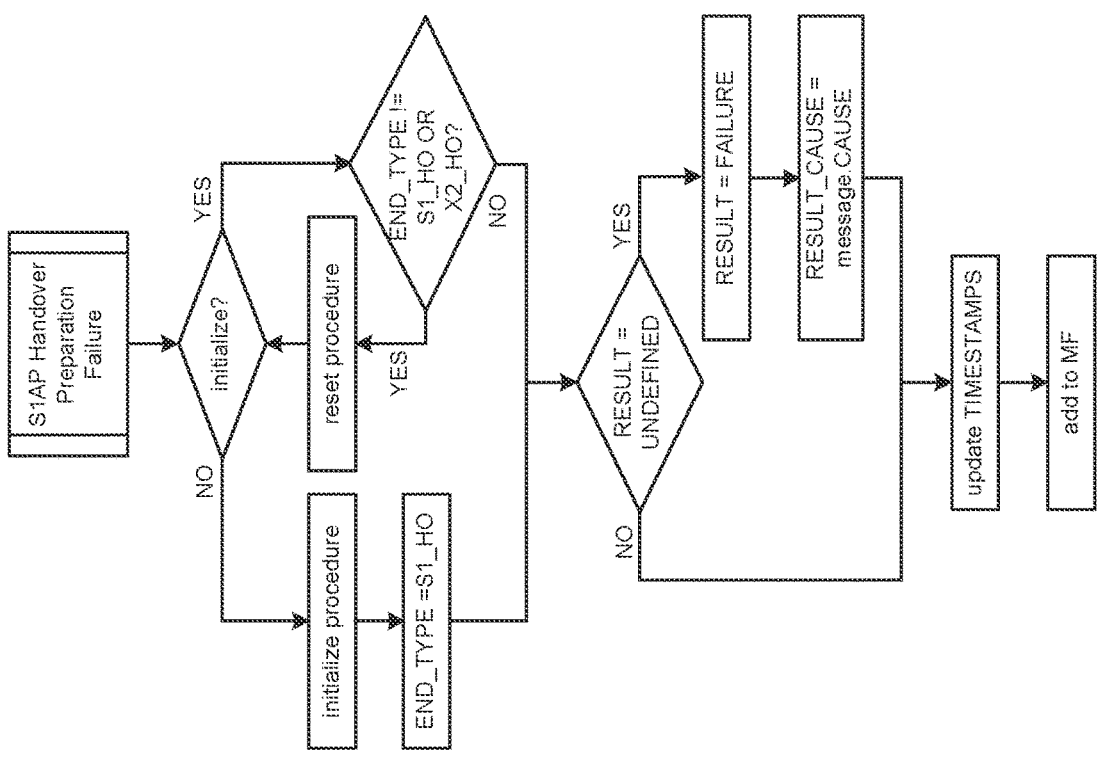
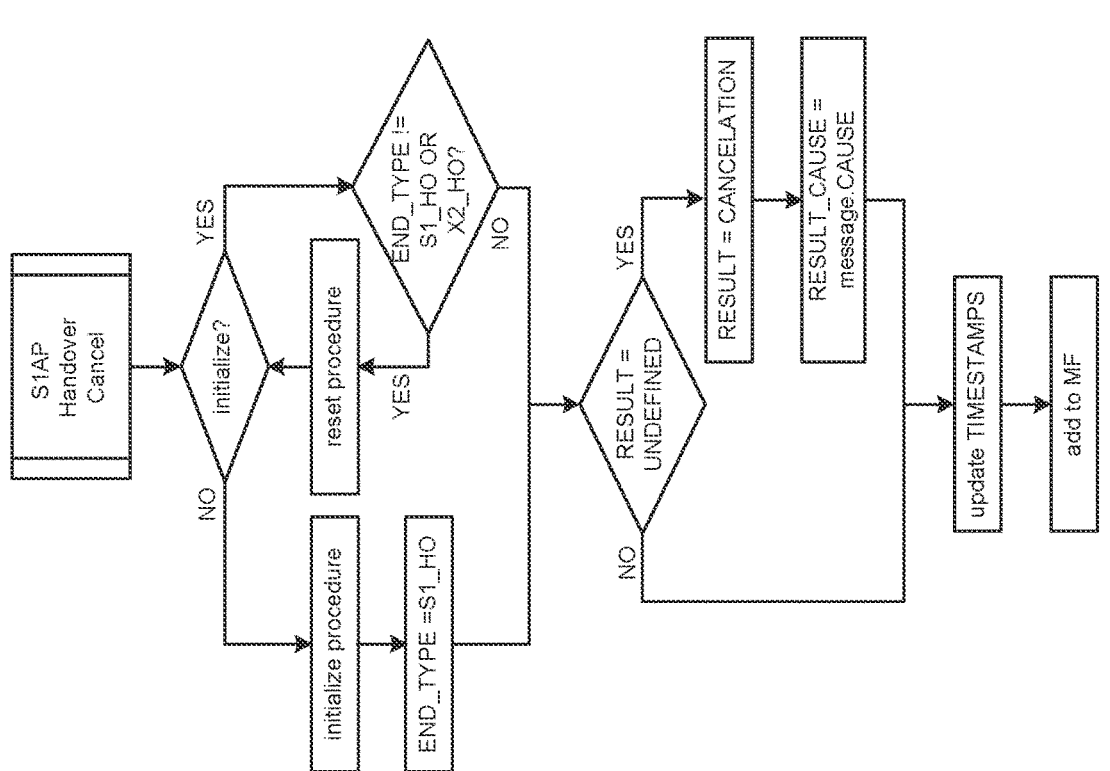
FIG. 67B

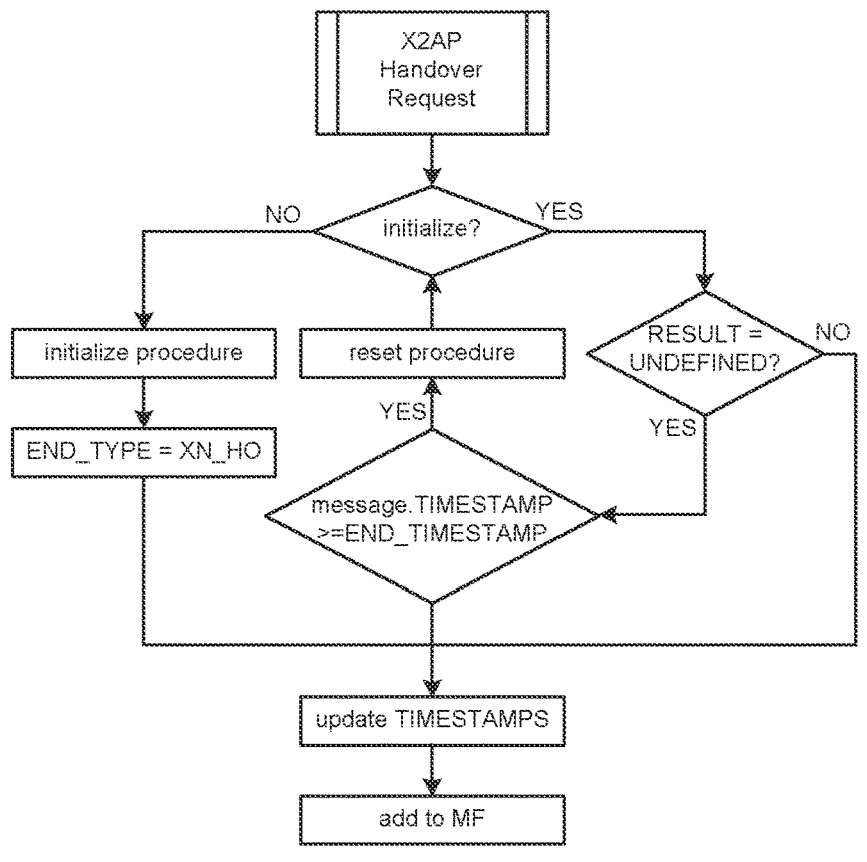
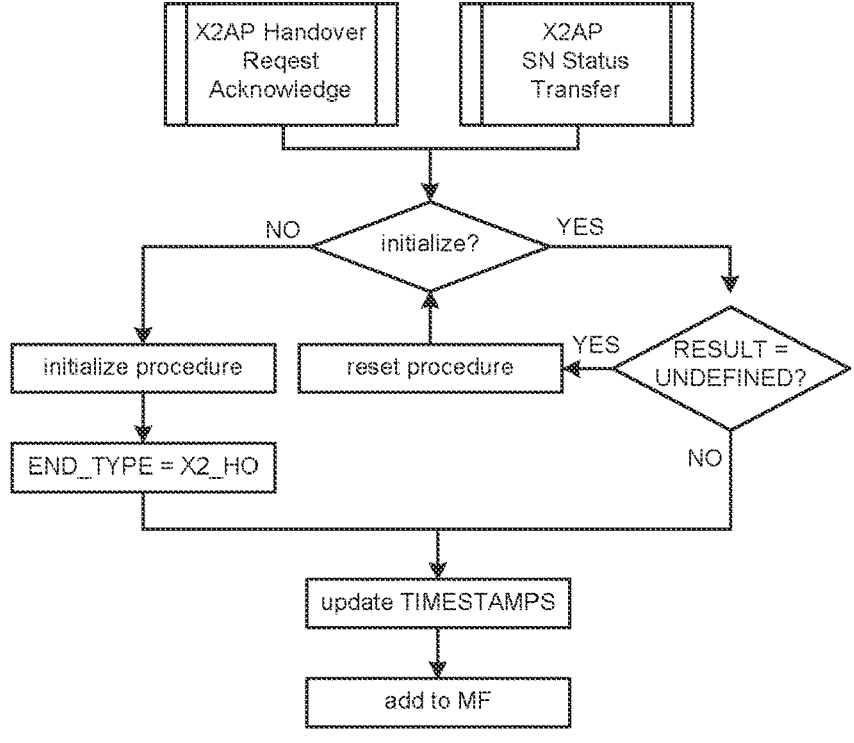
FIG. 68A

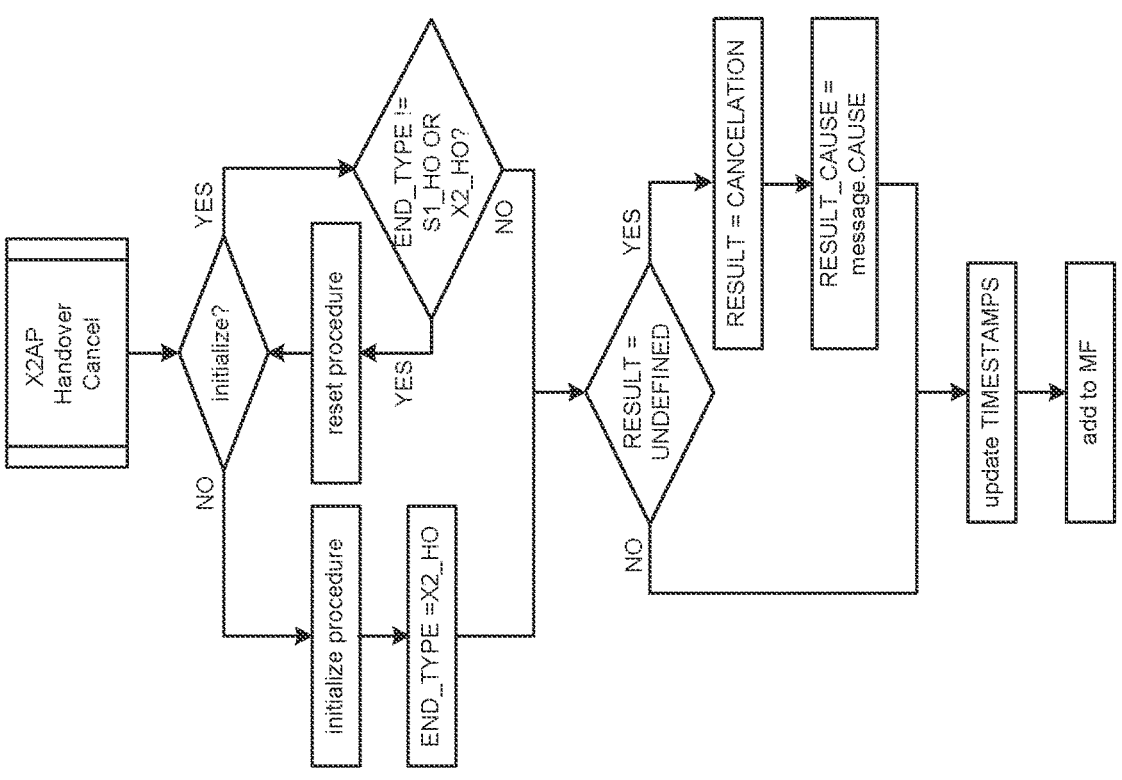
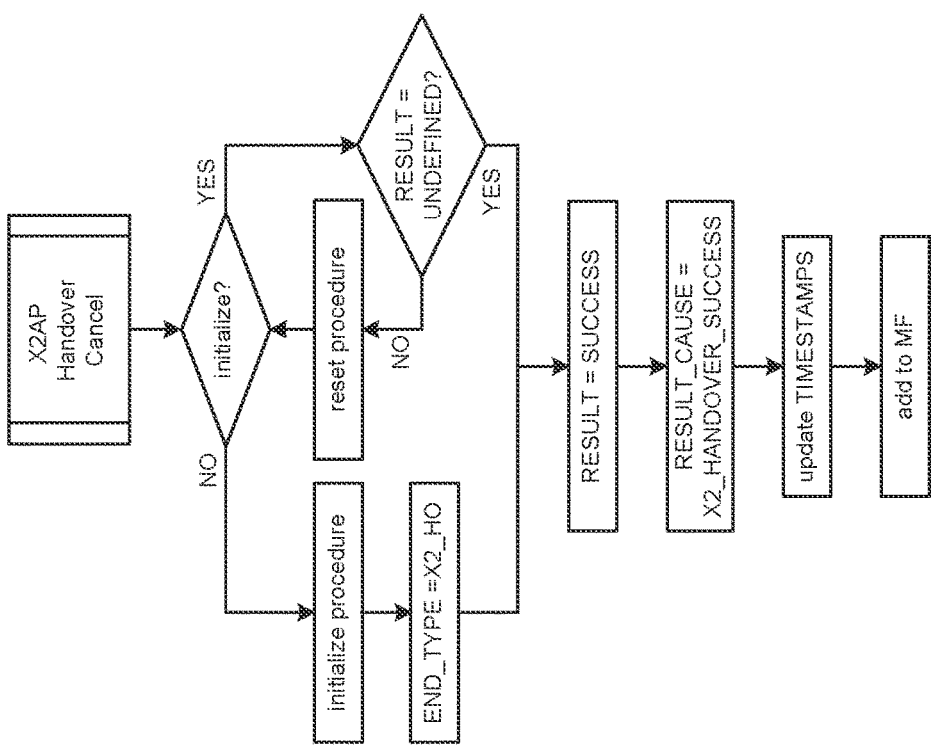
FIG. 68C

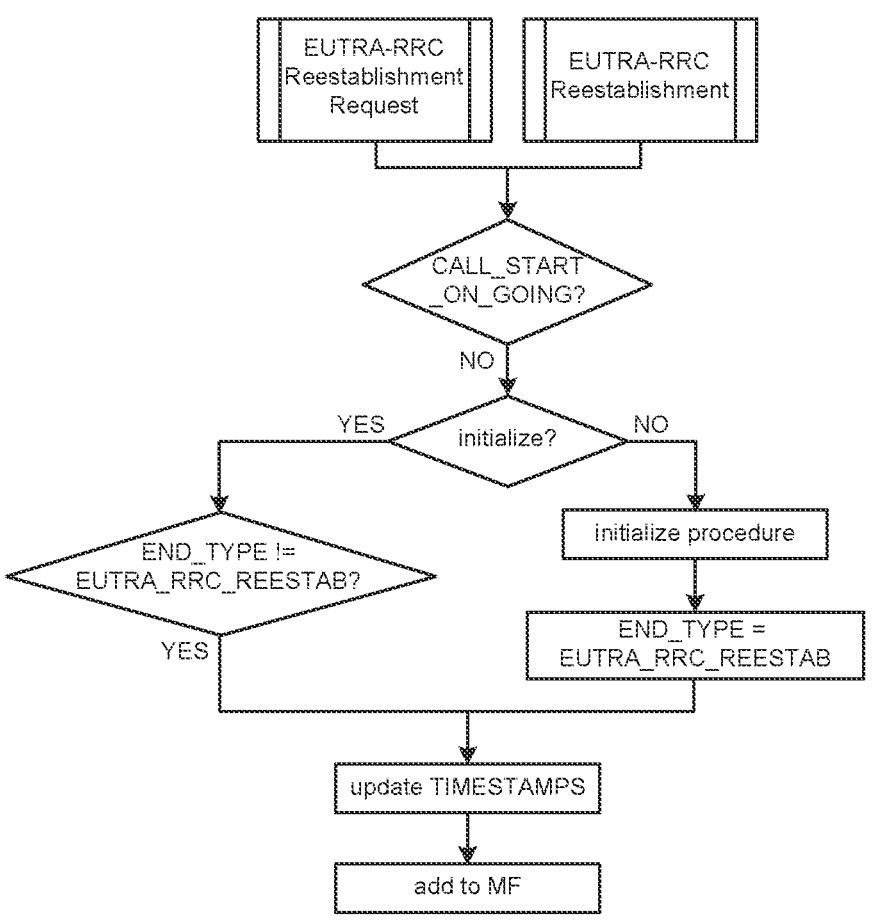
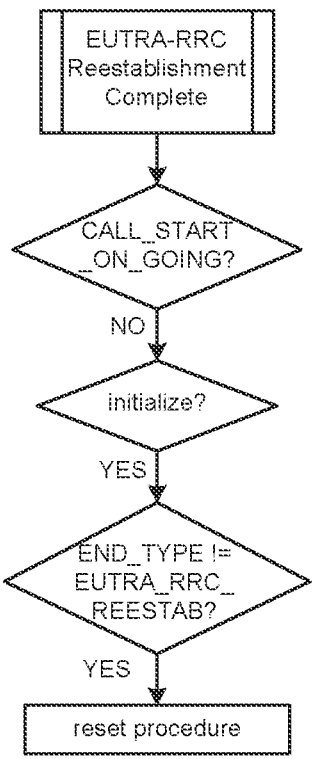
FIG. 69A

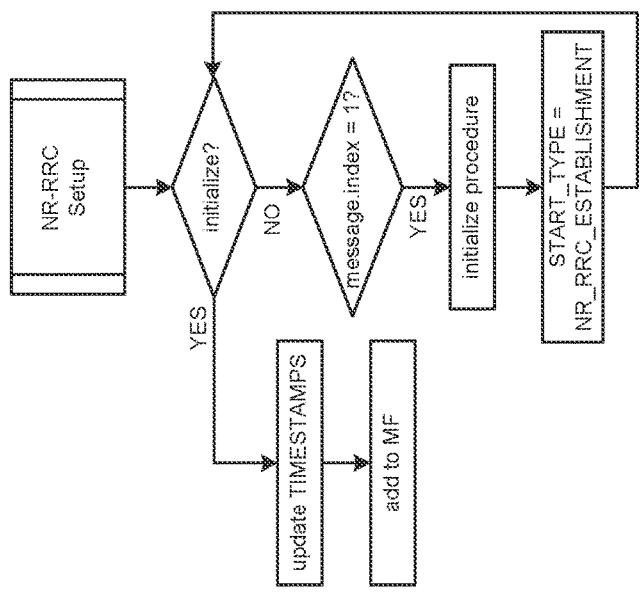
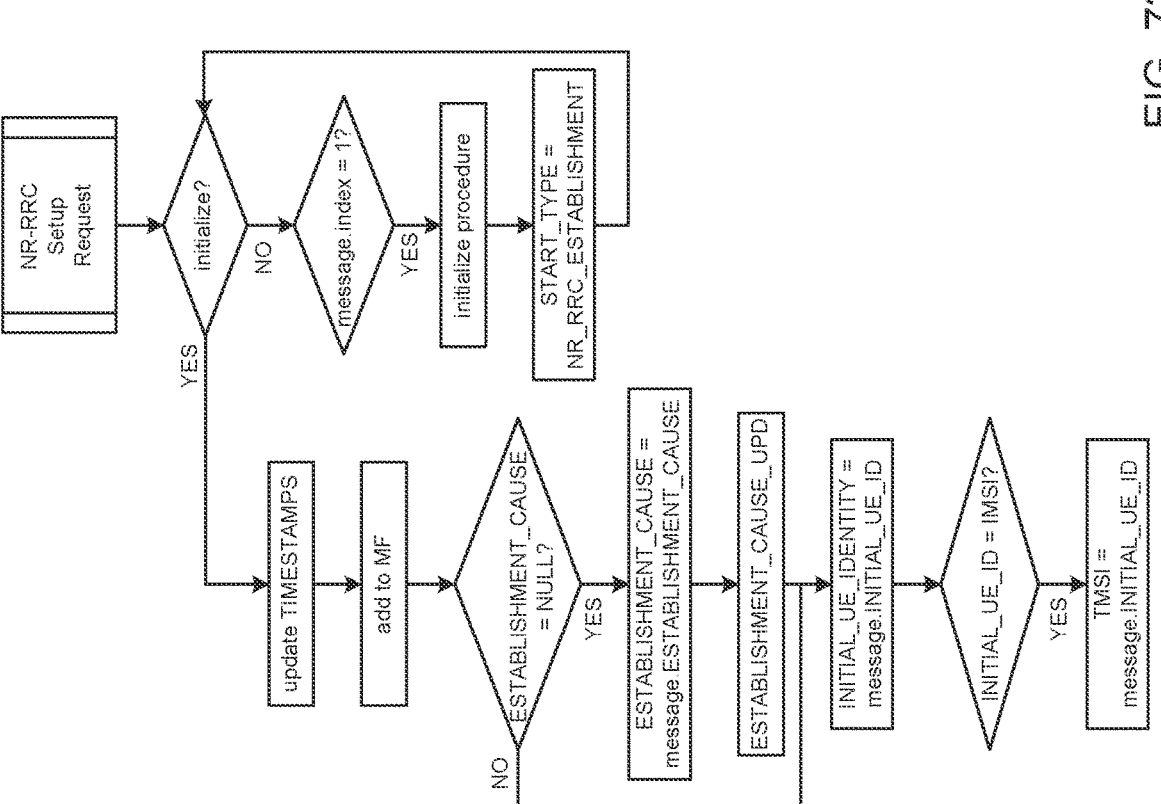
FIG. 72A

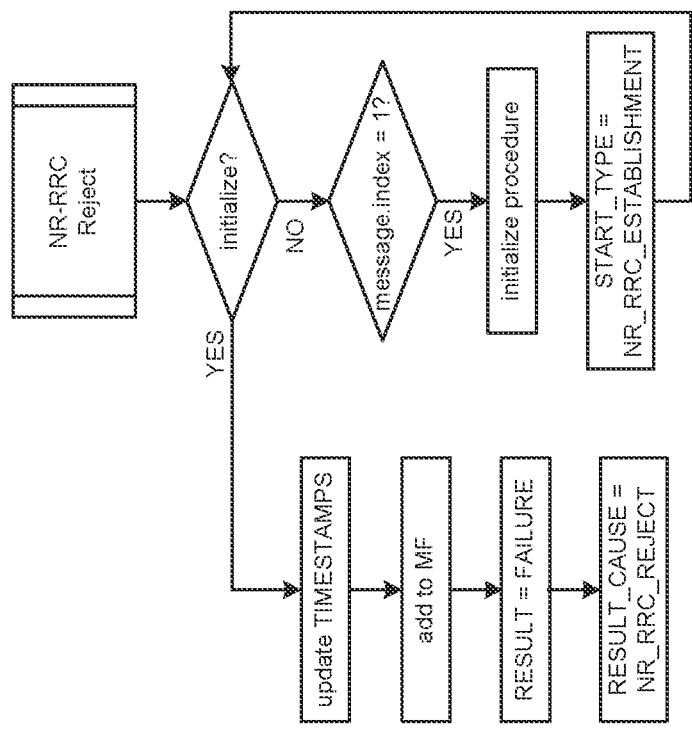
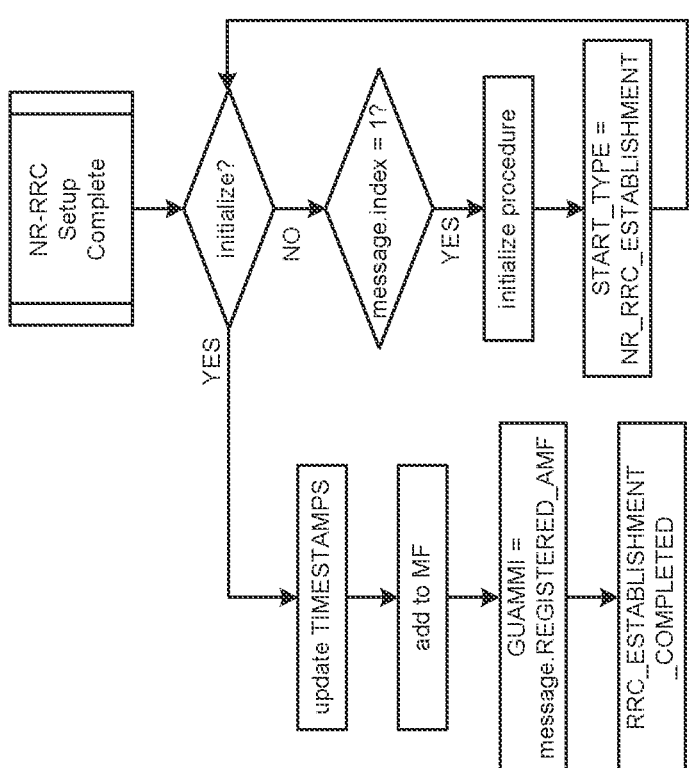
FIG. 72B

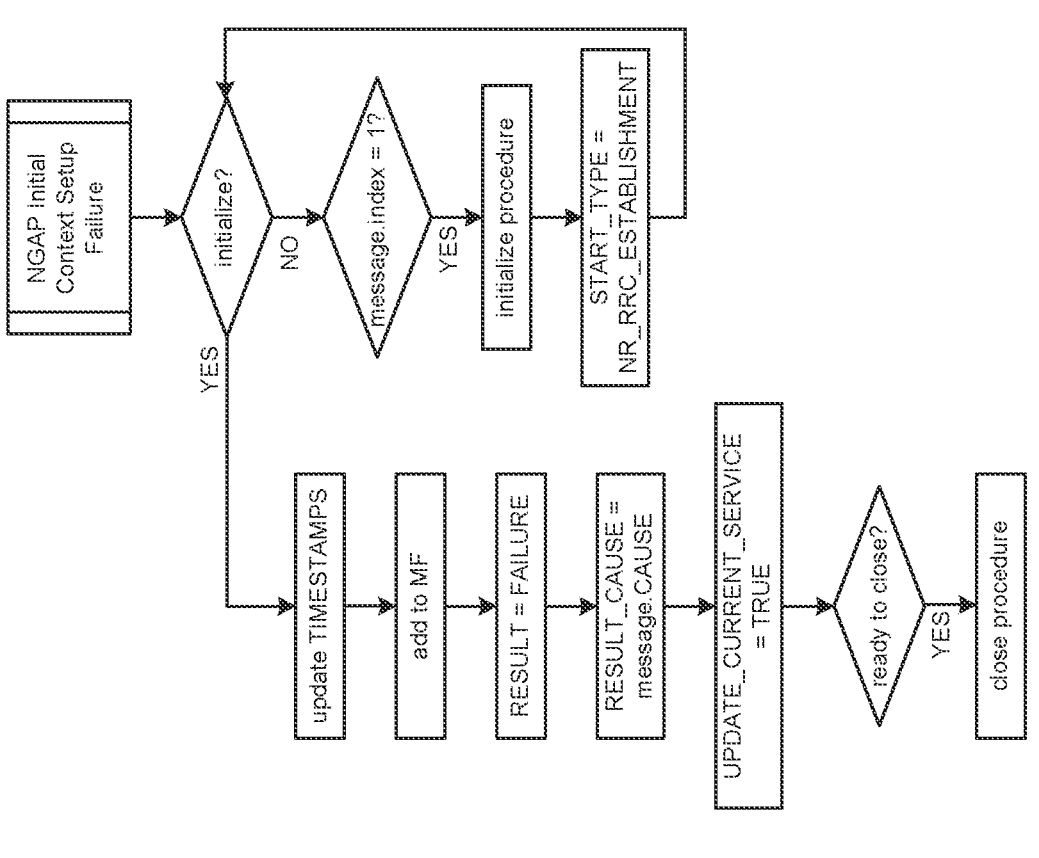
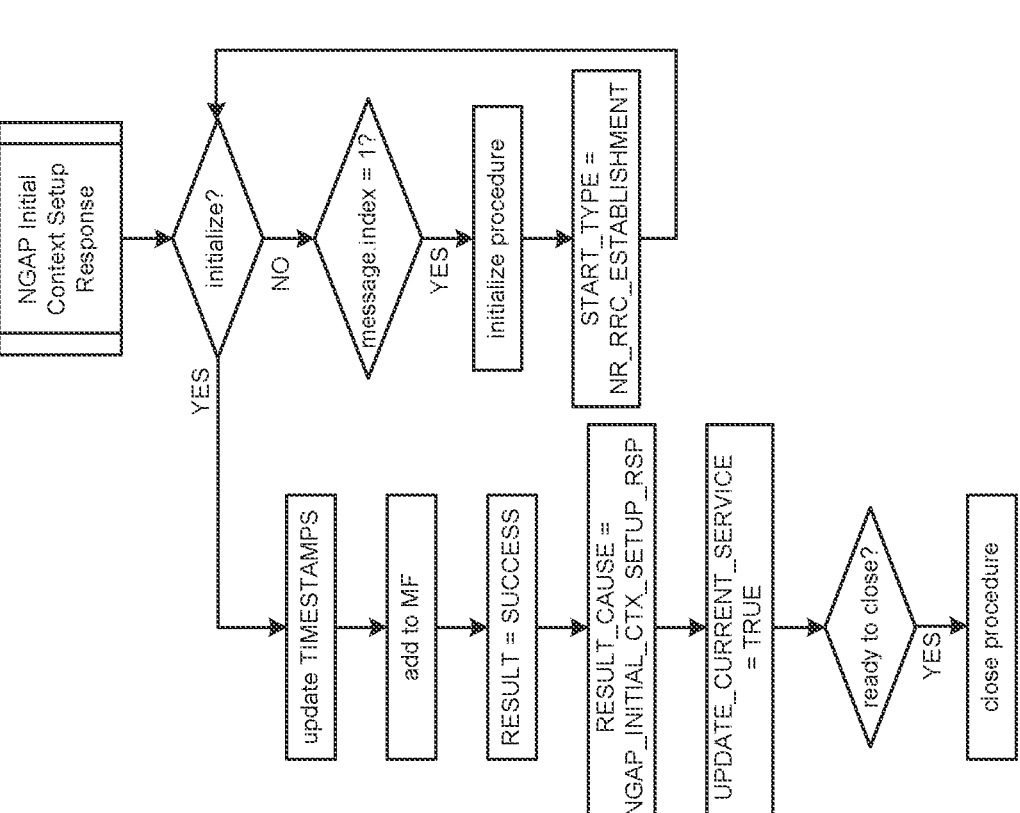
FIG. 74B

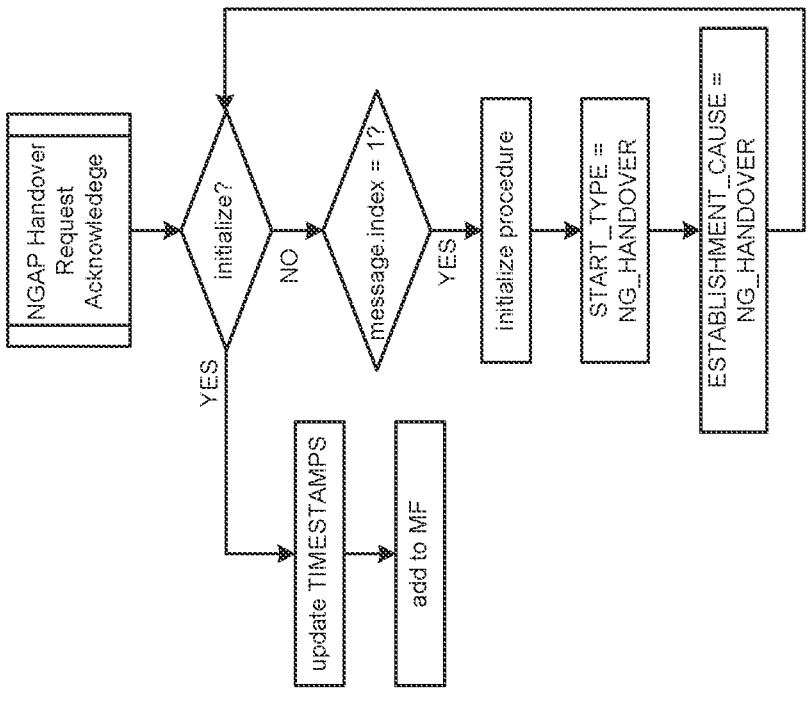
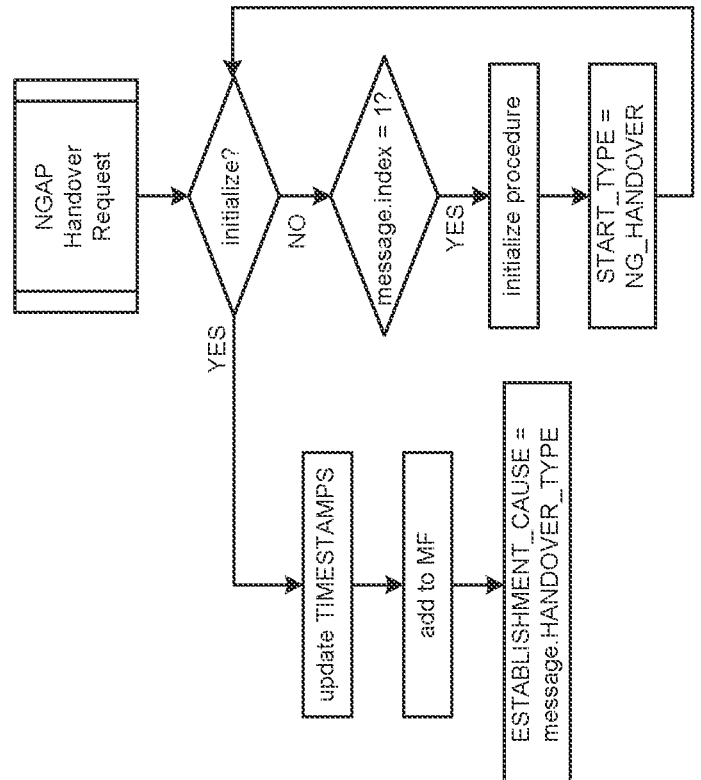
FIG. 75A

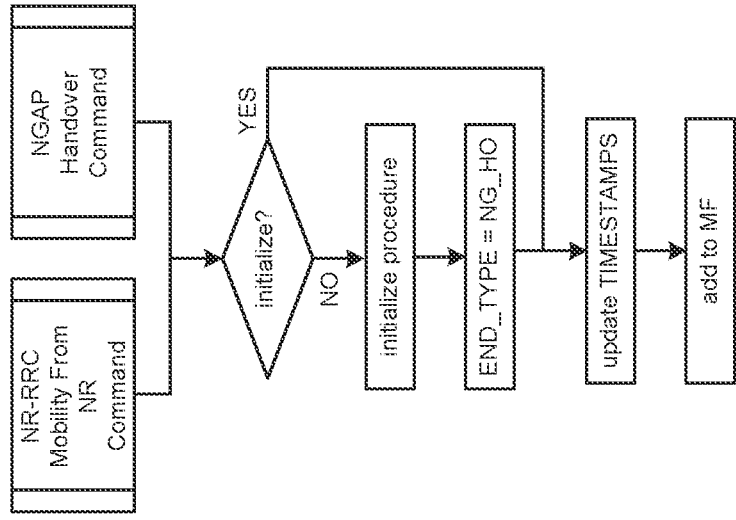
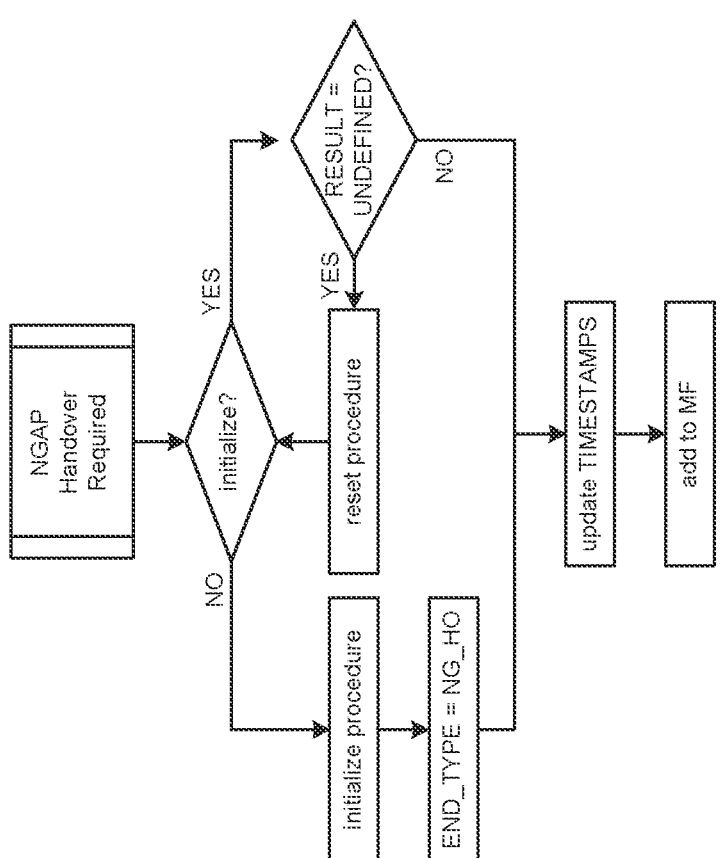
FIG. 85A

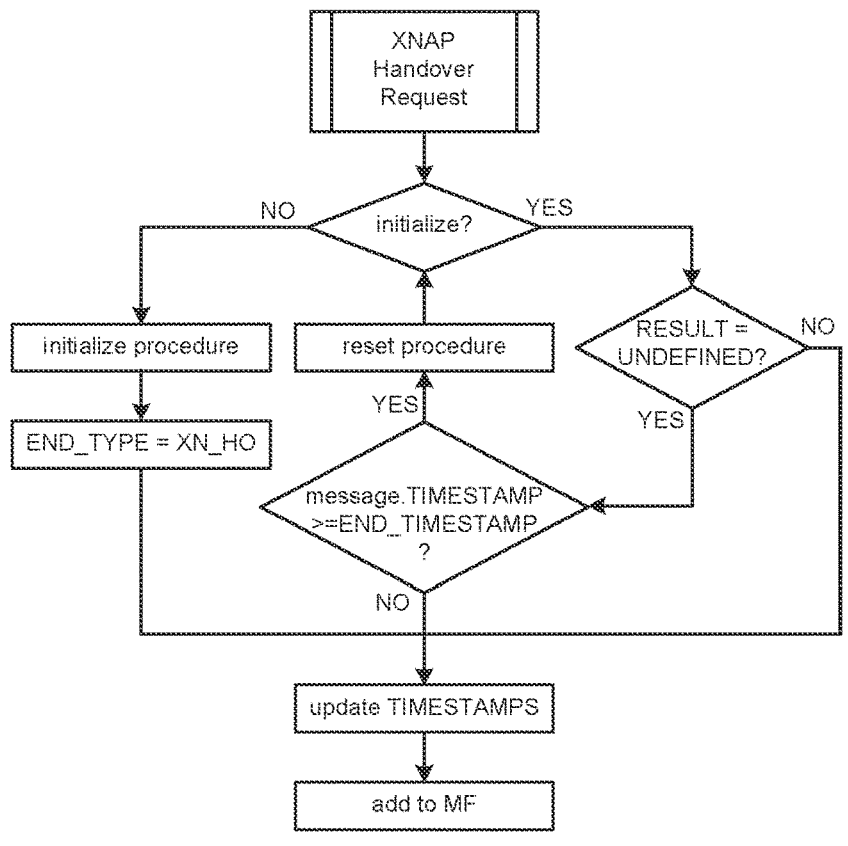
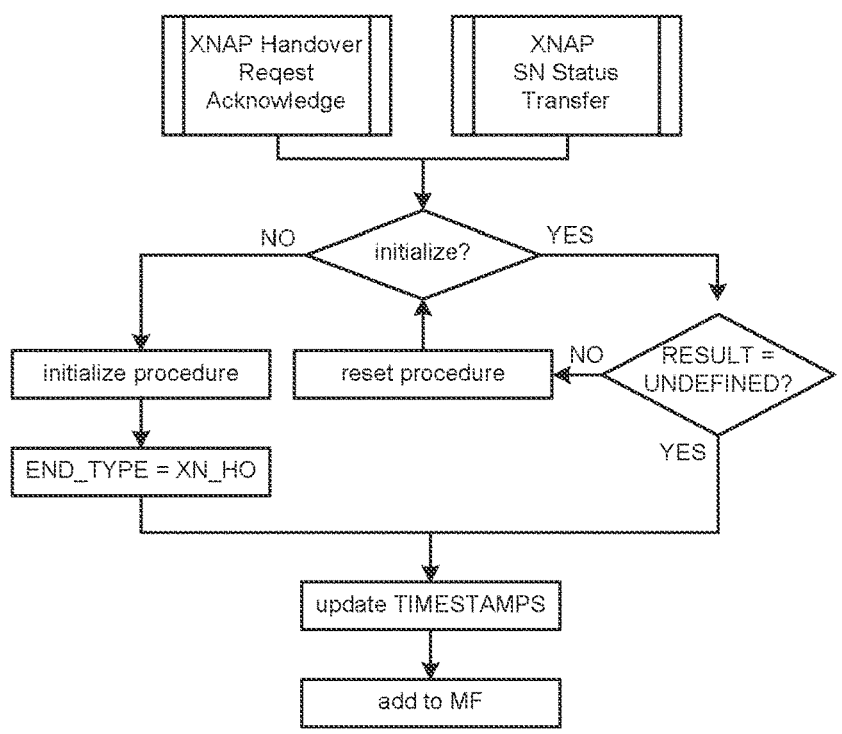
FIG. 86A

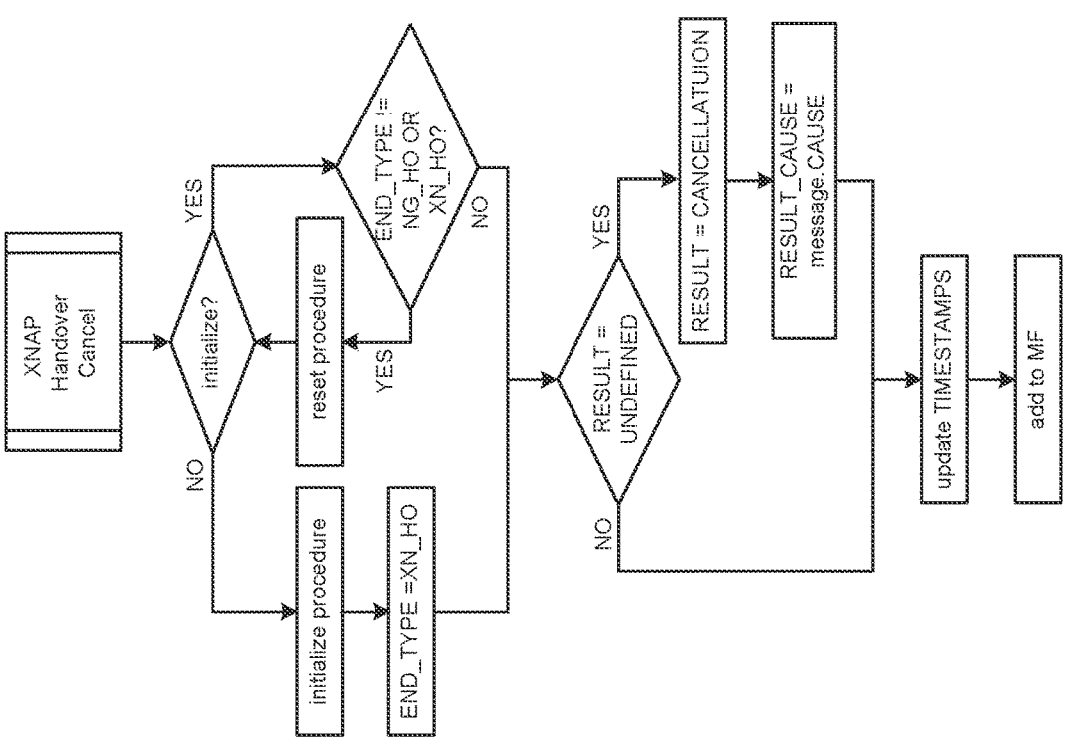
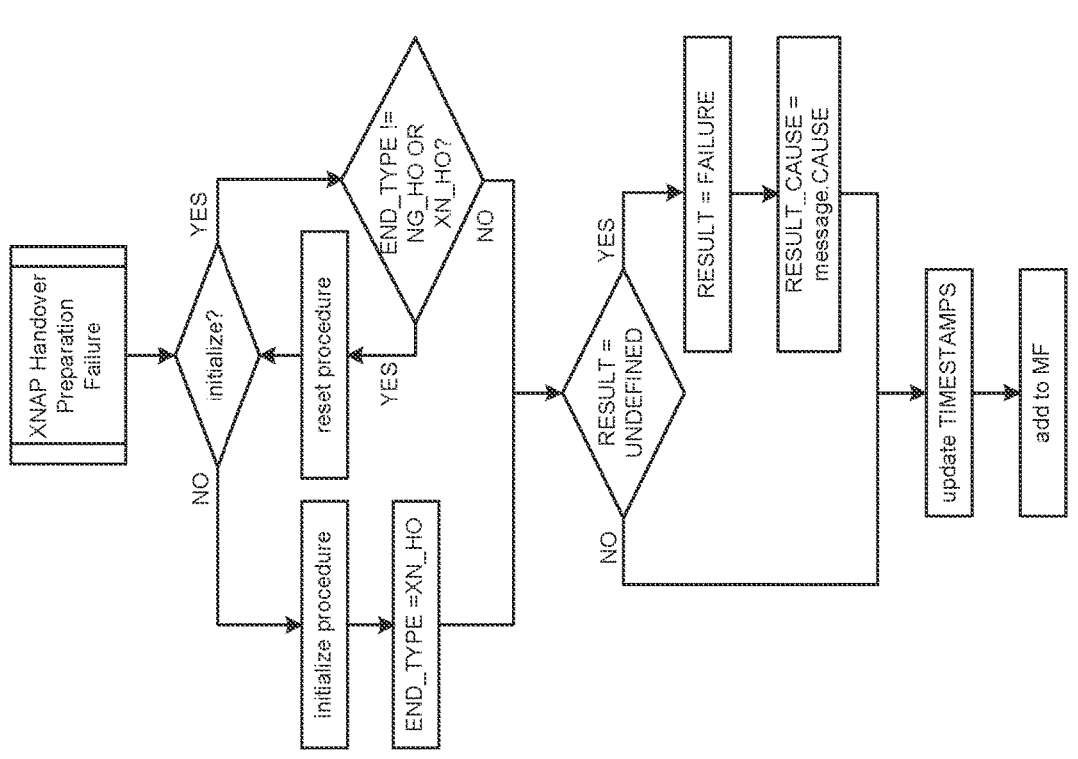
FIG. 86B

1

PROCEDURE CDR GENERATION FOR A RAN PARSER

CROSS-REFERENCE TO RELATED APPLICATION(S)

The present disclosure claims priority to U.S. Provisional Patent Application No. 63/441,927, filed Jan. 30, 2023, and U.S. Provisional Patent Application No. 63/404,448, filed Sep. 7, 2022, the contents of which are incorporated by reference in their entirety.

FIELD OF THE DISCLOSURE

The present disclosure relates generally to networking and computing. More particularly, the present disclosure relates to systems and methods for a procedure Call Data Record (CDR) generation for a Radio Access Network (RAN) parser.

BACKGROUND OF THE DISCLOSURE

In a telecommunications network, there are solutions for planning, troubleshooting and optimizing mobile networks using dynamic, geo-located devices, and subscriber data. A RAN Data Processing System (also referred to herein as a Parser, a RAN parser, and a parsing agent) is a scalable software adapter which collects and processes 2G, 3G, 4G and 5G 3rd Generation Partnership Project (3GPP) and vendor-specific RAN call events to generate call records and, optionally geolocated call records and real time location insights. The main output of RAN parser is a RAN user call data record (CDR) based on the messages provided by the network. This requires a correlation between different sources and messages found in the customer's information. And the aim is to provide the CDR as soon as possible, not waiting for the end of the call.

BRIEF SUMMARY OF THE DISCLOSURE

The present disclosure relates to systems and methods for a Call Data Record (CDR) generation procedure for a Radio Access Network (RAN) parser. In an embodiment, a method includes reading signaling messages as they arrive in a Radio Access Network (RAN) parser; for each signaling message, assigning the signaling message to a procedure, decoding the signaling message to obtain information required to generate a Call Data Record (CDR), and obtaining information on status of a procedure associated with the signaling message; and based on the status of the procedure, one of (1) waiting on more signaling messages for the procedure and (2) determining the procedure has ended and generating the CDR based on the associated signaling messages. Of note, data record generation is providing records for different signaling procedures that appear during the call, and the various descriptions utilize the term "procedures" for the different signaling procedures that occur during a call. That is, the term procedure is used to denote something related to signaling that occurs during the call.

In various embodiments, the present disclosure can include a method having steps, a processing device configured to implement the steps, and a non-transitory computer-readable medium storing instructions for programming one or more processors to implement the steps. The steps include reading signaling messages as they arrive in a Radio Access Network (RAN) parser; for each signaling message, assigning the signaling message to a procedure, decoding the signaling message to obtain information required to generate a Call Data Record (CDR), and obtaining information on status of a procedure associated with the signaling message; and based on the status of the procedure, one of (1) waiting on more signaling messages for the procedure and (2) determining the procedure has ended and generating the CDR based on the associated signaling messages.

The signaling messages can be in a vendor/technology agnostic format. The steps can include, when the procedure has ended, queueing the CDR and removing any information from memory. The steps can include incrementally building the CDR based on subsets of the signaling messages associated to the call fragment. The generated CDR types can include any of call start, handover, call end, eRAB establishment and release, redirection, re-establishment, CS Fallback, Serving cell measurements and miscellaneous procedures. The signaling messages can be associated with procedures involved in the call. The procedures can be correlated by a common identifier or a tuple and an international mobile subscriber identity (IMSI) with a timestamp. Details of the procedures can be based on associated signaling messages or from information from other correlated procedures. The procedures can be one of asynchronous generated when an event happens and synchronous that are generated periodically.

BRIEF DESCRIPTION OF THE DRAWINGS

The present disclosure is illustrated and described herein with reference to the various drawings, in which like reference numbers are used to denote like system components/method steps, as appropriate, and in which:

FIG. 14 is a flowchart of an ERAB release messages decision process.

FIG. 39 is a flowchart of a 4G Handover S1AP messages decision process.

FIG. 47 is a flowchart of a 4G Handover X2AP Handover Cancel and Conditional Handover Cancel messages decision process.

FIG. 53 is a flowchart of a Call Data Record (CDR) generation procedure for a Radio Access Network (RAN) parser.

FIGS. 55A-55B are flowcharts of a 4G Call Start initiating messages for Scenario 1.

FIGS. 59A-59B are flowcharts of a 4G Call Start for Scenario 3 in case of S1 Incoming Handover.

FIGS. 67A-67B are flowcharts of a 4G Call End corresponding to scenario 2, in this case S1 Outgoing handover.

FIGS. 68A-68C are flowcharts of a 4G Call End corresponding to scenario 2, in this case X2Outgoing handover.

FIGS. 69A-69B are the flowchart of a 4G Call End corresponding to scenario 3 (Re-establishment)

FIGS. 72A-72B are the flowchart of a 5G SA Call Start initiating messages for basic scenario (RRC Setup+NGAP UE Context setup)

FIGS. 74A-74B are the flowchart of a 5G SA Call Start ending messages for basic scenario (RRC Setup+NGAP UE Context setup)

FIGS. 75A-75B are the flowchart of a 5G SA Call Start for the Incoming NGAP Handover case.

FIGS. 85A-85B are flowcharts of a 5G SA Call End corresponding to the NGAP Outgoing handover case.

FIGS. 86A-86C are flowcharts of a 5G SA Call End corresponding to the XnAP Outgoing handover case.

DETAILED DESCRIPTION OF THE DISCLOSURE

Again, the present disclosure relates to systems and methods for a Call Data Record (CDR) generation procedure for a Radio Access Network (RAN) parser. The purpose of the current Parsers (non-cloud native) is to be able to regenerate a RAN user call based on the messages provided by the network. There is a correlation between different sources and messages, and this information is targeted as soon as the call in the network has finished. Apart from the "call details" output (CDR), the parser is able to provide other processed outputs, such as the geolocation (GDR) of the user along the call in Near Real Time (NRT) or specific Key Performance Indicators (KPIs) that allow optimization algorithms and recommendations to the network operator about which should be changed in the RAN network configuration to improve its quality. Parsers receive information provided by the customer network elements by files or by TCP streams (natively only in the Cloud Parser architecture). The supported formats depend on the vendor and technology; therefore, the Parsers should be able to understand, process and provide the corresponding outputs independently of the vendor/technology specificities.

The present disclosure includes a Cloud Native Parser that reproduces the behavior of the current Parsers via a new architecture that requires changes in terms of how the information is processed, how it is distributed along the different elements, how it is generated and how it is sent out of the system. The Cloud Native Parser aims to replace the legacy architecture making it more flexible and able to be deployed in several pieces along different locations (edge, central, etc. in a customer network in front of the monolithic version where only the central site deployment was allowed.

RAN Parser

RAN parsers require Call Traces (CTs) as inputs. CTs are generated by Network Elements (NEs) from the client's mobile network and have a vendor proprietary format depending on the vendor itself: e.g., Huawei, Nokia, Ericsson, Samsung, ZTE . . .

the technology of the mobile network: 2G, 3G, 4G, 5G, etc.

the trace format: e.g., there are Huawei 4G traces in format "TRC" and Huawei 4G traces in format STDSIG, and not only the format changes but also the content (there is information present in one but not in the other and vice versa)

the trace release: there can be internal changes between vendor release X.1 and vendor release X.2 of a certain trace format (changes in existent information, addition of new information, deprecation of existent information)

CDR Generation Service Architecture

Figure 1:
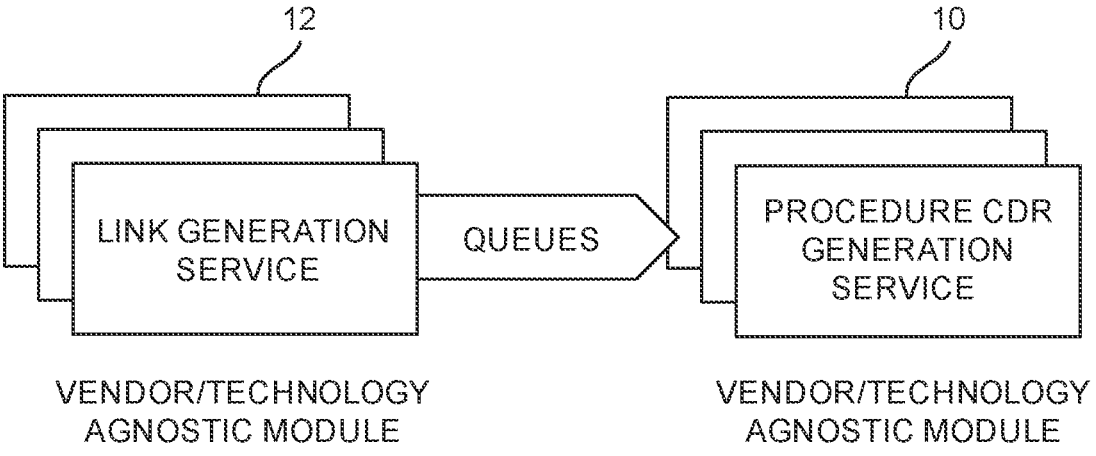
FIG. 1 is a block diagram of an architecture of a CDR generation service.

FIG. 1 is a block diagram of an architecture of a procedure CDR generation service 10. Input information for the procedure CDR generation service 10 is the vendor/technology agnostic output information generated by a Link Generation Service 12 and can be considered vendor/technology agnostic itself.

TABLE 1

| Input of the Procedure Generation Service | | |
|---|---|---|
| Field | Type | Description |
| timestamp_utc_ms | int64 | Timestamp of the message in milliseconds |
| time_zone_correction | int32 | Time zone correction |
| timestamp_dst_cor | int32 | Day Light Save Time Correction |
| technology | int32 | Technology |
| vendor | int32 | Vendor |
| version | int32 | Version |
| mcc | string | Mobile Country Code of the subscriber network (3 digits) |
| mnc | string | Mobile Network Code of the subscriber network (2/3 dig) |
| fragment_id_1 | int64 | First Identifier of the Unique Session Id for the UE |
| fragment_id_2 | int64 | Second Identifier of the Unique Session Id for the UE |
| enb_id | int64 | eNode B Id or gNode B Id depending on technology |
| cell_id | int32 | Cell Id |
| core_ue_ide | int64 | mme_ue_s1ap_id or amf_ue_ngap_id depending on the technology. Uniquely identifies the UE association over the S1 interface within the MME or NG interface within the AMF |
| ran_ue_id | int64 | enb_ue_s1ap_id or ran_ue_ngap_id depending on the technology. Uniquely identifies the UE association over the S1 interface within a eNB or NG interface within an gNB |
| gummei | int64 | gummei or guami depending on the technology. Unique identifier of a MME or an AMF |

TABLE 1-continued

| Input of the Procedure Generation Service | | |
|---|---|---|
| Field | Type | Description |
| c__rnti | int32 | C-RNTI Identifier |
| message__type | int32 | enumerated to identify the same message from different vendors |
| message__direction | int32 | Message direction: sent, received |
| message__content | bytes | asn. 1 content for 3GPP messages, raw data for messages |
| cell__fragment__identifier | int64 | Unique Identifier to link message to a cell Fragment Identifier. 2 pod ID, 6 auto incremental (starting from 0) |
| message__index | int64 | Message index inside of the cell fragment |
| ne__source__type | int32 | Source network element type |
| ne__source__identifiers | int64 | Source network element internal unique identifier |
| ne__target__type | int32 | Target network element type |
| ne__target__identifiers | int64 | Target network element internal unique identifier |
| imsi | string | International Mobile Subscriber Identity |
| ue__mcc | string | Mobile Country Code of the Home Public Land Mobile Network |
| ue__mnc | string | Mobile Network Code of the Home Public Land Mobile Network |
| imei | string | International Mobile Equipment Identity |
| svn | string | Handset Software Version |
| handset__tac | string | Type Allocation Code of the subscriber handset |
| source__identifier | int32 | Source identifier with edge information to allow edge distribution. 1 edge, 3 pod ID |
| gnodeb__id__length | int32 | Number of bits used to encode gNodeb__id |

Since the input messages to the Procedure CDR Generation Service 10 are the output of the Link Generation Service 12, every message already belongs to a cell fragment.

The Parser aims to create fast outputs, breaks down a UE (User Equipment) session or 'call' into 'cell fragments', separating in different outputs the part of the connection under each serving cell. In this document, the words "call", "cell fragment of a call" and "context" are used interchangeably.

Figure 2:
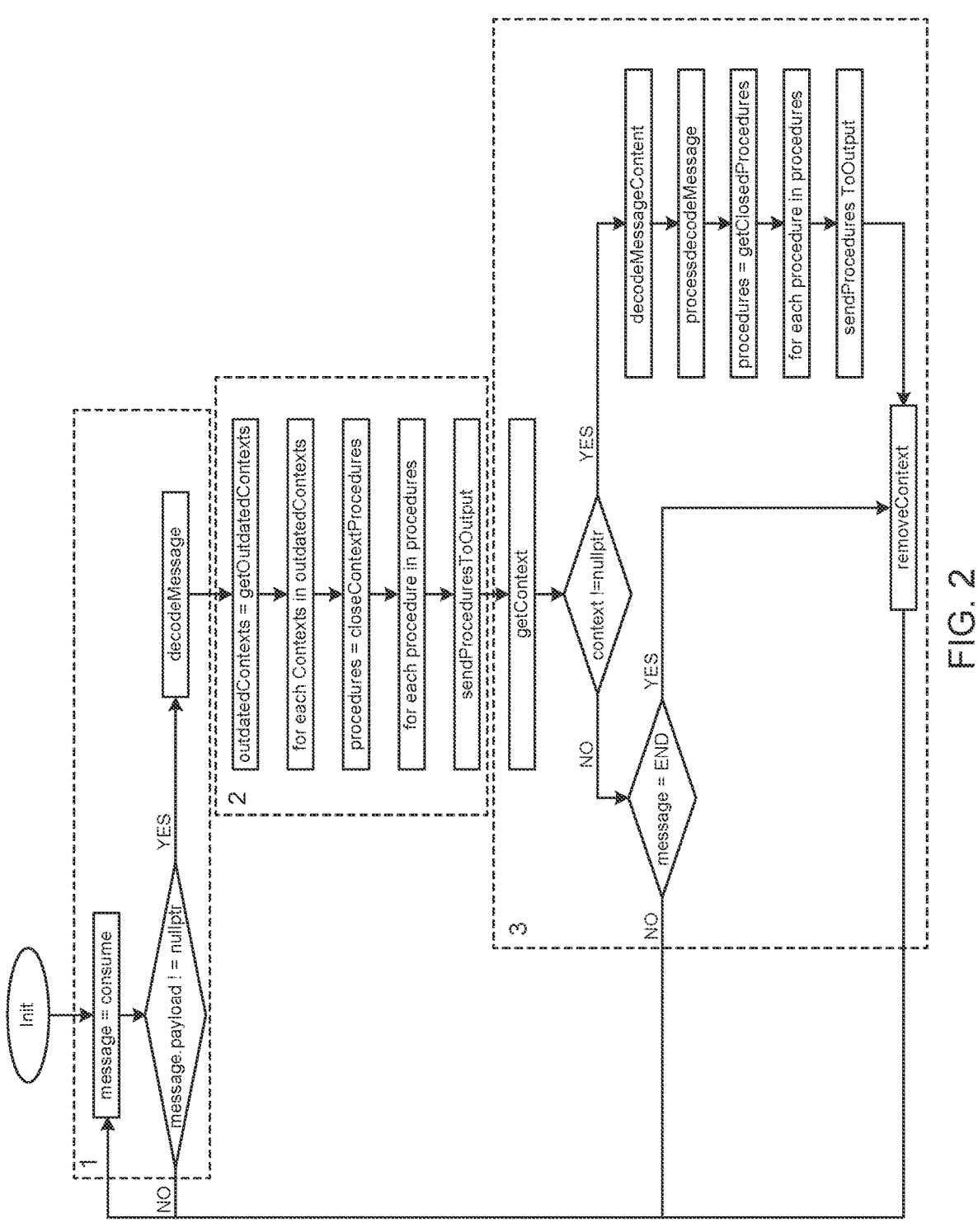
FIG. 2 is a flowchart of a CDR generations service.

FIG. 2 is a flowchart of a CDR generations service. The Procedure CDR Generation Service 10 can be divided in several main stages:

1. The extraction of the message from the input queue and the message de-codification of the header parameters.

2. Memory control: The contexts will be removed as a general rule when 'End' message arrives, but in case this message is missed, there is also a cleaning mechanism triggered every X messages or every X seconds. When the message arrives to this module, the first thing is to check if the cleaning mechanism should be triggered. Note that the cleaning mechanism works at Network Element (NE) level, that is, a message can only remove contexts from its own NE. For each context removed, all procedures will be closed and sent to the output queue. In an embodiment, every time a procedure is sent to the output queue, two different kinds of output can be generated: one with the procedure information itself and another output containing the information related to every message that takes part in the procedure 3. Procedure generation algorithm: When the message arrives to this stage, it searches for a context identified by cell_fragment_identifier and source_identitifier. In case the context is not found, it is created and stored in this module. When a context is created, the different procedures related to the context technology will be created.

Then depending on the message type, the message will decode its content to get the parameters need for the processing in the procedures algorithm. After the decoding, the message will be processed in the context. This process can trigger the closure of one or several procedures. All the closed procedures will be sent to the output to be serialized and sent to the output queue.

The message processing in the context will be explained in the following sections of the document.

Message Processing in the Context

Figure 3:
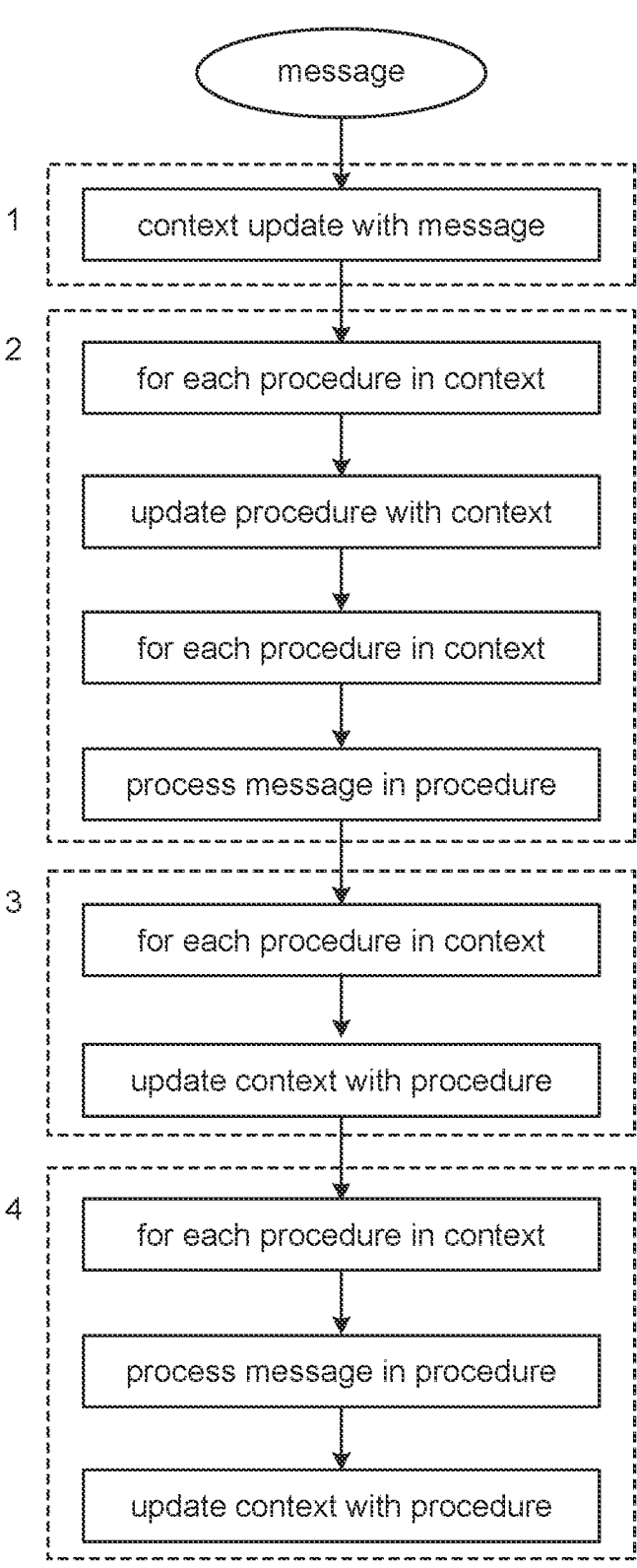
FIG. 3 is a flowchart of message processing stages.

FIG. 3 is a flowchart of message processing stages. For each message received we have 4 steps:

1. Update context information with message information: UE parameters: international mobile subscriber identity (IMSI), UE MCC, UE MNC, IMEI, TAC, SVN, . . .

Messages already received in the context (with this information we can decide for example if the context has ended or not)

2. Update procedures information:
   a. Update procedure with the context information. Procedures also have information related to the context. Depending on the procedure this information is related to the beginning of the procedure or to the end of it.
   b. Update procedure information with the message information. The logic of each procedure will be development in the following sections.

3. Update context information with the procedure information

Once the message has updated the procedures, each procedure shall update the context with its current state.

4. Reprocess message in procedure: In some scenarios, the processed message triggers the closure of one procedure, but without being attached to said procedure. In those cases, once said procedure has been closed, the message should be reprocessed to generate the creation of the procedure it really belongs to. This is shown in the flowcharts as 'store message'.

There are several general procedure concepts that are used in the following procedures:

Update timestamp: update start and end timestamp of the procedure with the message information All procedures process 'End' message, being the last message of the context.

Add to MF: add to msg_id_list

Figure 4:
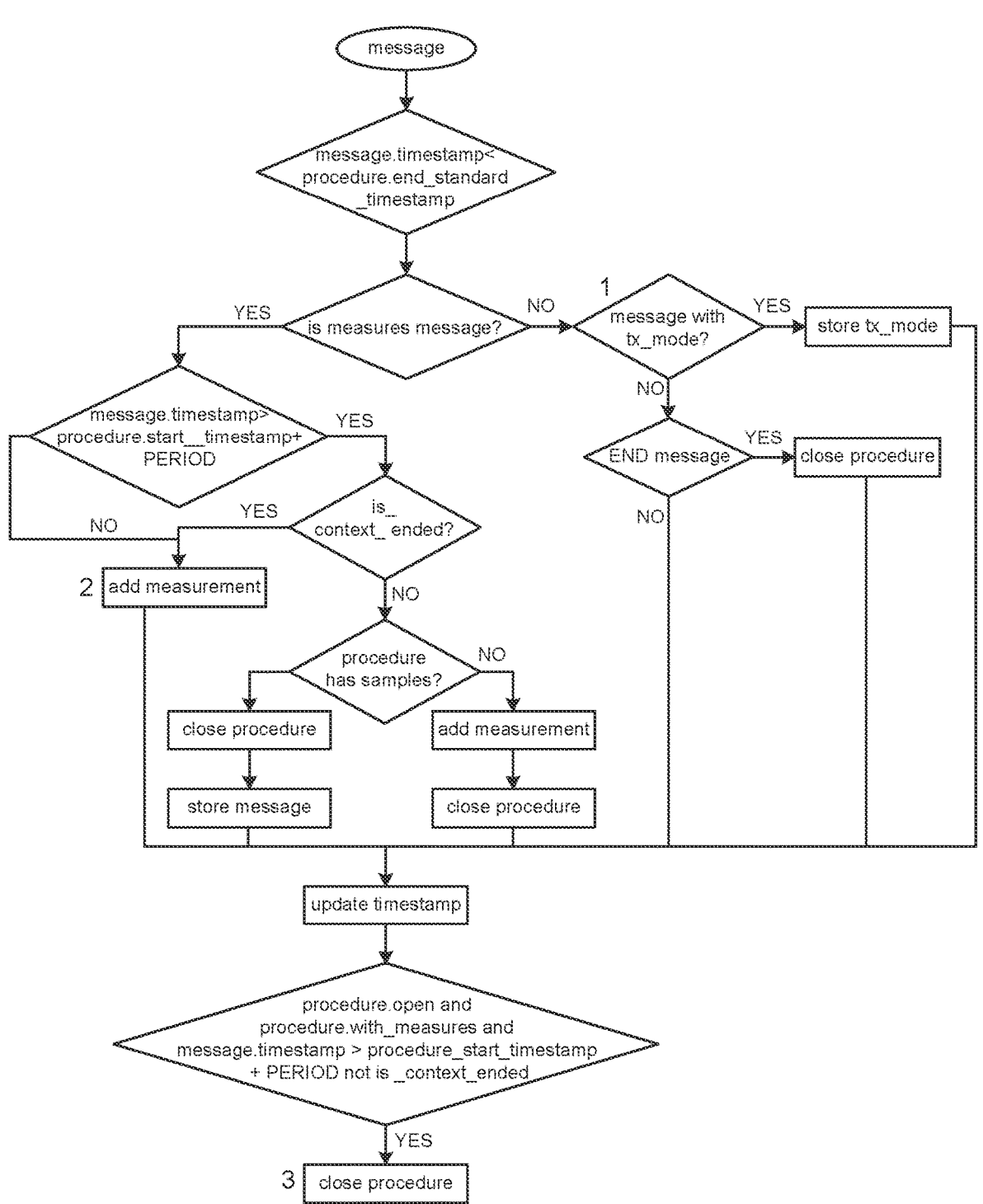
FIG. 4 is a flowchart of 4G serving cell measurements decision process.

Initialize procedure: means that if the procedure is not created, the message will trigger the creation of the procedure, but if it already exists, it will not.

is_context_ended: context is marked as ended if it has received one of the following messages:

> EUTRA-RRC RRC Connection Release, S1AP UE Context Release Command and S1AP UE Context Release Complete
>
> End
>
> S1AP Handover Required, S1AP UE Context Release Command and S1AP UE Context Release Complete
>
> NR-RRC RRC Connection Release, NGAP UE Context Release Command and NGAP UE Context Release Complete
>
> End
>
> NGAP Handover Required, NGAP UE Context Release Command and NGAP UE Context Release Complete 4G Serving Cell Measurements FIG. 4 is a flowchart of 4G serving cell measurements decision process. This procedure will be generated periodically (configurable period) to summarize the measurements performed over the 4G serving cell during that time interval.

Although messages of all types are involved in the procedure for time tracking purposes, only the following messages will be used to calculate the specific output parameters for this procedure:

> 2 EUTRA-RRC RRC Measurement Report standard 3GPP messages
>
> 2 UL SINR vendor messages
>
> 2 Timing Advance vendor messages
>
> 2 Throughput vendor messages In FIG. 4, Diamond 1: Messages that can contain tx_mode parameter are the following: EUTRA-RRC RRC Connection Setup, EUTRA-RRC RRC Connection Reconfiguration, EUTRA-RRC RRC Connection Reestablishment, EUTRA-RRC RRC Connection Resume, EUTRA-RRC Handover Preparation Information and EUTRA-RRC Handover Command.

Rectangle2: Add Measurement Implies:

> 2 Store the current value of the measure to update the context
>
> 2 Aggregate the value of the measure to be able to calculate the average value during the interval
>
> 2 Update the maximum value of the measure if it is necessary
>
> 2 Add to MF Rectangle3: Close Procedure Implies:

> 2 Calculate average values of the different measures
>
> 2 Decide which message that contains tx_mode will be added to the interval. Algorithm decision is the following:
>
>> When a message with tx_mode appears, we store messageid, timestamp (t1) and tx_mode value (v1)
>>
>> When another message with tx_mode appears and value is different (v2< >v1): we close the time interval with the old tx_mode value (v1 from t1 to t2). Additionally, we store the messageId, timestamp (t2) and tx_mode value (v2)
>>
>> When measurement interval ends, we check the tx_mode that has been in use with a maximum time interval. That value will be reported in the output procedure, adding to the MF only the messageID with the reported value 5G Serving Cell Measurements This procedure will be generated periodically (configurable period) to summarize the measurements performed over the 5G serving cell during that time interval. Although messages of all types are involved in the procedure for time tracking purposes, only the following messages will be used to calculate the specific output parameters for this procedure:

> 2 NR-RRC RRC Measurement Report standard 3GPP messages
>
> 2 UL SINR vendor messages
>
> 2 Timing Advance vendor messages
>
> 2 Throughput vendor messages This procedure will be generated periodically (configurable period) to summarize the measurements performed over the 5G serving cell during that time interval. Although messages of all types are involved in the procedure for time tracking purposes, only the following messages will be used to calculate the specific output parameters for this procedure: The process decision is very similar to the FIG. 4. There are slight differences due to the nature of the data in 5G.

4G ERAB

In this section, we are going to explain the 2 types of ERAB procedures (ERAB Establishment and ERAB Release) as they are closely related.

The way this procedure works is different from the other procedures. In this case, we have the ERAB procedure that stores:

> 2 information related with ERAB Establishment and ERAB Release procedure:
>
>> ACTIVE_QCI in the current moment, as it can be modified by every ERAB Established or Released
>>
>> LAST_TIMESTAMP: the timestamp of the last message in the context.
>>
>> UPDATED_CONTEXT: indicates if the ERAB procedure needs to update the context information after the message processing. This procedure updates active_qci, current_service and service parameters in the context
>
> 2 list of ERAB Establishment procedures
>
> 2 list of ERAB Release procedures Every time an ERAB Establishment procedure is closed with RESULT=SUCCESS, an ERAB Release procedure is opened. In case the ERAB Establishment procedure is closed with RESULT=FAILURE, then there is not an ERAB Release procedure associated to it.

There are several scenarios to be considered:

> 2 ERABS established at the beginning of the context
>
> 2 ERAB setup procedure
>
> 2 ERAB modification procedure
>
> 2 ERABS established during incoming handovers (S1 and X2 handovers)
>
> 2 ERAB release procedure initiated by the eNB
>
> 2 ERAB release procedure initiated by the MME
>
> 2 ERABS release at the end of the context In each scenario messages involved are different messages:

> 2 ERABS established at the beginning of the context: S1AP Initial Context Setup Request, S1AP Initial Context Setup Response, S1AP Initial Context Setup Failure
>
> 2 ERAB setup procedure: S1AP ERAB Setup Request, S1AP ERAB Setup Response 2 ERAB modification procedure: S1AP ERAB Modify Request, S1AP ERAB Modify Response 2 ERABS established during incoming handovers (S1 and X2 handovers): S1AP Handover Request, S1AP Handover Request Acknowledge, S1AP Handover Failure, X2AP Handover Request, X2AP Handover Request Acknowledge, X2AP Handover Preparation Failure, X2AP Handover Cancel, X2AP SN Status Transfer, S1AP Path Switch Request, S1AP Path Switch Request Acknowledge, S1AP Path Switch Request Failure, X2AP UE Context Release (Note: only X2AP messages traced in target eNB will be processed, except X2AP UE Context release that will be processed also when it is traced in source eNB)

2 ERAB release procedure initiated by the eNB: S1AP ERAB Release Indication

Figure 5:
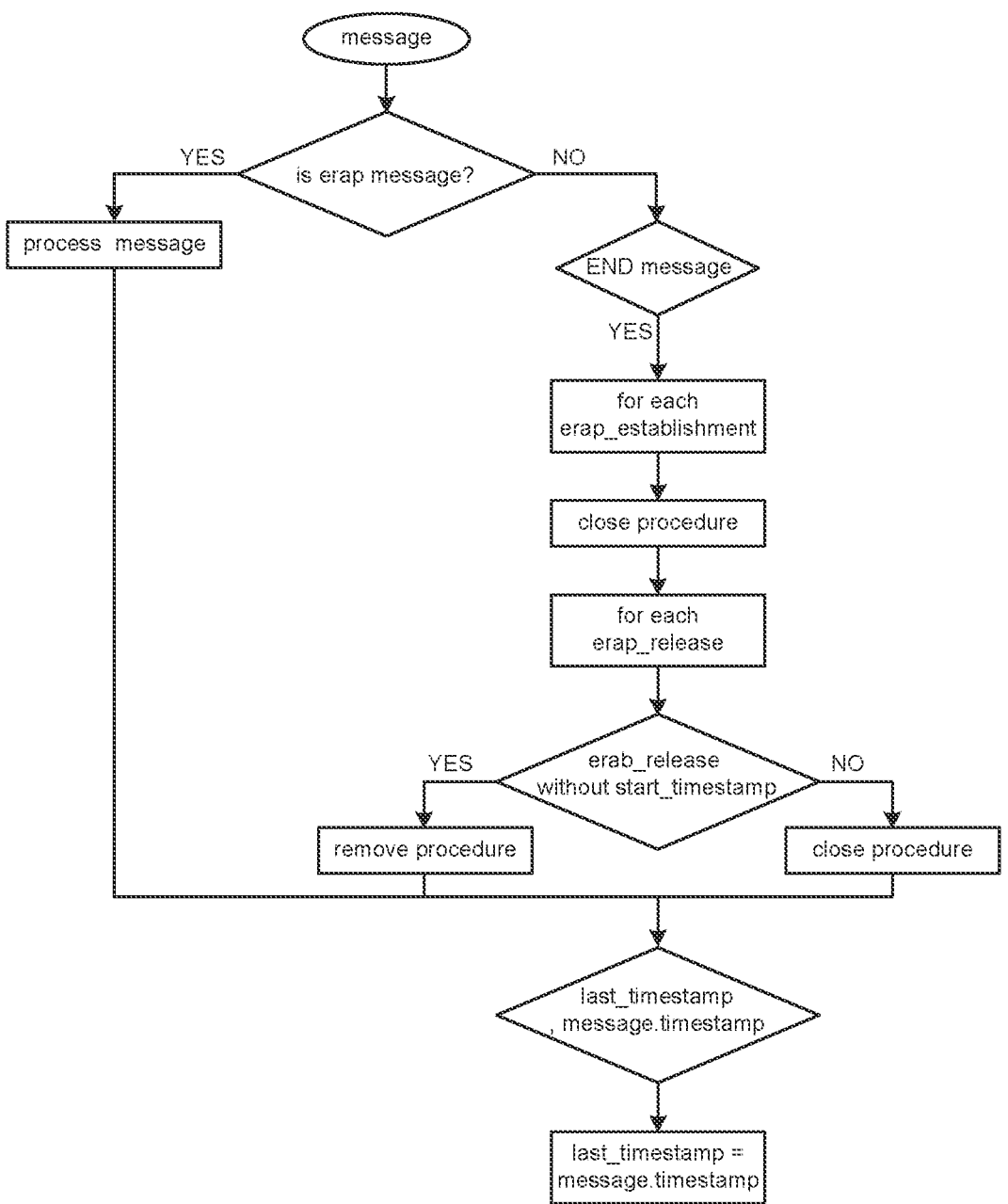
FIG. 5 is a flowchart of a 4G ERAB (E-UTRAN (Evolved-UMTS (Universal Mobile Telecommunications System) Terrestrial Radio Access Network) Radio Access Bearer) decision process.

2 ERAB release procedure initiated by the MME: S1AP ERAB Release Command, S1AP ERAB Release Command 2 ERAB release at the end of the context: EUTRA-RRC RRC Connection Release, S1AP UE Context Release Request, UE Context Release Command, UE Context Release Complete FIG. 5 is a flowchart of a 4G ERAB (E-UTRAN (Evolved-UMTS (Universal Mobile Telecommunications System) Terrestrial Radio Access Network) Radio Access Bearer) decision process. To correctly understand the decision algorithm for each message, details on several concepts are provided below:

2 Initialize ERAB Establishment implies:
Create a new erab_establishment procedure
Set eRab Id and Technology.
Add erab_establishment to the erab_establishment map of the ERAB procedure
Set updated_context=true 2 Initialize ERAB Release implies:
Create a new erab_release procedure
Set eRab Id and Technology.
Add erab_release to the erab_release map of the ERAB procedure 2 Knowing if an ERAB Establishment/ERAB Release is initialized: in case of ERAB Establishment search in erab_establishment map an ERAB by erab_id and technology. In case of ERAB Release, search the ERAB in the erab_release map with the same parameters.

Figure 6:
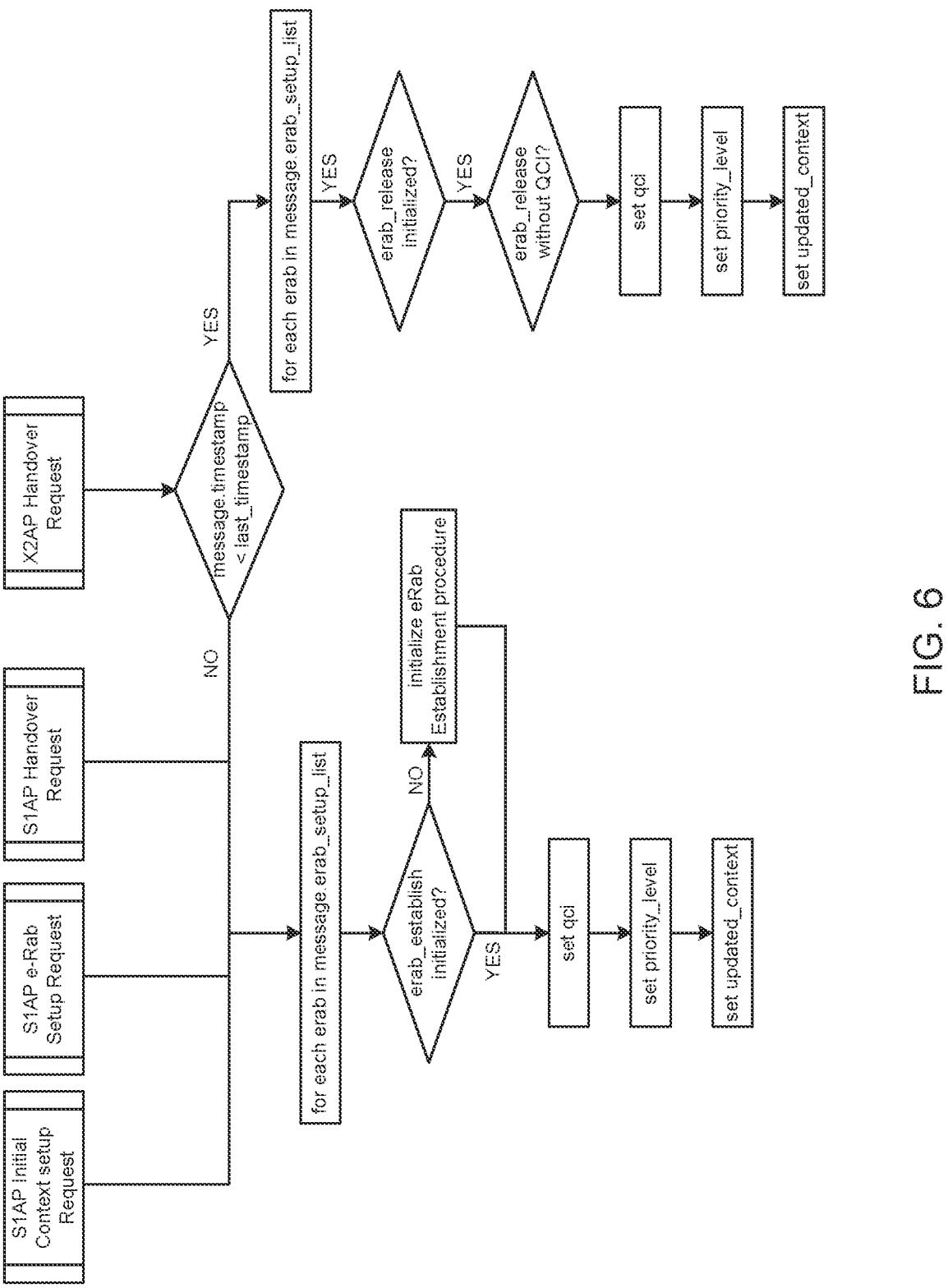
FIG. 6 is a flowchart of a 4G ERAB establishment initiating request messages decision process.

2 Close ERAB Establishment implies:
If the procedure does not have a result, then result=FAILURE and if the closure is triggered by 'End' message, then result_cause=CALL_ENDED, otherwise
result_cause=INCOMPLETE_PROCEDURE
Set updated_context=true 2 Close ERAB Release implies:
If the procedure does not have a result, and if the closure is triggered by 'End' message, then result_cause=CALL_ENDED and update start_timestamp and end_timestamp with message timestamp, otherwise then result=FAILURE, result_cause=INCOMPLETE_PROCEDURE
Update erab_start_timestamp with end_timestamp in case the parameter is not initialized.
Set updated_context=true 2 Remove ERAB: remove ERAB from erab_release_map or erab_establishment map in eRab procedure without generating an output 2 Reset ERAB: reset ERAB parameters: start_timestamp, end_timestamp, message_id_list The decision algorithms for each message are shown in the following figures:

FIG. 6 is a flowchart of a 4G ERAB establishment initiating request messages decision process.

Figure 7:
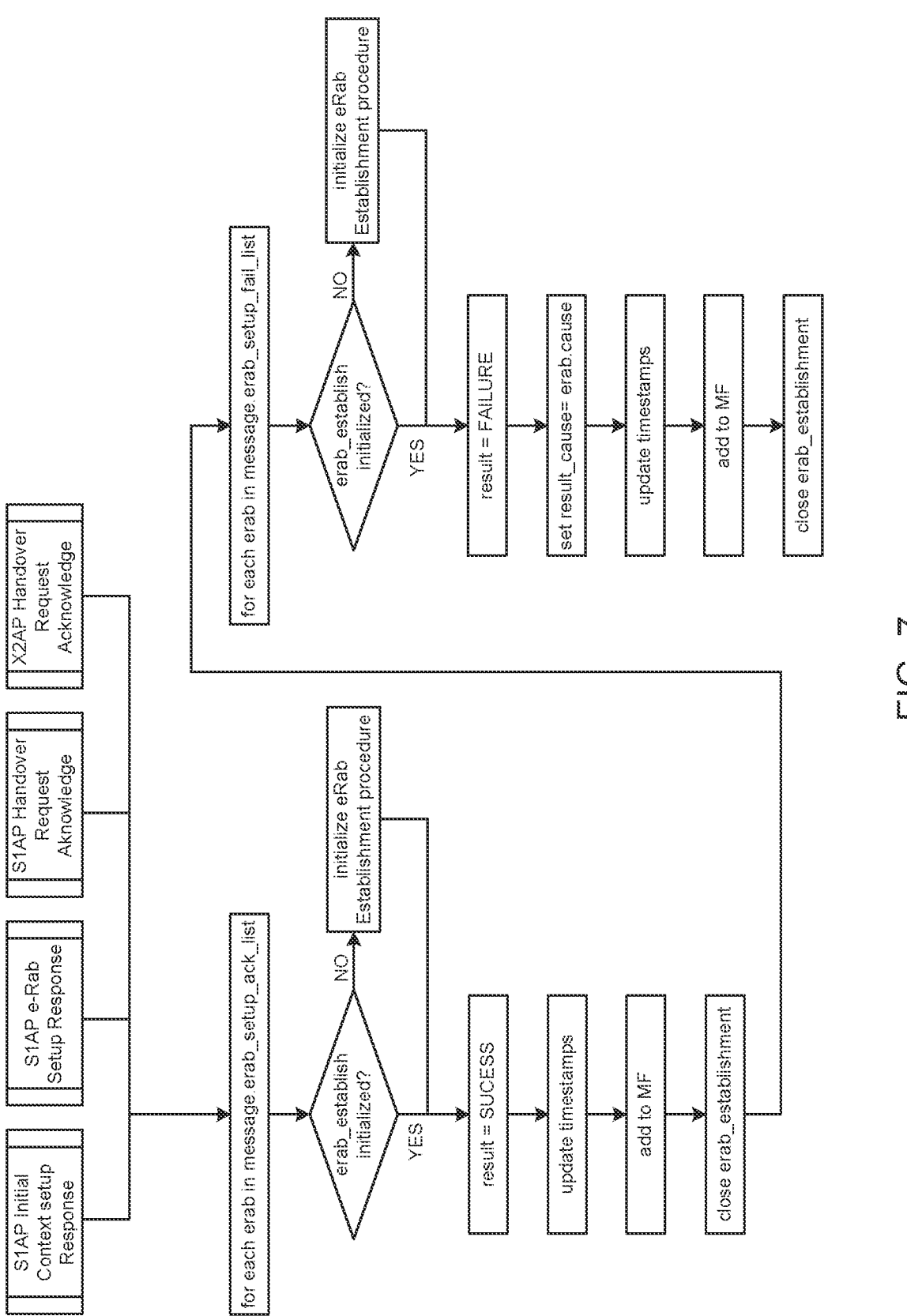
FIG. 7 is a flowchart of an ERAB establishment initiating response success messages decision process.

FIG. 7 is a flowchart of an ERAB establishment initiating response success messages decision process.

Figure 8:
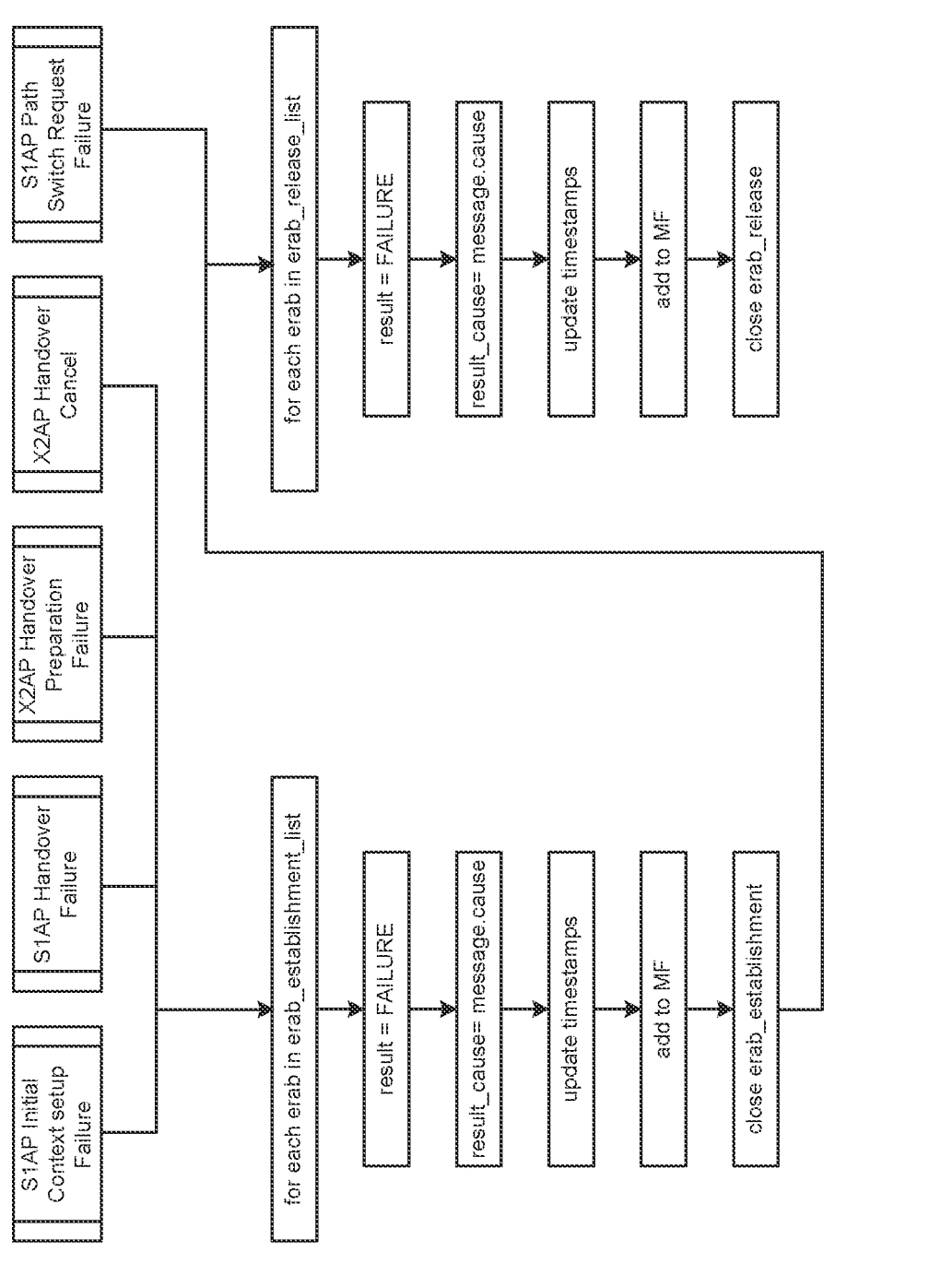
FIG. 8 is a flowchart of an ERAB establishment initiating response failure messages decision process.

FIG. 8 is a flowchart of an ERAB establishment initiating response failure messages decision process.

Figure 9:
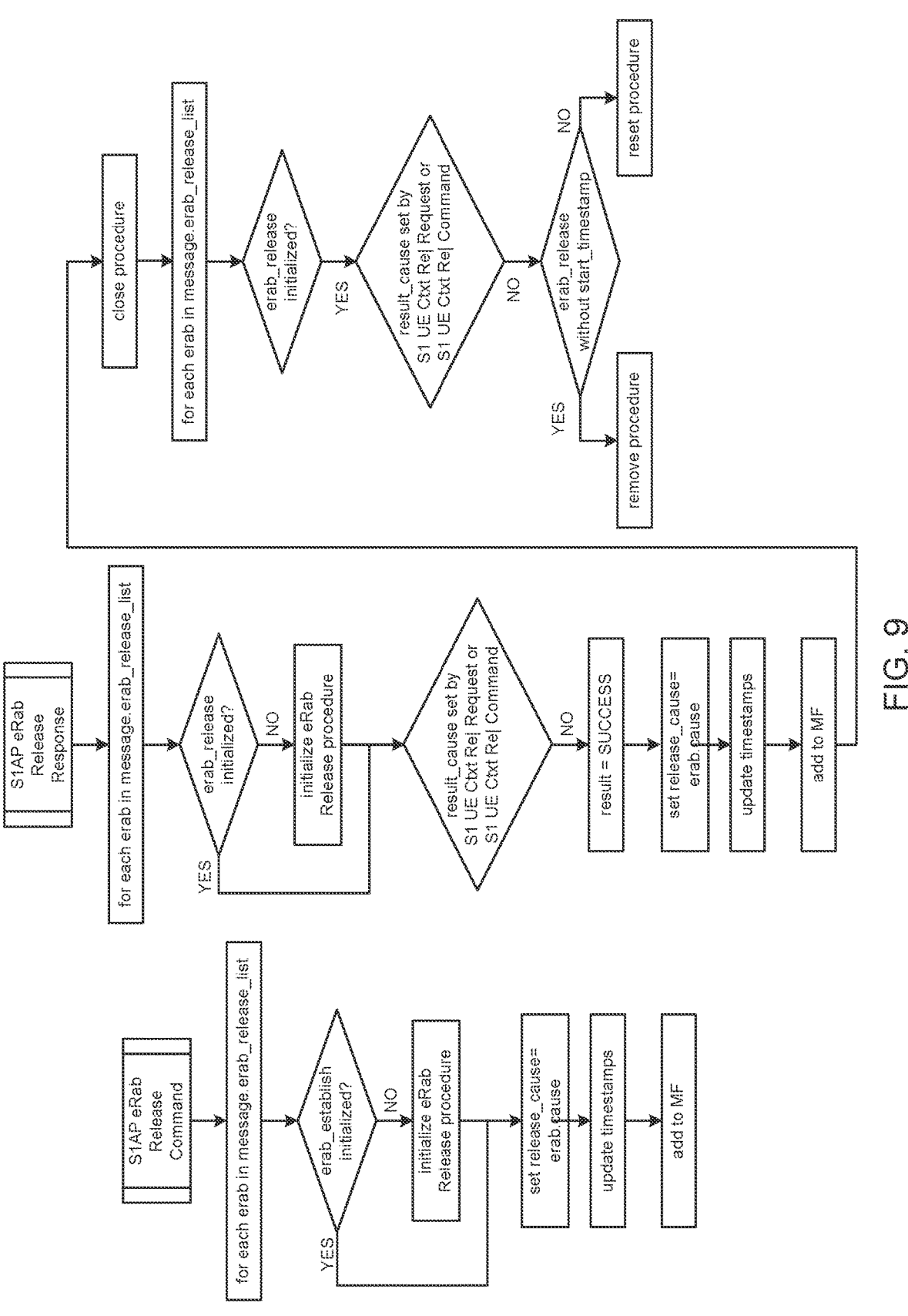
FIG. 9 is a flowchart of an ERAB release initiating by Mobility Management Entity (MME) messages decision process.

FIG. 9 is a flowchart of an ERAB release initiating by Mobility Management Entity (MME) messages decision process.

Figure 10:
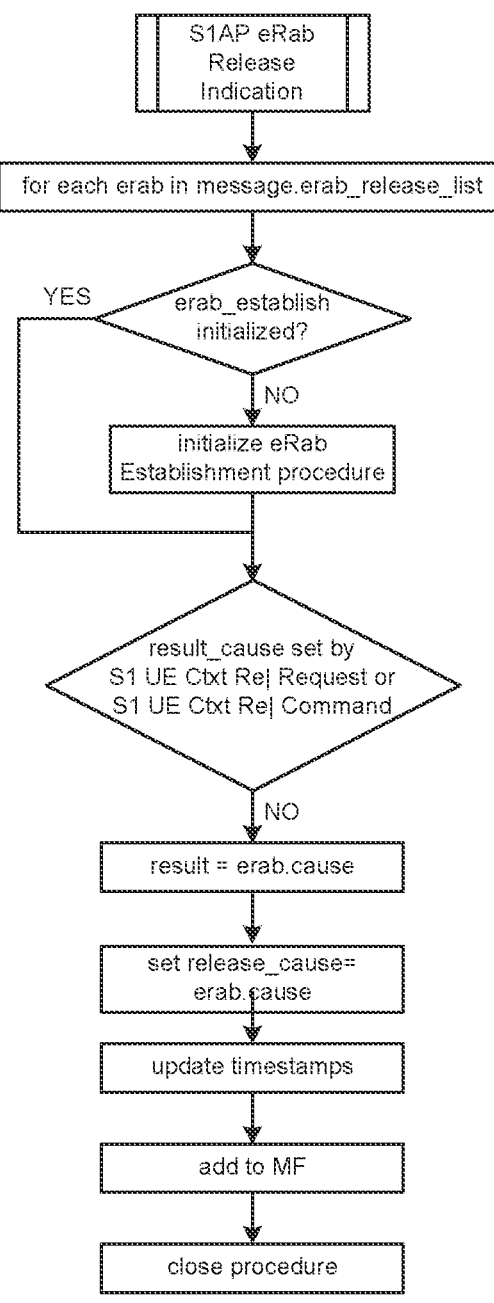
FIG. 10 is a flowchart of an ERAB release initiating by evolved Node B (eNB) messages decision process.

FIG. 10 is a flowchart of an ERAB release initiating by evolved Node B (eNB) messages decision process.

Figure 11A:
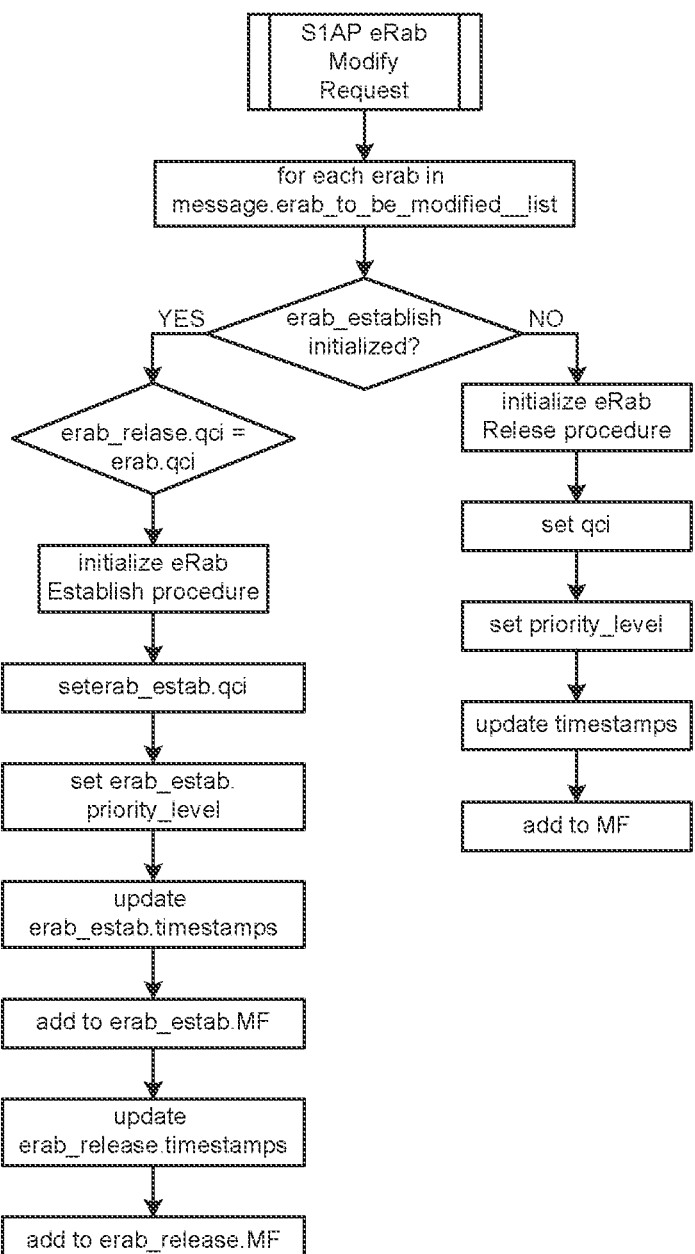
FIGS. 11A-11B are a flowchart of an ERAB modification messages decision process.
Figure 11B:
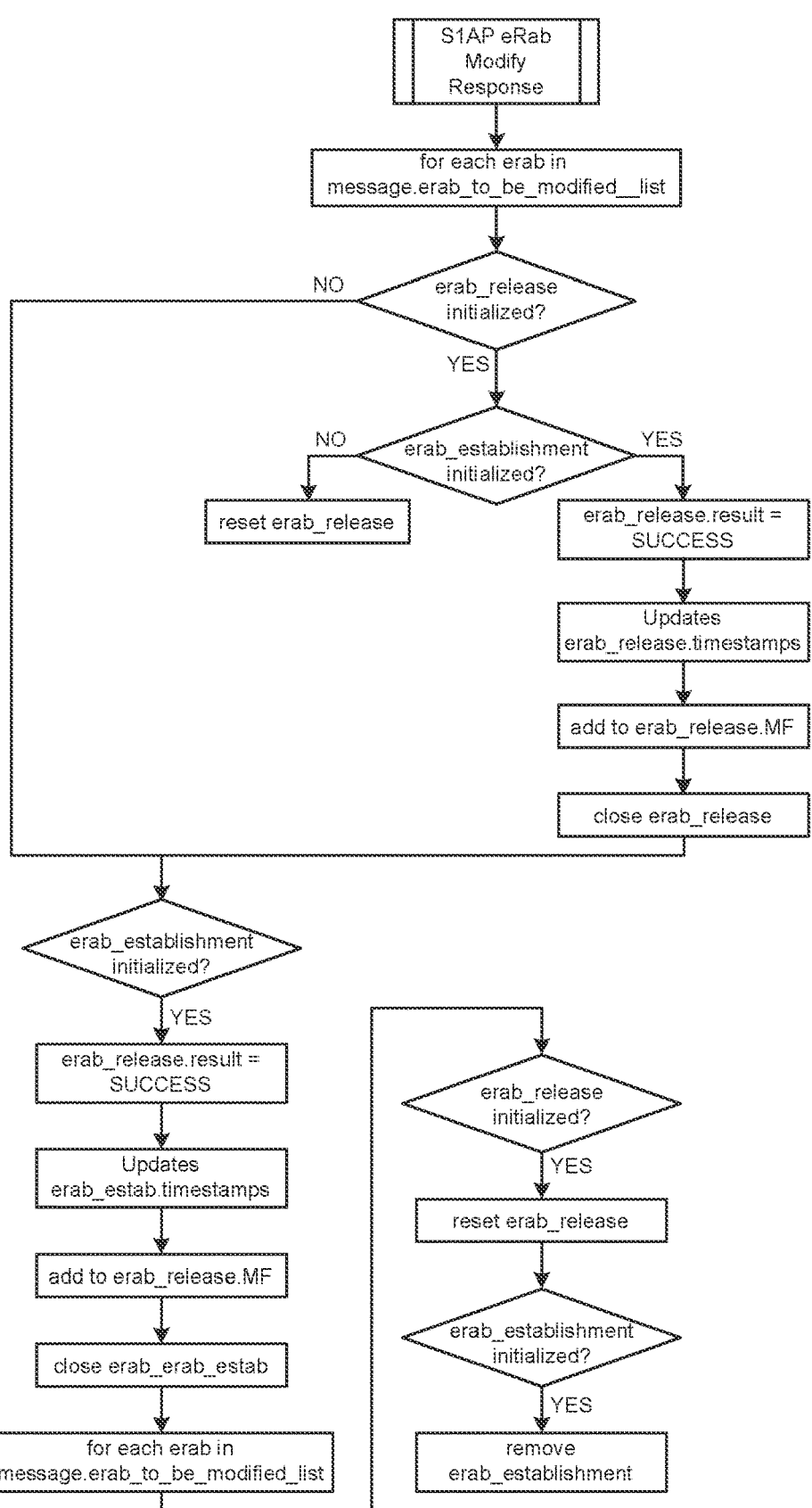

FIGS. 11A-11B are a flowchart of an ERAB modification messages decision process.

Figure 12:
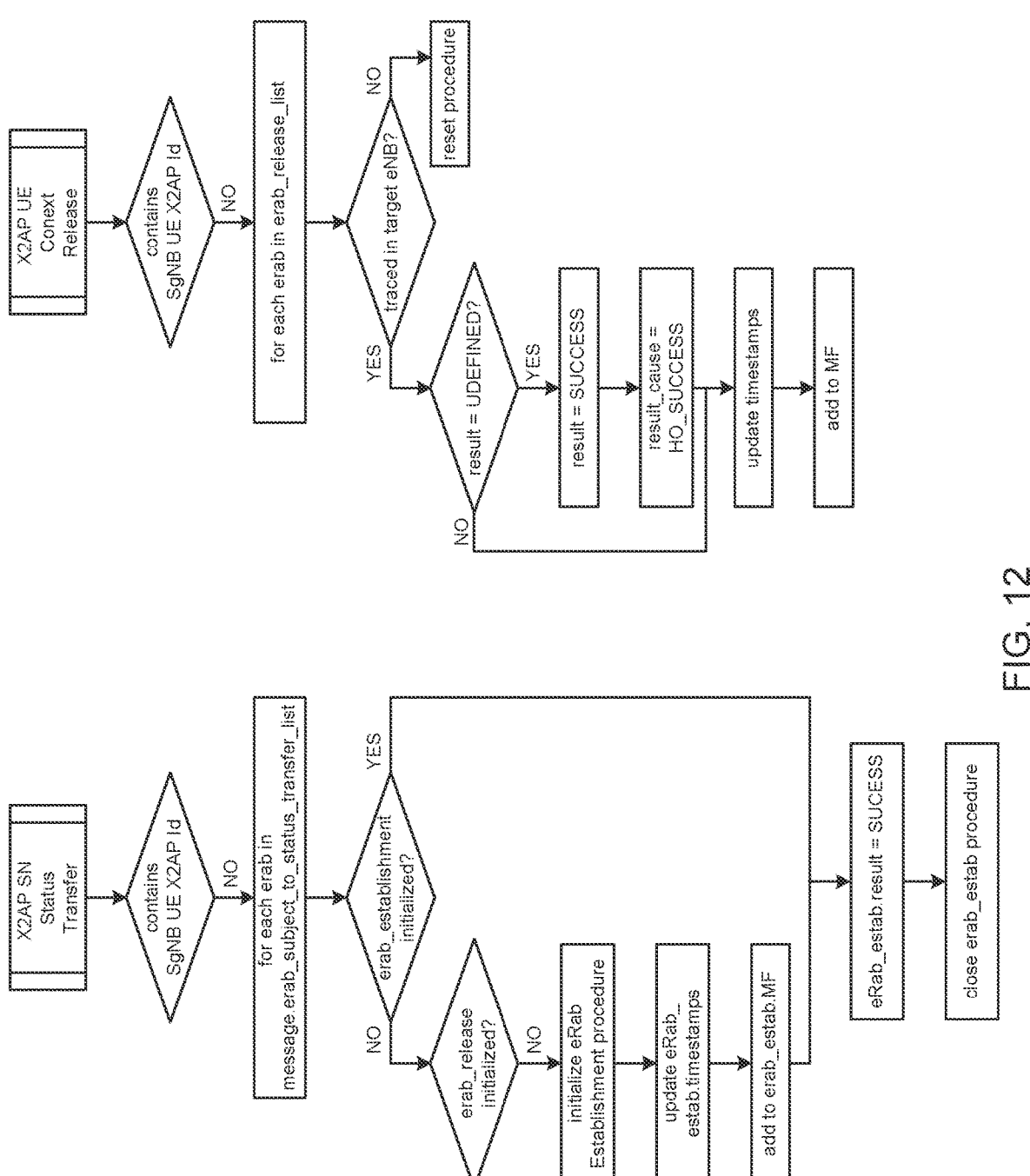
FIG. 12 is a flowchart of an ERAB establishment and release X2AP messages decision process.

FIG. 12 is a flowchart of an ERAB establishment and release X2AP messages decision process.

Figure 13A:
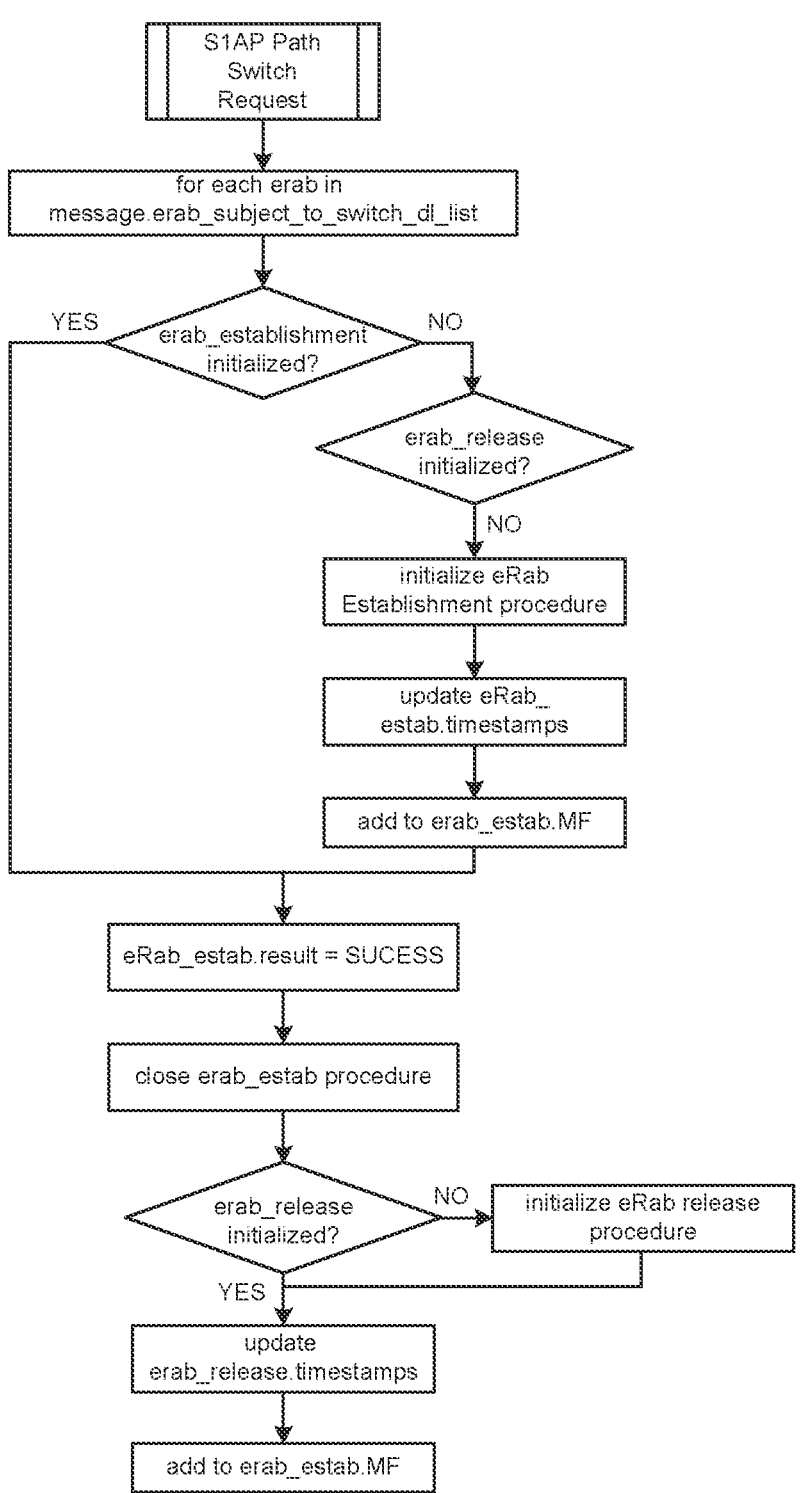
FIGS. 13A-13B are flowcharts of an ERAB establishment and release by Path Switch messages decision process.
Figure 13B:
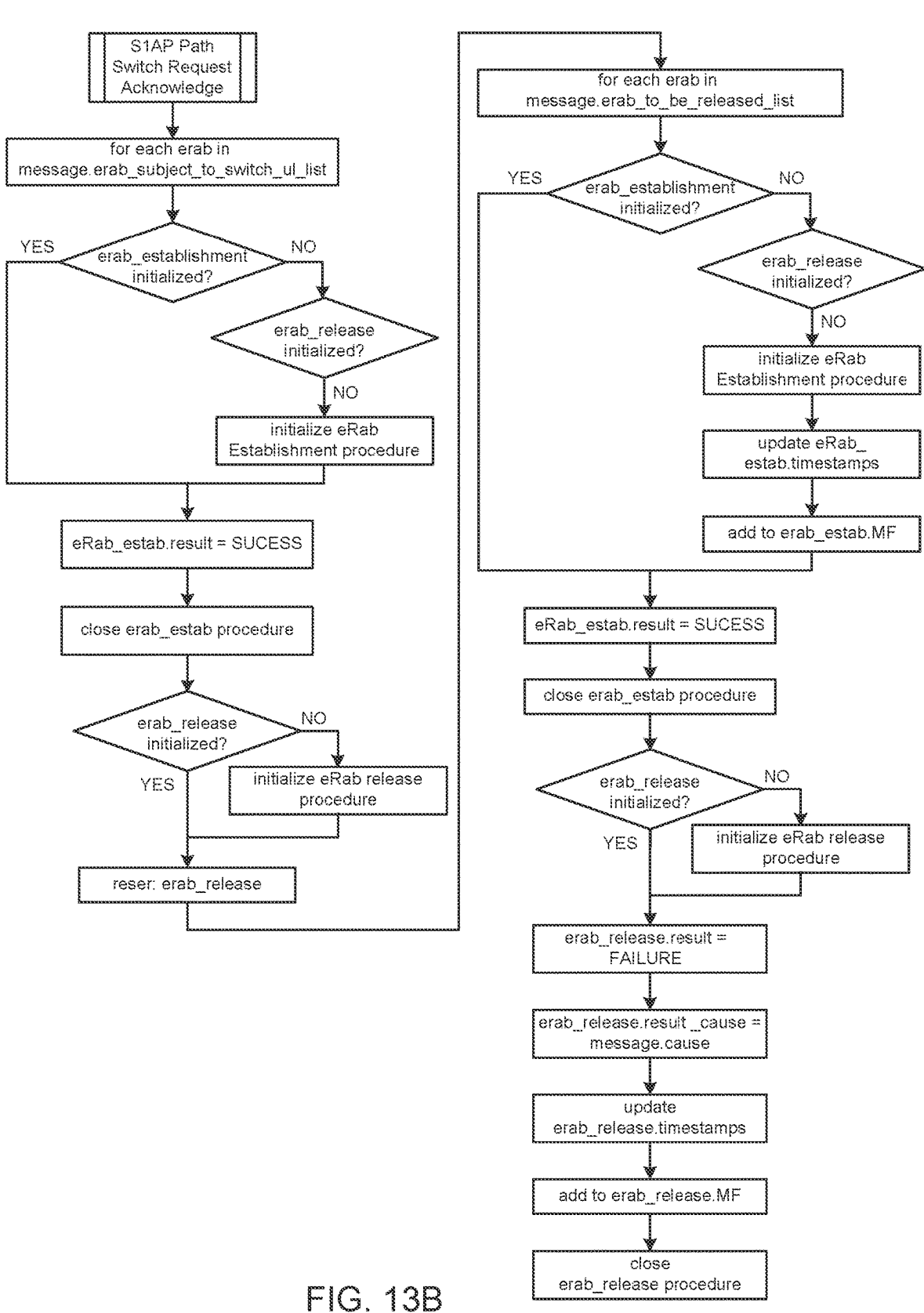

FIGS. 13A-13B are flowcharts of an ERAB establishment and release by Path Switch messages decision process.

FIG. 14 is a flowchart of an ERAB release messages decision process.

Figure 15:
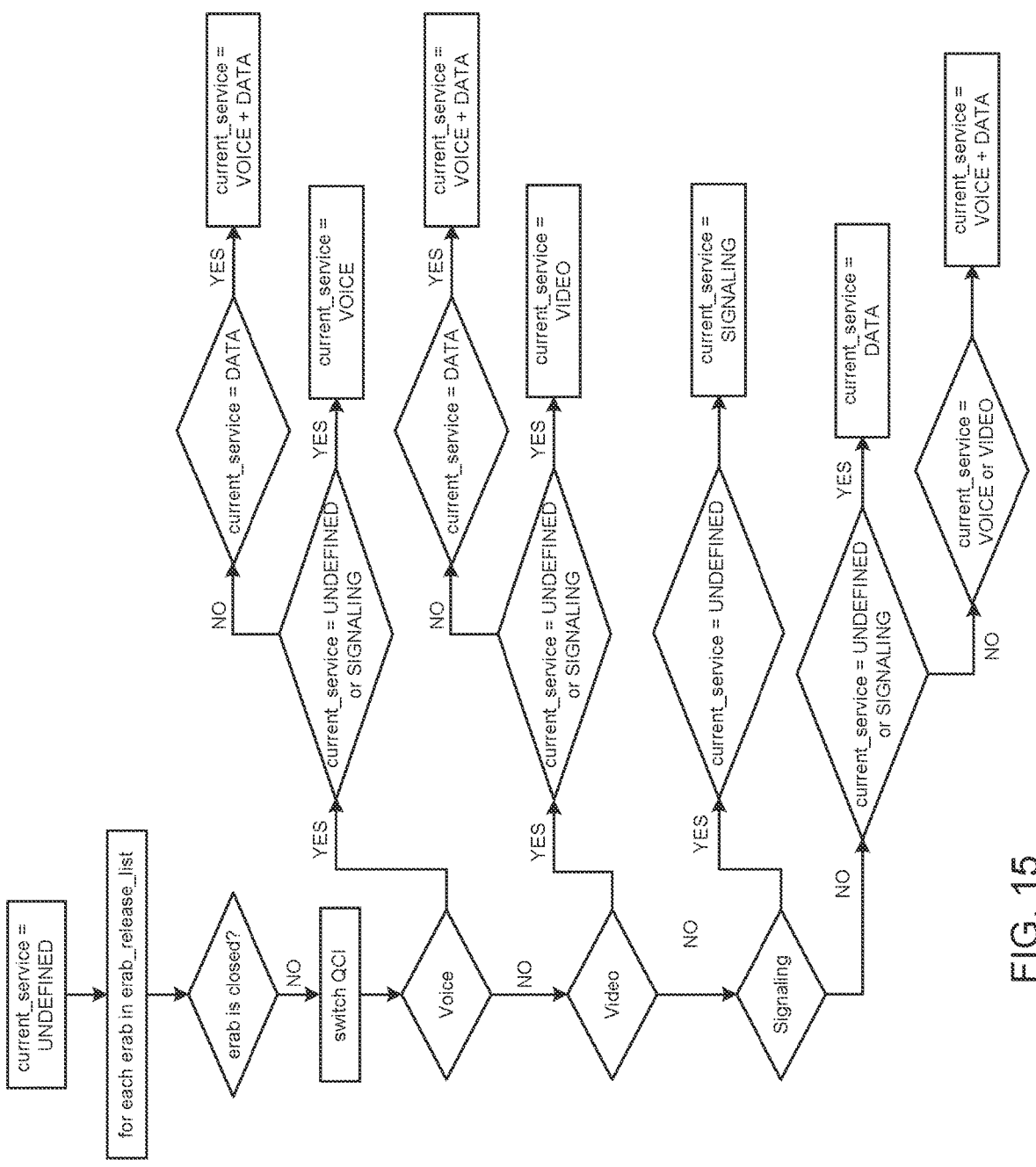
FIG. 15 is a flowchart of a current service decision process in an ERAB procedure.
Figure 16:
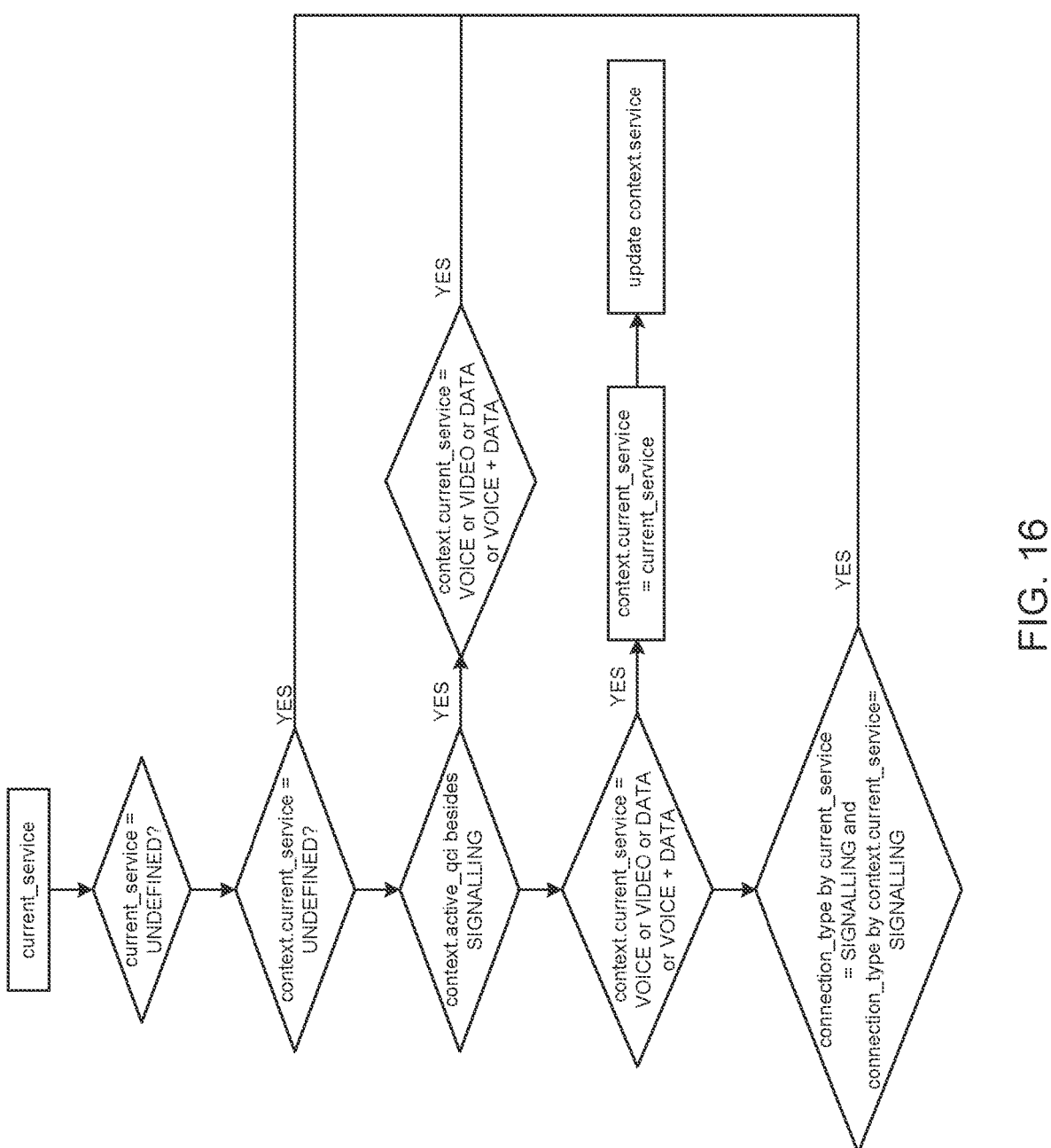
FIG. 16 is a flowchart if a current service decision process in context.

In Rectangle1 of FIG. 10, note that depending on the message.cause, the result of the algorithm is established. In FIG. 14, note that ERAB procedure updates the service and the current service of the context. FIG. 15 shows the decision algorithm to obtain the current service from eRab procedure. This current service is the input for the context decision algorithm illustrated in FIG. 16.

Note that the algorithm calculating the current_service in the context (FIG. 16), also calls the algorithm for calculating service in the context, using the calculated current_service as an input parameter.

Table 2 shows the relation between current_service and connection_type

TABLE 2

| Relation between current_service and connection_type | |
| --- | --- |
| Current_service | Connection_type |
| Voice | Voice |
| Video | Video |
| Data | Data |
| Signaling | Signaling |
| Attach/Detach | Signaling |
| Tracking Area Update | Signaling |
| CS Fallback | Signaling |
| Emergency | Emergency |
| Voice + Data | Voice + Data |

Figure 17:
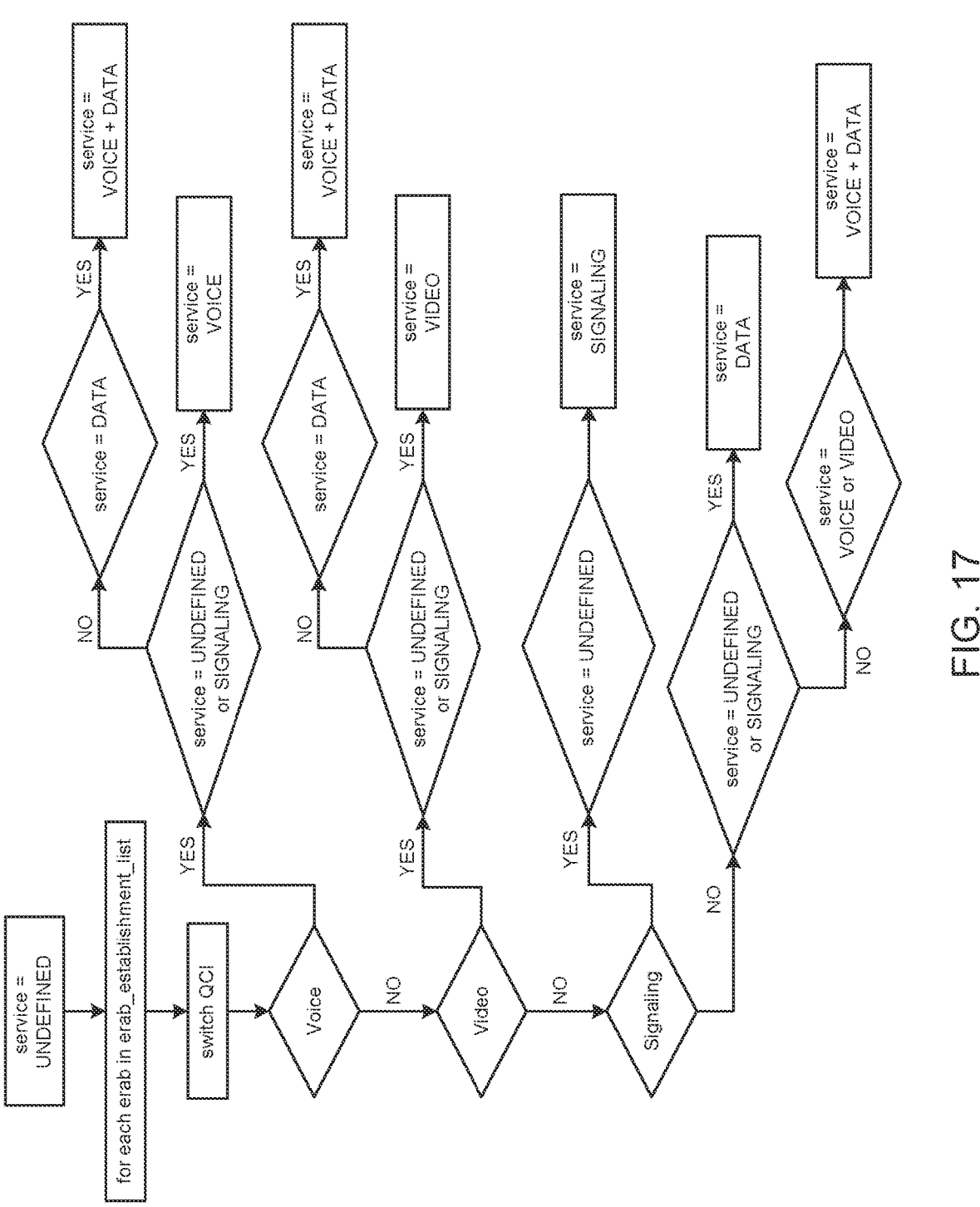
FIG. 17 is a flowchart of a service decision process in an ERAB procedure.
Figure 18:
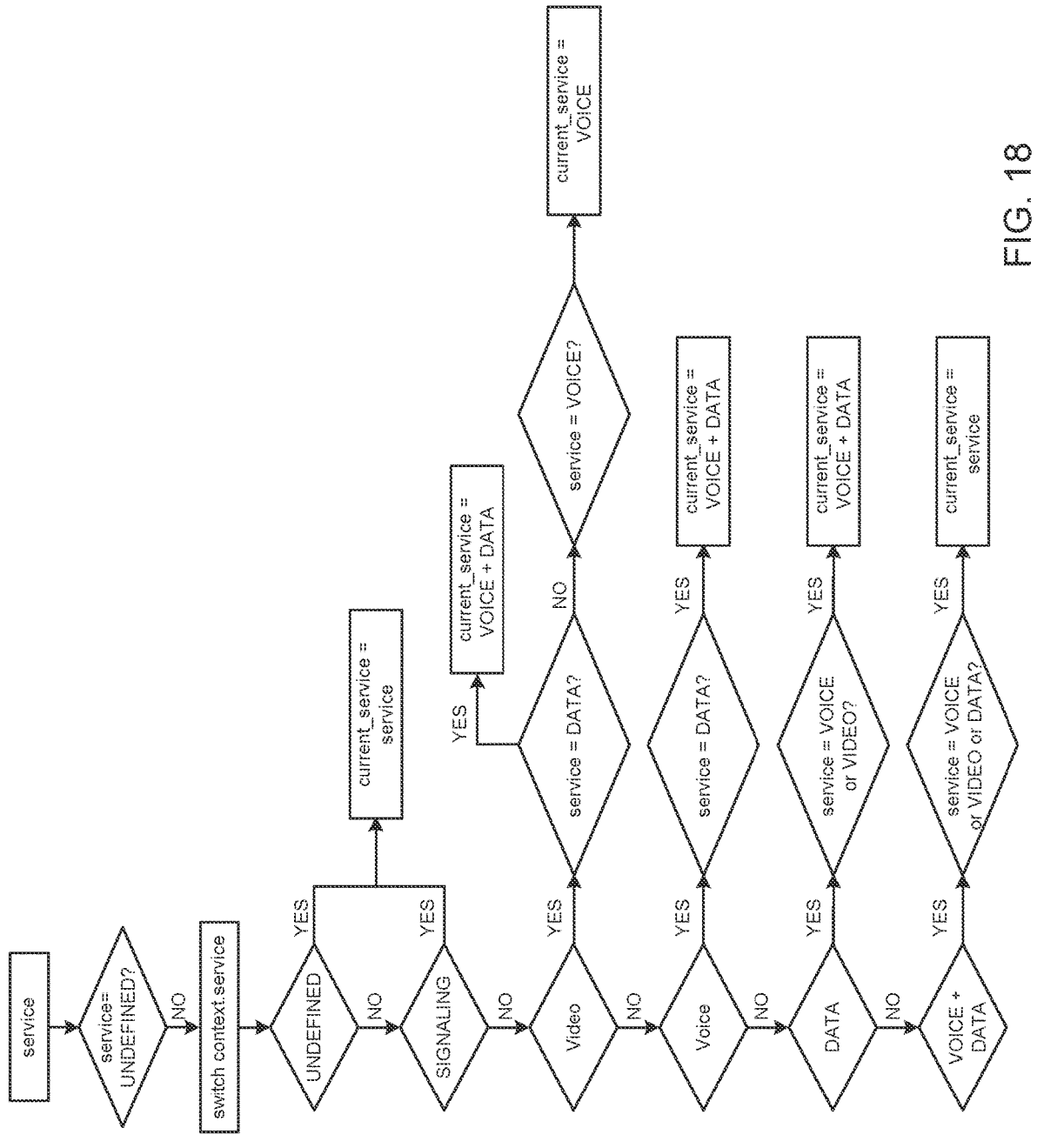
FIG. 18 is a flowchart of a service decision process in context.

Note that the algorithm calculating the current_service in the context (FIG. 16), also calls the algorithm for calculating service in the context, using the calculated current_service as an input parameter. FIG. 17 shows the decision algorithm to obtain the service from ERAB procedure. This service is the input for the context decision algorithm illustrated in FIG. 18.

4G Reestablishment

This procedure will report the reestablishment procedures occurring during the context. The messages involved in the procedure are: EUTRA-RRC RRC Connection Reestablishment Request, EUTRA-RRC RRC Connection Reestablishment, EUTRA-RRC RRC Connection Reestablishment Complete and EUTRA-RRC RRC Connection Reestablishment Reject and X2AP Private messages.

Figure 19:
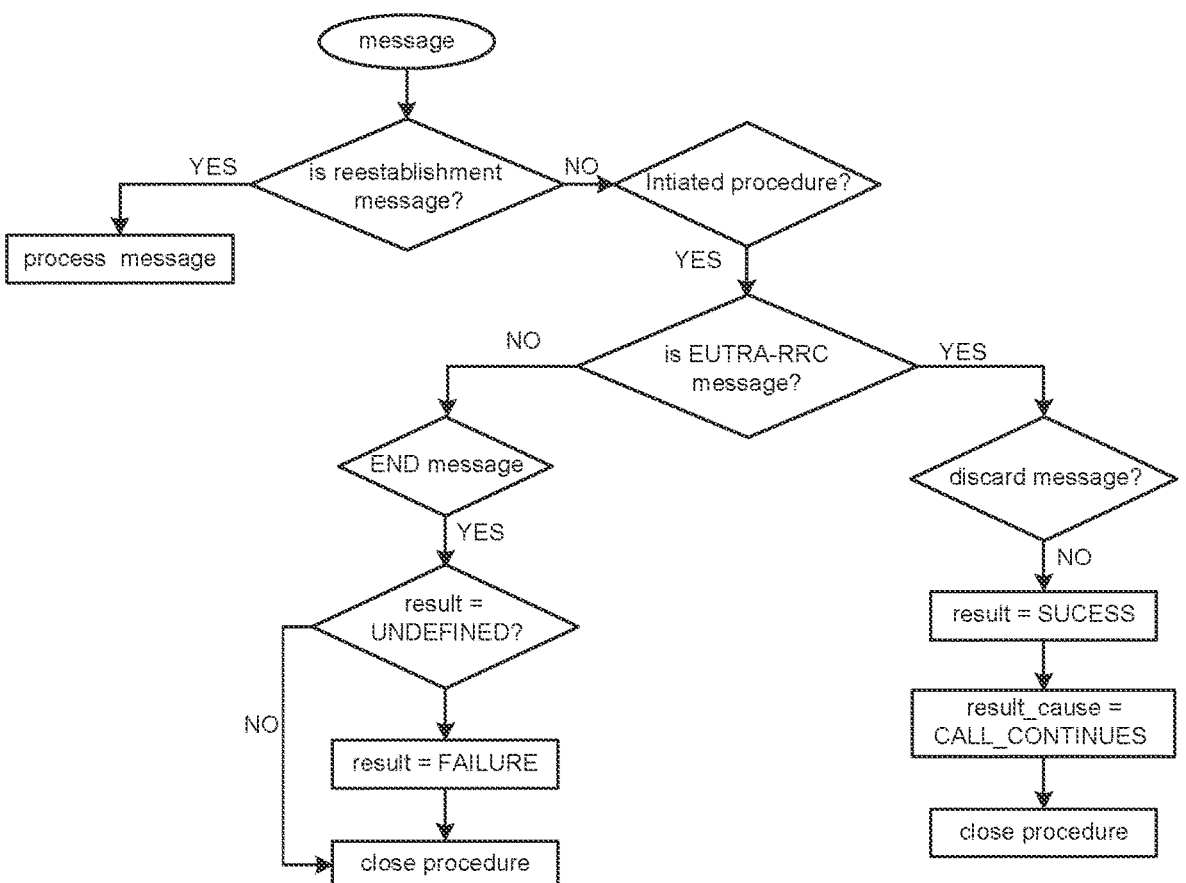
FIG. 19 is a flowchart of a 4G reestablishment decision process.
Figure 20:
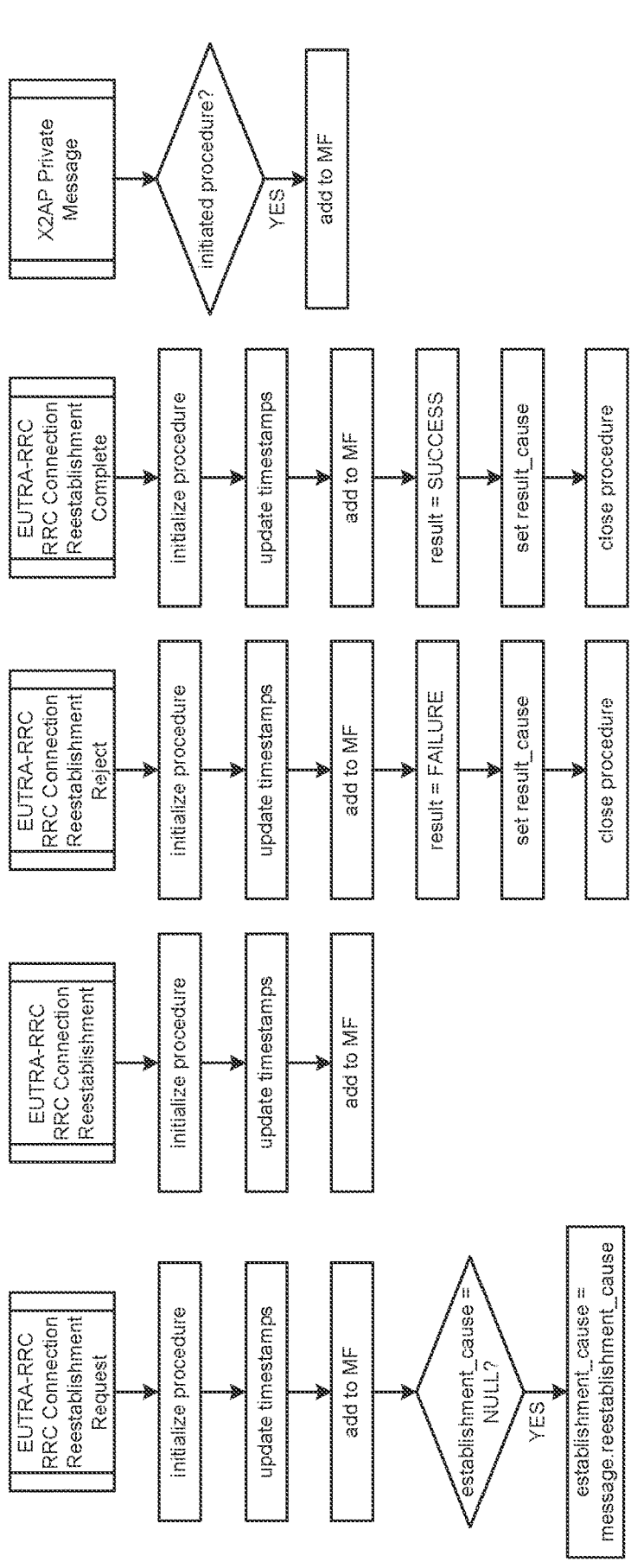
FIG. 20 is a flowchart of a 4G reestablishment messages decision process.

FIG. 19 is a flowchart of a 4G reestablishment decision process. Messages discarded in Diamond1 of FIG. 19 are: EUTRA-RRC UE Information Response, EUTRA-RRC UE Capability Information, EUTRA-RRC Measurement Report and EUTRA-RRC RRC Connection Release. The decision algorithms for each message are shown in FIG. 20.

4G Redirection

Figure 21:
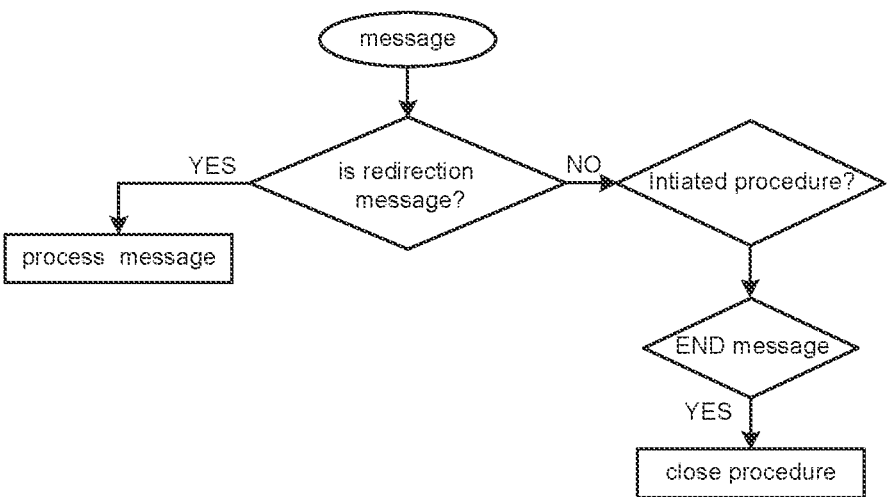
FIG. 21 is a flowchart of a 4G redirection decision process.
Figure 22A:
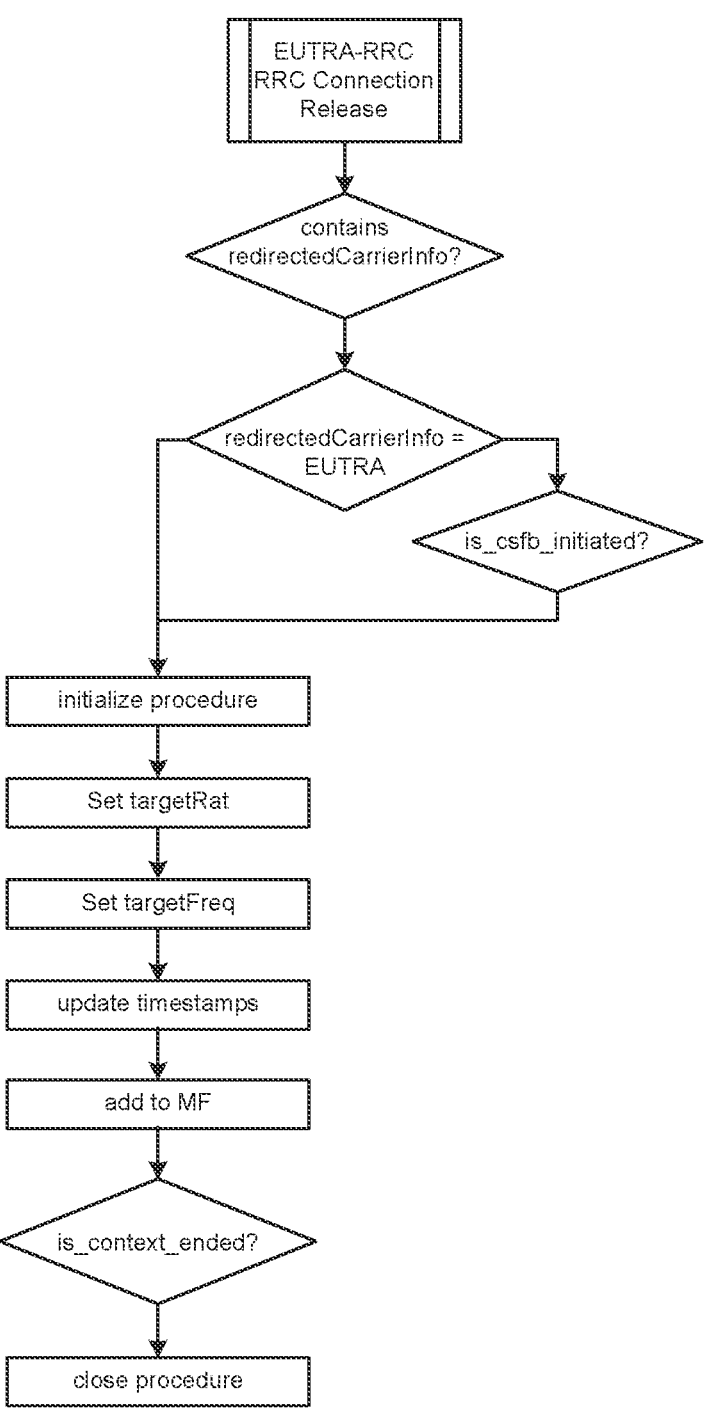
FIGS. 22A-22B are flowcharts of a 4G redirection messages decision process.
Figure 22B:
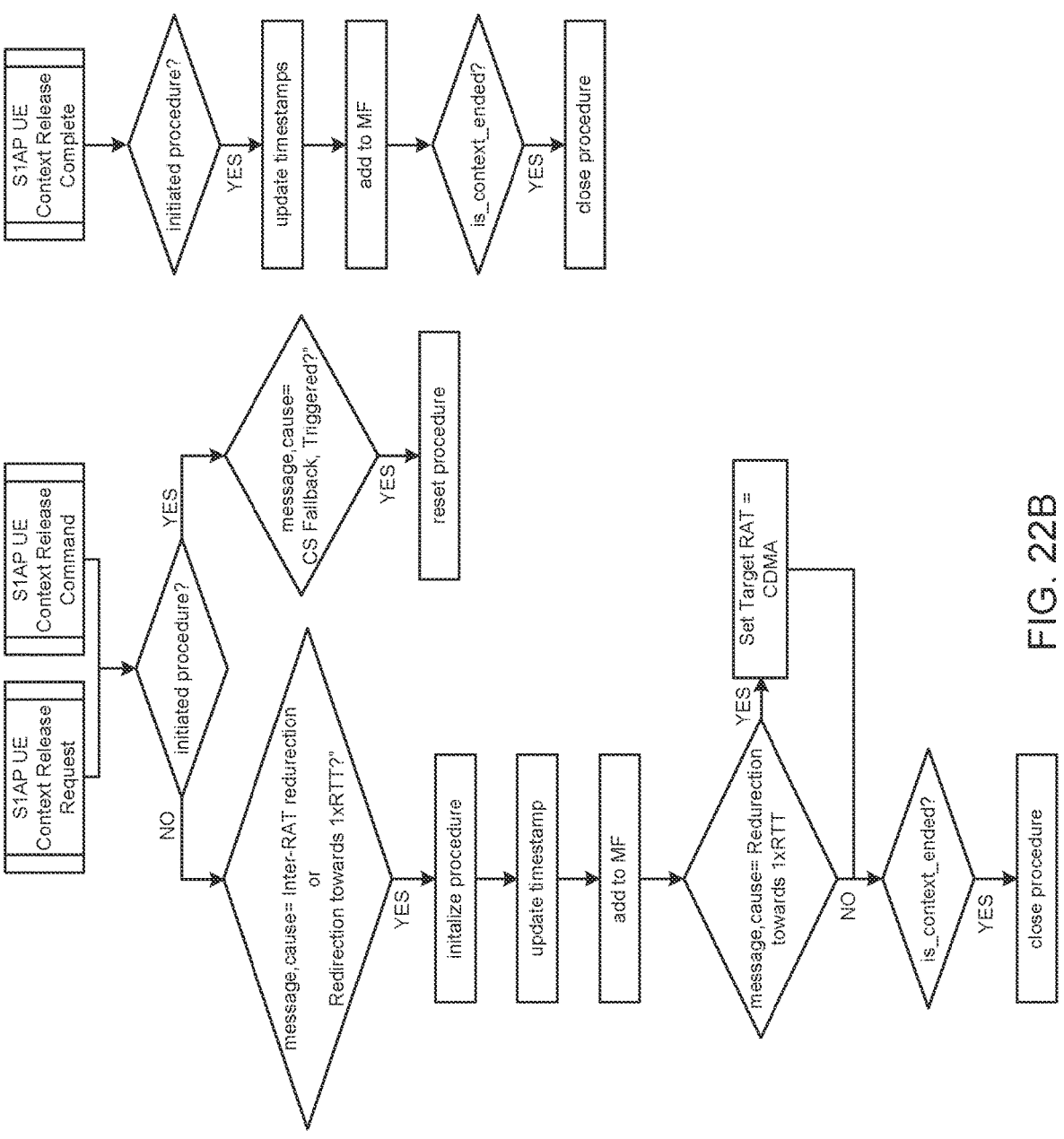

This procedure will report the mobility information provided when the context ends with a redirection to another technology or frequency. The messages involved in the procedure are: EUTRA-RRC RRC Connection Release, S1AP UE Context Release Request, S1AP UE Context Release Command, S1AP UE Context Release Complete. FIG. 21 is a flowchart of a 4G redirection decision process. FIGS. 22A-22B are flowcharts of a 4G redirection messages decision process. Diamond 1. Note that we consider is_csf-b_initiated, when there is a CS Fallback procedure ongoing. This information is obtained from the context as a previous step to process the message.

4G CS Fallback

This procedure will report the most important characteristics of any CS fallback procedure occurred in the context. This procedure considers several scenarios:

2 CS Fallback at the beginning of the context

2 CS Fallback by UE Context Modification

2 CS Fallback by Handover Required

Figure 23:
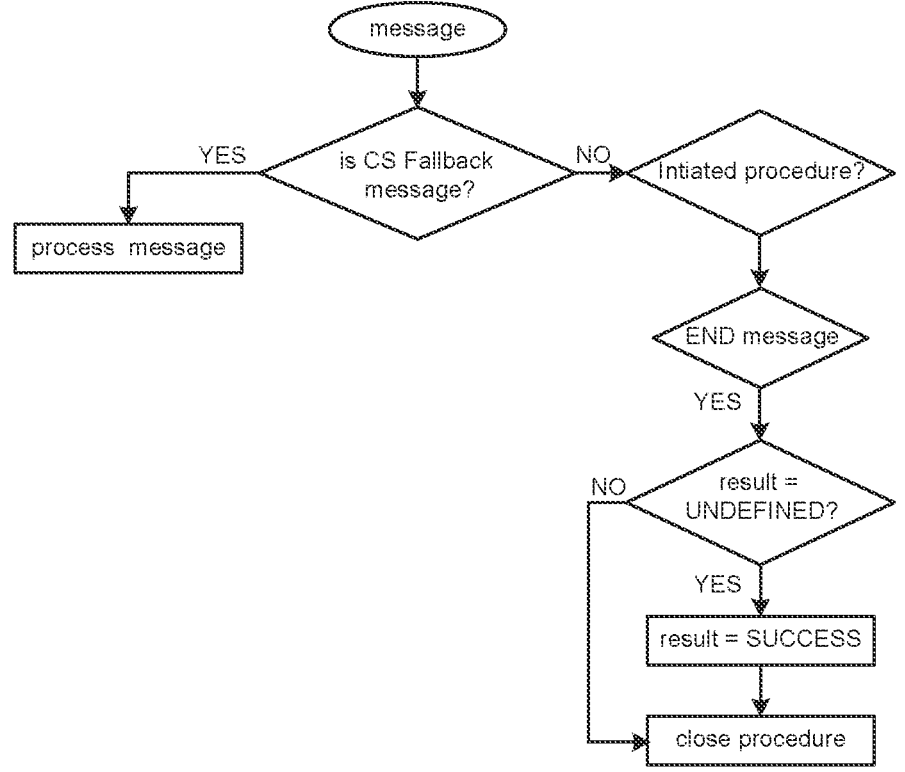
FIG. 23 is a flowchart of a 4G Circuit Switched (CS) fallback decision process.
Figure 24:
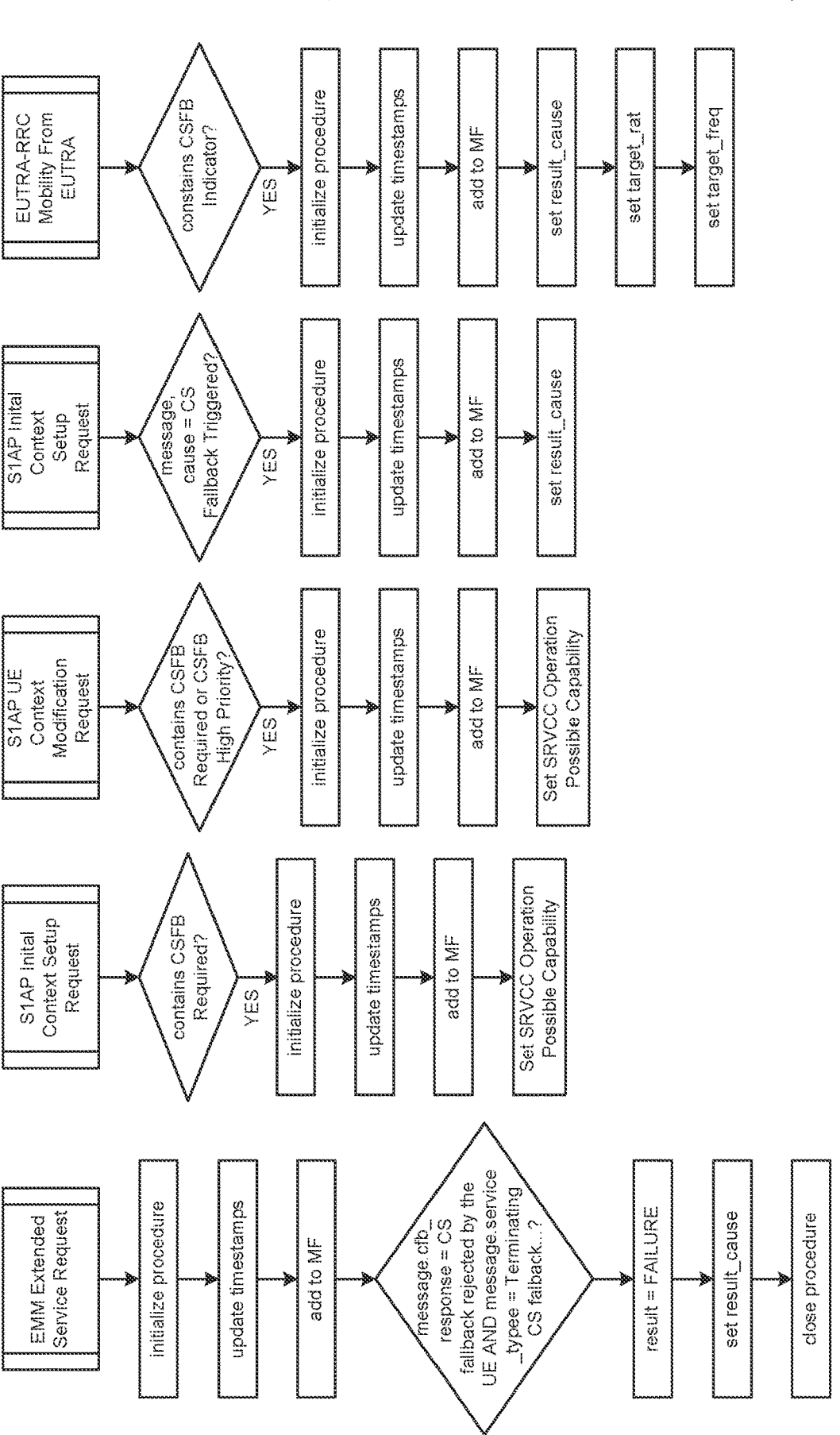
FIG. 24 is a flowchart of a 4G CS fallback initiating messages decision process.

The messages involved in the procedure are:

2 CS Fallback at the beginning of the context: EMM Extended Service, EMM Service Reject, S1AP Initial Context Setup Request, S1AP Initial Context Setup Failure, S1AP UE Context Modification Request, EUTRA-RRC RRC Connection Release, S1AP UE Context Release Request, S1AP UE Context Release Command, S1AP UE Context Release Complete 2 CS Fallback by UE Context Modification scenario adds the following messages: S1AP UE Context Modification Response, UE Context Modification Failure 2 CS Fallback by Handover Required scenario adds the following messages: S1AP Handover Required, EUTRA-RRC Mobility From EUTRA Command This procedure will report the most important characteristics of any CS fallback procedure occurred in the context. This procedure considers several scenarios. FIG. 23 is a flowchart of a 4G Circuit Switched (CS) fallback decision process. FIG. 24 is a flowchart of a 4G CS fallback initiating messages decision process.

In FIG. 24, in Box initialize procedure, parameter trigger is set depending on the message that creates the procedure. Table 3 registers the relation between message type and trigger parameter value:

TABLE 3

CS Fallback relation between message and trigger parameter

| Message | Trigger value |
|---|---|
| EMM Service Request | Extended Service Request + EMM Service type |
| S1AP Initial Context Setup Request | Extended Service Request |
| S1AP UE Context Modification Request | UE Context Modification + CSFB Indicator |
| S1AP Handover Required | Handover Required + CS Fallback triggered |
| EUTRA-RRC Mobility From EUTRA | Handover Required + CS Fallback triggered |
| EUTRA-RRC RRC Connection Release | |

TABLE 3-continued

CS Fallback relation between message and trigger parameter

| Message | Trigger value |
|---|---|
| S1AP UE Context Release Request | UE Context Release Request + CS Fallback triggered |
| S1AP UE Context Release Command | UE Context Release Request + CS Fallback triggered |

Figure 25:
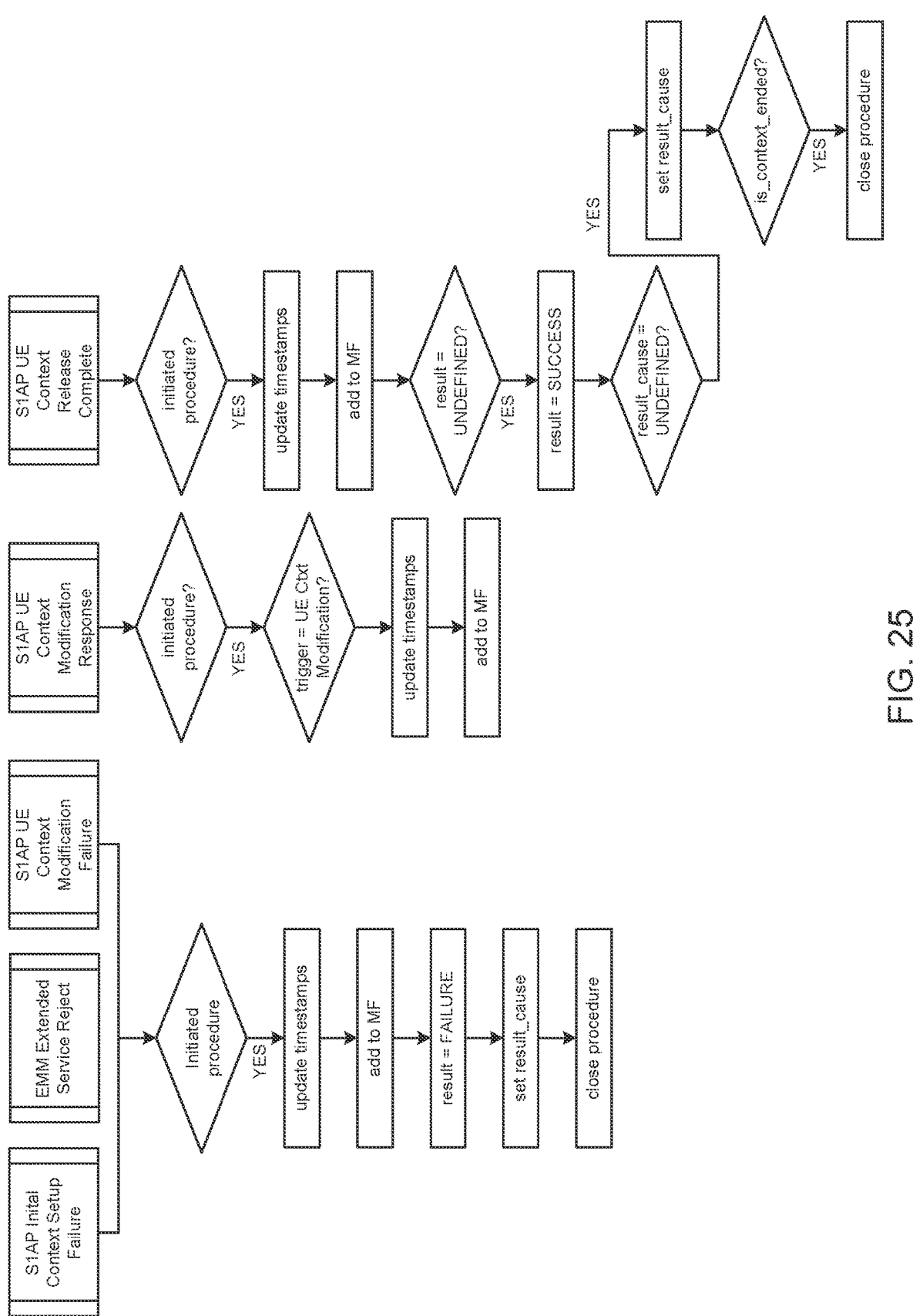
FIG. 25 is a flowchart of a 4G CS fallback response messages decision process.
Figure 26:
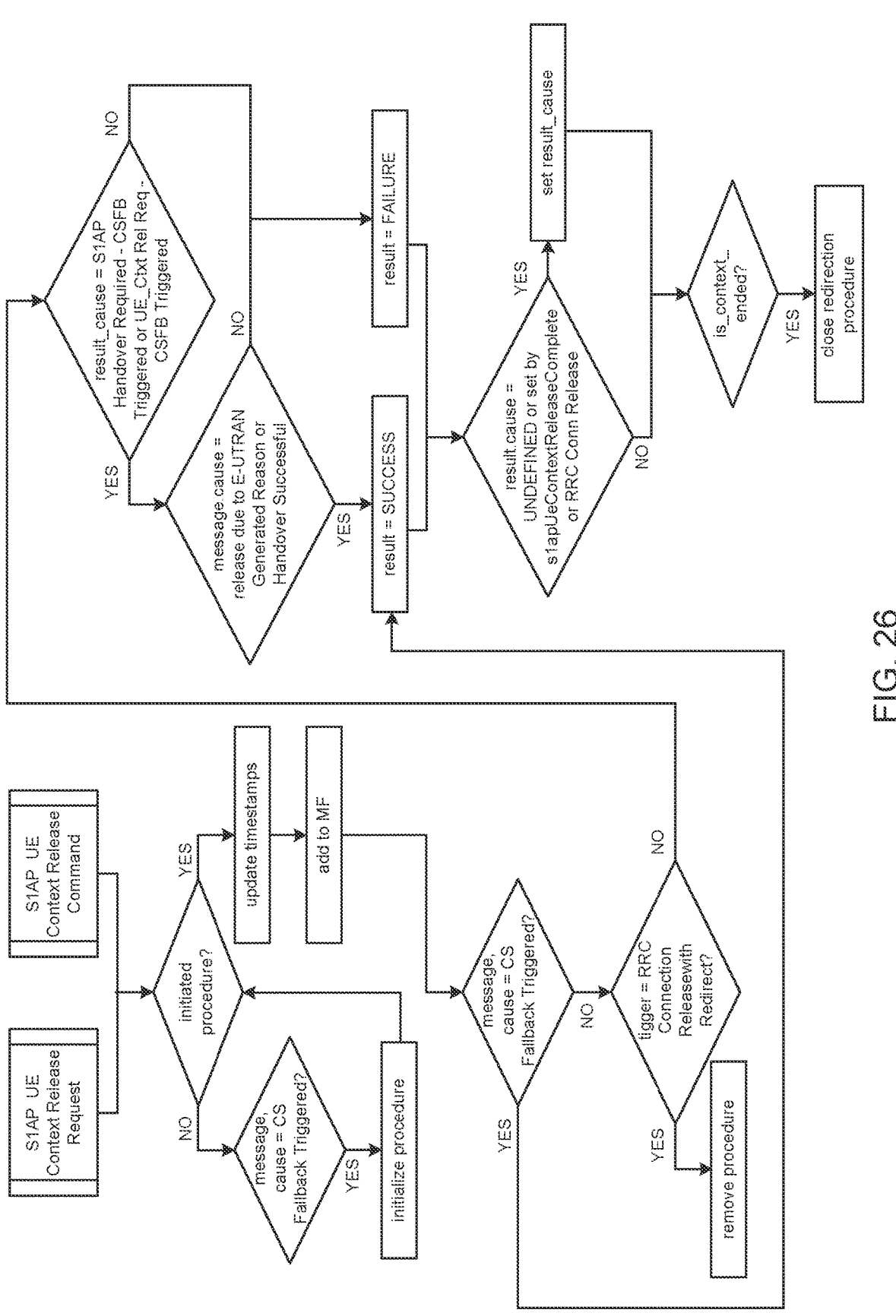
FIG. 26 is a flowchart of a 4G CS fallback S1AP release messages decision process.
Figure 27:
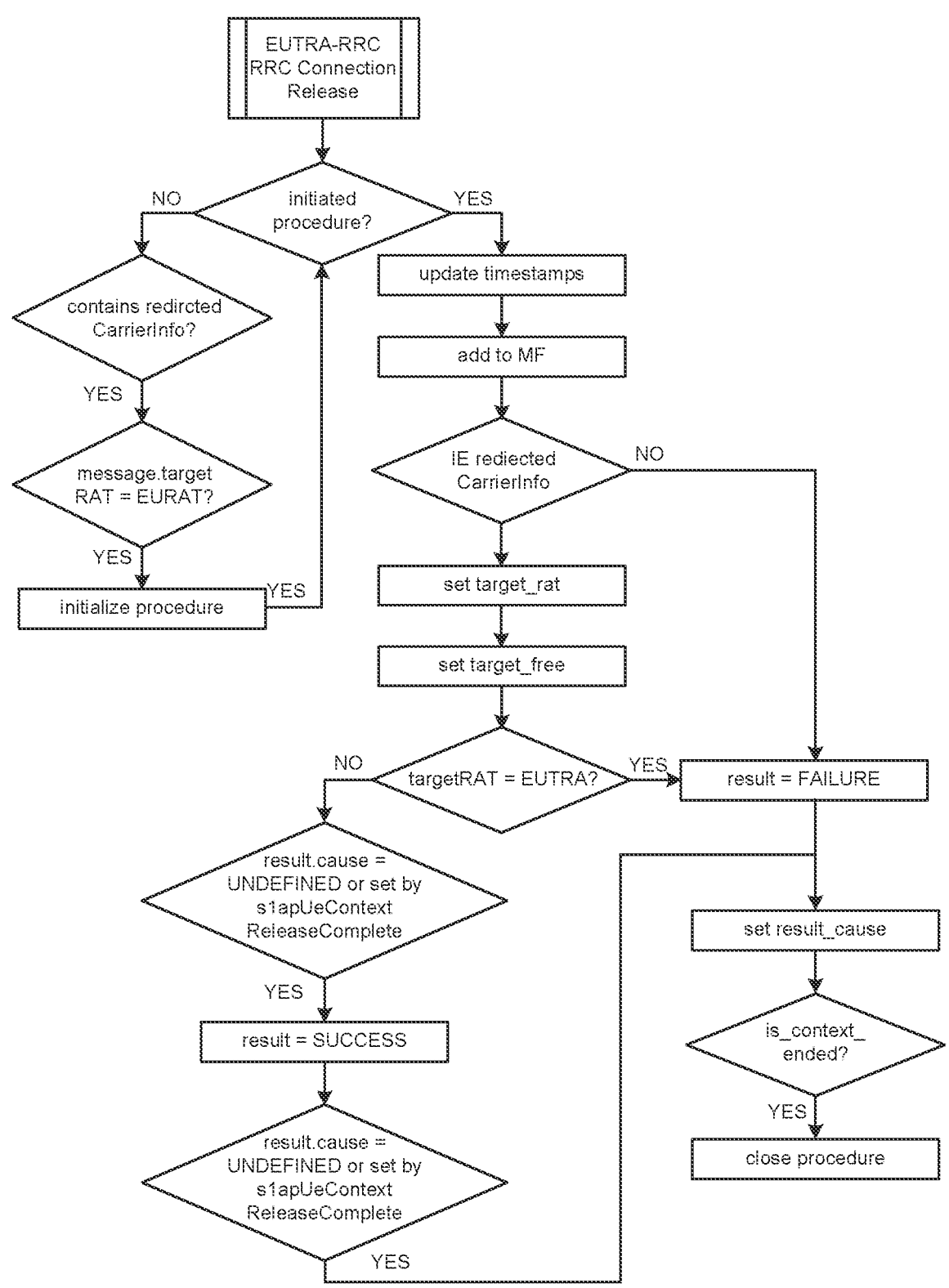
FIG. 27 is a flowchart of a 4G CS fallback EUTRA-RRC (Evolved Universal Terrestrial Radio Access (E-UTRA)-Radio Resource Control (RRC)) release messages decision process.

FIG. 25 is a flowchart of a 4G CS fallback response messages decision process. FIG. 26 is a flowchart of a 4G CS fallback S1AP release messages decision process. FIG. 27 is a flowchart of a 4G CS fallback EUTRA-RRC (Evolved Universal Terrestrial Radio Access (E-UTRA)-Radio Resource Control (RRC)) release messages decision process.

4G Handover

This procedure will report the most important characteristics of any handover attempt, including X2AP handover, S1AP handover and intra eNB handover (RRC handover) if possible. In this procedure there are 3 scenarios to be considered:

1. Incoming handovers: messages traced in the target eNB

2. Outcoming handovers: messages traced in the source eNB

3. Conditional handovers: special case of outcoming handovers where several handovers are launched at the same time, but only one will succeed.

Scenarios 1 and 2 apply to X2AP, S1AP and intra eNB handovers, while scenario 3 only applies to X2AP, S1AP handovers.

The messages used in the handover procedure algorithm are the following (Note: some messages can be involved in more than one scenario): X2AP Handover Request, X2AP Handover Request Acknowledge, X2AP Handover Success, X2AP Handover Preparation Failure, X2AP Handover Cancel, X2AP Conditional Handover Cancel, X2AP SN Status Transfer, X2AP UE Context Release, S1AP Handover Request, S1AP Handover Request Acknowledge, S1AP Handover Required, S1AP Handover Command, S1AP Handover Notify, S1AP Handover Cancel, S1AP Handover Cancel Acknowledge, S1AP Handover Failure, S1AP Handover Preparation Failure, S1AP Path Switch Request, S1AP Path Switch Request Acknowledge, S1AP Path Switch Request Failure, S1AP UE Context Release Request, S1AP UE Context Release Command, S1AP UE Context Release Complete, EUTRA-RRC RRC Connection Reconfiguration, EUTRA-RRC RRC Connection Reconfiguration Complete, EUTRA-RRC Mobility From EUTRA Command, EUTRA-RRC RRC Connection Reestablishment Request, EUTRA-RRC RRC Connection Reestablishment, EUTRA-RRC RRC Connection Reestablishment Complete, EUTRA-RRC RRC Connection Reestablishment Reject, EUTRA-RRC RRC Connection Release. Note: The X2AP messages will have a different algorithm depending on whether the message has been traced at the source eNB or at the target eNB.

Figure 28:
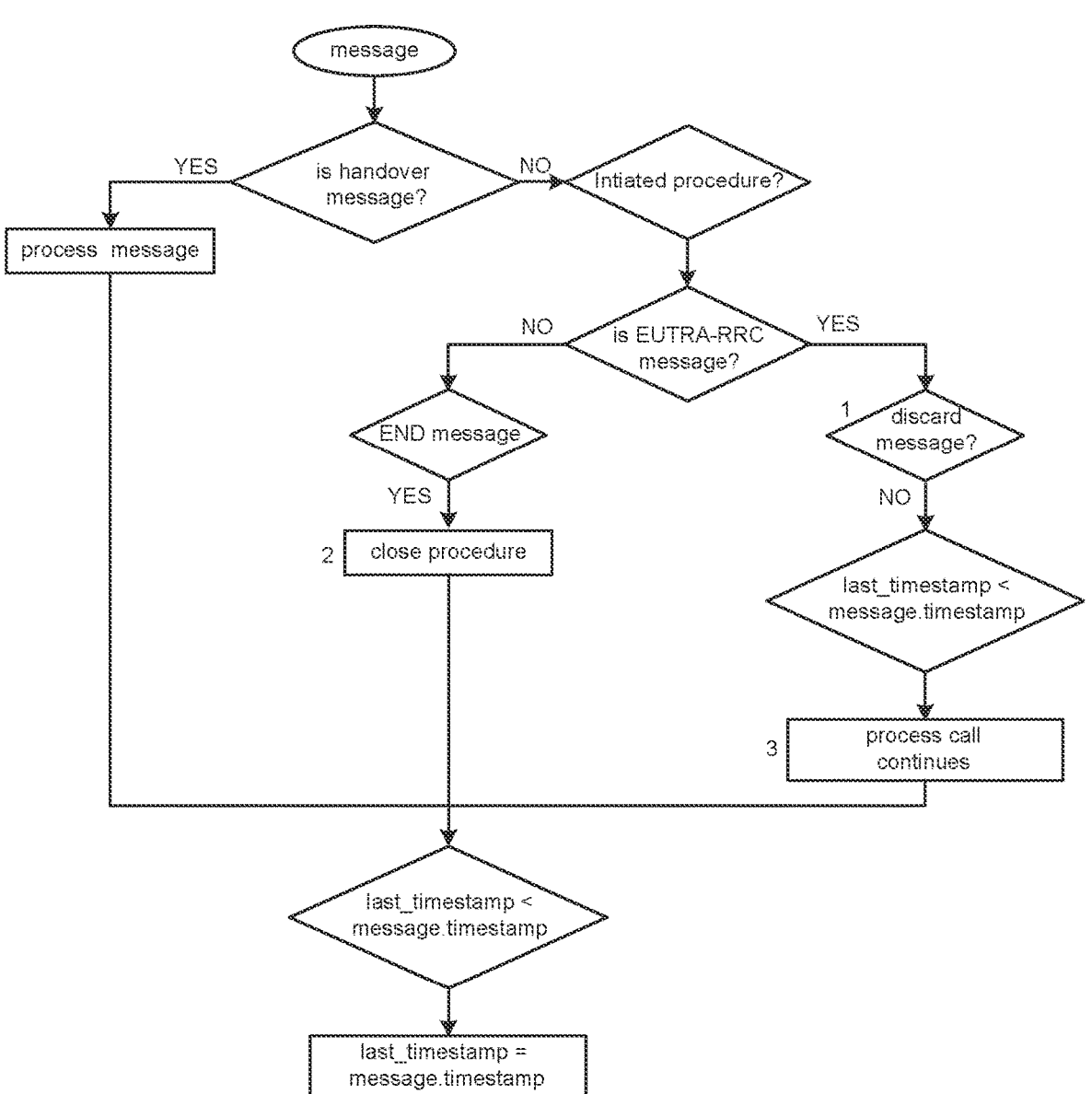
FIG. 28 is a flowchart of 4G handover decision process.

FIG. 28 is a flowchart of 4G handover decision process. Messages discarded are: EUTRA-RRC UE Information Response, EUTRA-RRC UE Capability Information, EUTRA-RRC Measurement Report, EUTRA-RRC UL Information Transfer and EUTRA-RRC UL Information Transfer MRDC.

Figure 29:
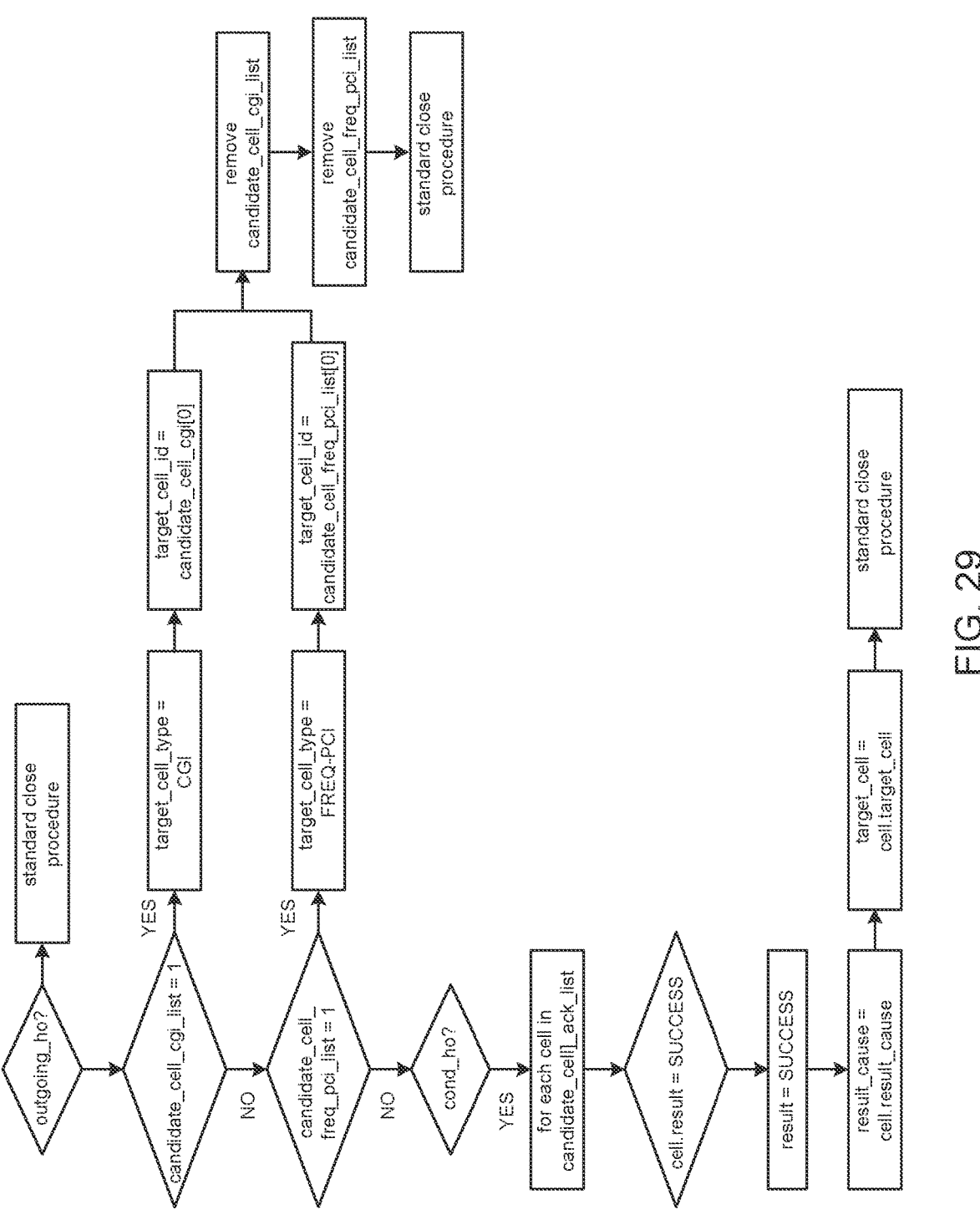
FIG. 29 is a flowchart of a closing process for handover procedures.
Figure 30:
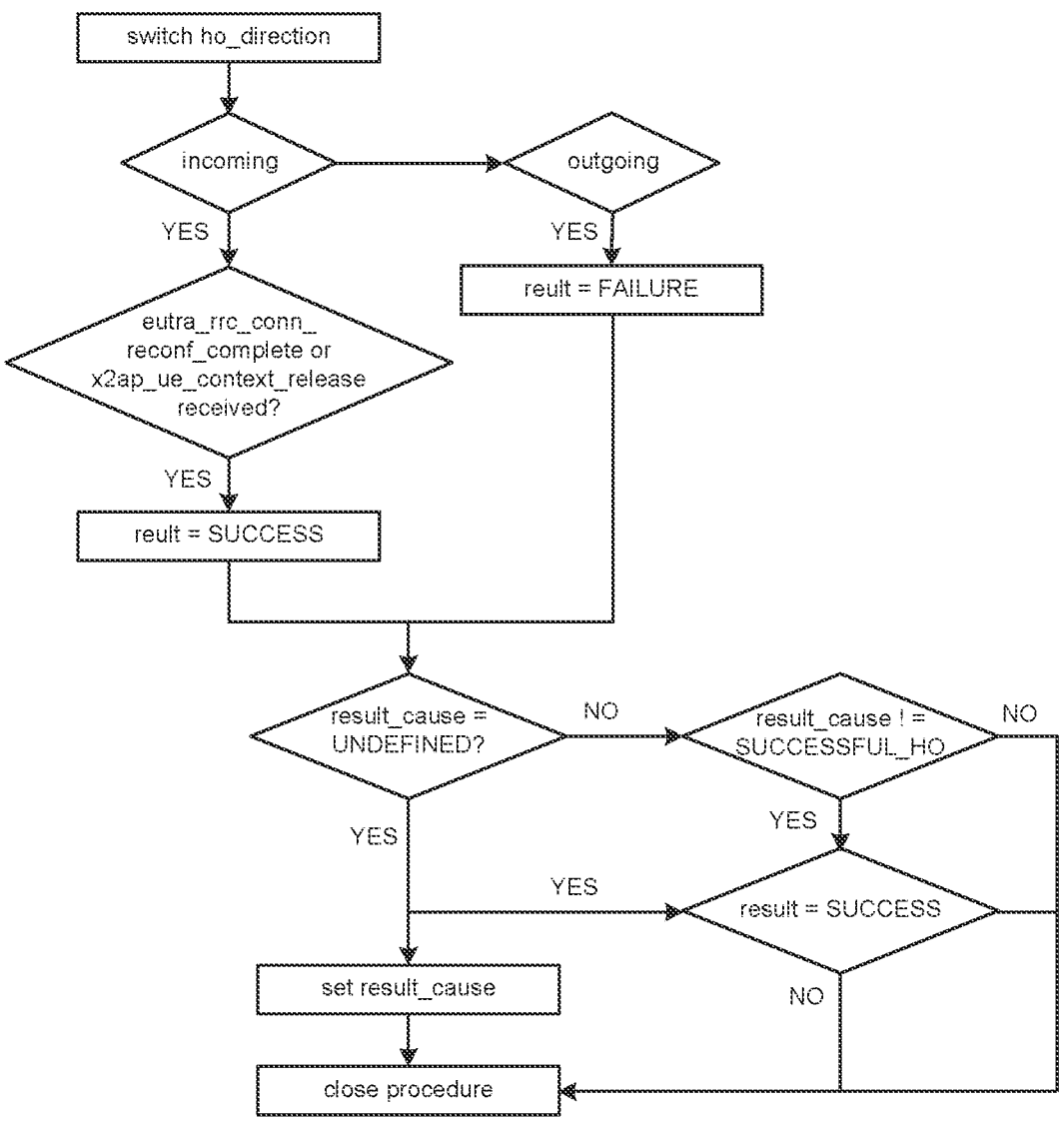
FIG. 30 is a flowchart of a process call continues process.

For handover procedure the process of closing the procedure is not as simple as setting some parameters with the information of the triggering messages. There are some decisions to make at the time of the closure. In handover procedure, every time a Box close procedure appears, it refers to the example process of FIG. 29. Box process call continues includes all the decisions to be taken in an open handover when we decided that the context continues in the cell in which the handover was triggered. FIG. 30 is a flowchart of a process call continues process.

Figure 31A:
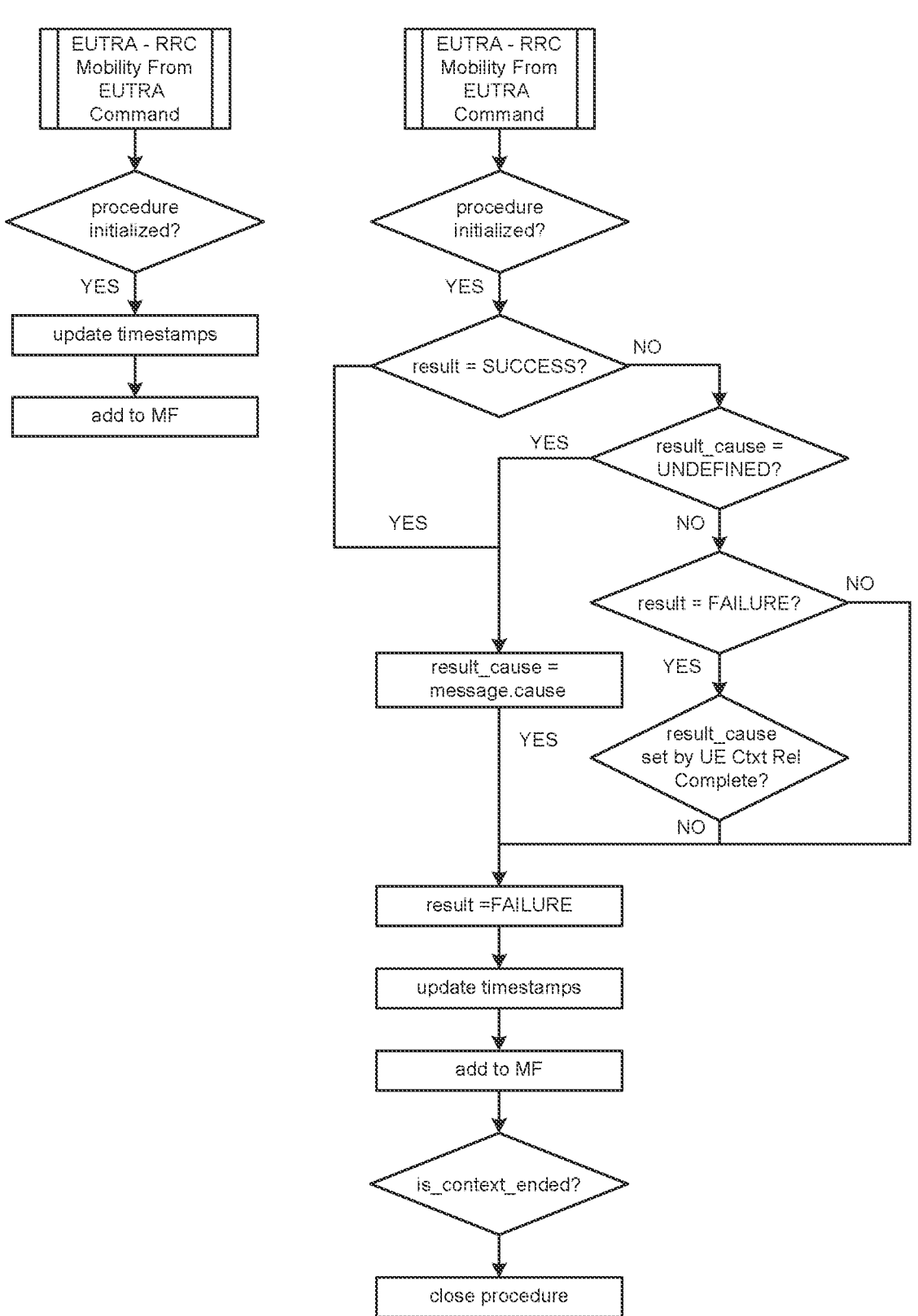
FIGS. 31A-31B are flowcharts of a 4G handover EUTRA-RRC messages decision process.
Figure 31B:
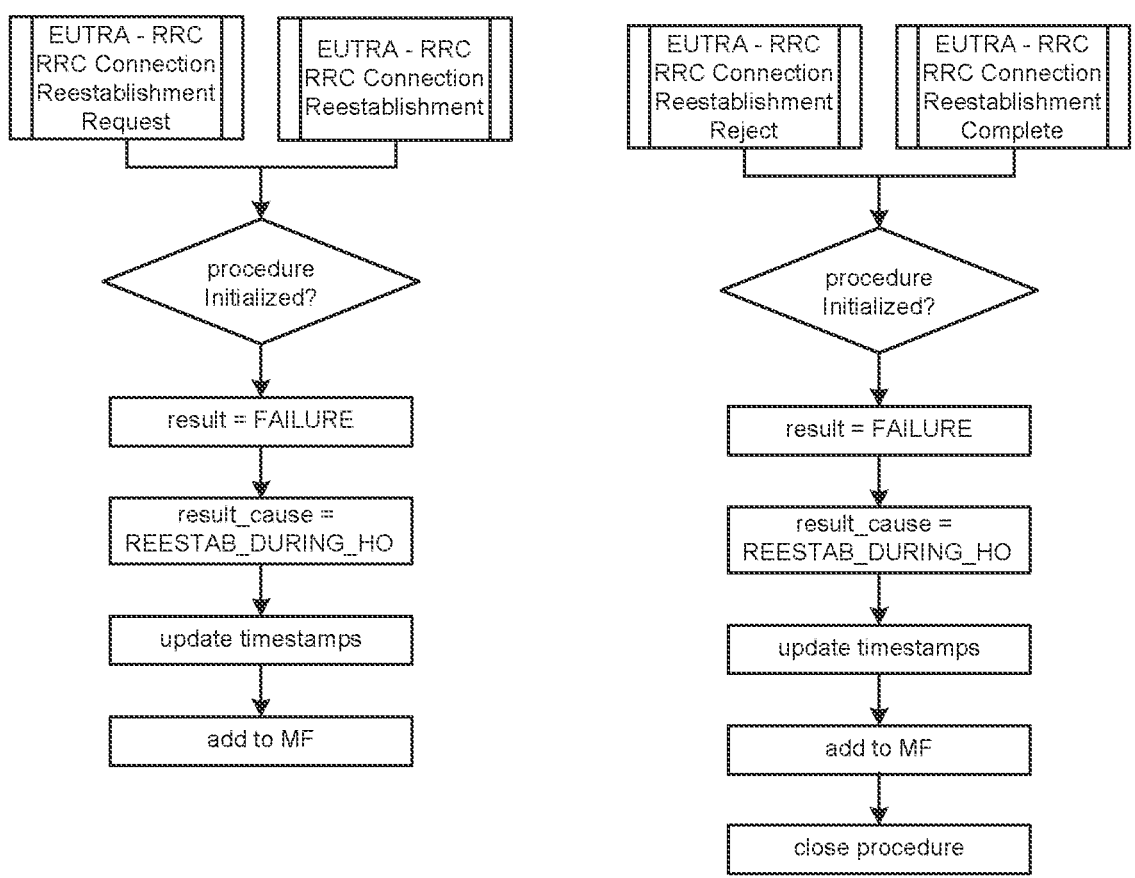

The decision algorithms for each message are shown in the following figures:

FIGS. 31A-31B are flowcharts of a 4G handover EUTRA-RRC messages decision process.

Figure 32A:
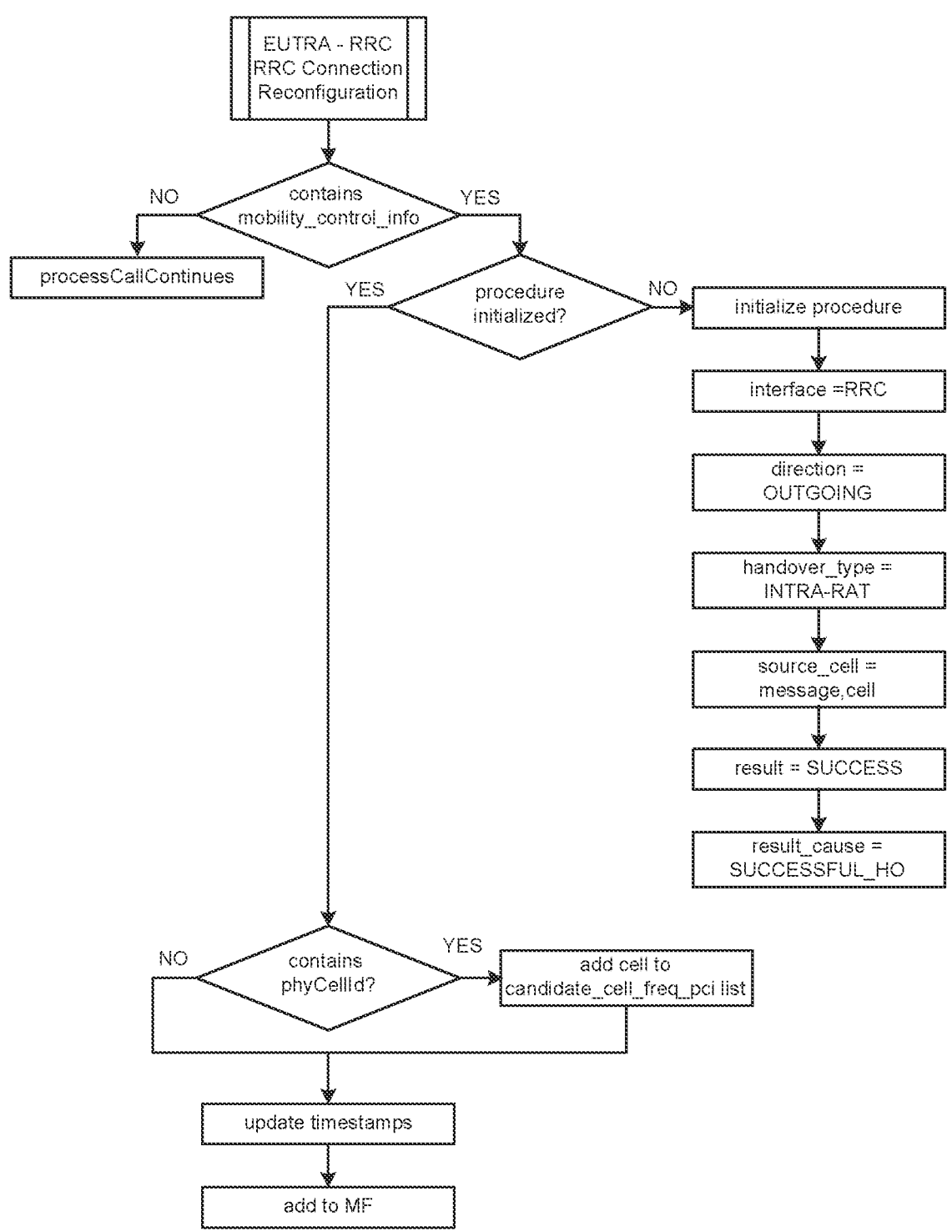
FIGS. 32A-32B are flowcharts of a 4G Handover EUTRA-RRC RRC Connection Reconfiguration messages decision process.
Figure 32B:
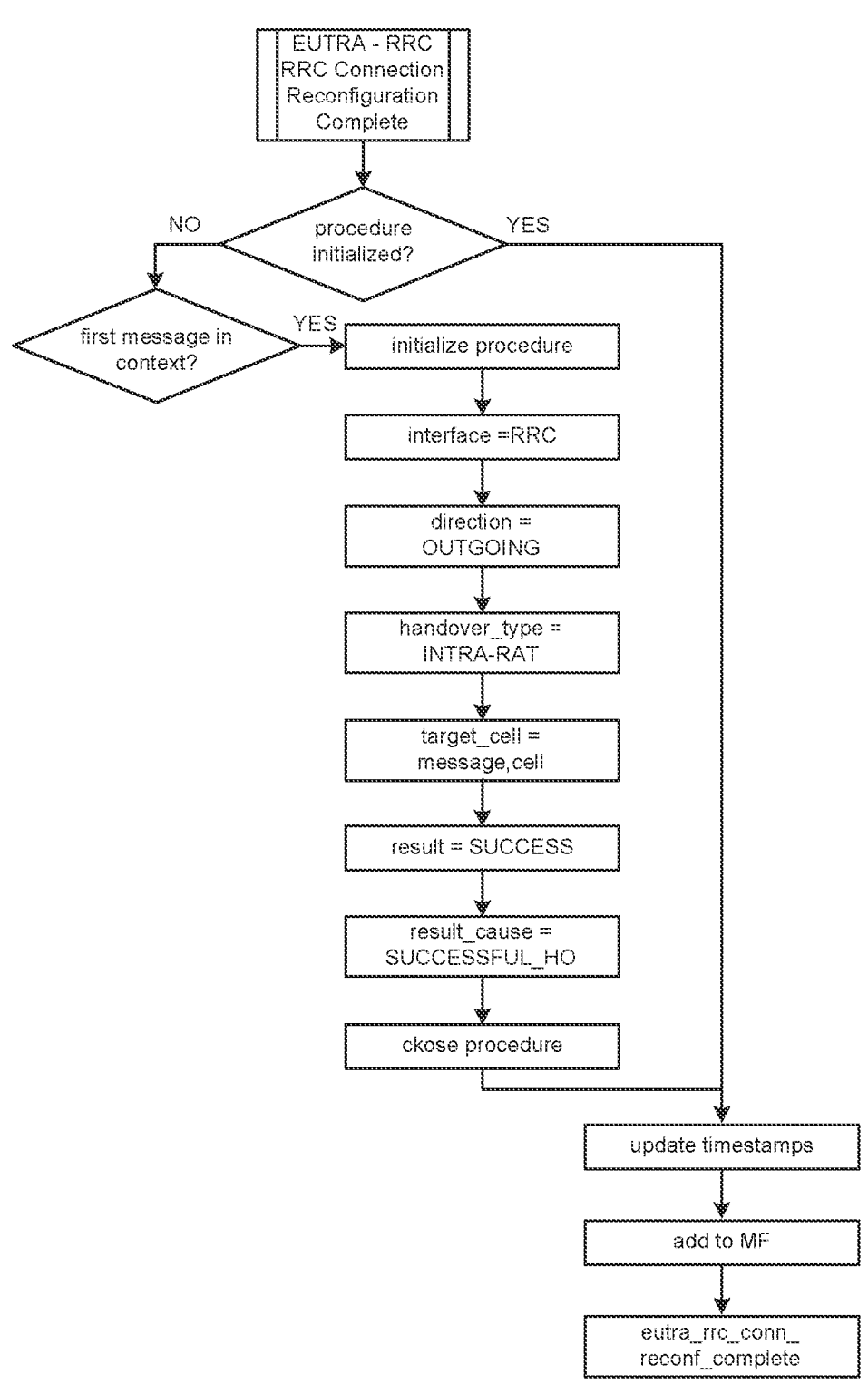

FIGS. 32A-32B are flowcharts of a 4G Handover EUTRA-RRC RRC Connection Reconfiguration messages decision process.

Figure 33:
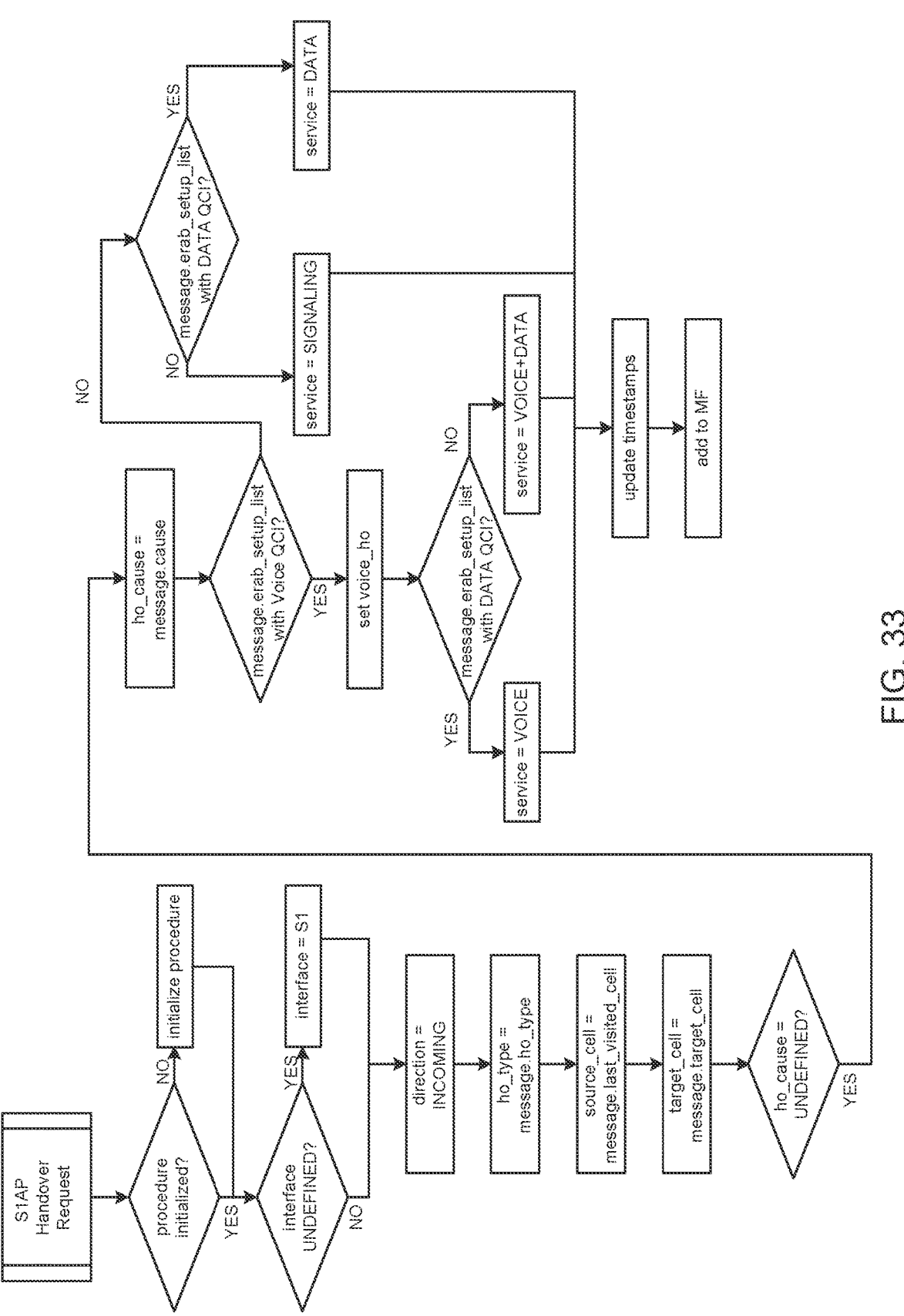
FIG. 33 is a flowchart of a 4G Incoming handover: S1AP Handover Request messages decision process.

FIG. 33 is a flowchart of a 4G Incoming handover: S1AP Handover Request messages decision process.

Figure 34:
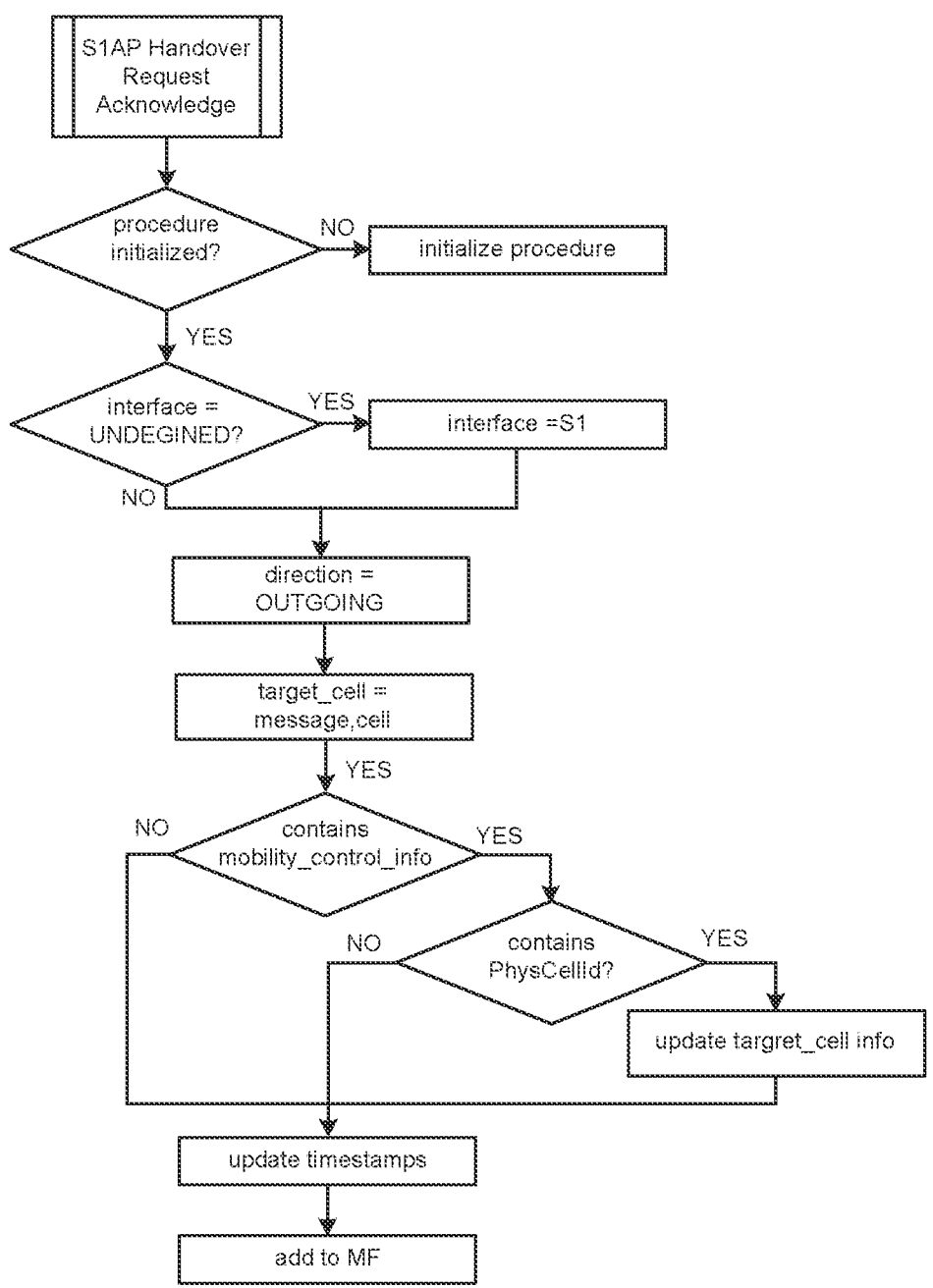
FIG. 34 is a flowchart of a 4G Incoming handover: S1AP Handover Request Acknowledge messages decision process.

FIG. 34 is a flowchart of a 4G Incoming handover: S1AP Handover Request Acknowledge messages decision process.

Figure 35:
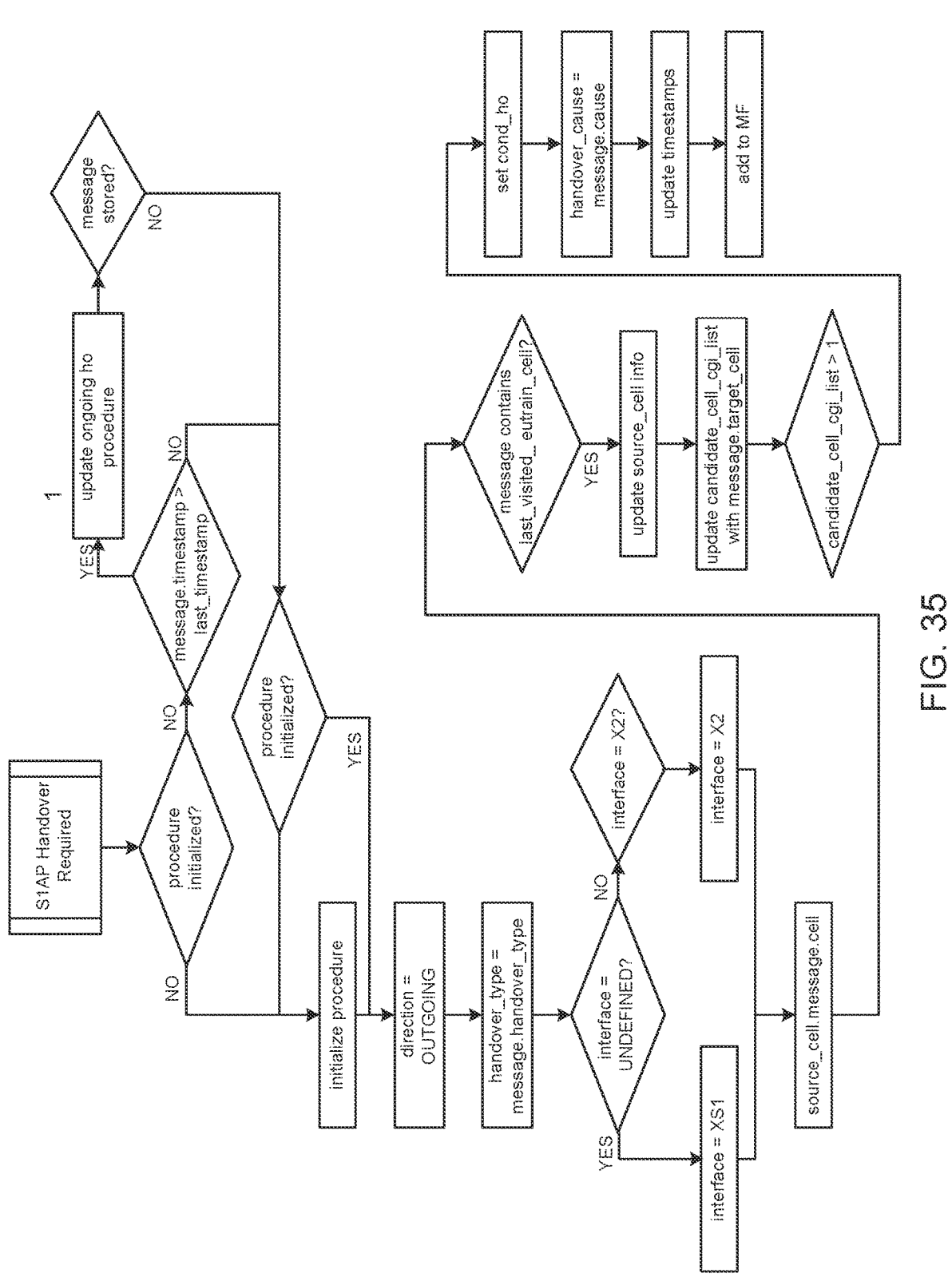
FIG. 35 is a flowchart of a 4G Outgoing handover: S1AP Handover Required messages decision process.

FIG. 35 is a flowchart of a 4G Outgoing handover: S1AP Handover Required messages decision process.

Figure 36:
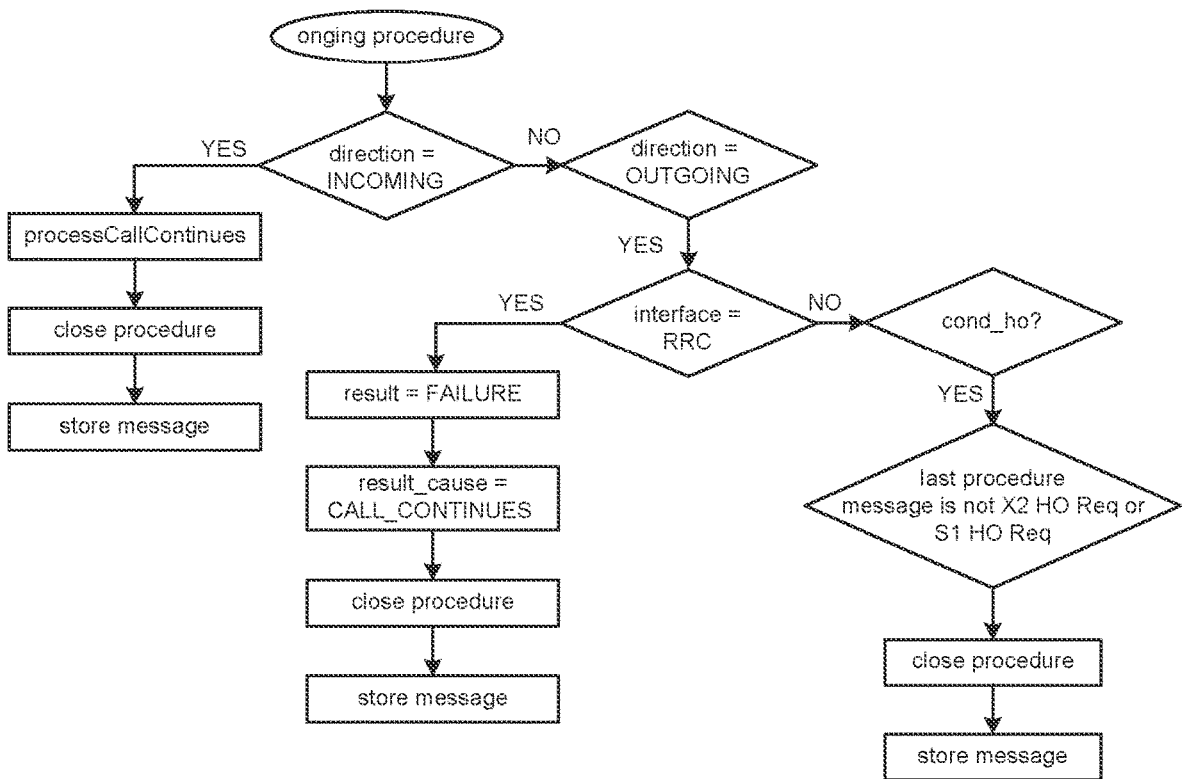
FIG. 36 is a flowchart of a 4G Ongoing procedure decision process in S1AP Handover Required message.

Specific for the decision algorithm of message S1AP Handover Required on scenario 4G outgoing handover, Box 1 in FIG. 35: If there is a handover procedure ongoing when the S1AP Handover Required message arrives, there is an algorithm to decide if the ongoing procedure has to be closed and sent to output before processing the message, presented in FIG. 36 which is a flowchart of a 4G Ongoing procedure decision process in S1AP Handover Required message.

Figure 37:
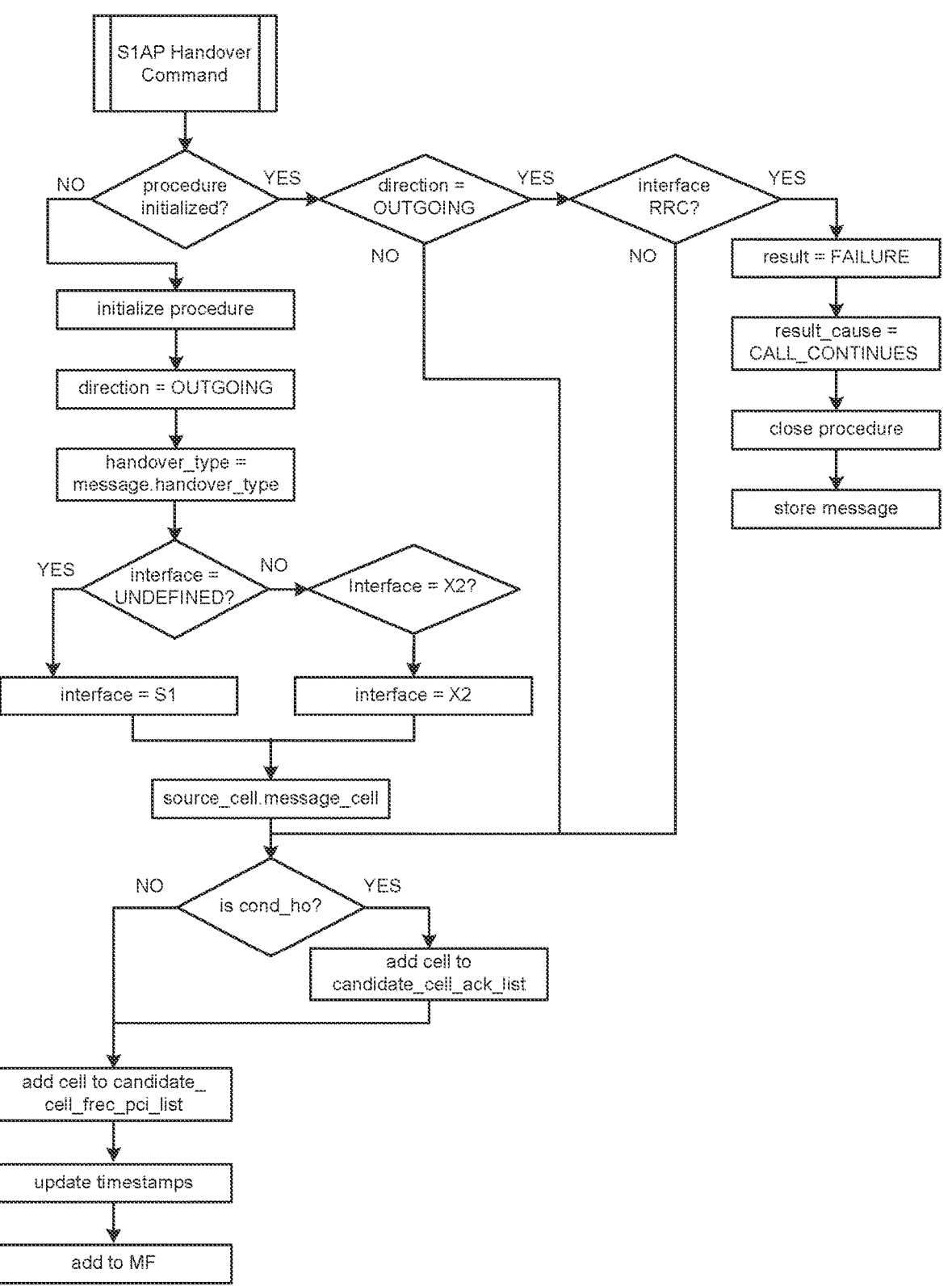
FIG. 37 is a flowchart of a 4G Outgoing handover: S1AP Handover Command messages decision process.

The Continuation of the decision algorithms for each message in the following figures:

FIG. 37 is a flowchart of a 4G Outgoing handover: S1AP Handover Command messages decision process.

Figure 38A:
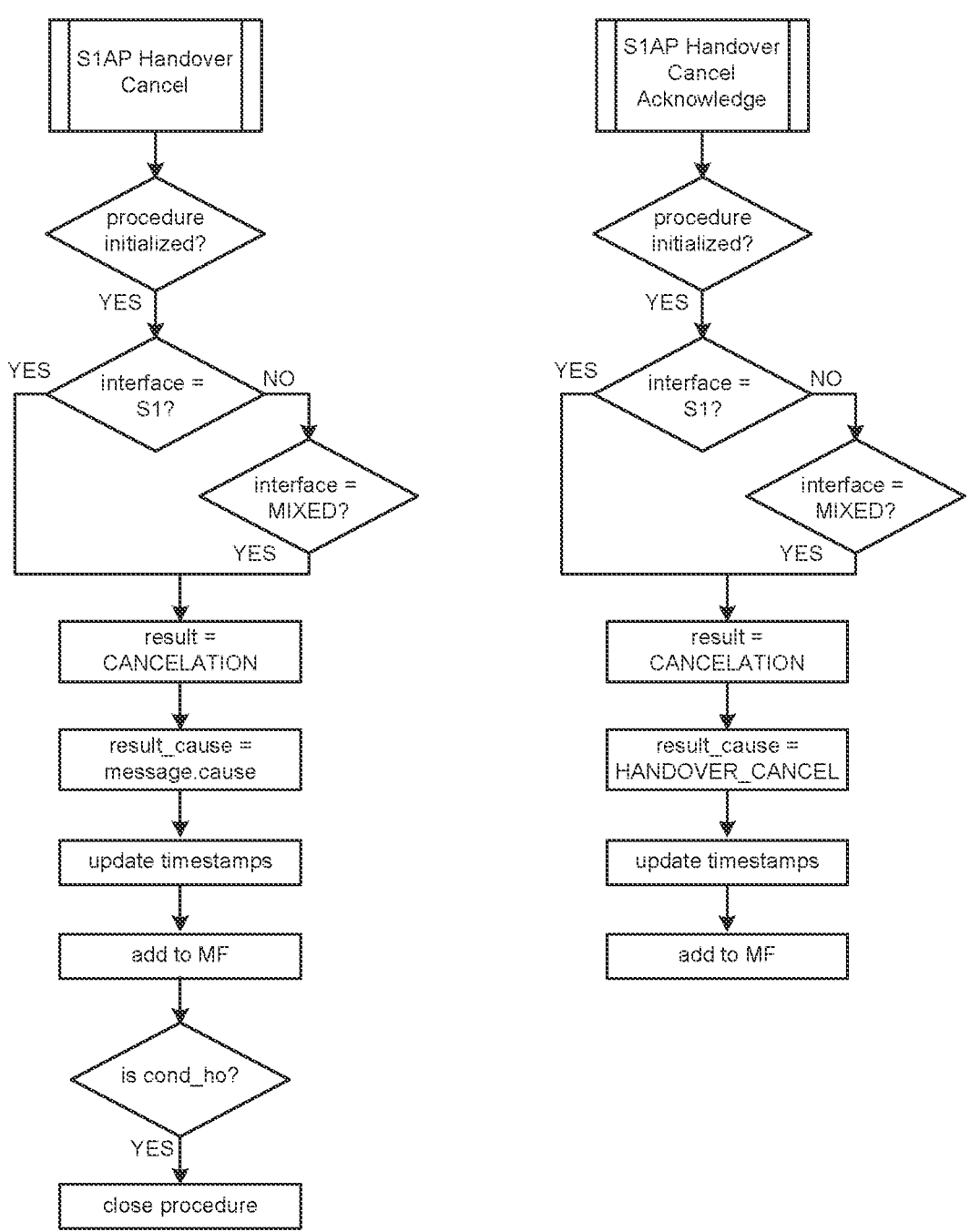
FIGS. 38A-38B are flowcharts of a S1AP Handover failure messages decision process.
Figure 38B:
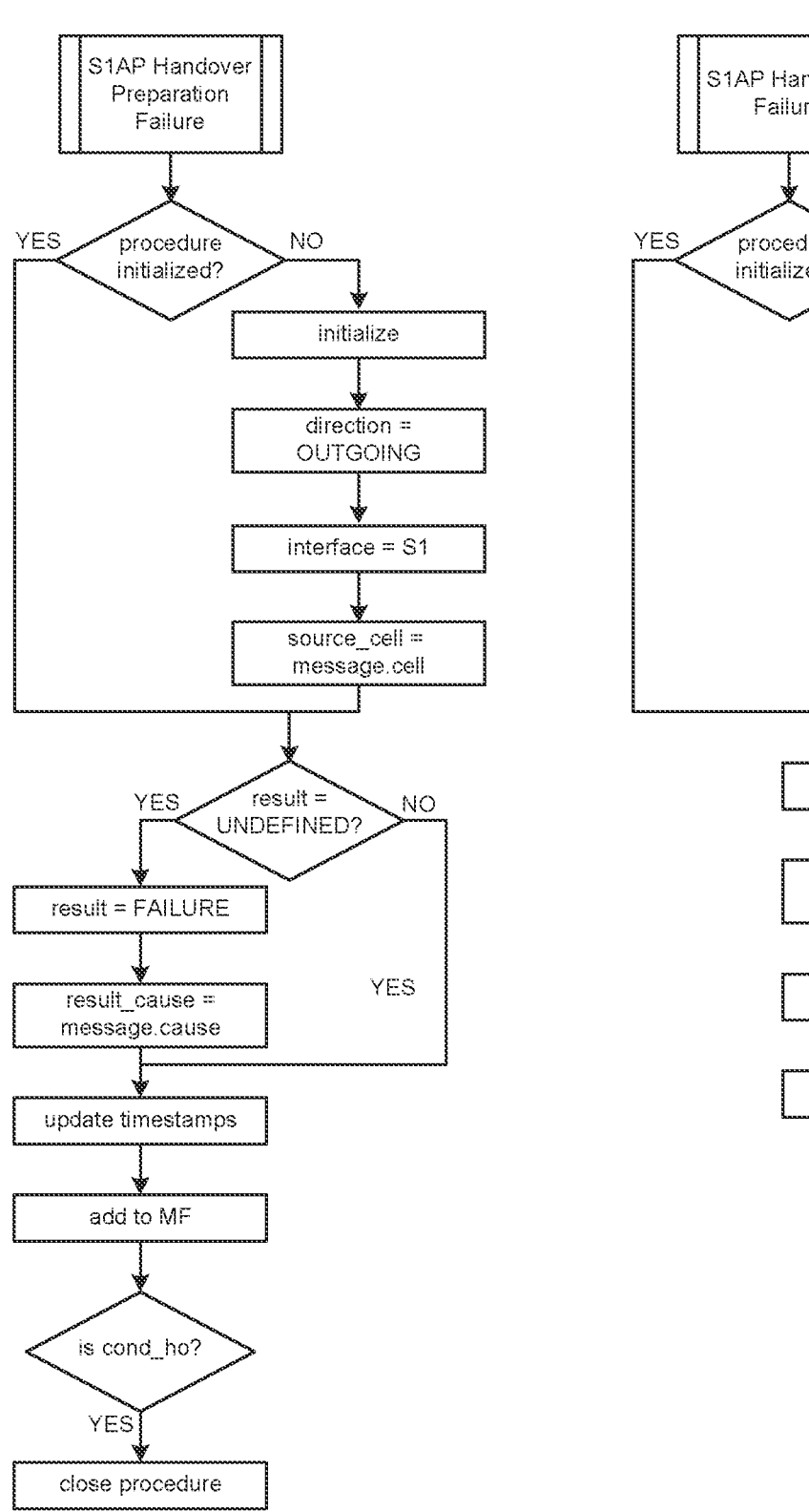

FIGS. 38A-38B are flowcharts of a S1AP Handover failure messages decision process. FIG. 39 is a flowchart of a 4G Handover S1AP messages decision process.

Figure 40A:
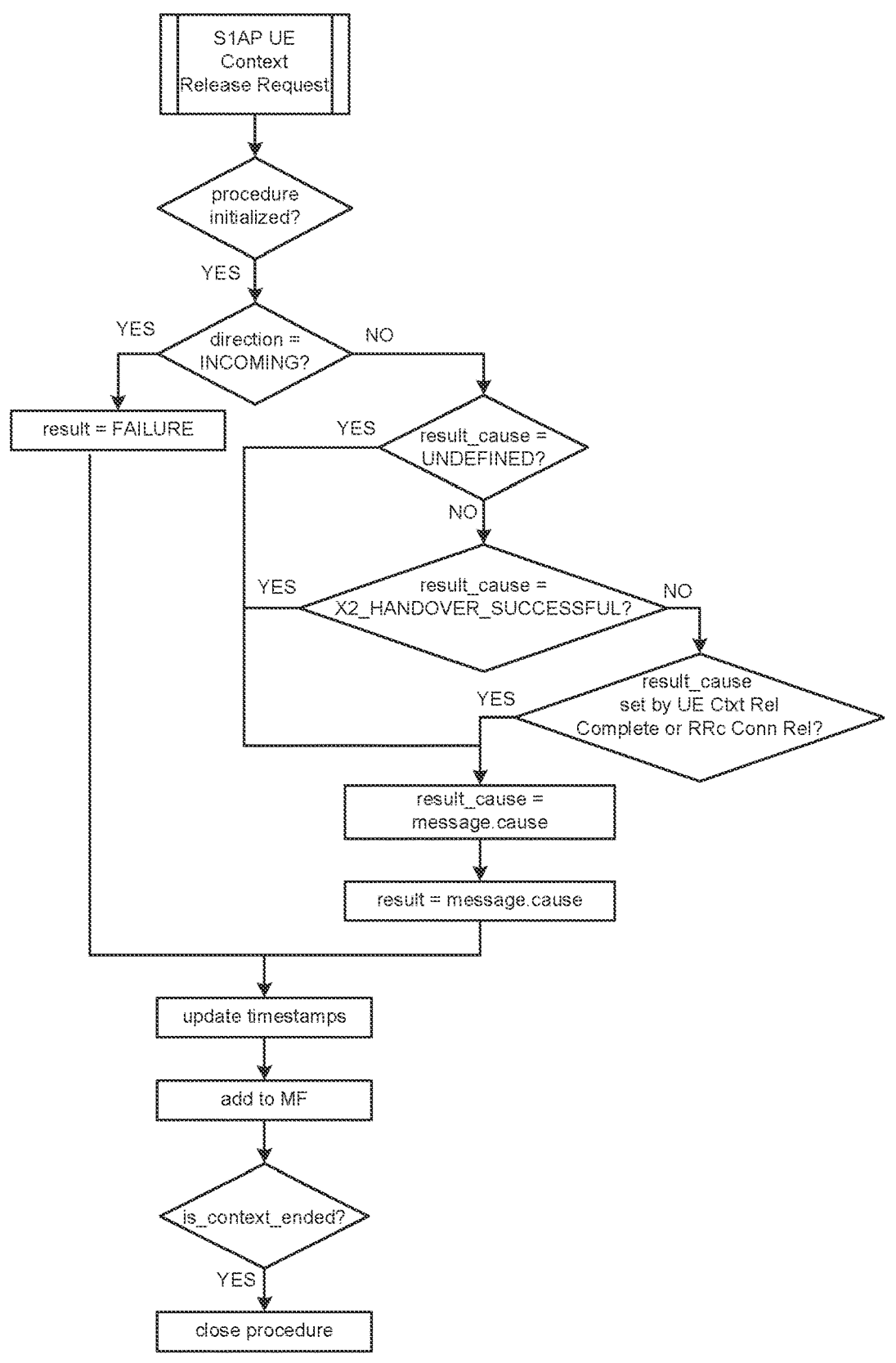
FIGS. 40A-40B are flowcharts of a 4G Handover S1AP User Equipment (UE) Context Release messages decision process.
Figure 40B:
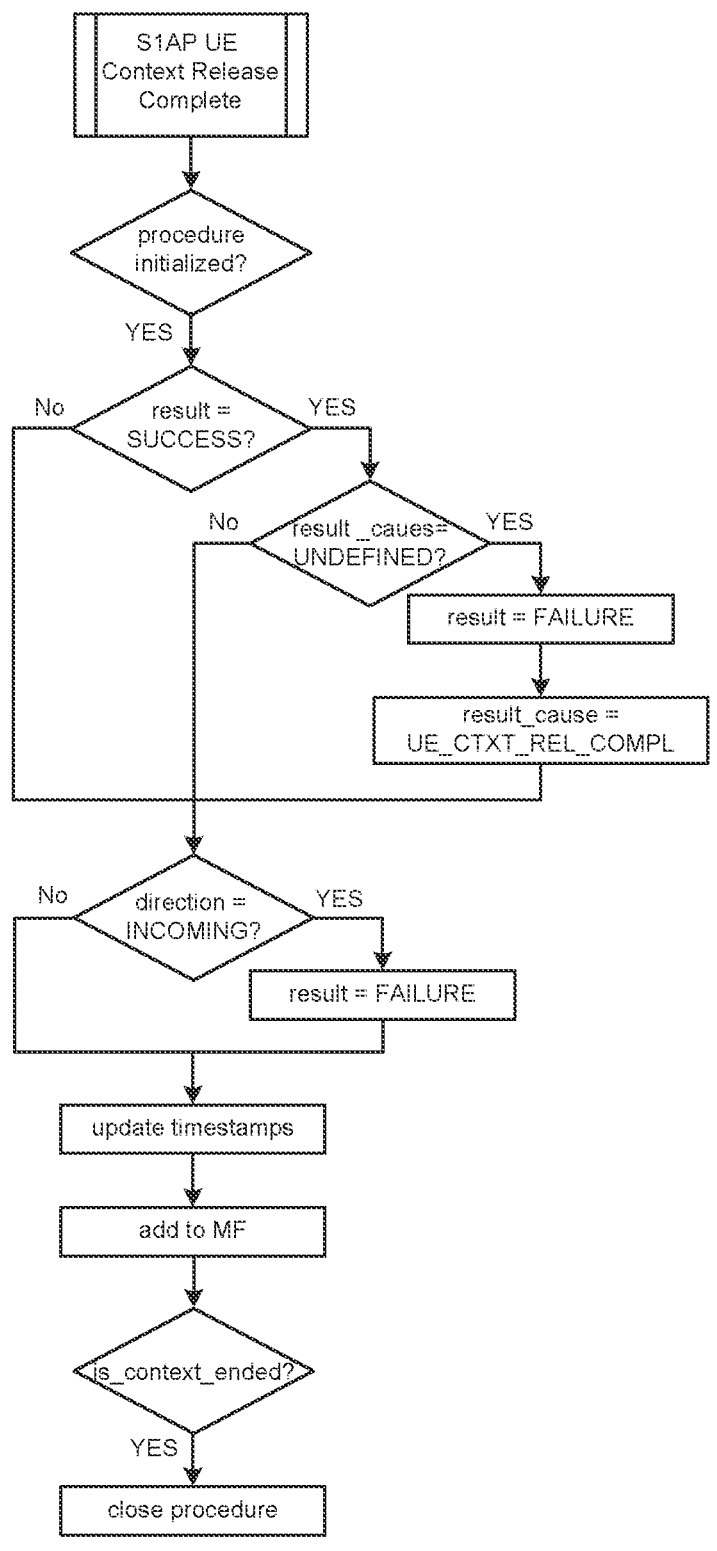

FIGS. 40A-40B are flowcharts of a 4G Handover S1AP User Equipment (UE) Context Release messages decision process.

Figure 41:
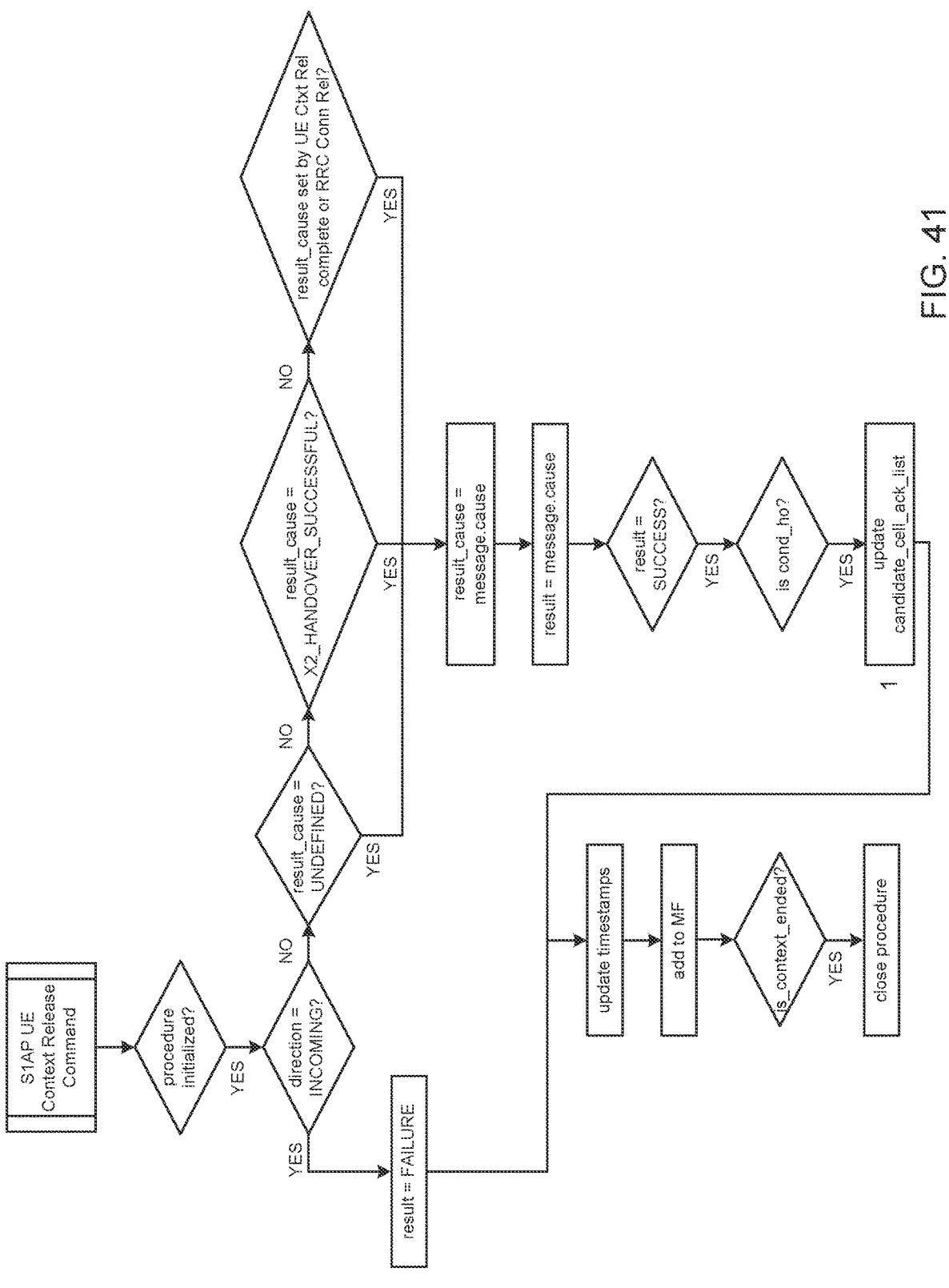
FIG. 41 is a flowchart of a 4G Handover S1AP UE Context Release Command messages decision process.

FIG. 41 is a flowchart of a 4G Handover S1AP UE Context Release Command messages decision process. In FIG. 41, box 1: how to update candidate_cell_ack_list is described by FIG. 42.

Figure 42:
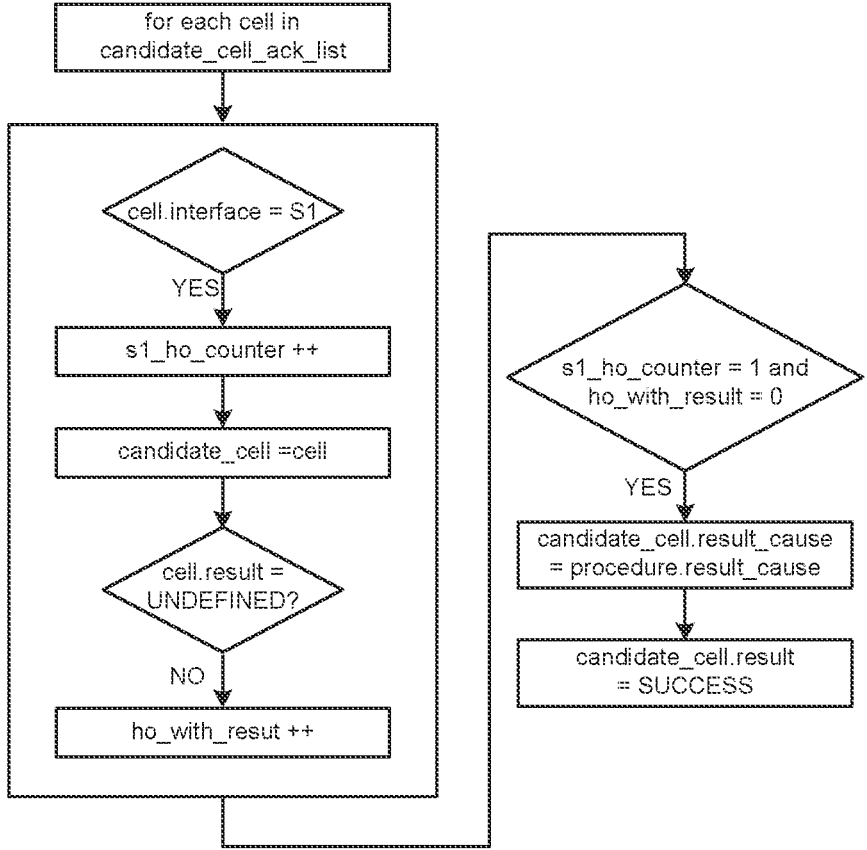
FIG. 42 is a flowchart of update candidate_cell_ack_list by S1AP UE Context Release Command message process.

FIG. 42 is a flowchart of update candidate_cell_ack_list by S1AP UE Context Release Command message process.

Figure 43:
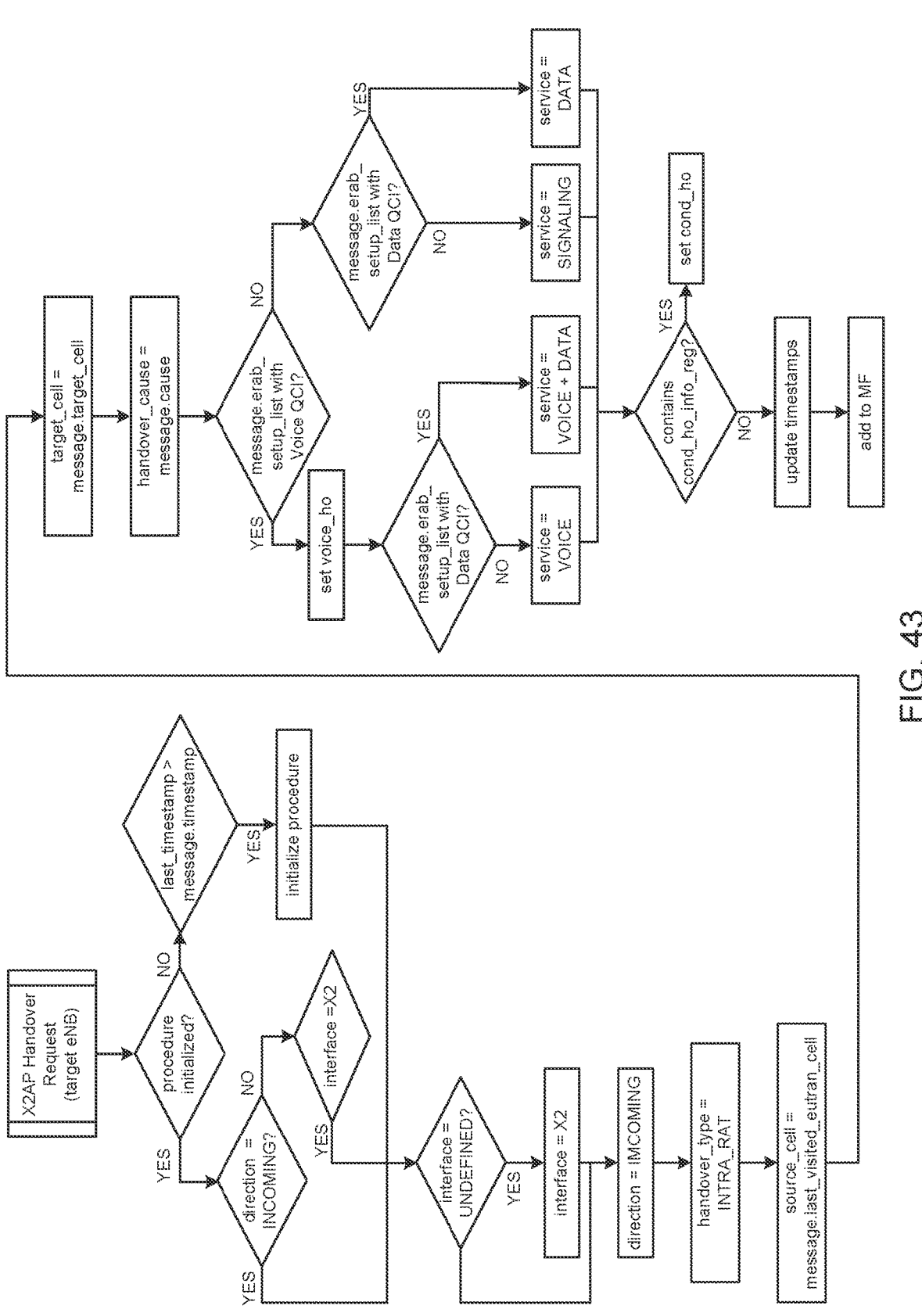
FIG. 43 is a flowchart of a 4G Incoming Handover X2AP Handover Request message decision process.

FIG. 43 is a flowchart of a 4G Incoming Handover X2AP Handover Request message decision process.

Figure 44:
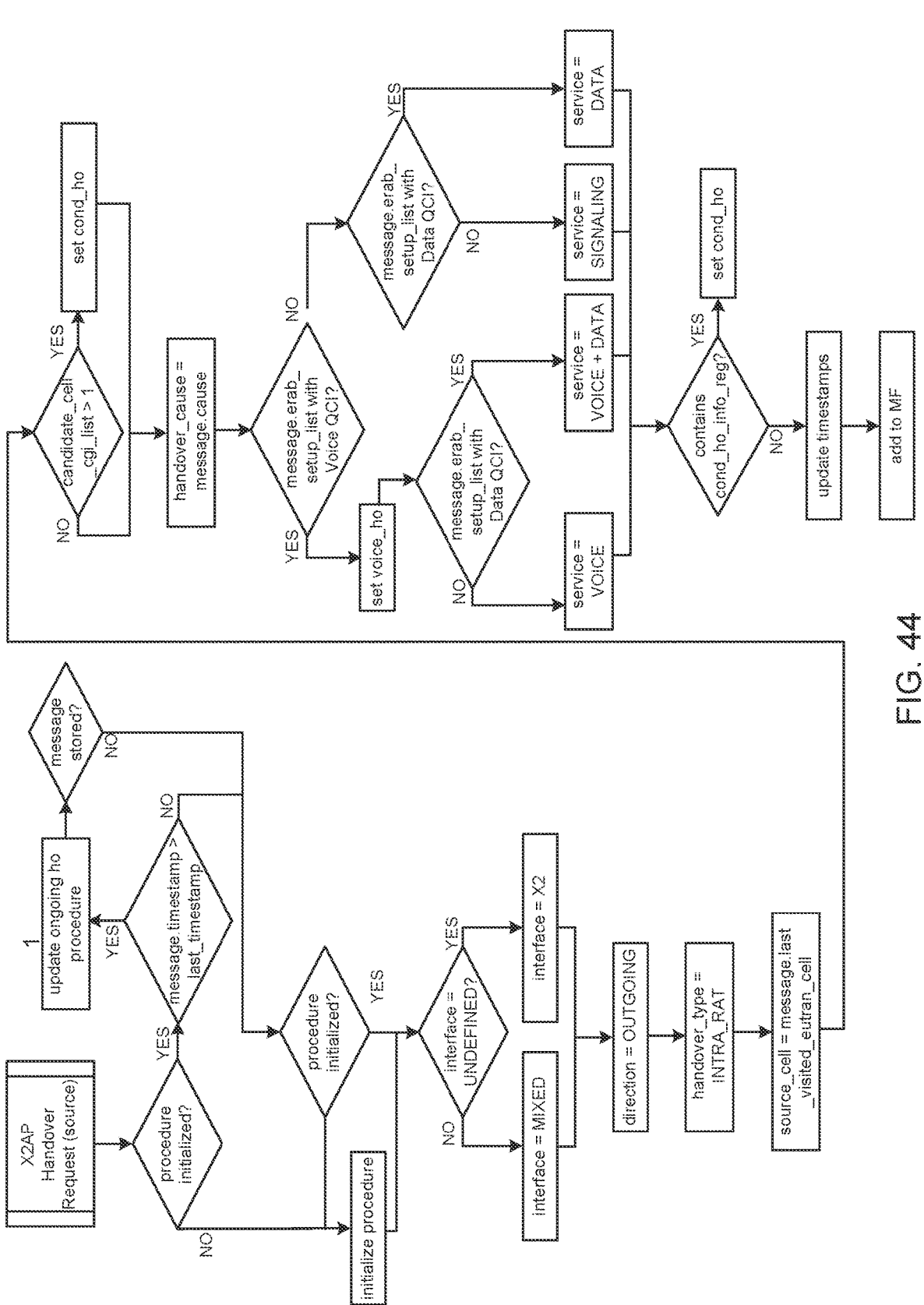
FIG. 44 is a flowchart of a 4G Outgoing Handover X2AP Handover Request message decision process.

FIG. 44 is a flowchart of a 4G Outgoing Handover X2AP Handover Request message decision process.

Figure 45:
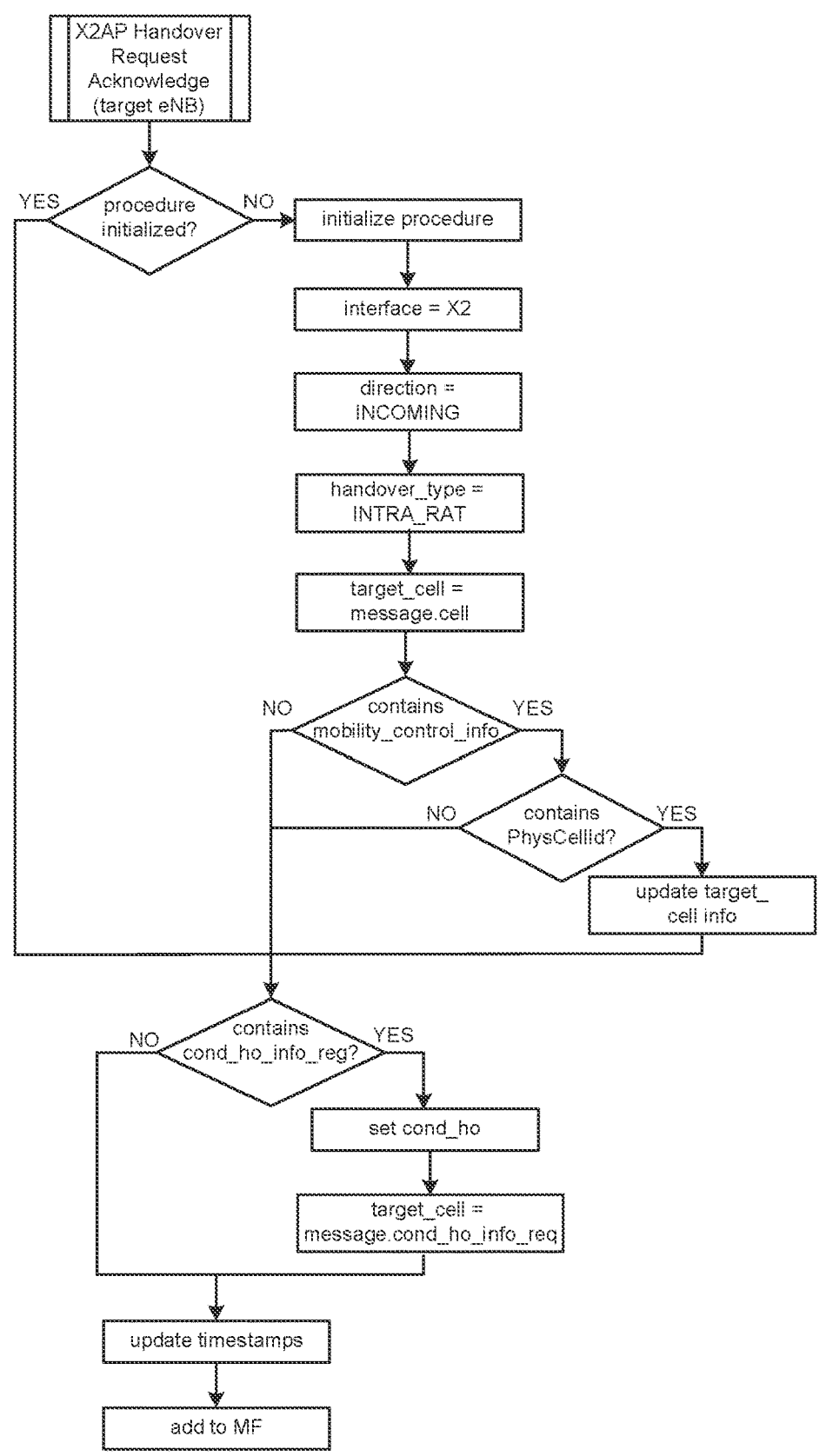
FIG. 45 is a flowchart of a 4G Incoming Handover X2AP Handover Request Acknowledge message decision process.

FIG. 45 is a flowchart of a 4G Incoming Handover X2AP Handover Request Acknowledge message decision process.

Figure 46:
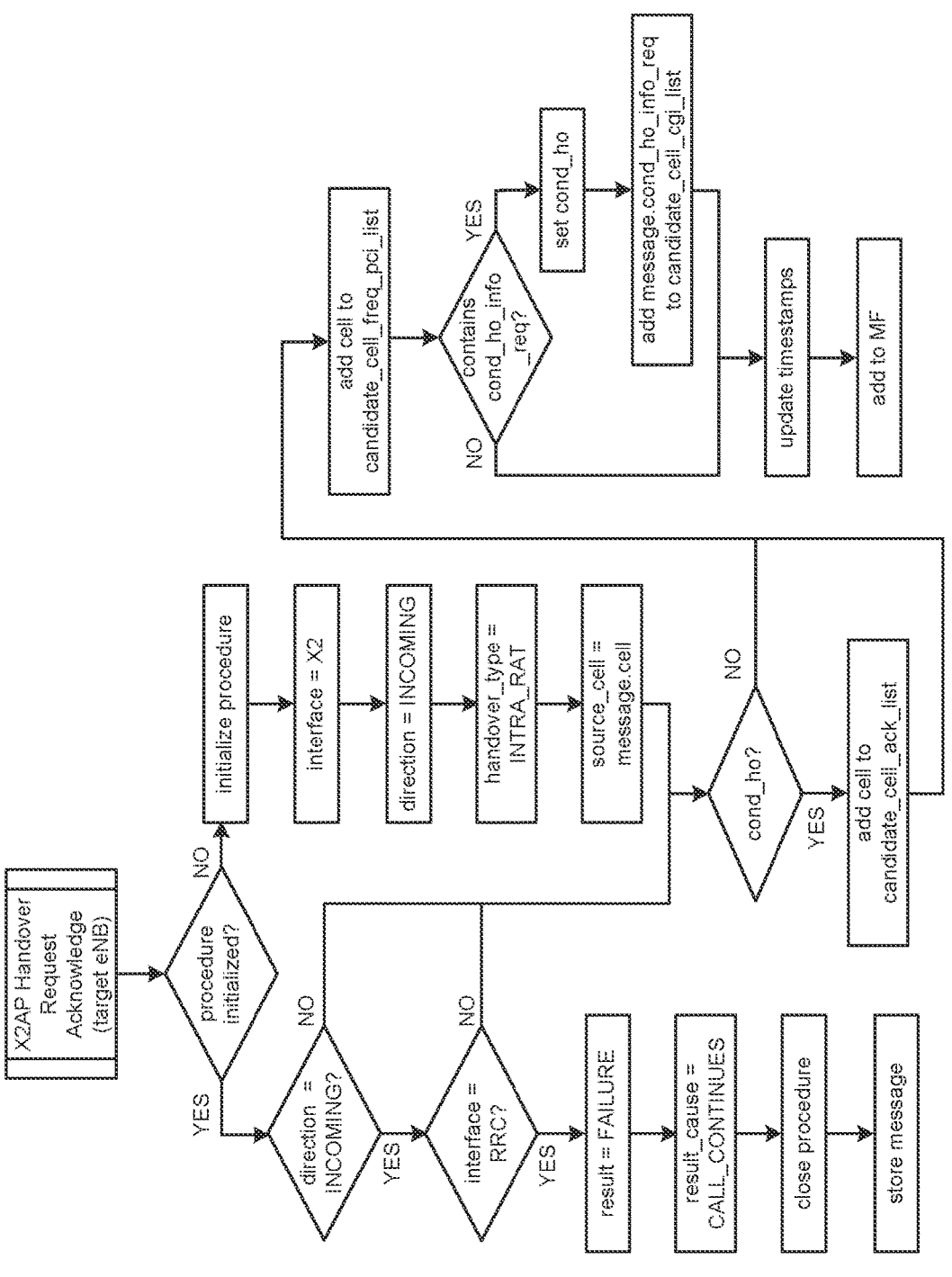
FIG. 46 is a flowchart of a 4G Outgoing Handover X2AP Handover Request Acknowledge message decision process.

FIG. 46 is a flowchart of a 4G Outgoing Handover X2AP Handover Request Acknowledge message decision process.

FIG. 47 is a flowchart of a 4G Handover X2AP Handover Cancel and Conditional Handover Cancel messages decision process.

Figure 48A:
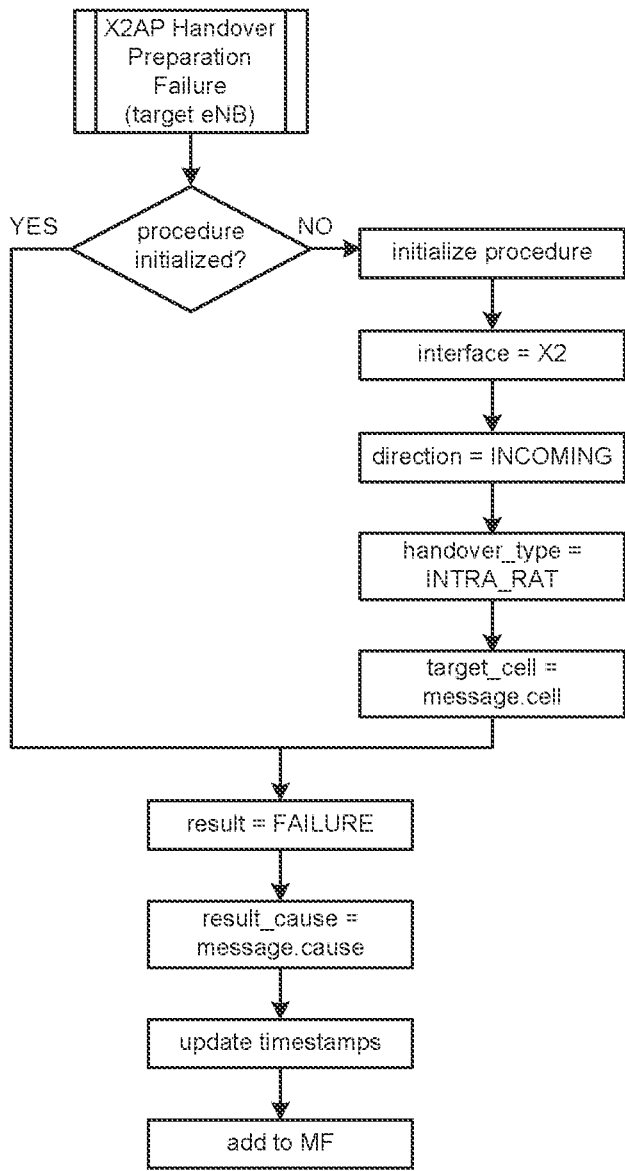
FIGS. 48A-48B are flowcharts of a 4G Handover X2AP Handover Preparation Failure message decision process.
Figure 48B:
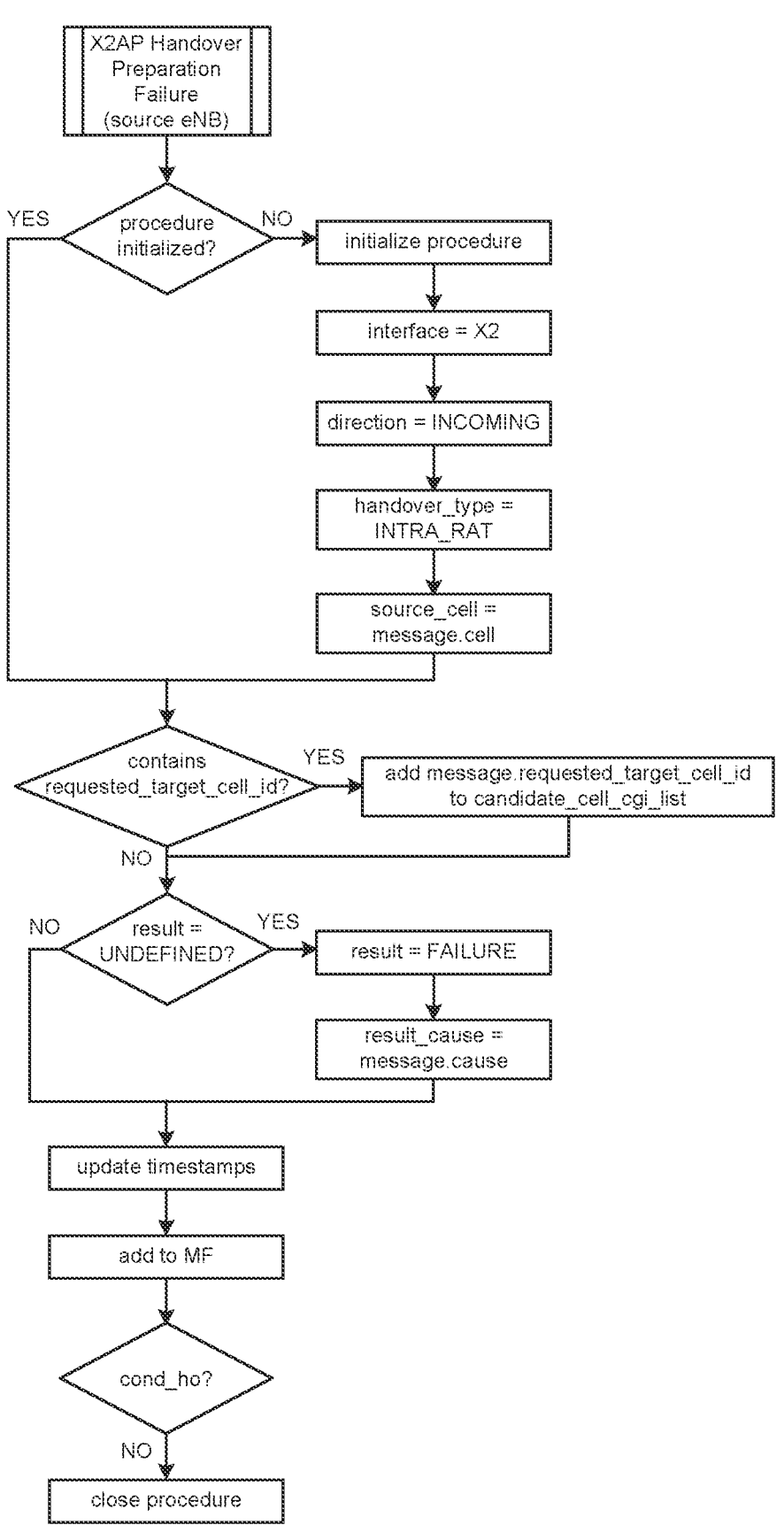

FIGS. 48A-48B are flowcharts of a 4G Handover X2AP Handover Preparation Failure message decision process.

Figure 49A:
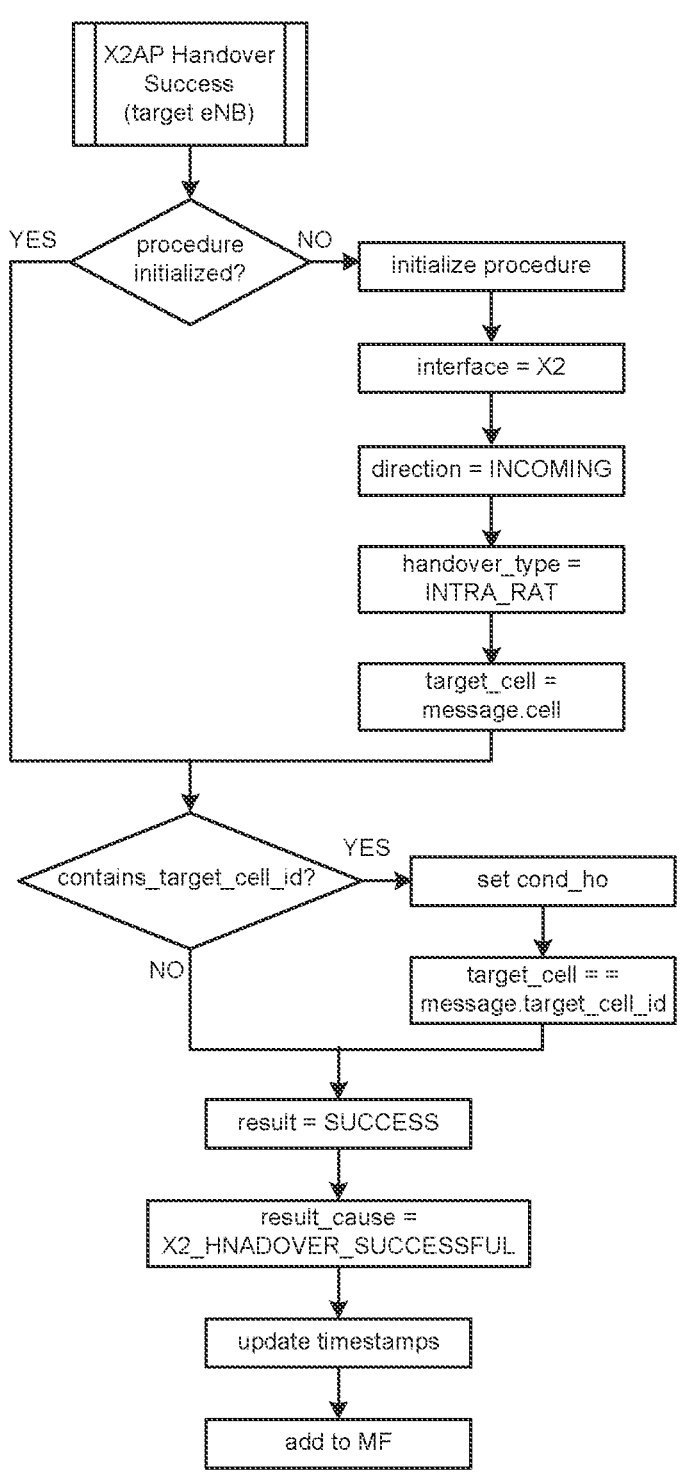
FIGS. 49A-49B are flowcharts of a 4G Handover X2AP Handover Success message decision process.
Figure 49B:
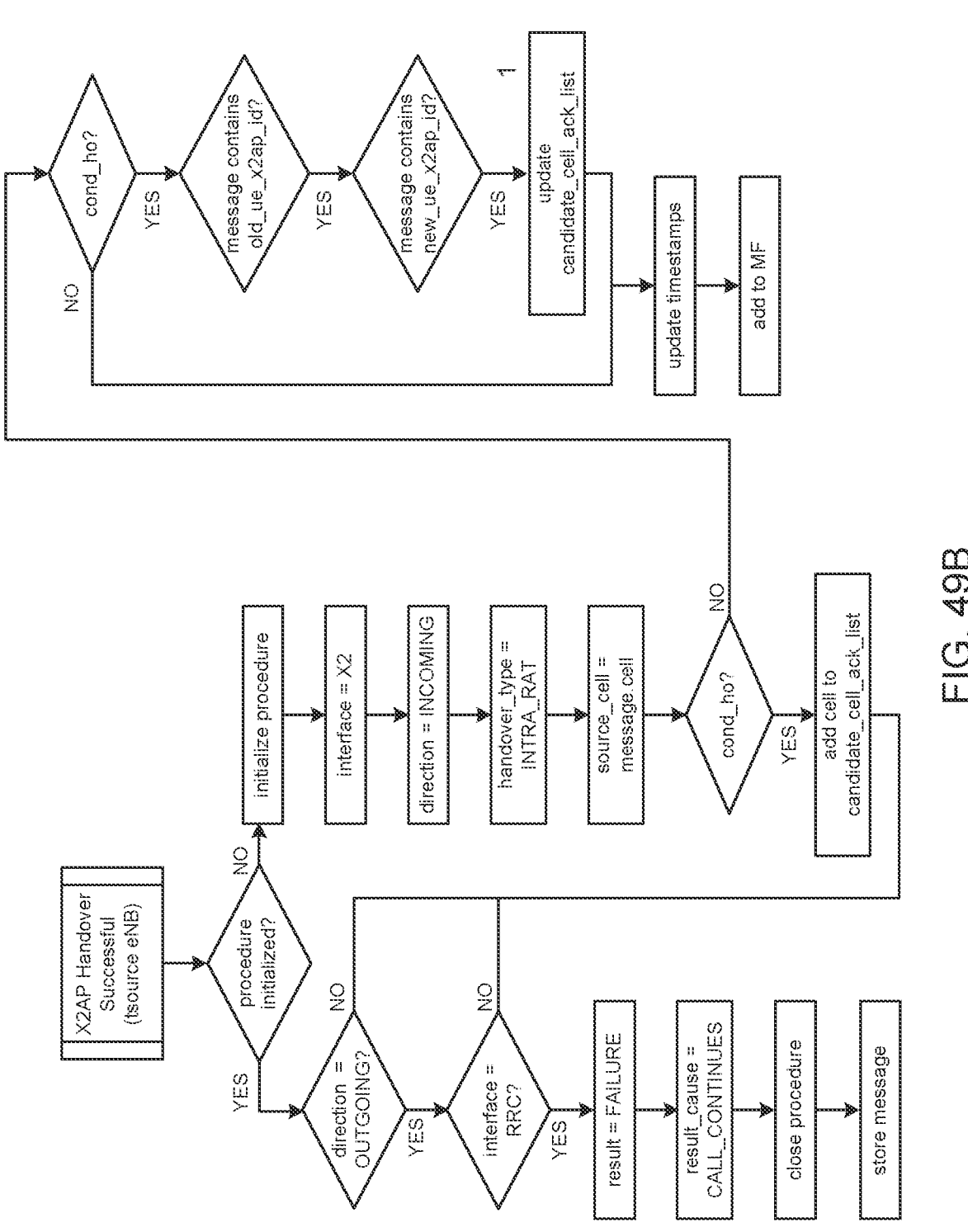

FIGS. 49A-49B are flowcharts of a 4G Handover X2AP Handover Success message decision process. Box 1: how to update candidate_cell_ack_list is described by FIG. 50.

Figure 50:
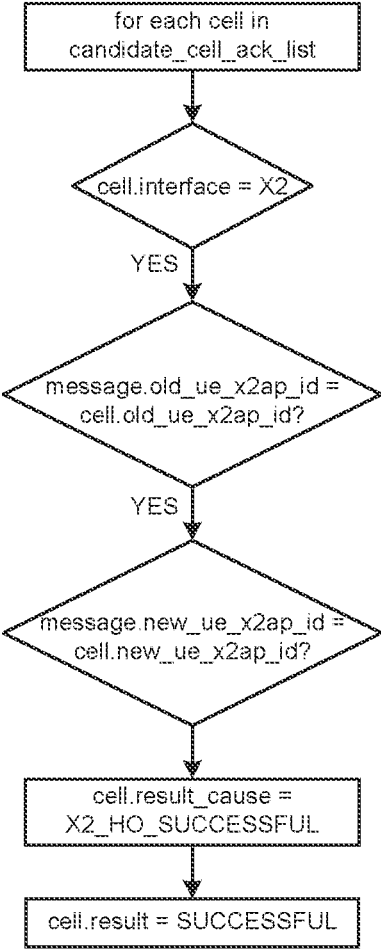
FIG. 50 is a flowchart of an update candidate_cell_ack_list by X2AP Handover Success message process.

FIG. 50 is a flowchart of an update candidate_cell_ack_list by X2AP Handover Success message process.

Figure 51:
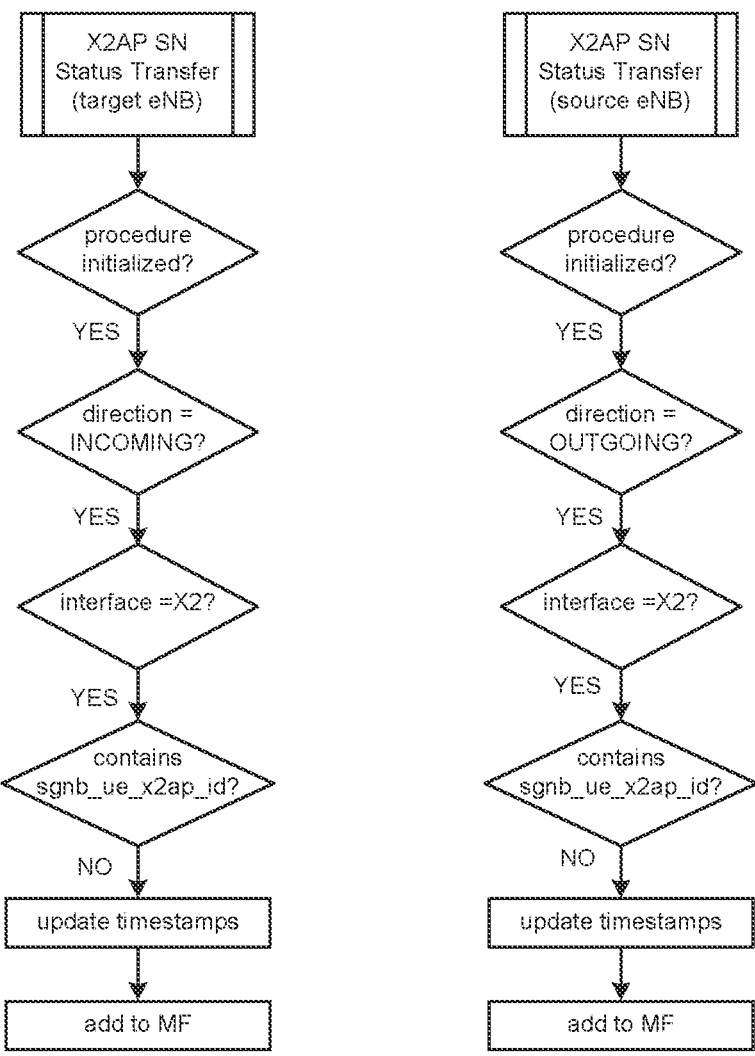
FIG. 51 is a flowchart of a 4G Handover X2AP SN Status Transfer message decision process.

FIG. 51 is a flowchart of a 4G Handover X2AP SN Status Transfer message decision process.

Figure 52:
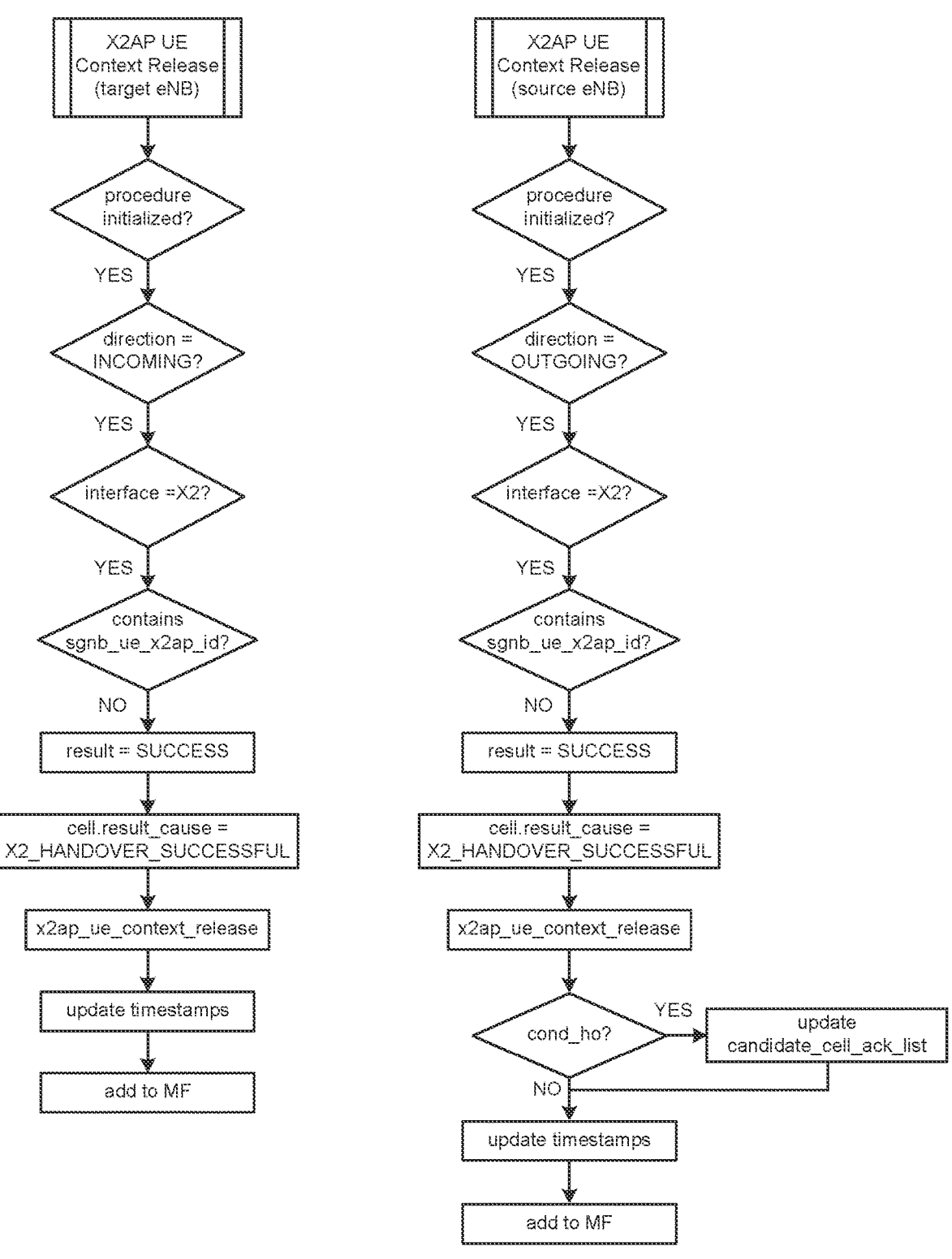
FIG. 52 is a flowchart of a 4G Handover X2AP UE Context Release message decision process.

FIG. 52 is a flowchart of a 4G Handover X2AP UE Context Release message decision process. In FIG. 52, box 1: how to update candidate_cell_ack_list is described by FIG. 50.

4G Call Start

This procedure will report the most important characteristics of a connection starts. As call fragment may start due to one of the following signaling procedures 1. RRC Connection Establishment 2. RRC Connection Re-establishment 3. Incoming Handover Scenario 3 includes X2, S1 and RRC handovers.

Figure 55B:
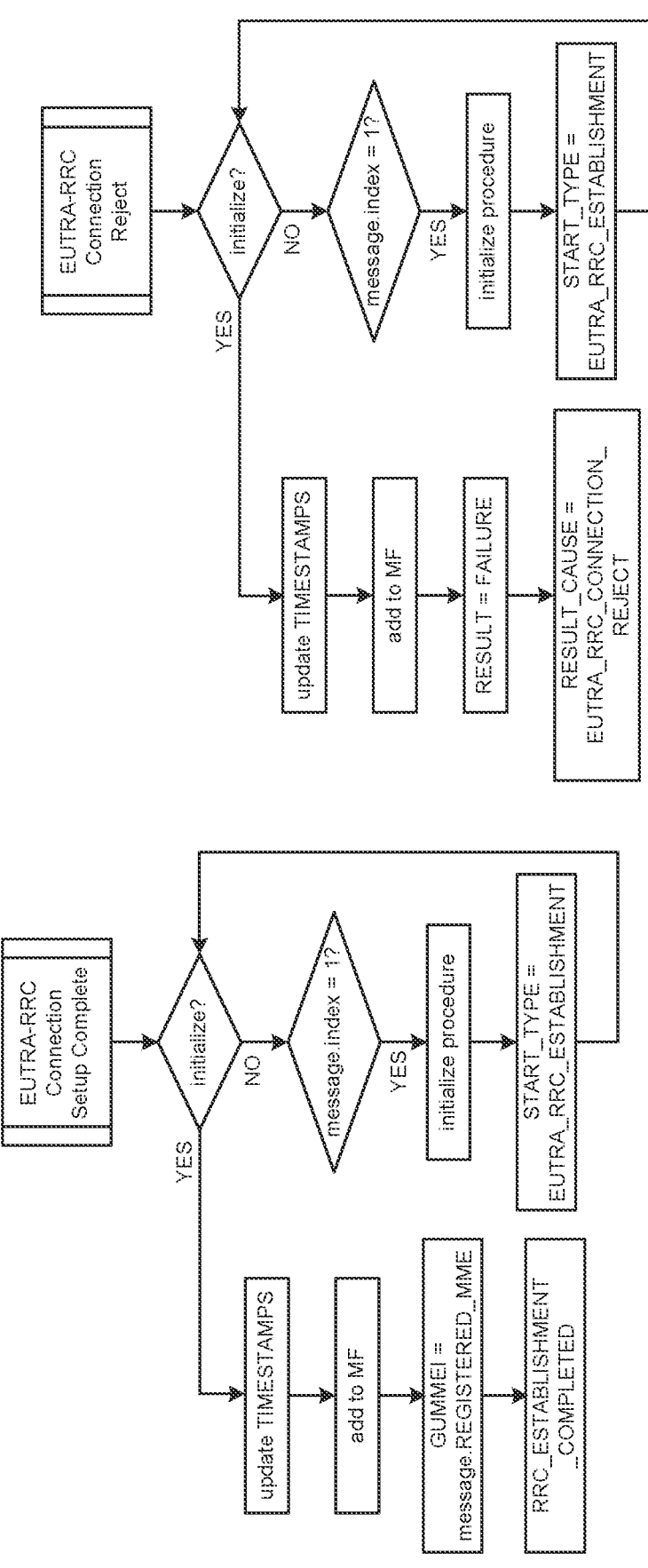

Message used in the LTE Call Start Procedure algorithm are the following: EUTRA-RRC RRC Connection Request, EUTRA-RRC RRC Connection Setup, EUTRA-RRC RRC Connection Setup Complete, EUTRA-RRC RRC Connection Reject, EUTRA-RRC Security Mode Command, EUTRA-RRC Security Mode Complete, EUTRA-RRC Security Mode Failure, S1AP Initial UE Message, S1AP Initial Context Setup Request, S1AP Initial Context Setup Response, S1AP Initial Context Setup Failure, S1AP Handover Request, S1AP Handover Request Acknowledge, S1AP Handover Failure, S1AP Handover Notify, X2AP Handover Request (received), X2AP Handover Request Acknowledge (sent), X2AP Handover Preparation Failure (sent), X2AP Handover Cancel (received), X2AP SN Status Transfer (received), X2AP UE Context Release (sent), S1AP Path Switch Request, S1AP Path Switch Request Acknowledge, S1AP Path Switch Request Failure, EUTRA-RRC RRC Connection Reconfiguration Complete, EUTRA-RRC RRC Reestablishment Request, EUTRA-RRC RRC Reestablishment, EUTRA-RRC RRC Reestablishment Complete, EUTRA-RRC RRC Reestablishment Reject The decision algorithms for each message are shown in the following figures FIGS. 55A-55B show the flowchart of a Call Start due to RRC Connection Setup procedure. If this sub-set of messages ends as failure the call start ends as failed (block), otherwise additional messages are expected.

Figure 56:
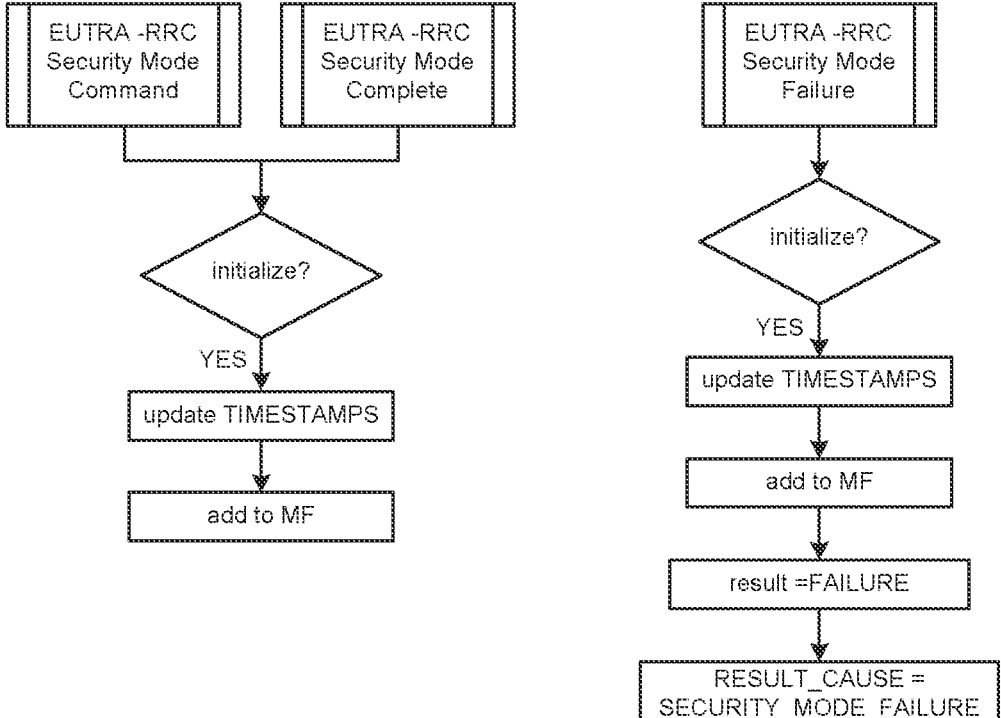
FIG. 56 is a flowchart of a 4G Call Start for the Security procedure that appears after the EUTRA RRC Connection Setup procedure.

FIG. 56 show the flowchart of the security procedure that may appear after the RRC Connection Setup (FIGS. 55A-55B).

Figure 57A:
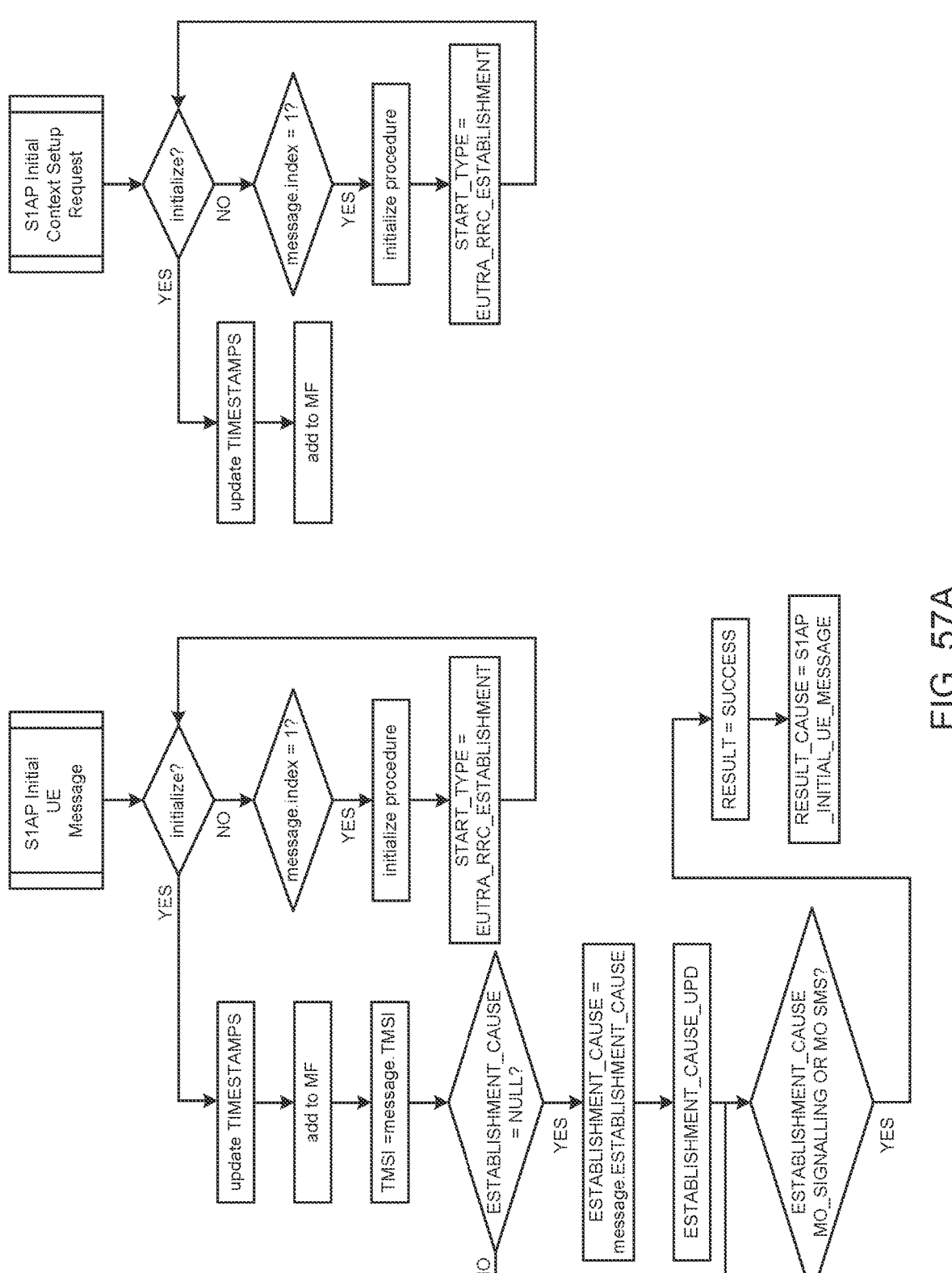
FIGS. 57A-57B are flowcharts of a 4G Call Start ending message for Scenario 1.
Figure 57B:
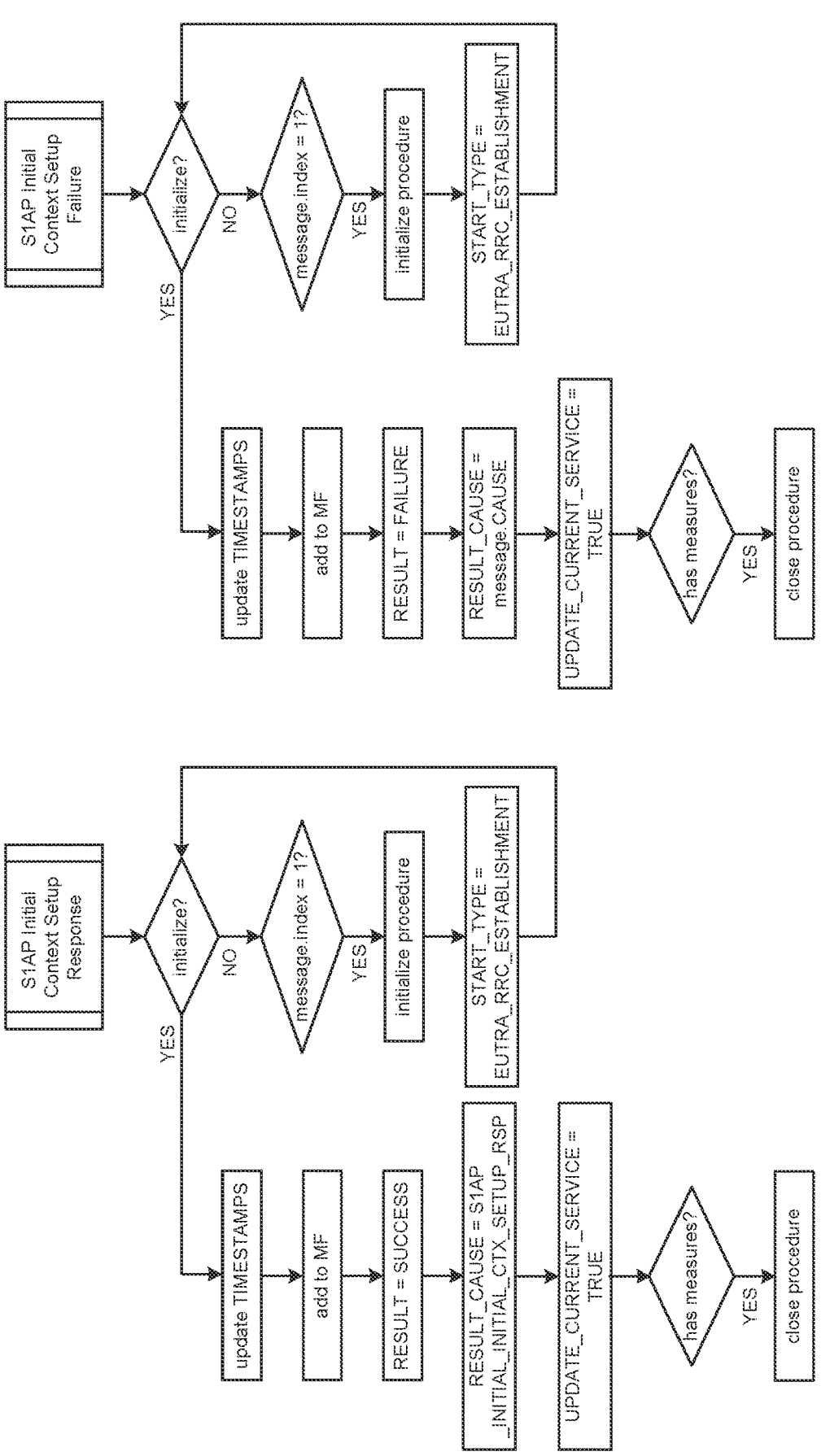

FIGS. 57A-57B show the flowchart of a Call Start with the messages that appear after the RRC Connection Setup (FIGS. 55A-55B) if it is successful.

Figure 58:
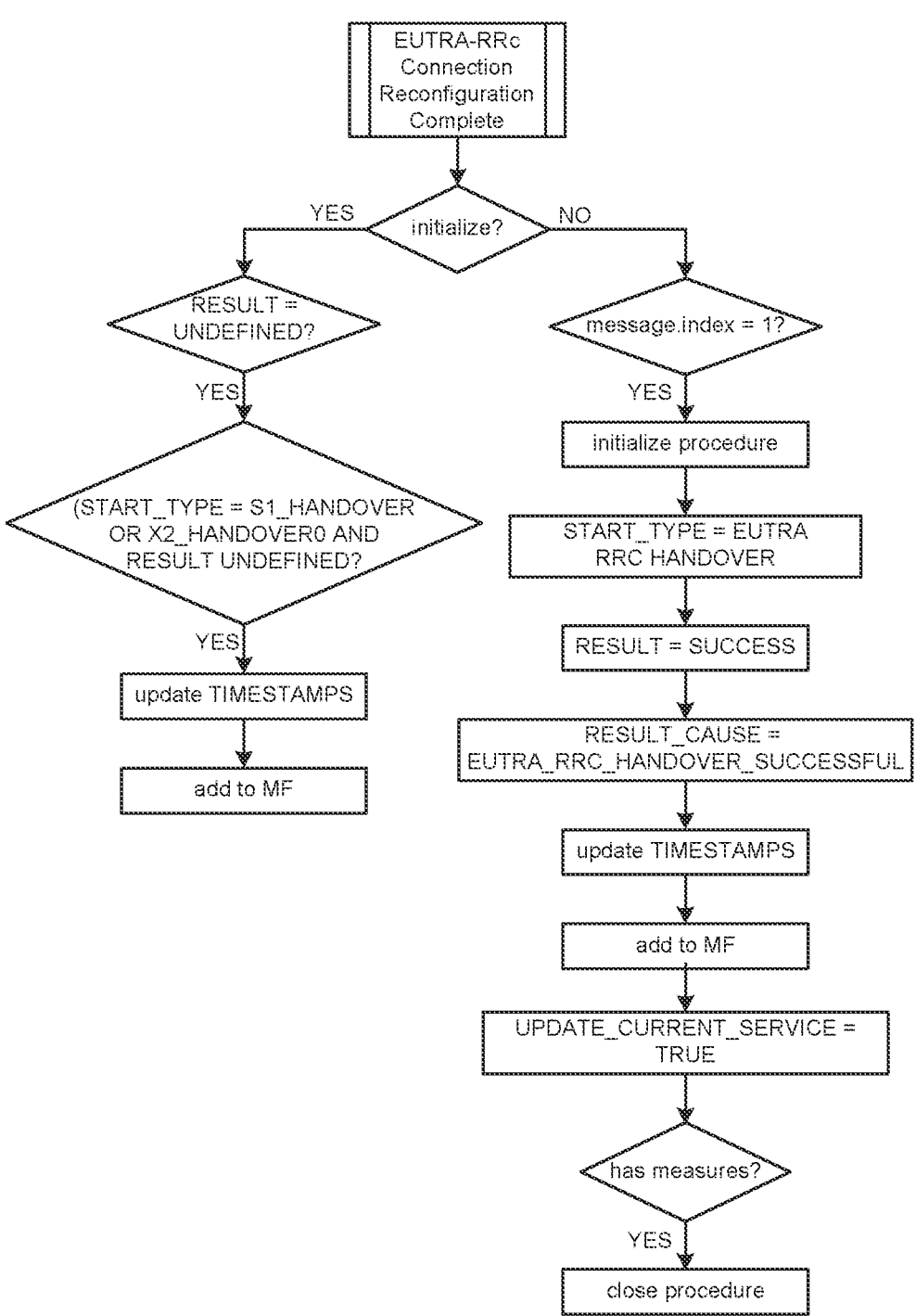
FIG. 58 is a flowchart of a 4G Call Start for Scenario 3 in case of RRC Incoming Handover.

FIG. 58 shows the flowchart of a Call Start due to RRC Incoming Handover. As RRC Connection Reconfiguration Complete that is the only message in this flowchart does not indicate if it is part of a handover, Call Start algorithm will consider that call fragments that start with RRC Connection Reconfiguration Complete are generating a Call Start due to RRC Handover.

Figure 59A:
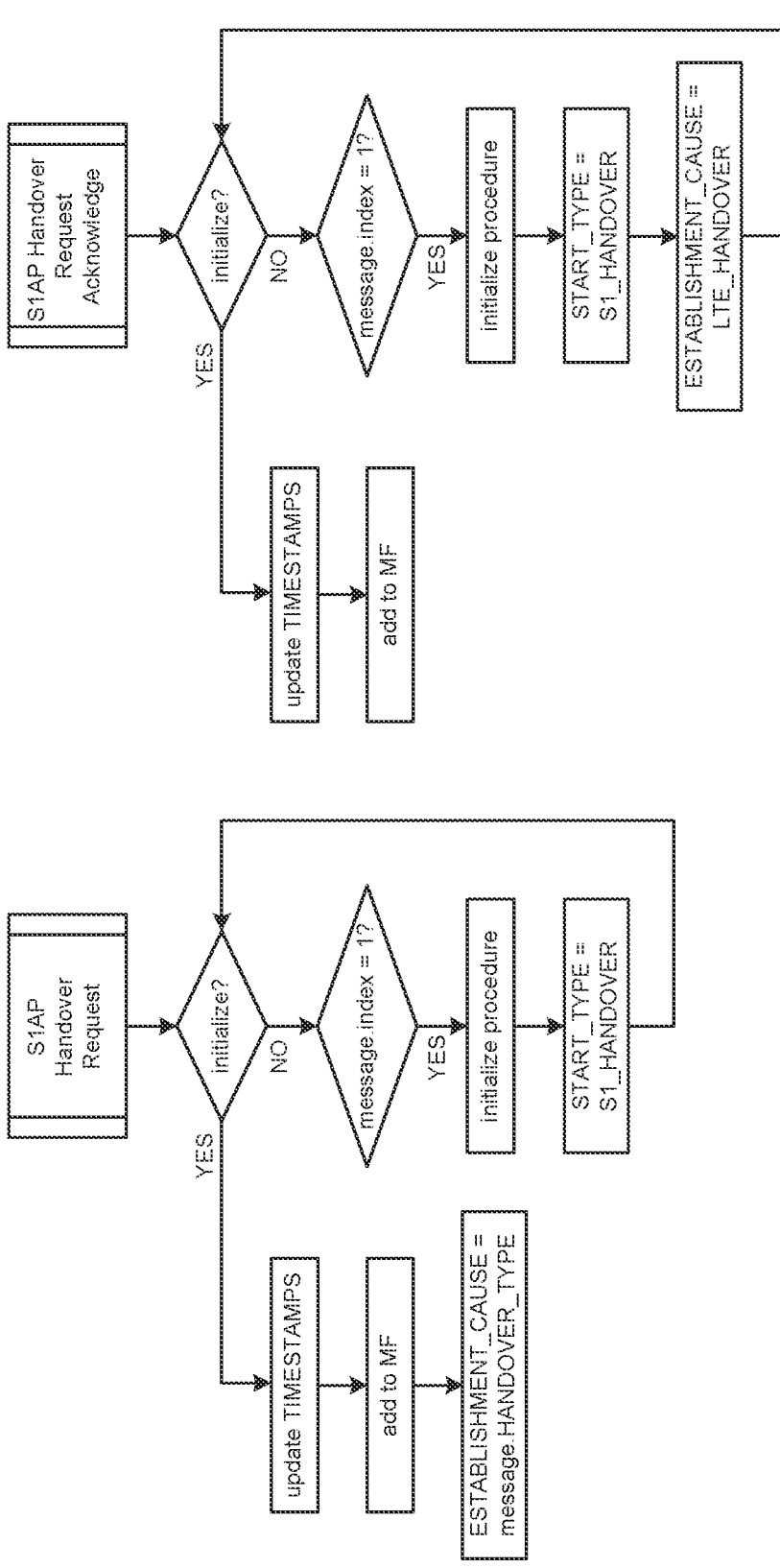
Figure 60A:
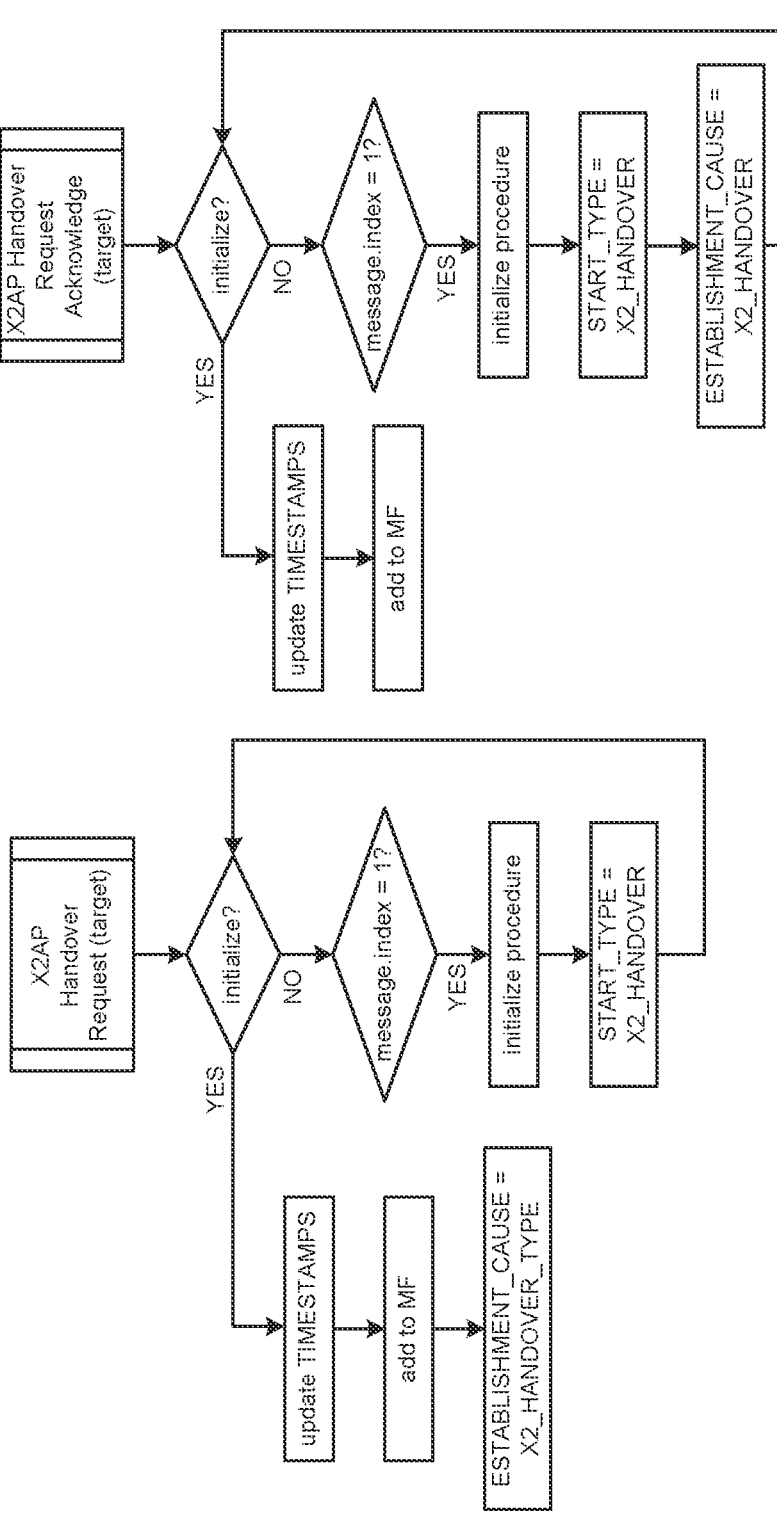
FIGS. 60A-60D are flowcharts of a 4G Call Start for Scenario 3 in case of X2 Incoming Handover.
Figure 60B:
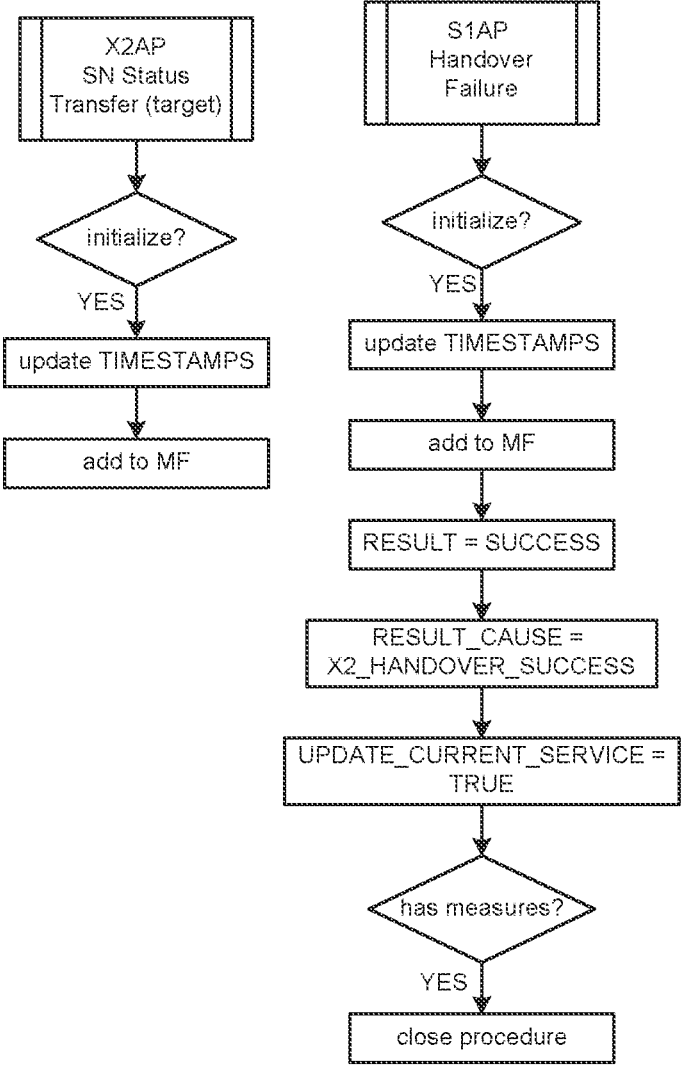
Figure 60C:
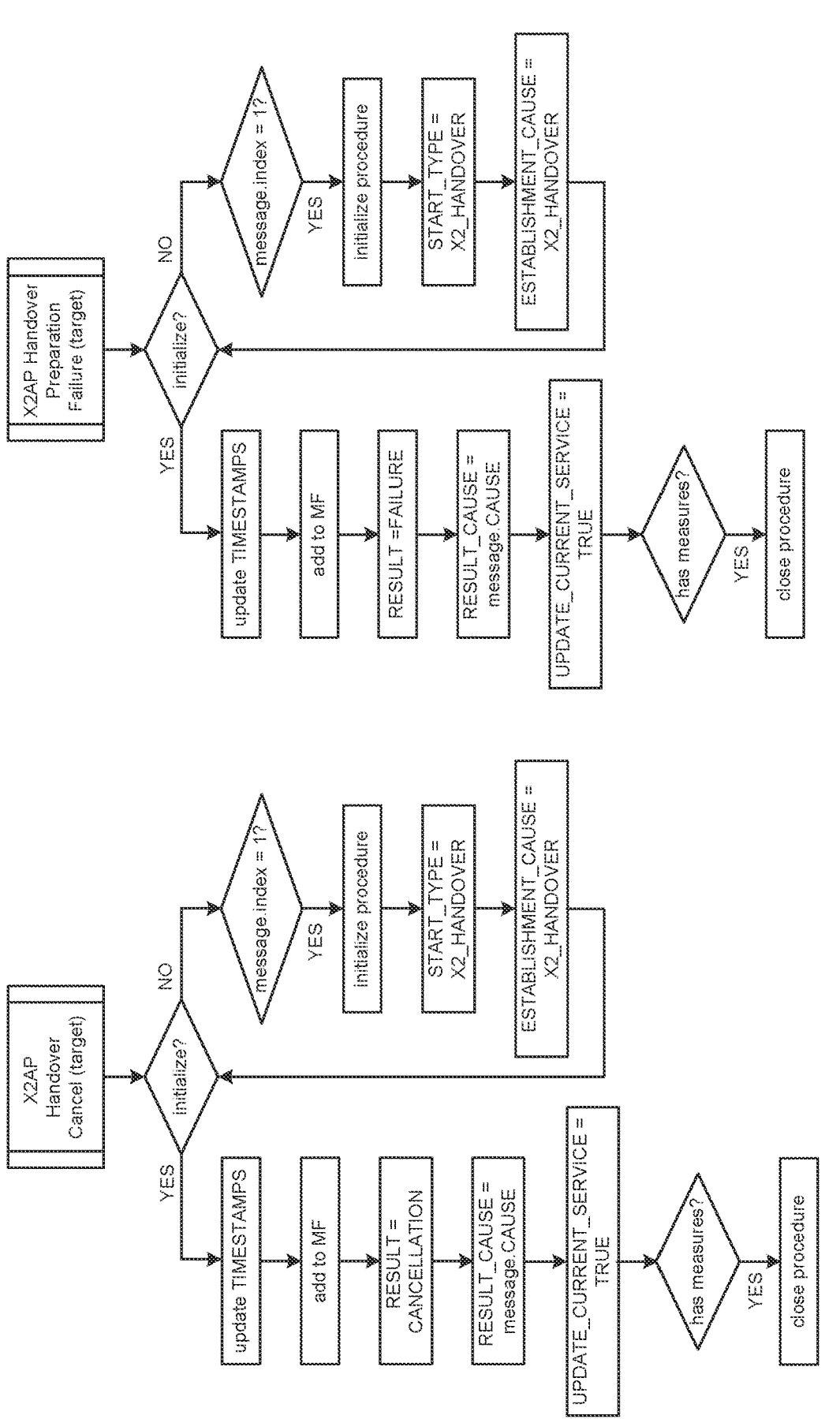
Figure 60D:
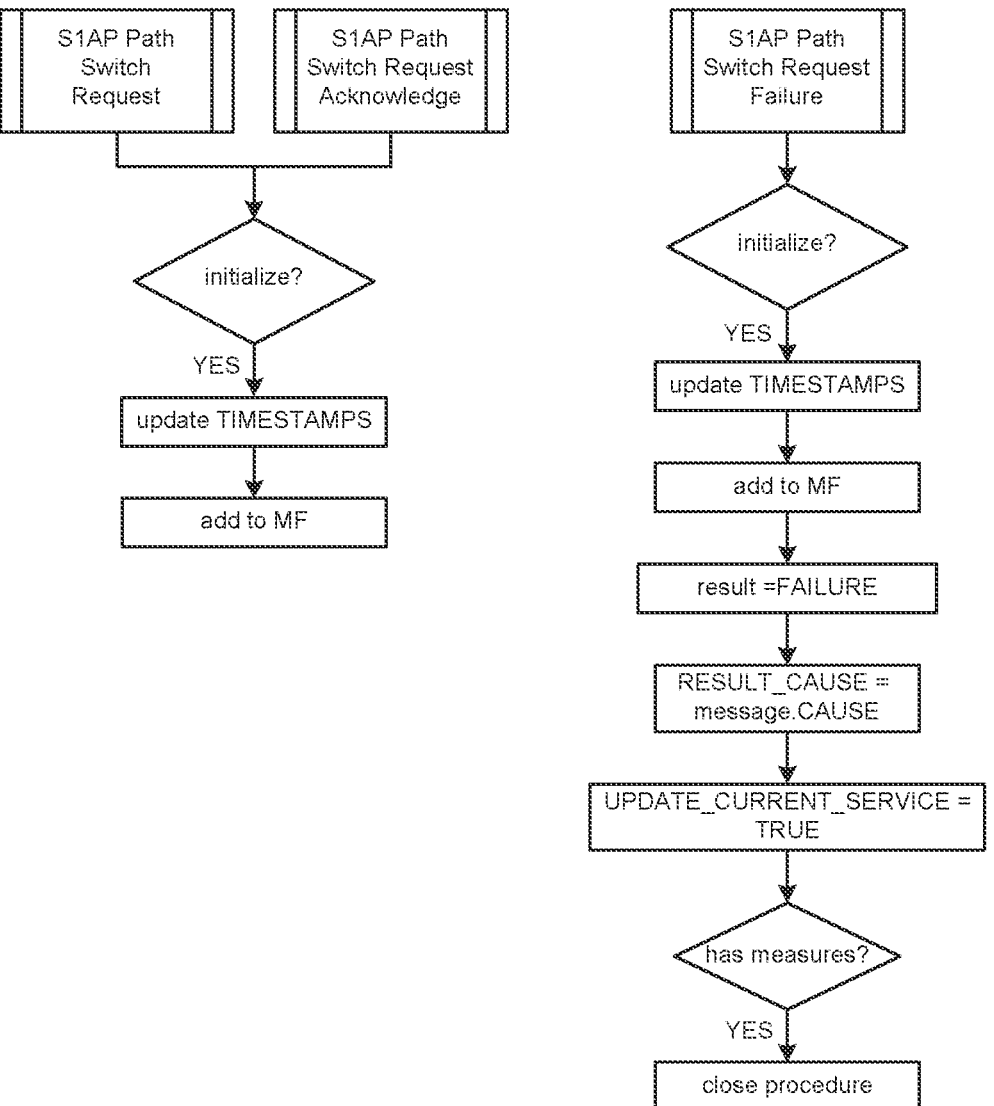

FIGS. 59A-59B show the flowchart of a Call Start due to S1 Incoming Handover.

FIGS. 60A-60D shows the flowchart of a Call Start due to X2 Incoming Handover.

Figure 61A:
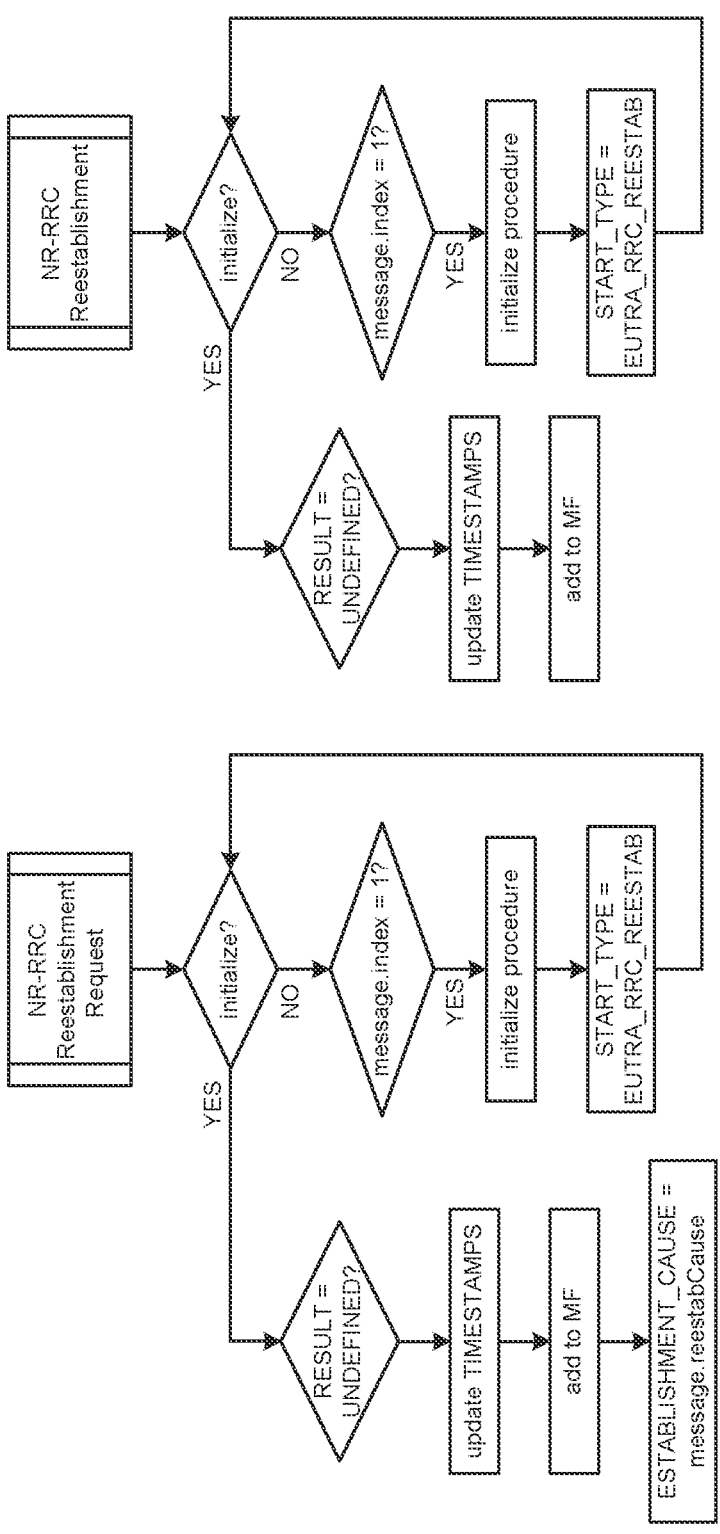
FIGS. 61A-61B are a flowchart of a 4G Call Start for Scenario 2 (re-establishment).
Figure 61B:
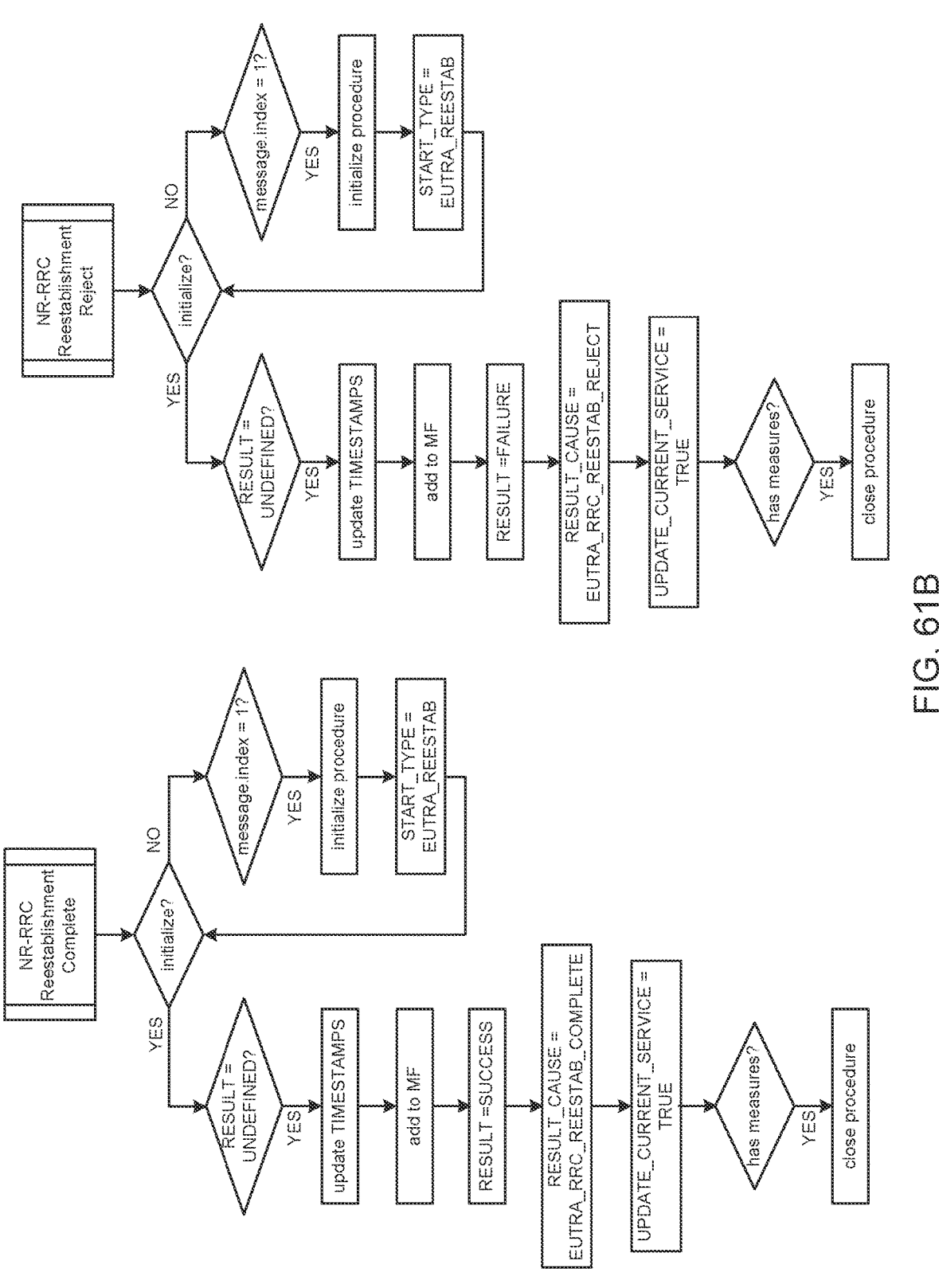

FIGS. 61A-61B show the flowchart of a Call Start due to re-establishment. Note that not all re-establishment signaling procedures generate a Call Start procedure, decision algorithm considers only those case in which the first message of the call fragment is part of the Re-establishment procedure.

Figure 63A:
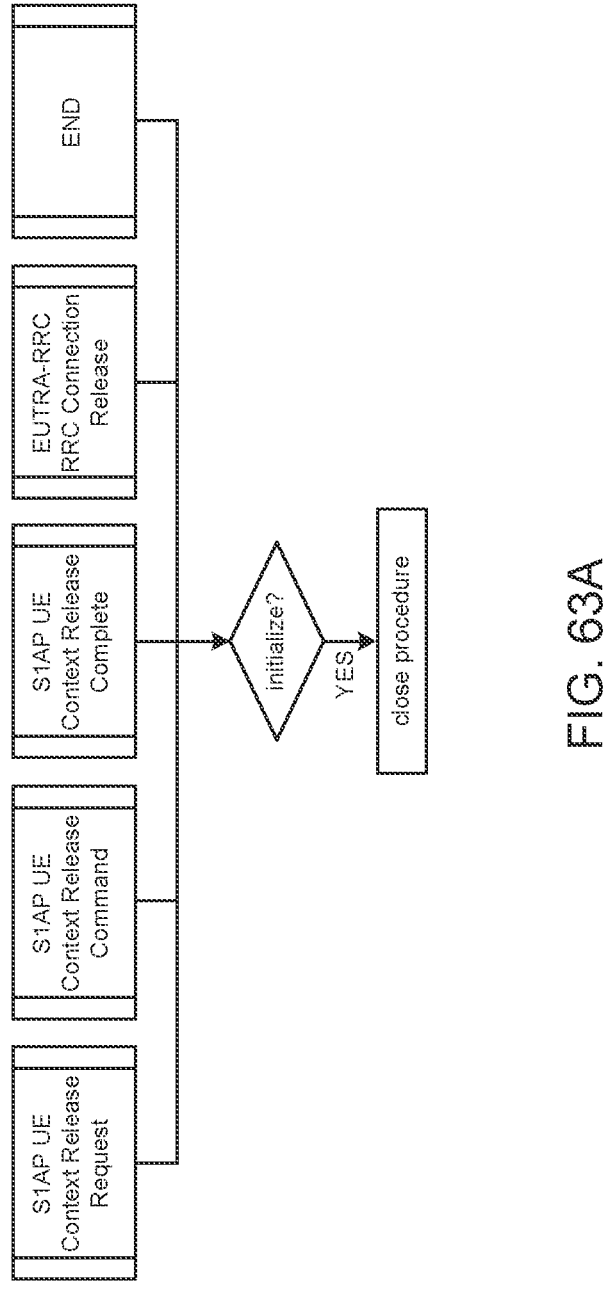
FIGS. 63A-63B are a flowchart of a 4G Call Start with the additional messages that can be used to close the procedure.
Figure 63B:
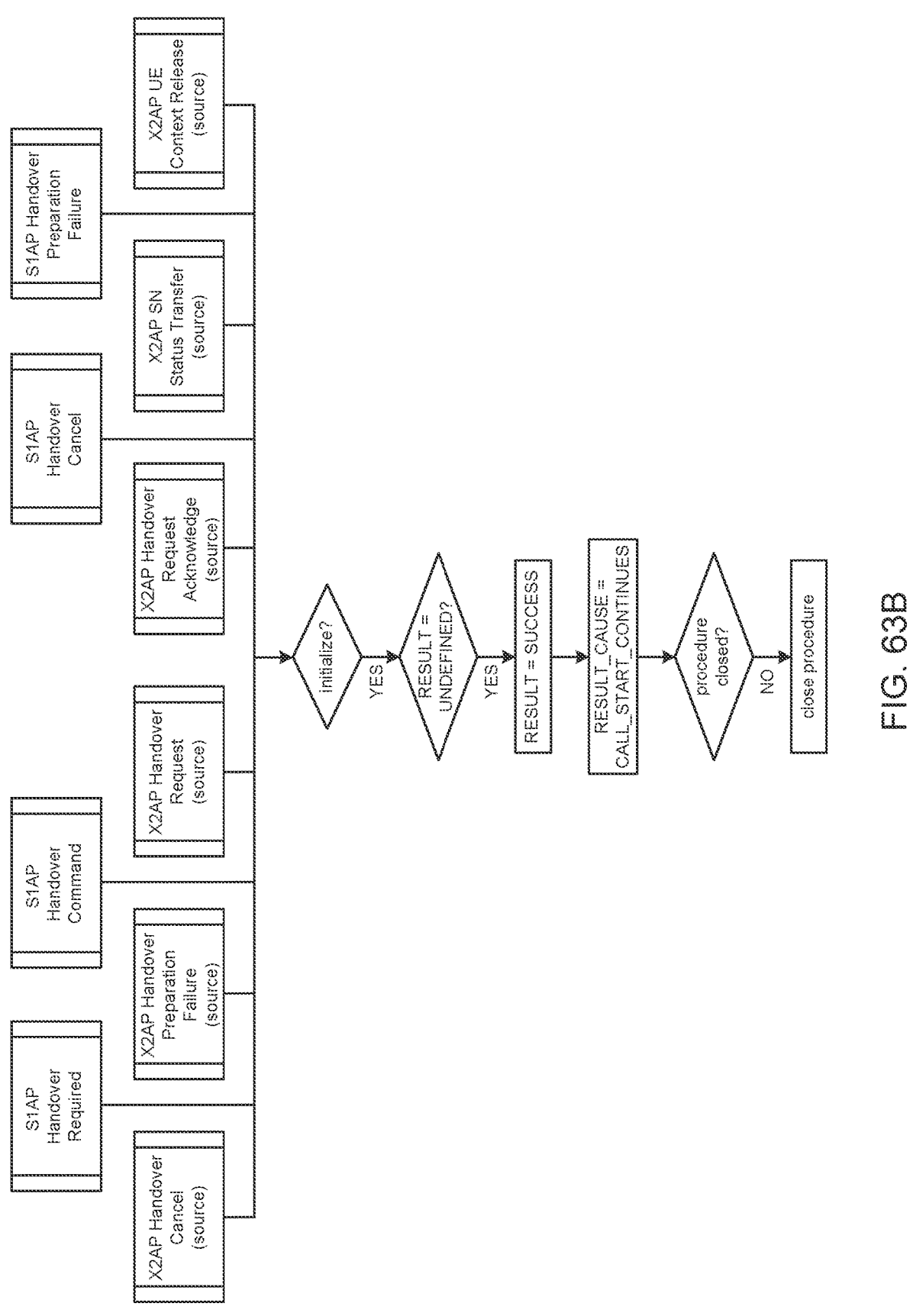
Figure 64:
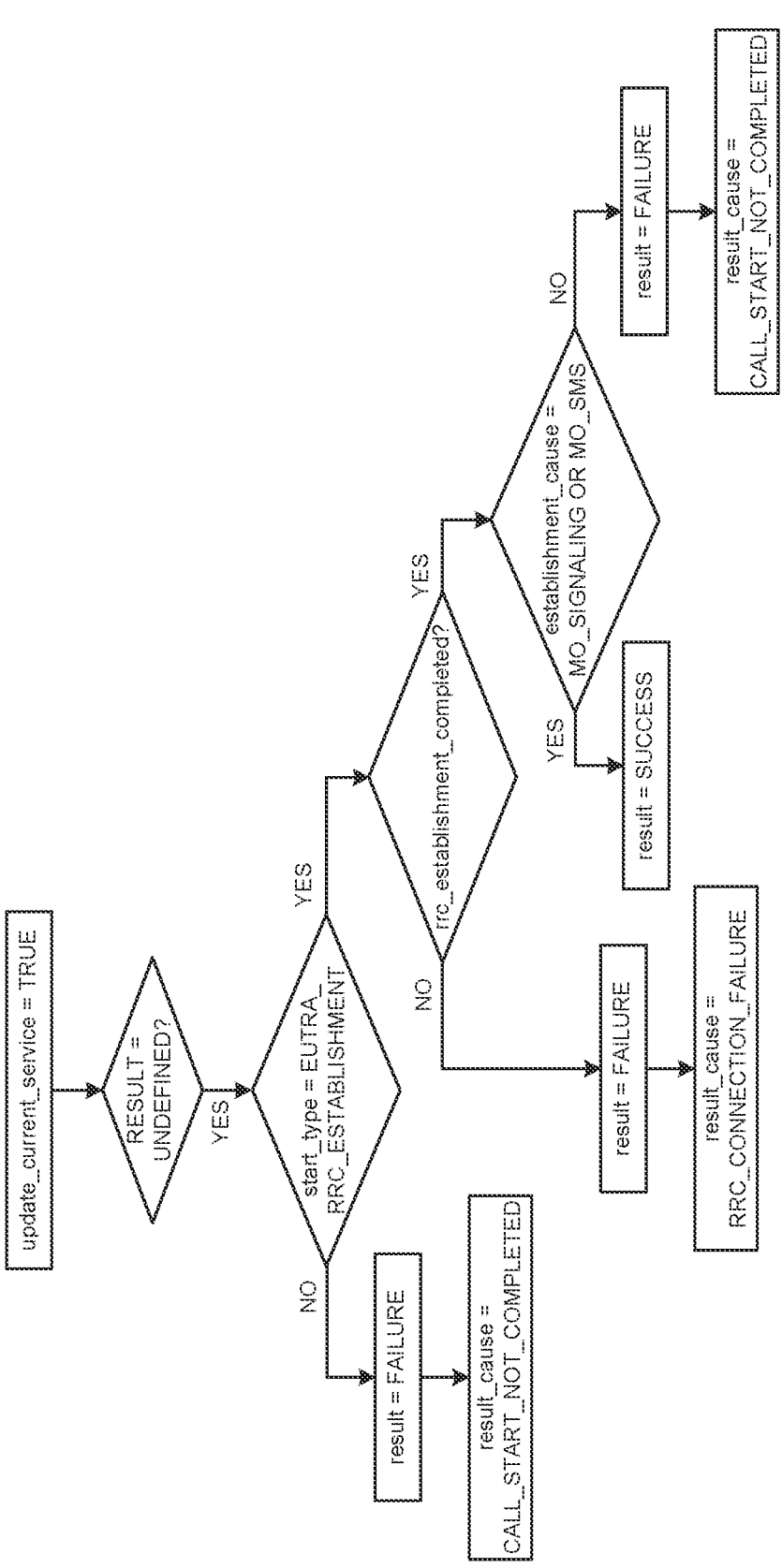
FIG. 64 is a flowchart of a 4G Call Start with the logic to close the Call Start procedure.

In case of missing messages in the Call Start processing, this procedure can end due to (FIGS. 63A-63B):

2 Call Continues after the Call Start procedure

2 Call ends

Figure 62:
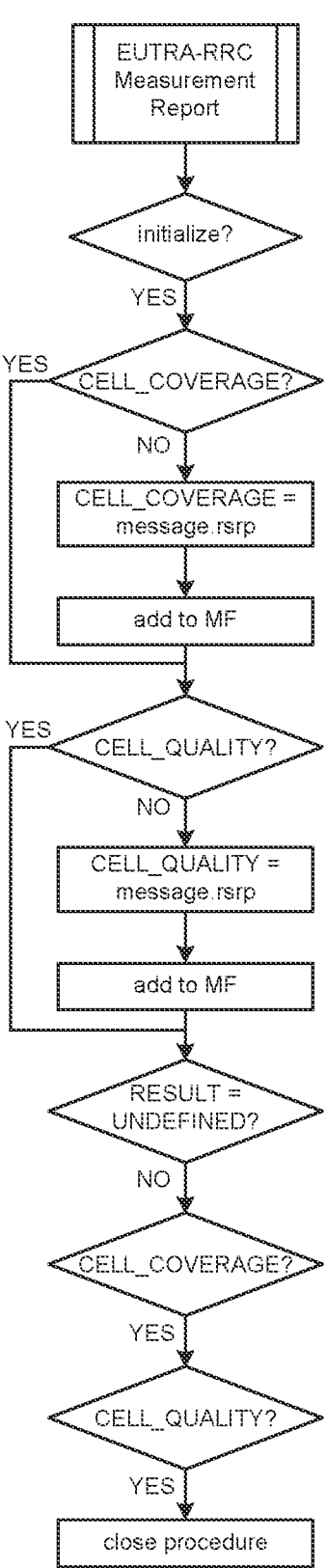
FIG. 62 is a flowchart of a 4G Call Start for obtaining measurement information associated to the call start procedure.

Call Start procedure should include measurements regarding to the serving cell. When call start signaling procedure ends, if measurement information has not arrived, the Call Start processing will wait for that information as shown in FIG. 62.

Measurement Report message is only considered if time elapsed since the start of the Call Start and the Measurement Report is lower than a threshold.

Call Start procedure will update the context with the values of the Service and Current Service based on the establishment cause that is set during the Call Start processing.

Table 4 shows the relation between establishment_cause and service

TABLE 4

Relation between establishment_cause and service

| ESTABLISHMENT_CAUSE | SERVICE |
|---|---|
| Emergency | EUTRA Voice |
| HighPriorityAccess | EUTRA Signaling |
| MT-Access | EUTRA Signaling |
| MO Signaling | EUTRA Signaling |
| MO Data | EUTRA Data |
| delayTolerantAccess-v1020 | EUTRA Data |
| MO Voice Call | EUTRA Voice |

Table 5 shows the relation between establishment_cause and current_service

TABLE 5

Relation between establishment_cause and current_service

| ESTABLISHMENT_CAUSE | SERVICE |
|---|---|
| MO Signaling | EUTRA Signaling |
| High Priority Access | |
| MT Access | |
| MO Data | EUTRA Data |
| MO Voice Call | EUTRA Voice |
| Emergency | |
| Delay TolerantAccess-v1020 | EUTRA Data |

4G Call End

This procedure will report the most important characteristics of a connection end. A call fragment may end due to one of the following signaling procedures 1. RRC Connection Release/S1AP UE Context Release
2. Outgoing Handover
3. RRC Connection Re-establishment Scenario 2 includes X2, S1 and RRC handovers.

Scenario 3 will only generate a Call End procedure if it fails. When re-establishment procedure is successful, call continues in the cell where the procedure is triggered.

Message used in the LTE Call End Procedure algorithm are the following: EUTRA-RRC RRC Connection Release, S1AP UE Context Release Request, S1AP UE Context Release Command. S1AP UE Context Release Complete, X2AP Handover Request, X2AP Handover Request Acknowledge, X2AP Handover Cancel, X2AP Handover Preparation Failure, X2AP SN Status Transfer, X2AP UE Context Release, S1AP Handover Required, S1AP Handover Command, S1AP Handover Cancel, S1AP Handover Preparation Failure, EUTRA-RRC Mobility From EUTRA Command, EUTRA-RRC RRC Connection Reconfiguration, EUTRA-RRC Connection Reestablishment Request, EUTRA-RRC Connection Reestablishment, EUTRA-RRC Connection Reestablishment Complete, EUTRA-RRC Connection Reestablishment Reject.

Figure 65A:
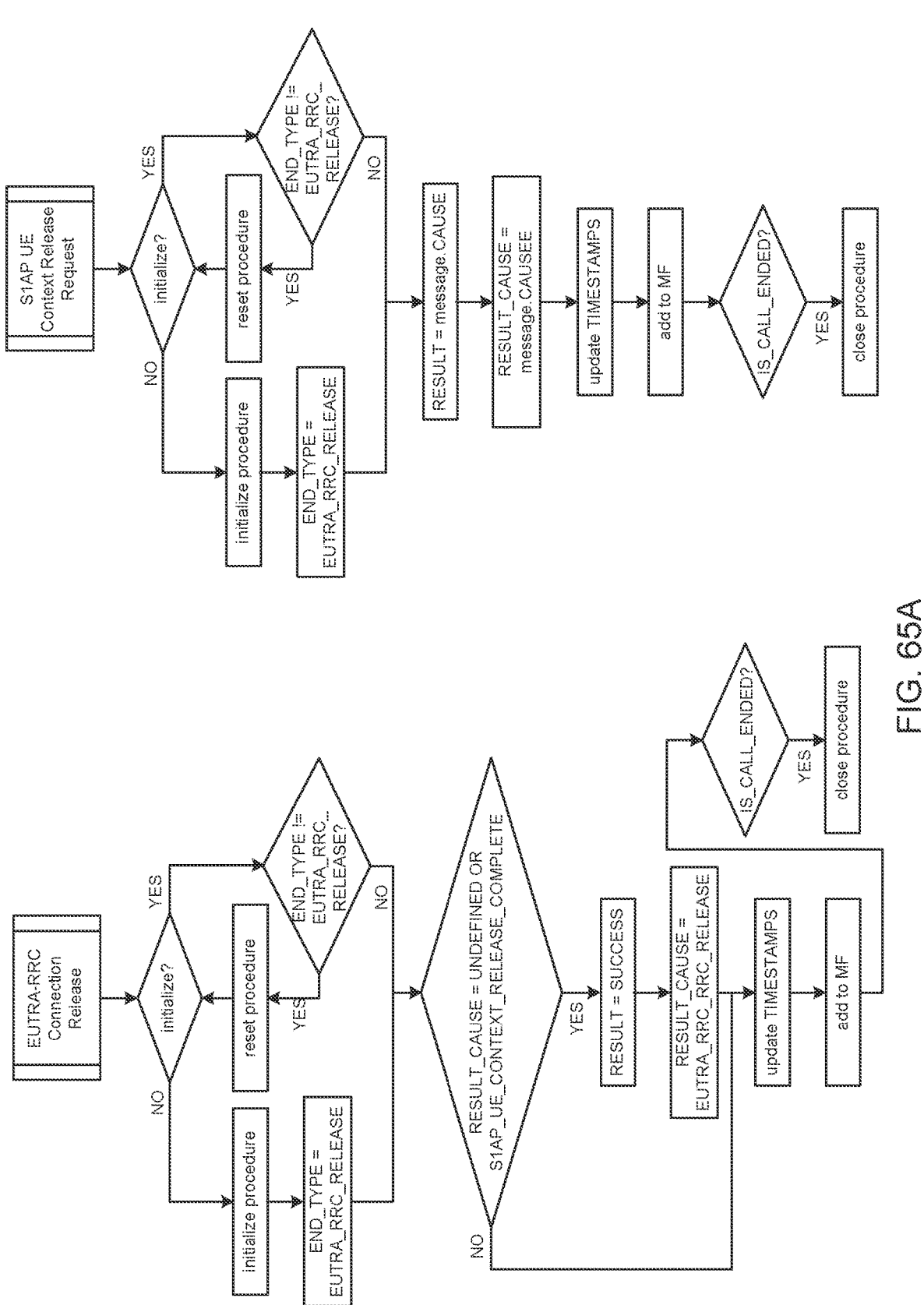
FIG. 65A and FIG. 65B are the flowcharts of a 4G Call End corresponding to scenario 1 (S1AP Context Release/RRC Connection Release)
Figure 65B:
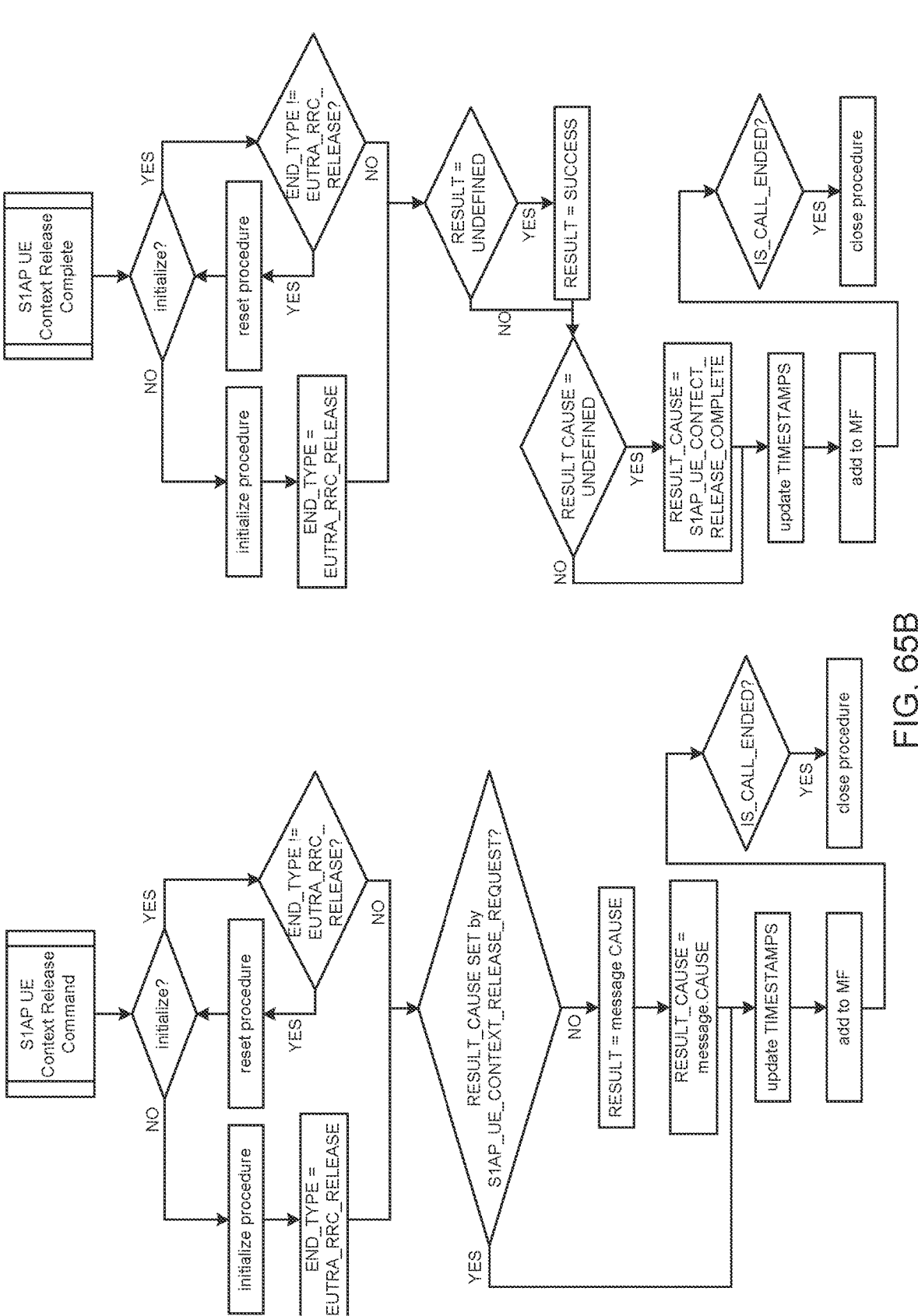

A Call is considered ended (IS_CALL_ENDED=TRUE) when the procedure includes one of the following combinations 2 S1AP UE Context Release Command+S1AP UE Context Release Complete EUTRA-RRC RRC Connection Release 2 S1AP Handover Required+S1AP UE Context Release Command+S1AP UE Context Release Complete 2 End Message Call End procedure includes measurement information. This information is taken from the context, using the last measurement information recorded during the call. Measurement Report message is only considered if time elapsed since the Measurement Report message and the Call End is lower than a threshold The decision algorithms for each message are shown in the following figures:

FIG. 65A and FIG. 65B show the basic Call End procedure.

S1AP UE Context Release Request is an optional message for the basic Call End procedure.

Value of Result field for basic Call End procedure depends on the cause reported to perform the release in the S1AP UE Context Release Command o S1AP UE Context Release Request.

Figure 66:
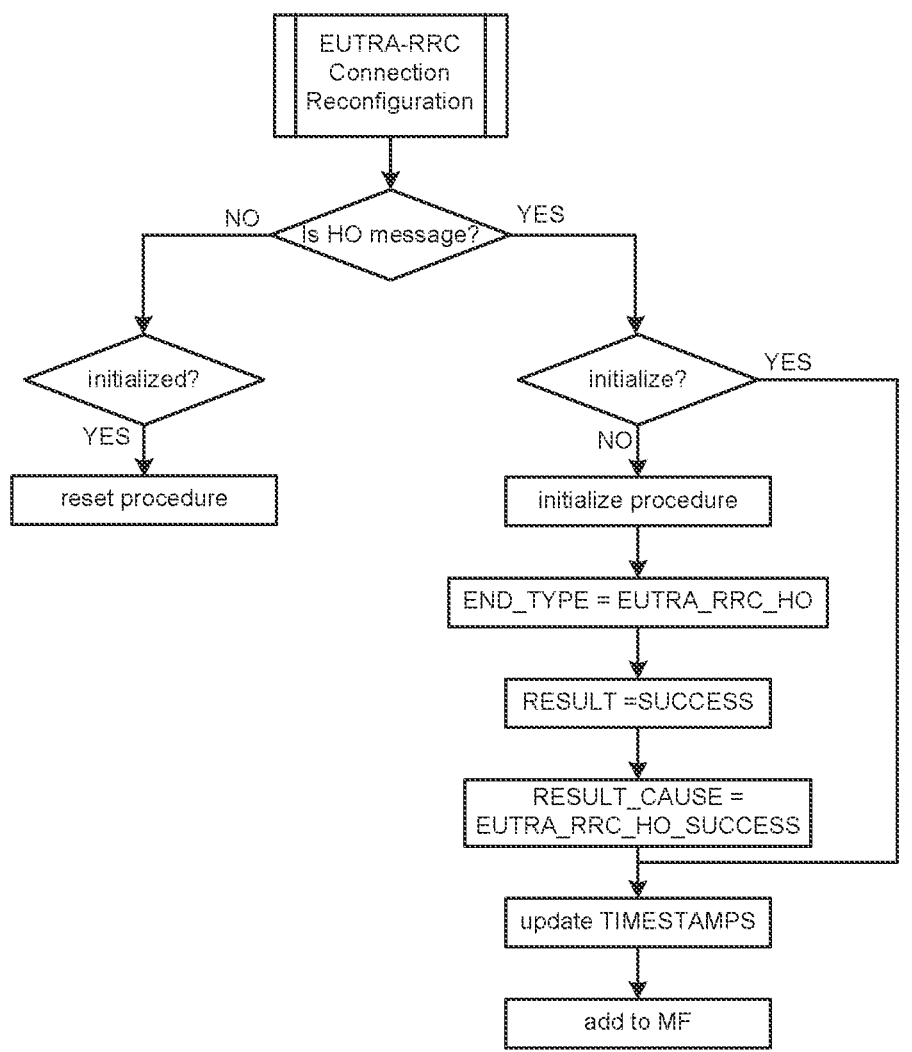
FIG. 66 is the flowchart of a 4G Call End corresponding to scenario 2, in this case RRC Outgoing handover.

FIG. 66 shows the Call End decision algorithm for Outgoing RRC Handover procedure. An EUTRA-RRC RRC Connection Reconfiguration is considered a HO message when it includes the mobilityControlInfo IE.

Outgoing RRC Handover is always considered as a Successful Call End procedure.

FIGS. 67A-67B show the Call End decision algorithm for Outgoing S1 Handover procedure. In case the procedure is successful (reception of S1AP Handover Command and/or EUTRA-RRC Mobility From EUTRA Command), after those message, procedure should wait to receive the S1AP Context Release message described in FIG. 65B to close the procedure.

Figure 68B:
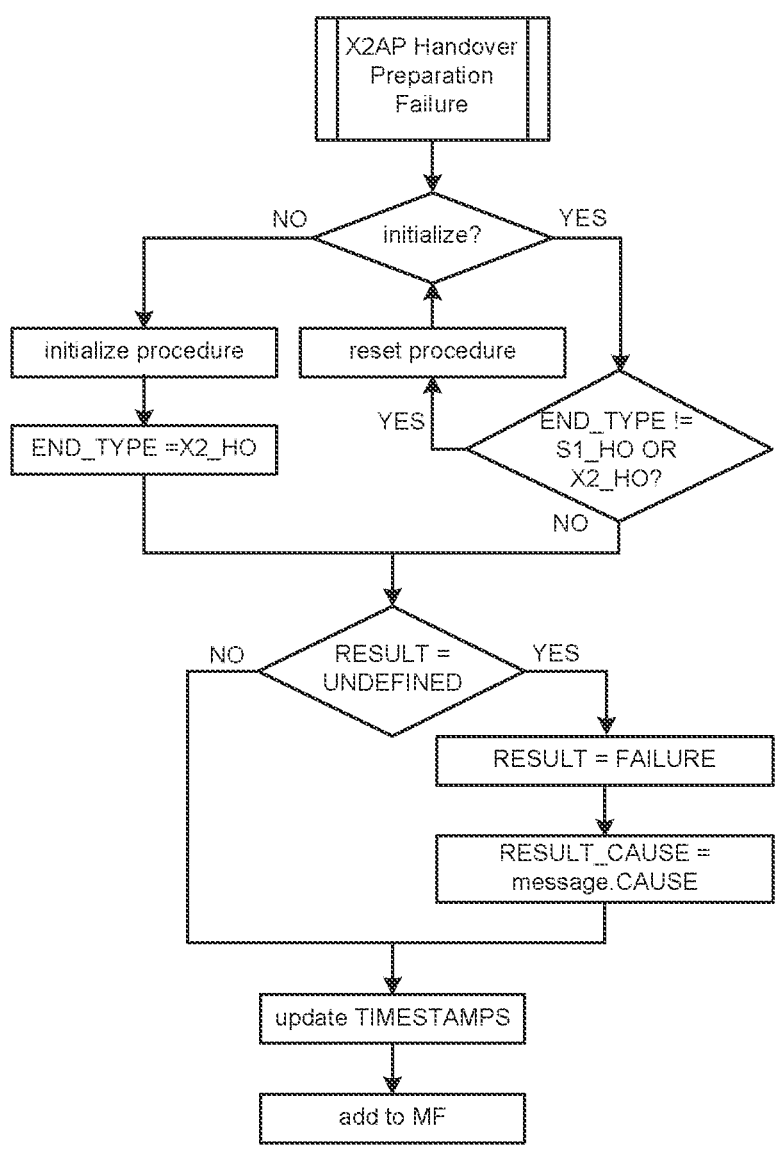

FIGS. 68A-68C show the Call End decision algorithm for Outgoing X2 Handover procedure.

Figure 69B:
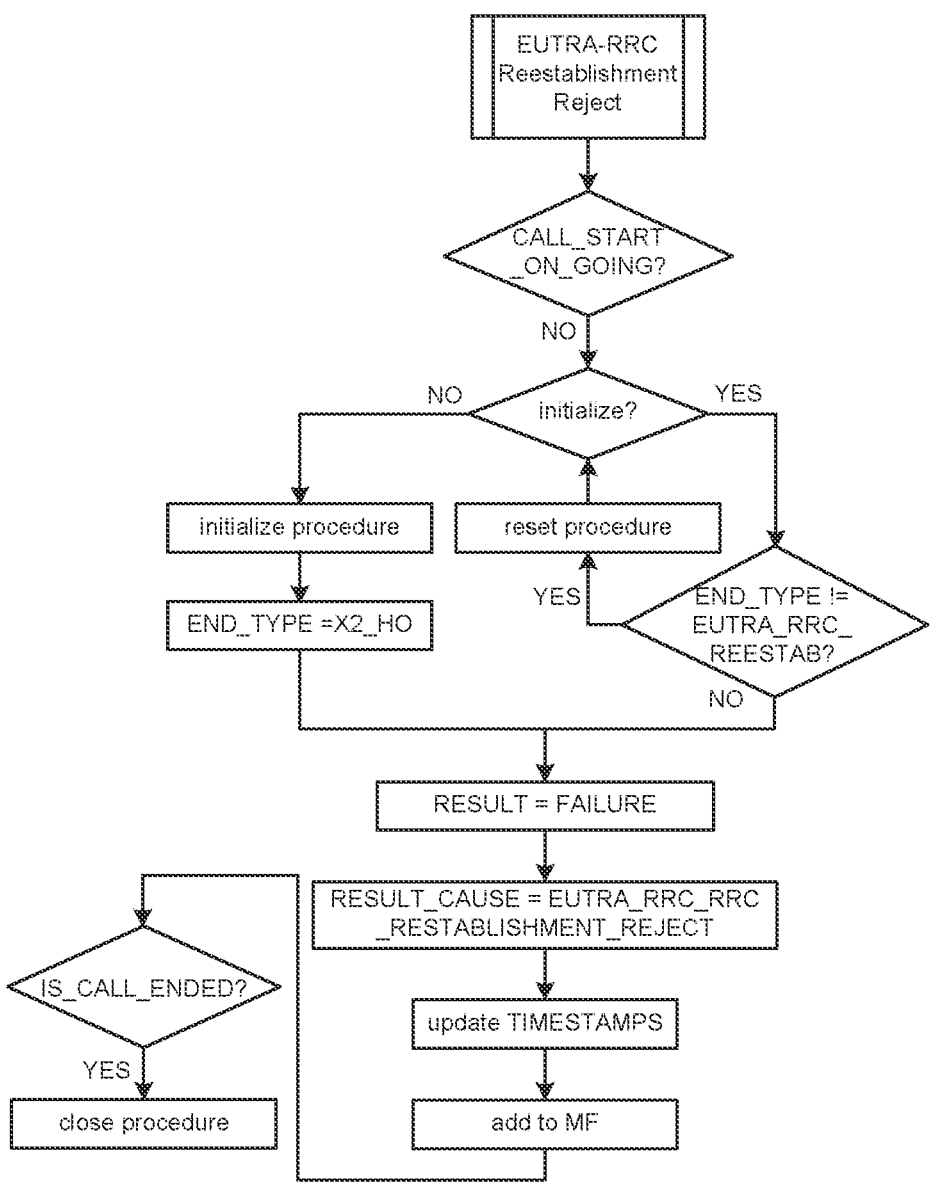

FIGS. 69A-69B show the Call End decision algorithm for Re-establishment. Call End due to re-establishment is always classified as Failure.

Figure 70:
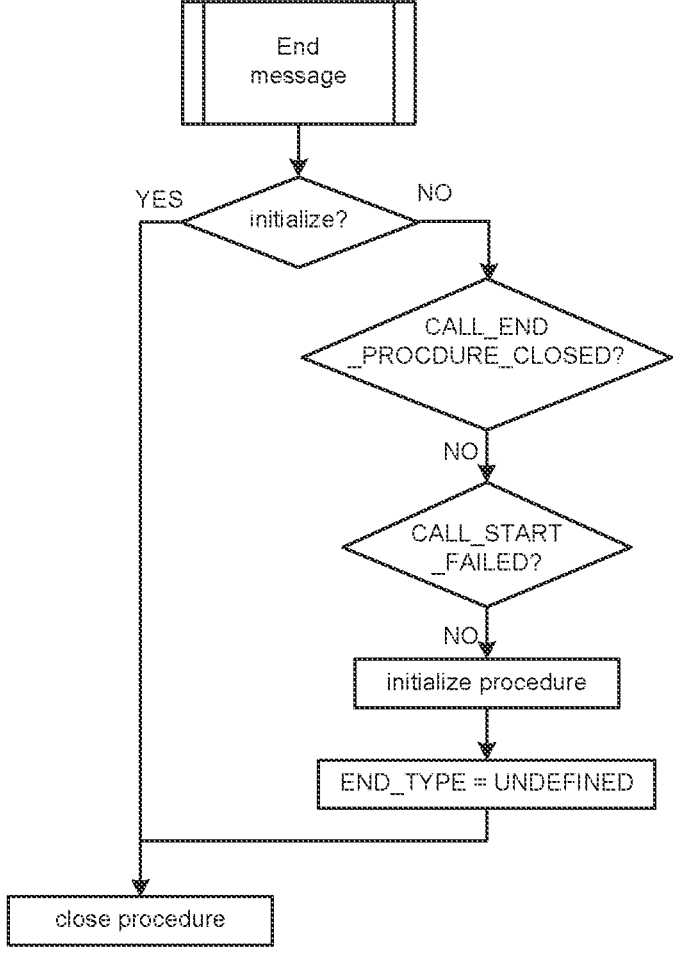
FIG. 70 is the flowchart of a 4G Call End corresponding to unfinished calls.

FIG. 70 shows the Call End decision algorithm for unfinished calls, i.e. those cases in which the End message arrives without having closed the Call End procedure.

Figure 71:
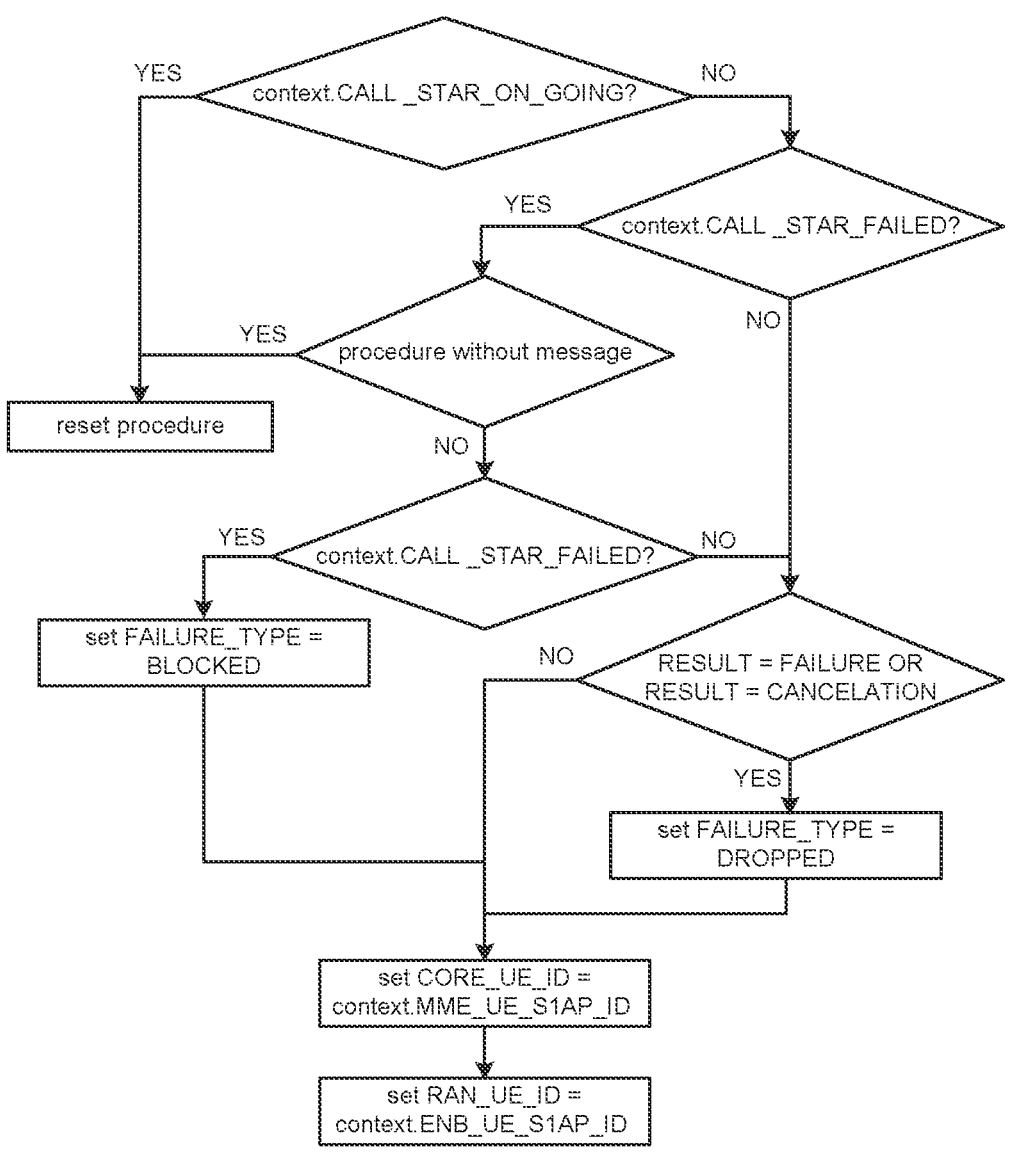
FIG. 71 is the flowchart to close the 4G Call End procedure.

FIG. 71 shows the logic to set FAILURE_TYPE field. Note there are cases in which the Call Start procedure fails and it includes messages that trigger the Call End procedure. FAILURE_TYPE help user to distinguish those cases.

5G SA Call Start

This procedure will report the most important characteristics of a connection starts. As call fragment may start due to one of the following signaling procedures 1. RRC Setup
2. RRC Connection Re-establishment
3. Incoming Handover Scenario 3 includes Xn, NGAP and RRC handovers.

Message used in the 5G SA Call Start Procedure algorithm are the following: NR-RRC RRC Setup Request, NR-RRC RRC Setup, NR-RRC RRC Setup Complete, NR-RRC RRC Reject, NR-RRC Security Mode Command, NR-RRC Security Mode Complete, NR-RRC Security Mode Failure, NGAP Initial UE Message, NGAP Initial Context Setup Request, NGAP Initial Context Setup Response, NGAP Initial Context Setup Failure, NGAP Handover Request, NGAP Handover Request Acknowledge, NGAP Handover Failure, NGAP Handover Notify, XNAP Handover Request (received), XNAP Handover Request Acknowledge (sent), XNAP Handover Preparation Failure (sent), XNAP Handover Cancel (received), XNAP SN Status Transfer (received), XNAP UE Context Release (sent), NGAP Path Switch Request, NGAP Path Switch Request Acknowledge, NGAP Path Switch Request Failure, NR-RRC RRC Reconfiguration Complete, NR-RRC RRC Reestablishment Request, NR-RRC RRC Reestablishment, NR-RRC RRC Reestablishment Complete The decision algorithms for each message are shown in the following figures FIGS. 72A-72B show the flowchart of a Call Start due to RRC Setup procedure. If this sub-set of messages ends as failure the call start ends as failed (block), otherwise additional messages are expected.

Figure 73:
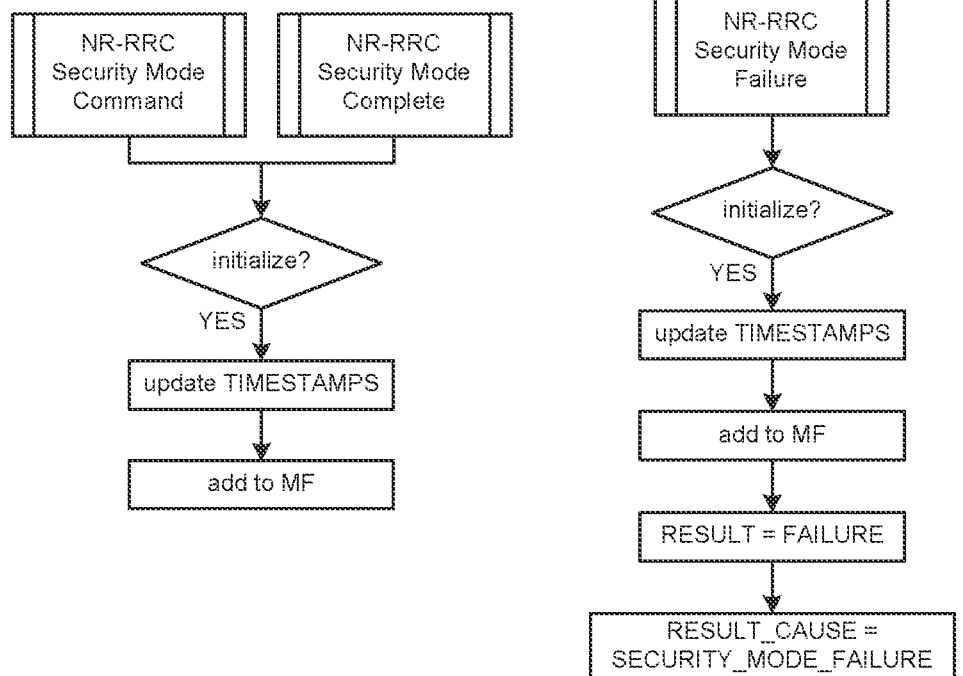
FIG. 73 is the flowchart of a 5G SA Call Start for the Security procedure that may appear after the RRC Setup (FIGS. 72A-72B).

FIG. 73 show the flowchart of the security procedure that may appear after the RRC Connection Setup (FIGS. 72A-72B).

Figure 74A:
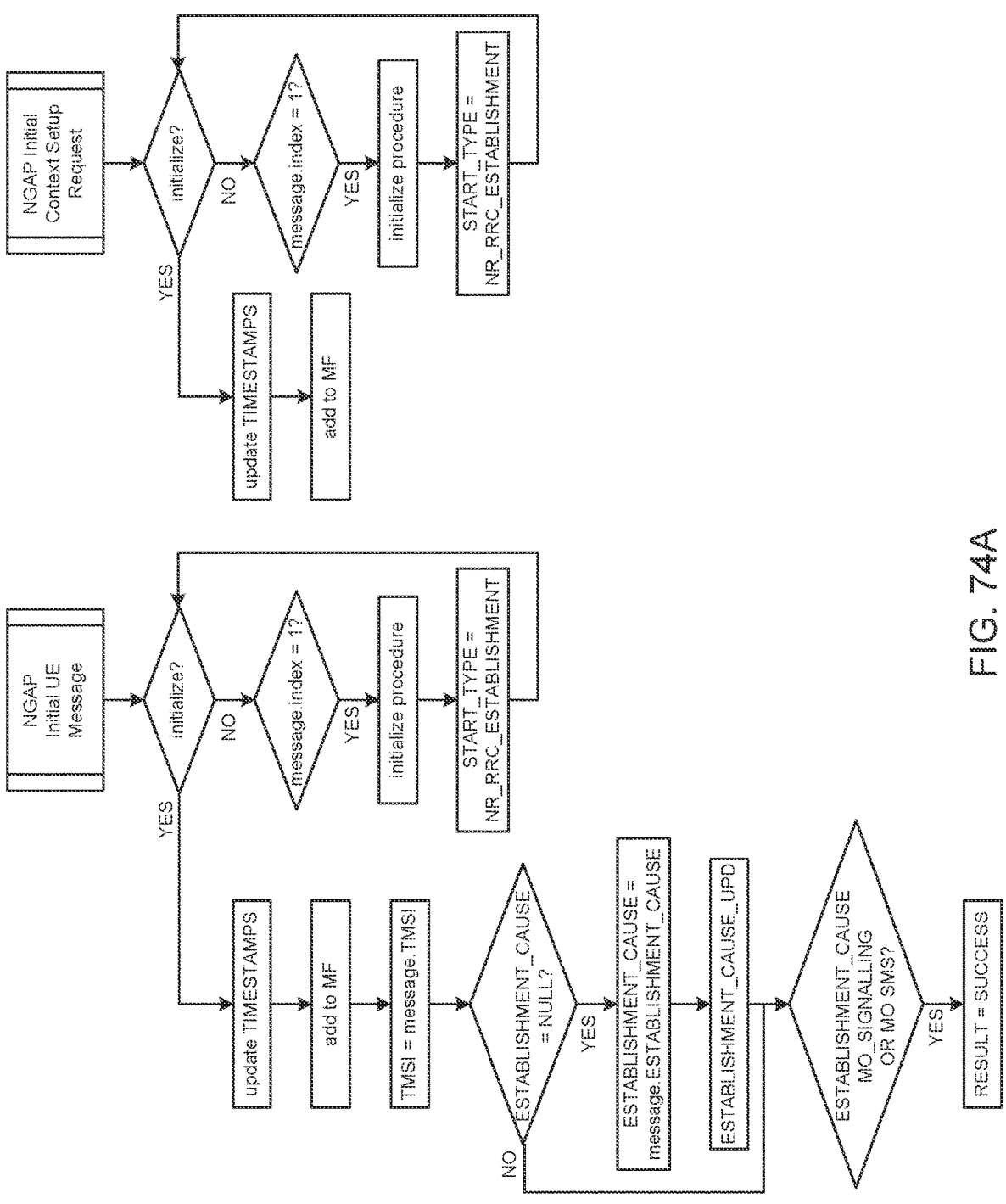

FIGS. 74A-74B show the flowchart of a Call Start with the messages that appear after the RRC Setup (FIGS. 72A-72B) if it is successful.

Figure 75B:
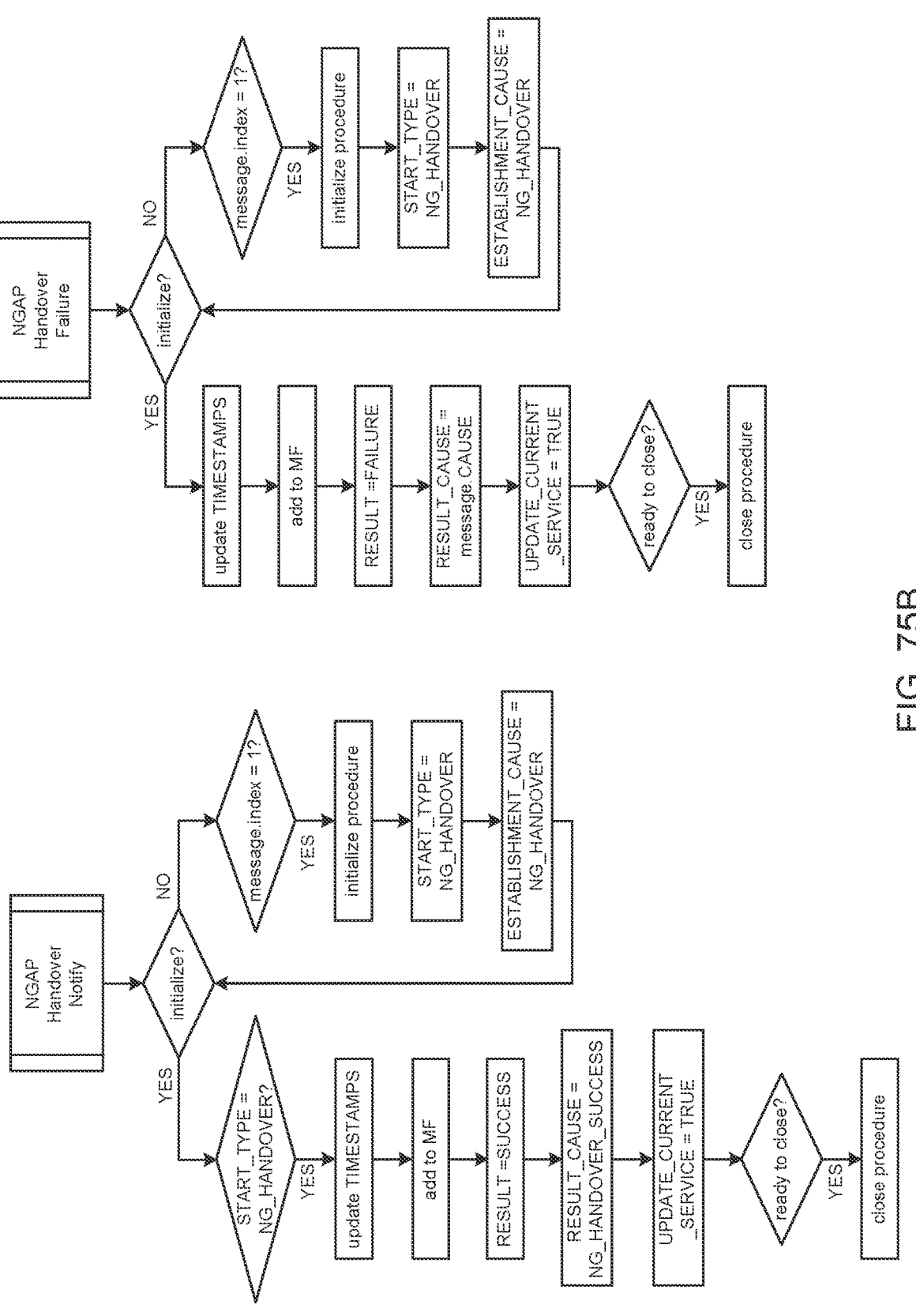

FIGS. 75A-75B show the flowchart of a Call Start due to NGAP Incoming Handover.

Figure 76A:
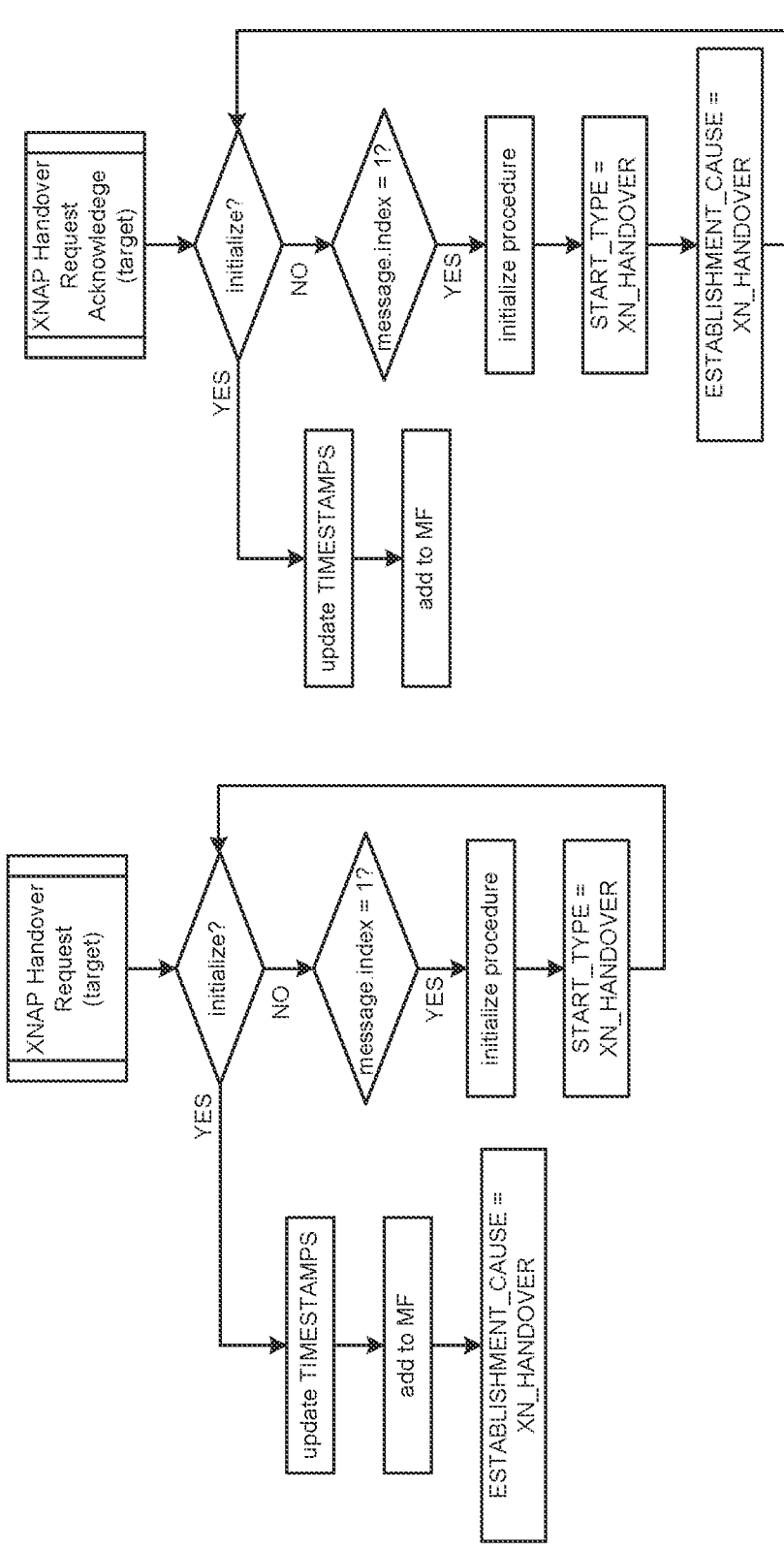
FIGS. 76A-76C are flowcharts of a 5G SA Call Start for the Incoming XnAP Handover case.
Figure 76B:
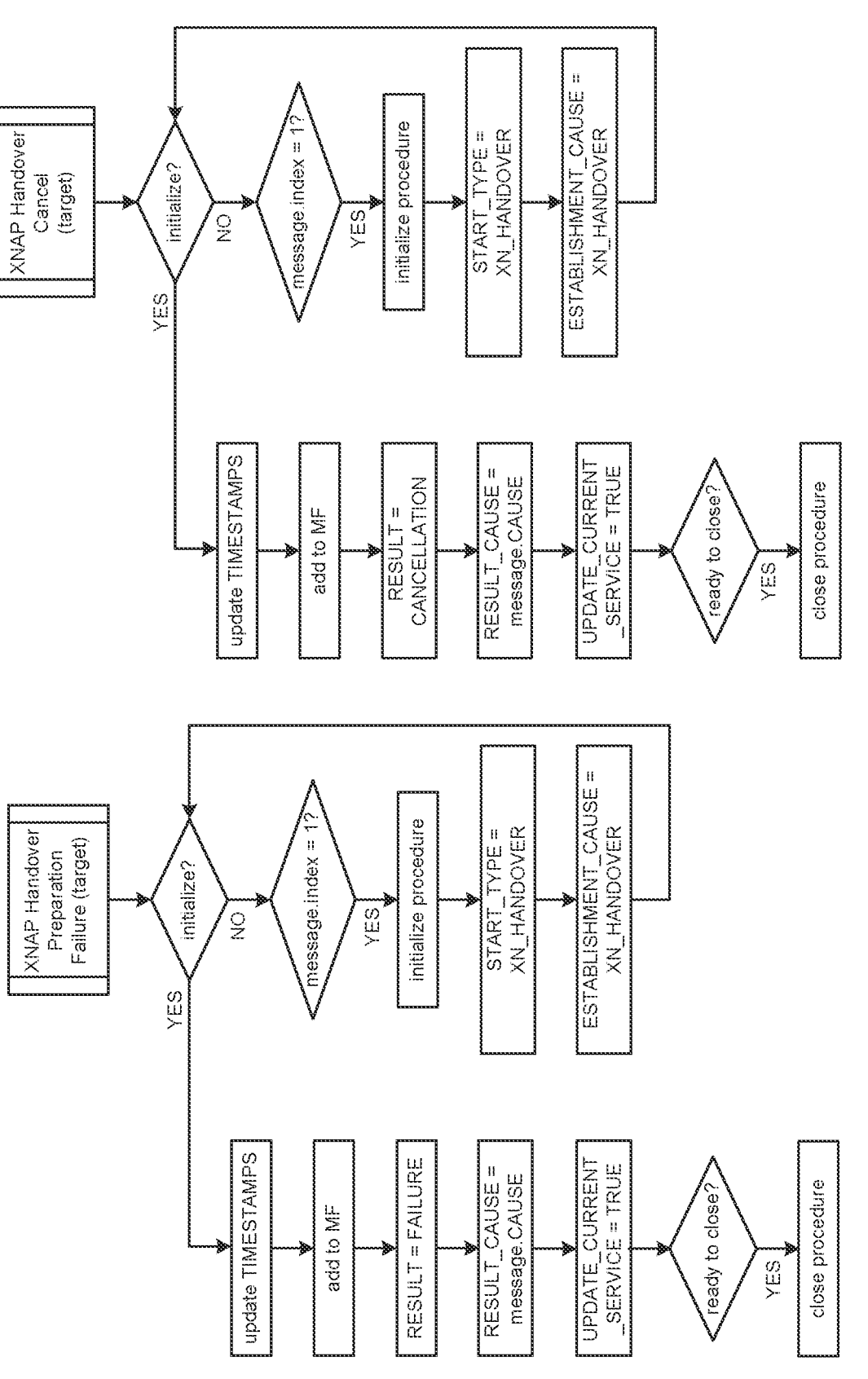
Figure 76C:
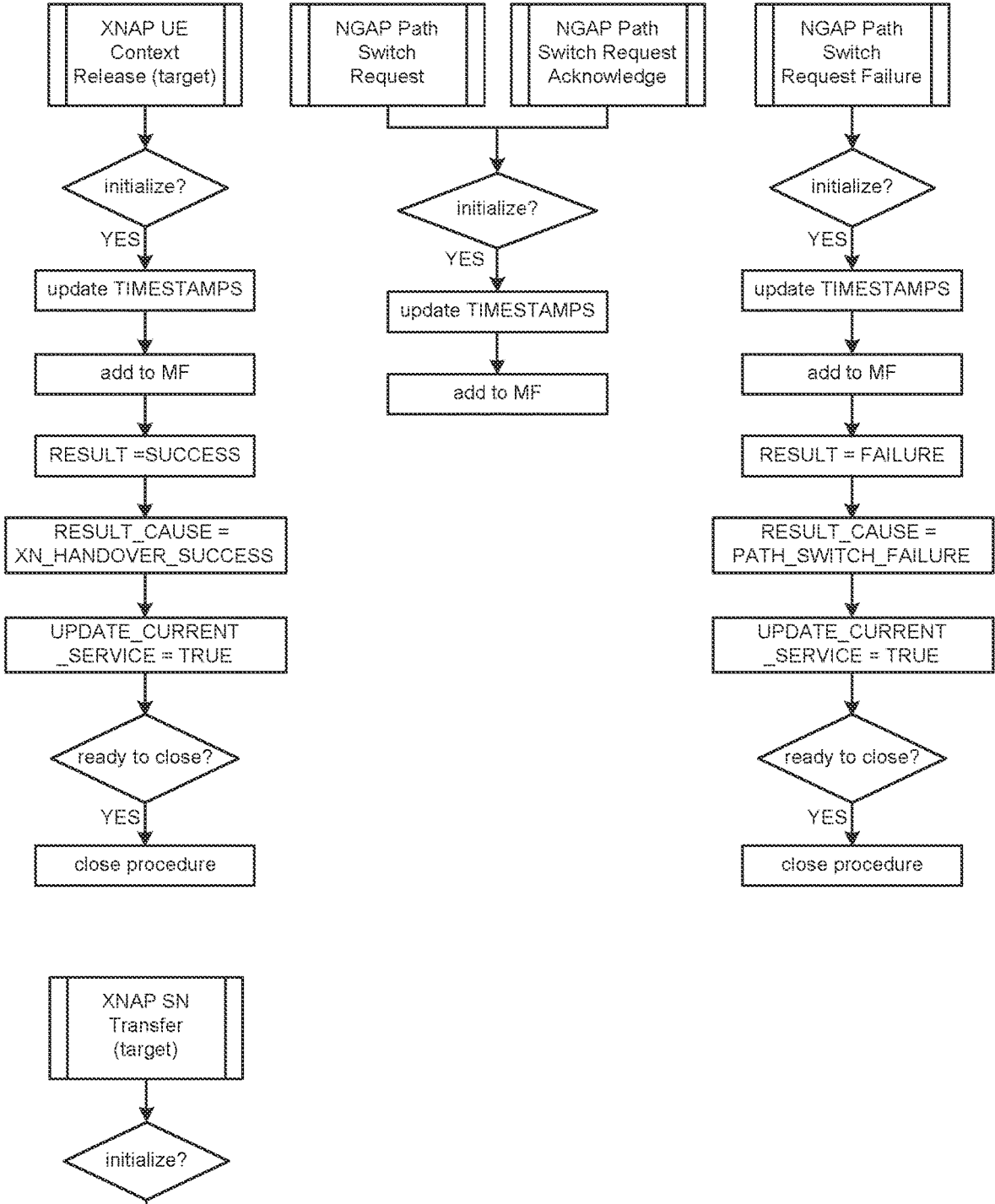

FIGS. 76A-76C show the flowchart of a Call Start due to Xn Incoming Handover.

Figure 77:
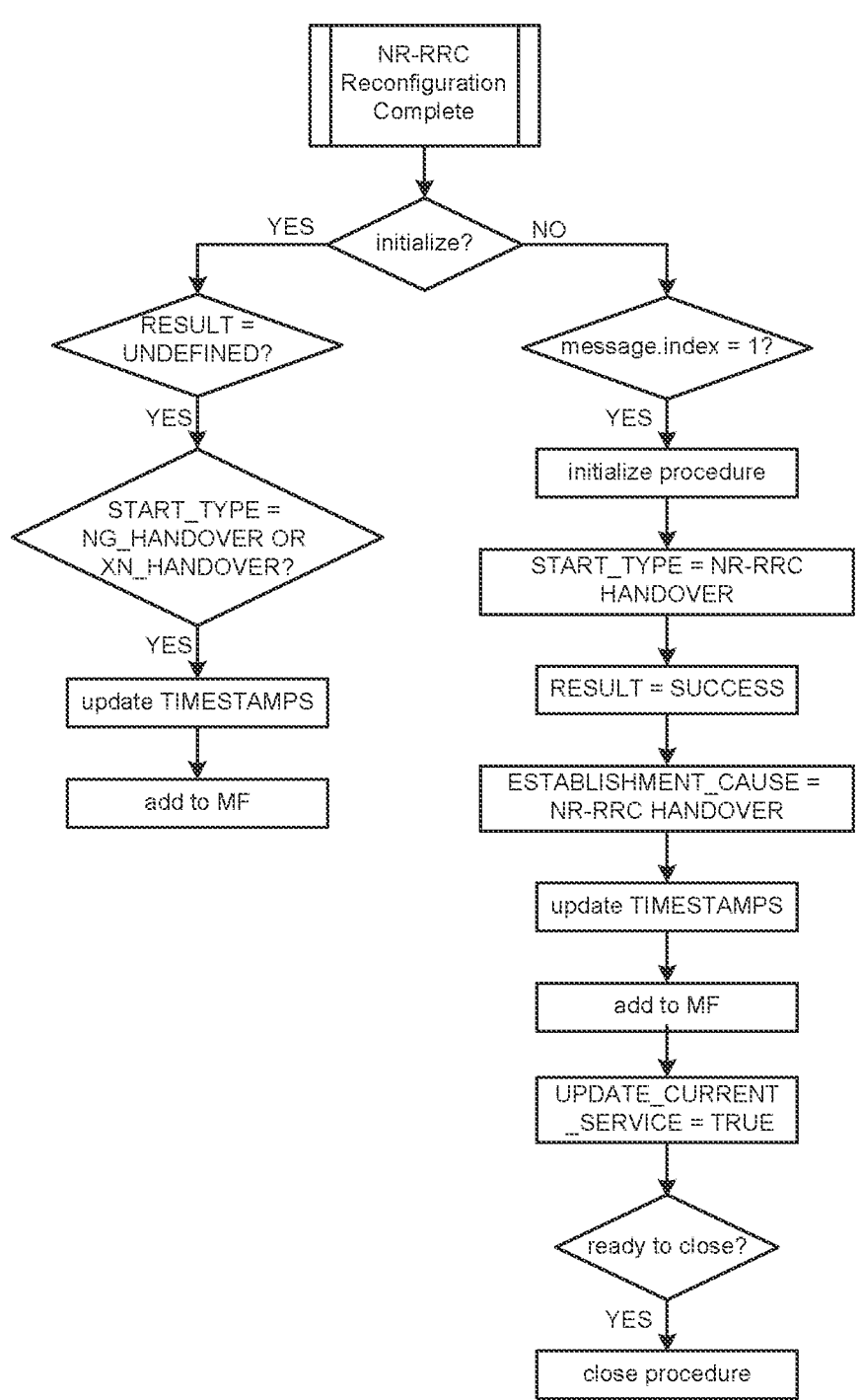
FIG. 77 is the flowchart of a 5G SA Call Start for the Incoming RRC handover case.

FIG. 77 shows the flowchart of a Call Start due to RRC Incoming Handover. As RRC Reconfiguration Complete, that is the only message in this flowchart, does not indicate if it is part of a handover, Call Start algorithm will consider that call fragments that start with RRC Connection Complete are generating a Call Start due to RRC Handover.

Figure 79A:
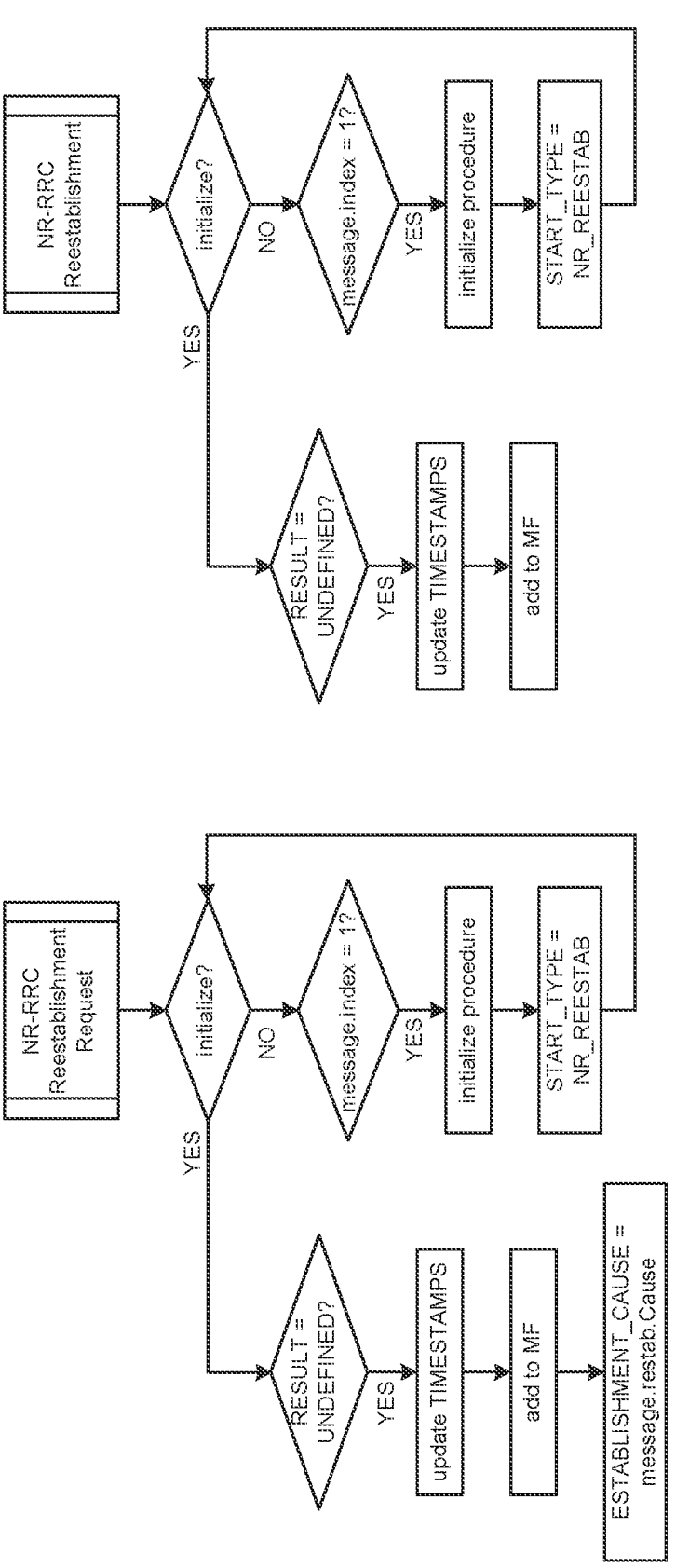
FIGS. 79A-79B are the flowchart of a 5G SA Call Start for the re-establishment case.
Figure 79B:
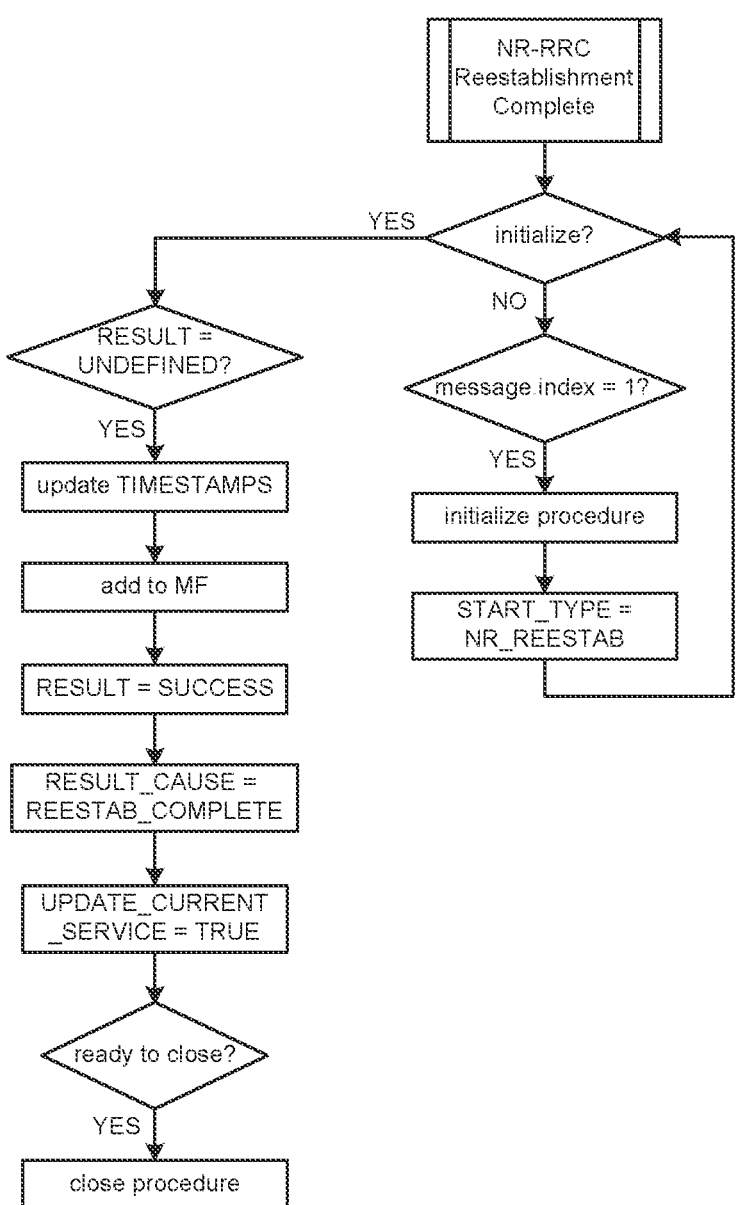
Figure 80A:
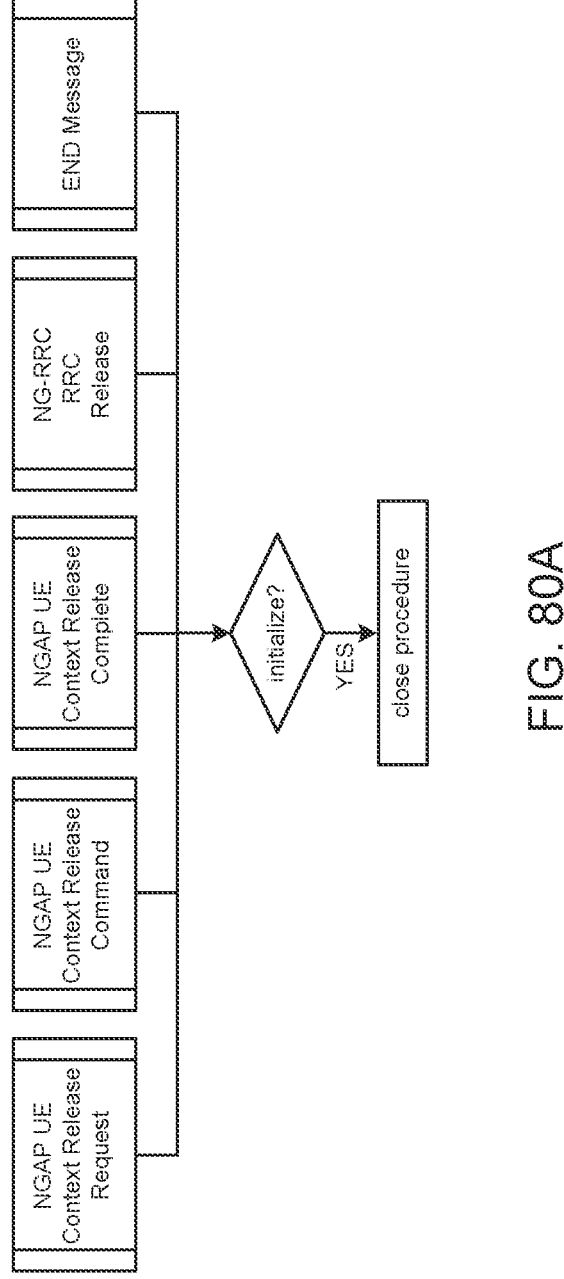
FIGS. 80A-80B are a flowchart of a 5G SA Call Start with the additional messages that can be used to close the procedure.
Figure 80B:
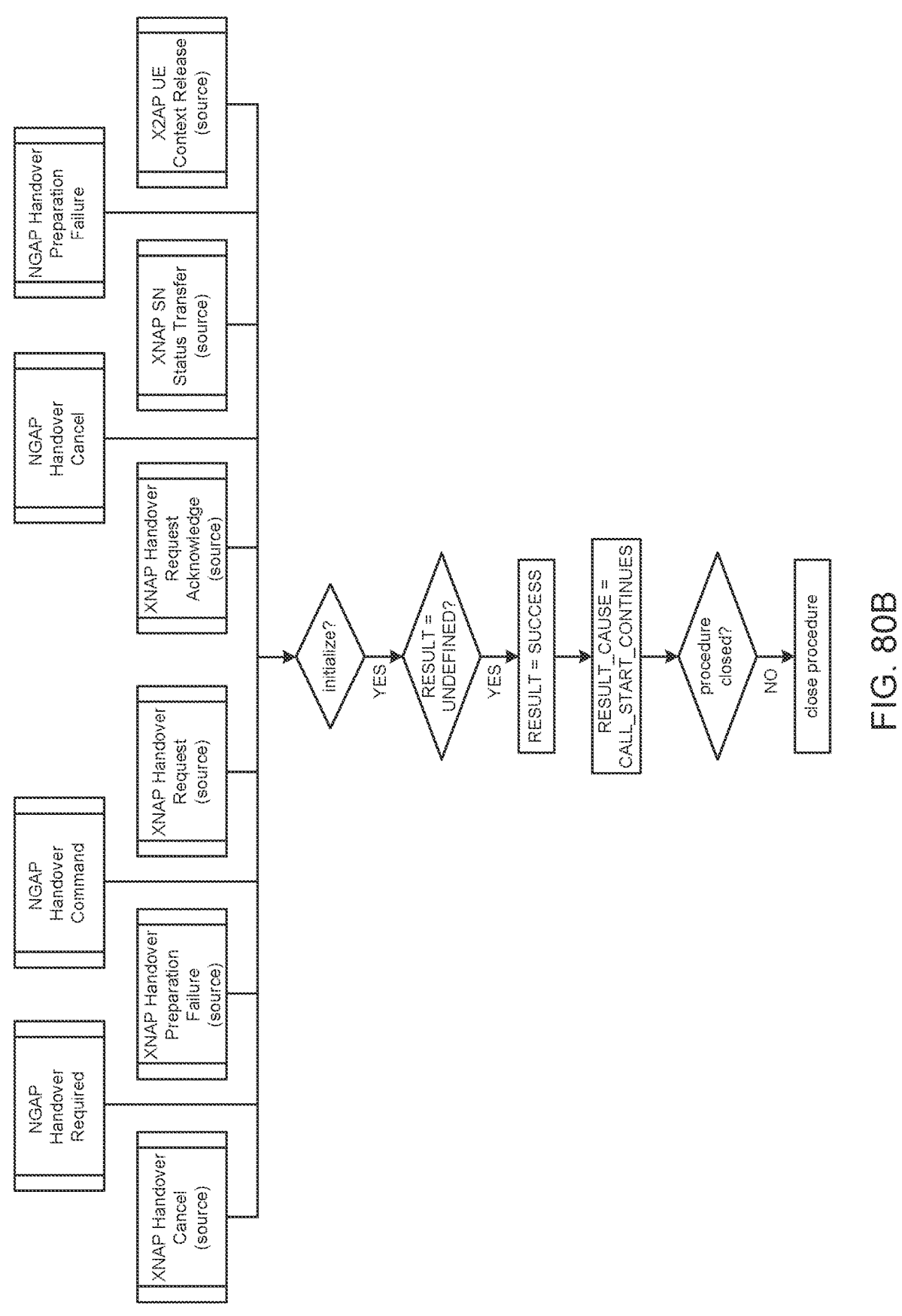
Figure 81:
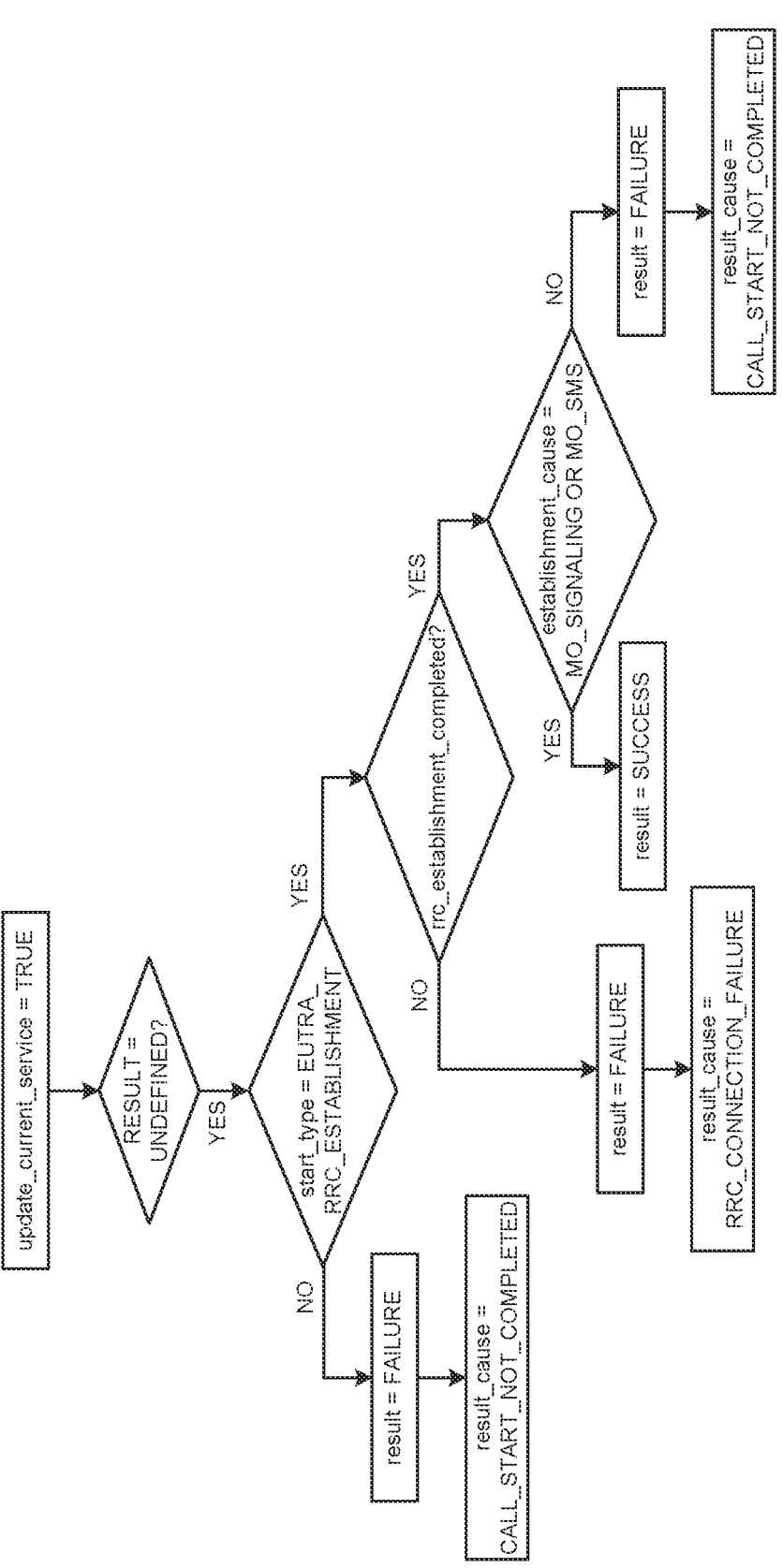
FIG. 81 is a flowchart of a 5G SA Call Start with the logic to close the Call Start procedure
Figure 82A:
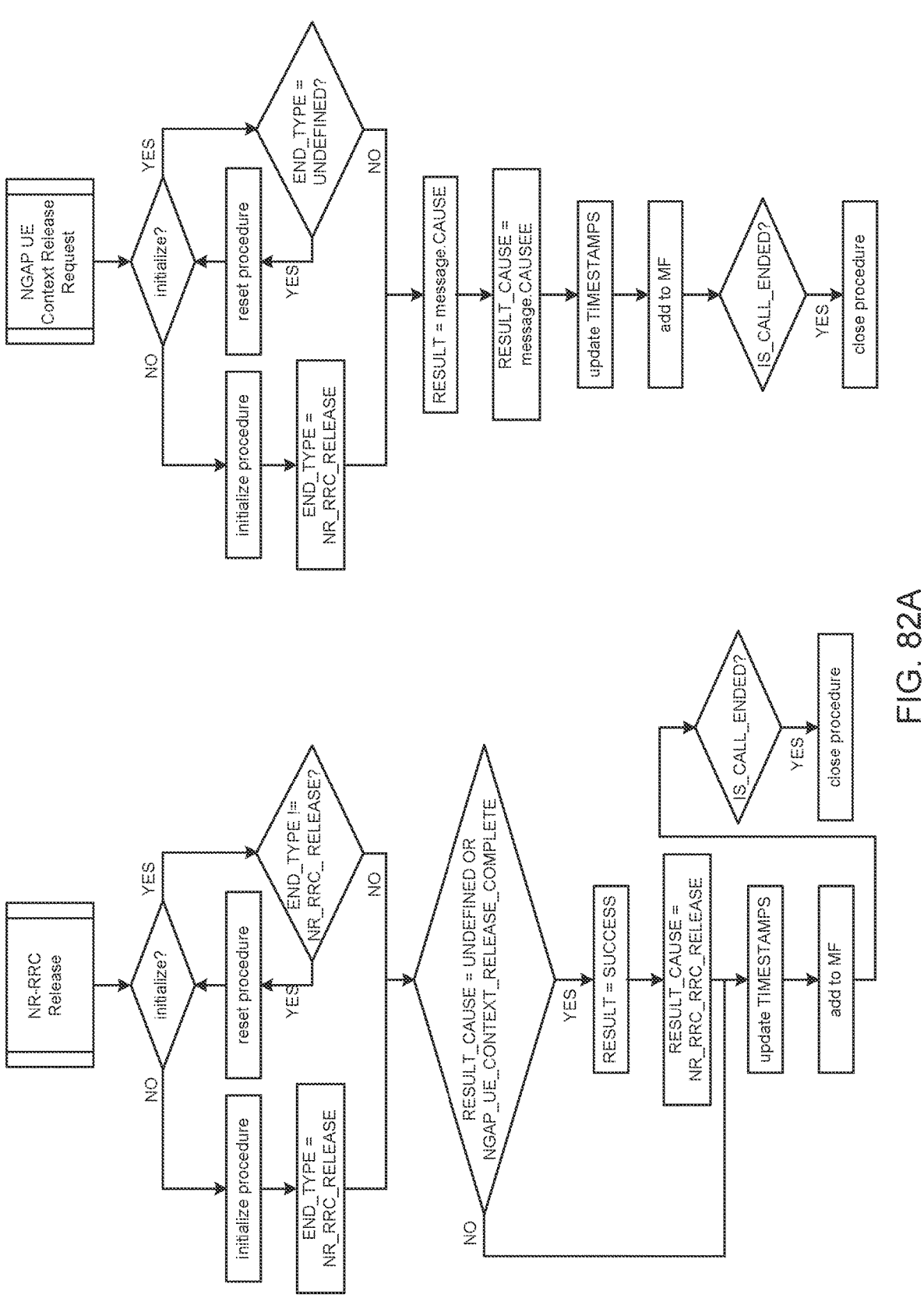
FIGS. 82A-82B are flowchart of a 5G SA Call End corresponding to the basic scenario (NGAP Context Release/RRC Release).
Figure 82B:
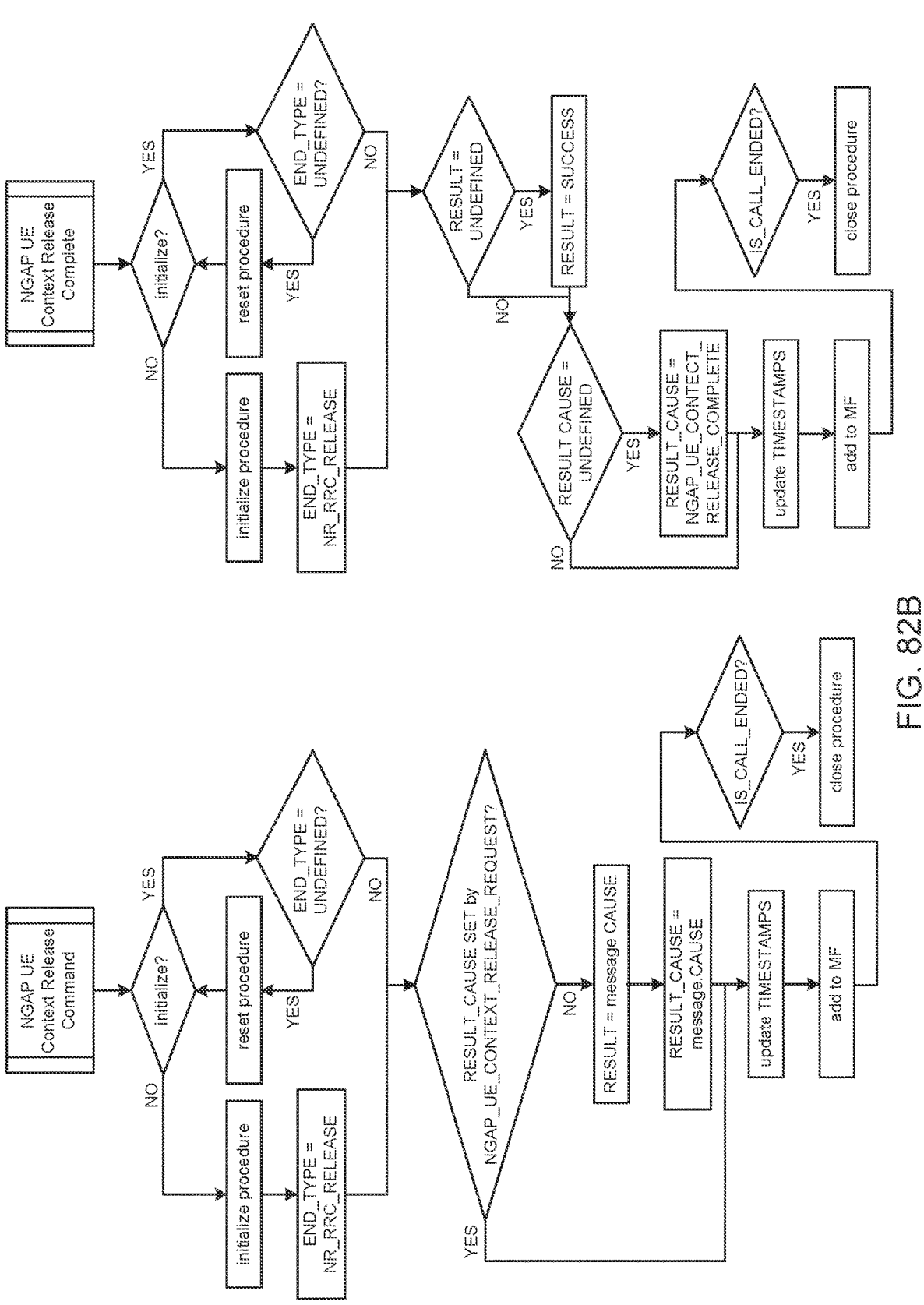

FIGS. 79A-79B show the flowchart of a Call Start due to re-establishment. Note that not all re-establishment signaling procedures generate a Call Start procedure, decision algorithm considers only those case in which the first message of the call fragment is part of the Re-establishment procedure. FIGS. 80A-80B are a flowchart of a 5G SA Call Start with the additional messages that can be used to close the procedure. FIG. 81 is a flowchart of a 5G SA Call Start with the logic to close the Call Start procedure. FIGS. 82A-82B are flowchart of a 5G SA Call End corresponding to the basic scenario (NGAP Context Release/RRC Release).

In case of missing messages in the Call Start processing, this procedure can end due to (FIGS. 79A-79B):

2 Call Continues after the Call Start procedure

2 Call ends

Figure 78:
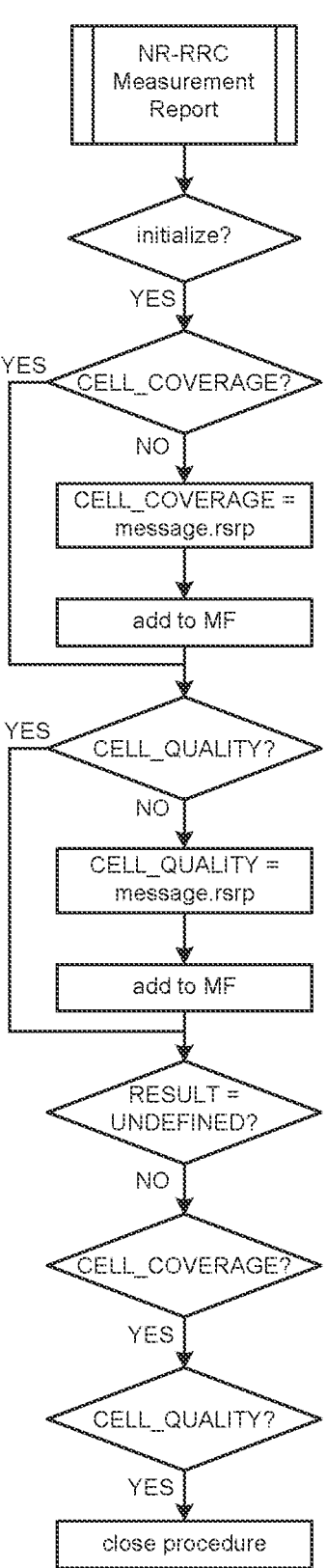
FIG. 78 is a flowchart of a 5G SA Call Start for obtaining measurement information associated to the call start procedure.

Call Start procedure should include measurements regarding to the serving cell. When call start signaling procedure ends, if measurement information has not arrived, the Call Start processing will wait for that information as shown in FIG. 78.

Measurement Report message is only considered if time elapsed since the start of the Call Start and the Measurement Report is lower than a threshold.

Call Start procedure will update the context with the values of the Service and Current Service based on the establishment cause that is set during the Call Start processing.

Table 6 shows the relation between establishment_cause and service

TABLE 6

| Relation between establishment_cause and service | |
|---|---|
| ESTABLISHMENT_CAUSE | SERVICE |
| MO Signaling | NR Signaling |
| MO SMS | |
| MO Data | NR Data |
| MO Voice Call | NR Voice |
| Emergency | |
| MO Video Call | NR Video |

Table 7 shows the relation between establishment_cause and current_service

TABLE 7

| Relation between establishment_cause and current_service | |
|---|---|
| ESTABLISHMENT_CAUSE | CURRENT_SERVICE |
| MO Signaling | NR Signaling |
| MO SMS | |
| High Priority Access | |
| MT Access | |
| MPS Priority Access | |
| MCS Priority Access | |
| MO Data | NR Data |
| MO Voice Call | NR Voice |
| Emergency | |
| MO Video Call | NR Video |

5G SA Call End

This procedure will report the most important characteristics of a connection end. A call fragment may end due to one of the following signaling procedures 1. RRC Release/NGAP UE Context Release 2. Outgoing Handover 3. RRC Re-establishment Scenario 2 includes Xn, Xn and RRC handovers.

Message used in the 5G SA Call End Procedure algorithm are the following: NR-RRC RRC Release, NGAP UE Context Release Request, NGAP UE Context Release Command, NGAP UE Context Release Complete, XNAP Handover Request, XNAP Handover Request Acknowledge, XNAP Handover Cancel, XNAP Handover Preparation Failure, XNAP SN Status Transfer, XNAP UE Context Release, NGAP Handover Required, NGAP Handover Command, NGAP Handover Cancel, NGAP Handover Preparation Failure, NR-RRC Mobility From NR Command, NR-RRC RRC Reconfiguration, NR-RRC Reestablishment Request, NR-RRC Reestablishment, NR-RRC Reestablishment Complete A Call is considered ended (IS_CALL_ENDED=TRUE) when the procedure includes one of the following combinations 2 NGAP UE Context Release Command+NGAP UE Context Release Complete NR-RRC RRC Release 2 NG1AP Handover Required+NGAP UE Context Release Command+NGAP UE Context Release Complete 2 End Message Call End procedure includes measurement information. This information is taken from the context, using the last measurement information recorded during the call. Measurement Report message is only considered if time elapsed since the Measurement Report message and the Call End is lower than a threshold The decision algorithms for each message are shown in the following figures:

FIG. 82 shows the basic Call End procedure.

NGAP UE Context Release Request is an optional message for the basic Call End procedure.

Value of Result field for basic Call End procedure depends on the cause reported to perform the release in the NGAP UE Context Release Command o NGAP UE Context Release Request.

Figure 83:
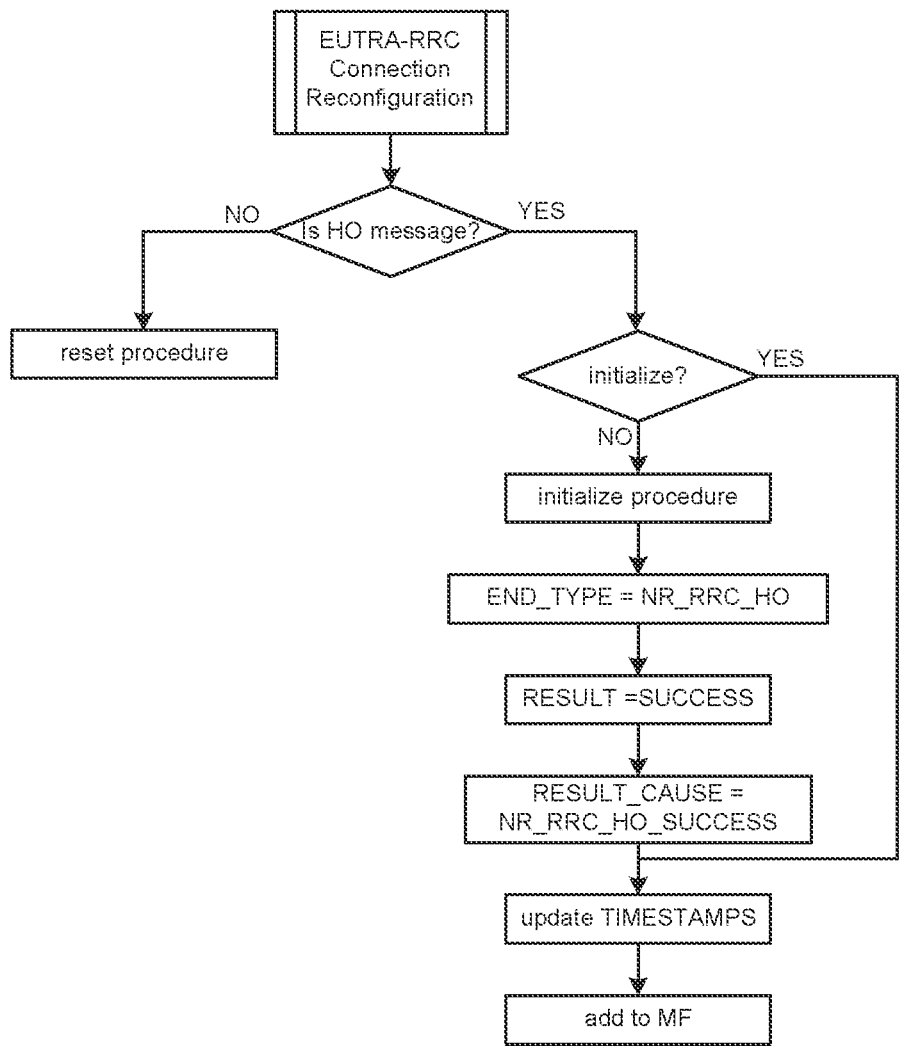
FIG. 83 is the flowchart of a 5G SA Call End corresponding to the RRC Outgoing handover case.

FIG. 83 shows the Call End decision algorithm for Outgoing RRC Handover procedure. An NR-RRC RRC Connection Reconfiguration is considered a HO message when it includes the SSB_ADD_MOD_LIST without FULL_CONFIG.

Outgoing RRC Handover is always considered as a Successful Call End procedure.

Figure 84:
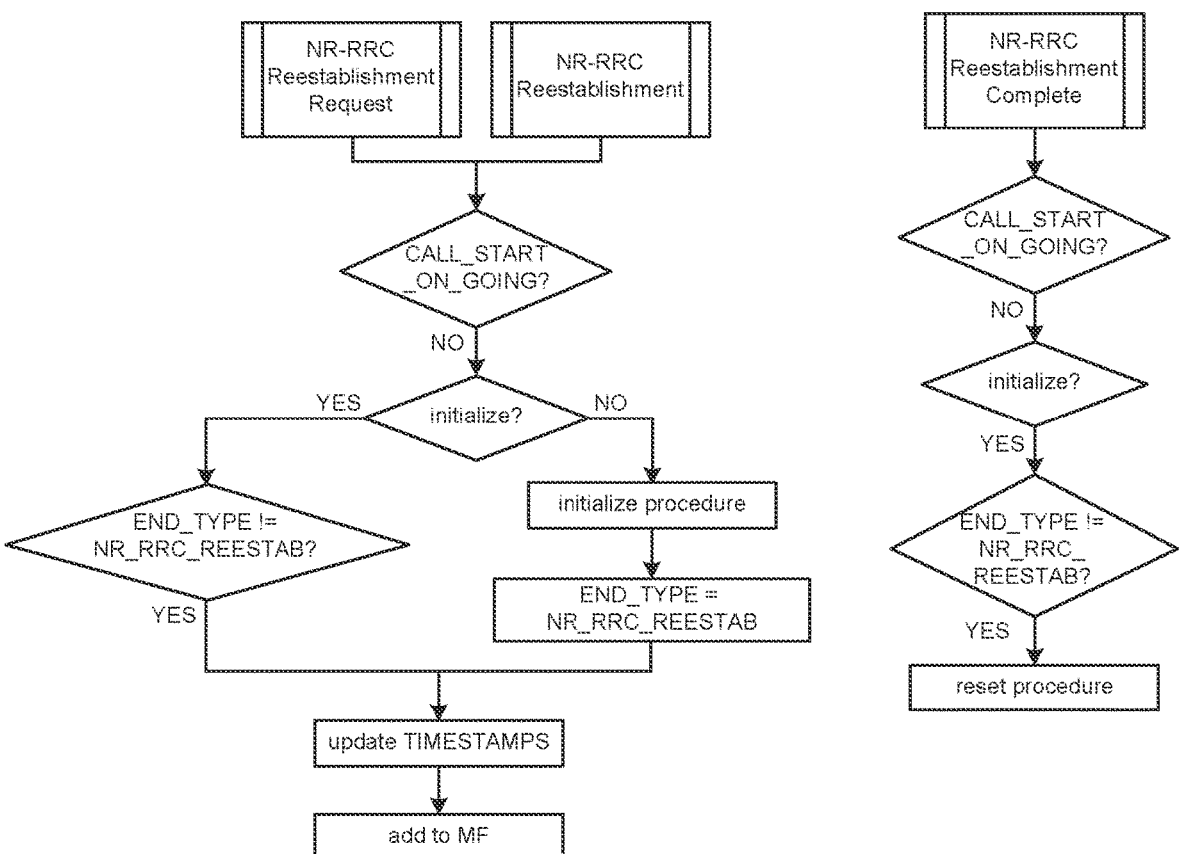
FIG. 84 is the flowchart of a 5G SA Call End corresponding to the re-establishment case.

FIG. 84 shows the Call End decision algorithm for Re-establishment.

Figure 85B:
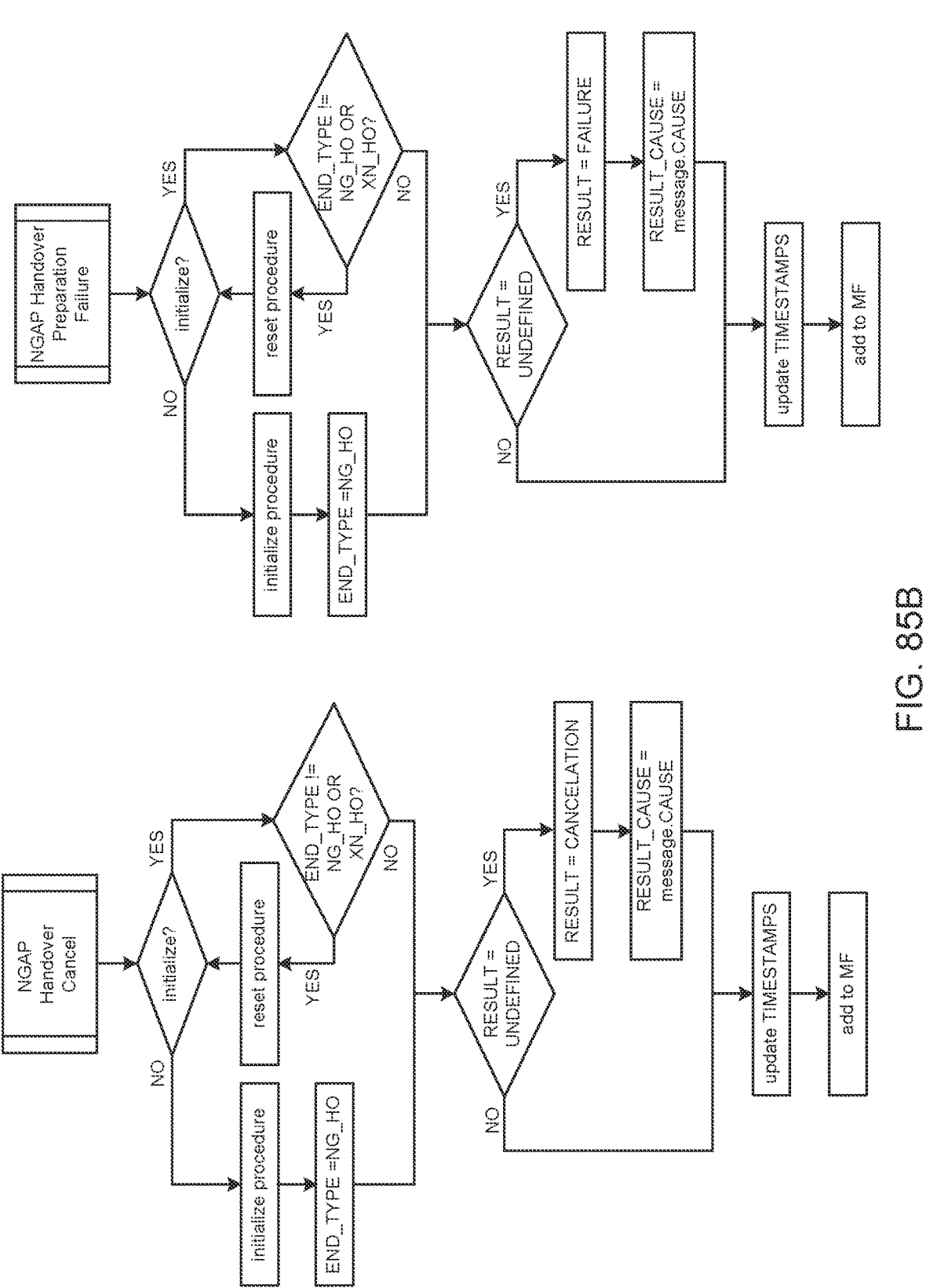

FIGS. 85A-85B show the Call End decision algorithm for Outgoing NGAP Handover procedure. In case the procedure is successful (reception of NGAP Handover Command and/or NR-RRC Mobility From NR Command), after those message, procedure should wait to receive the NGAP Context Release message described in FIG. 82 to close the procedure.

Figure 86C:
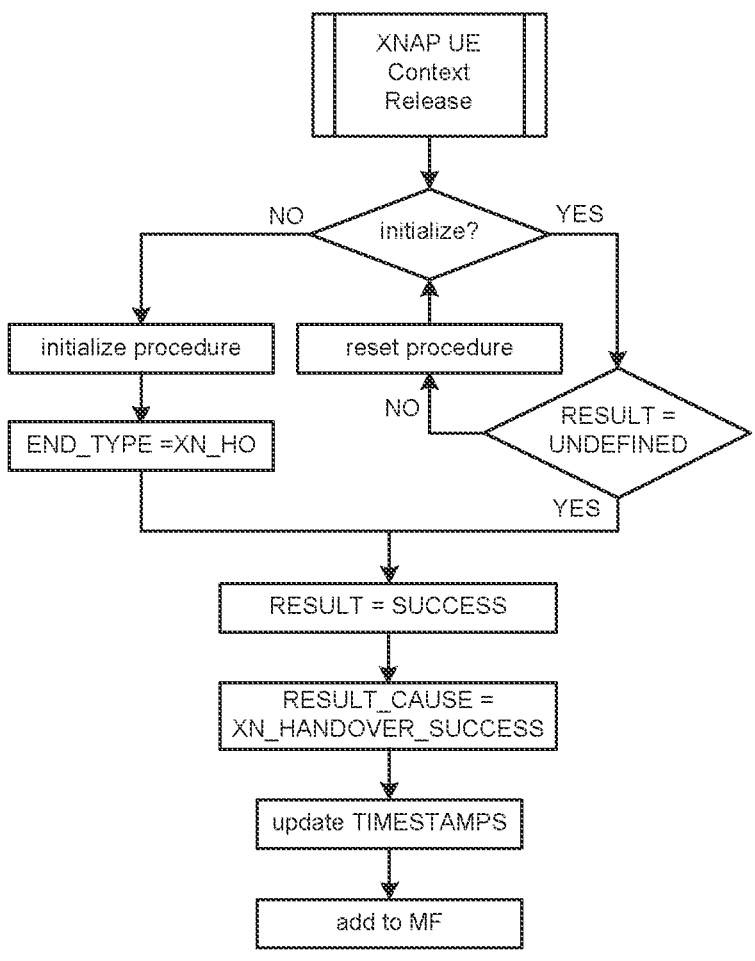

FIGS. 86A-86C show the Call End decision algorithm for Outgoing Xn Handover procedure.

Figures 87, 88:
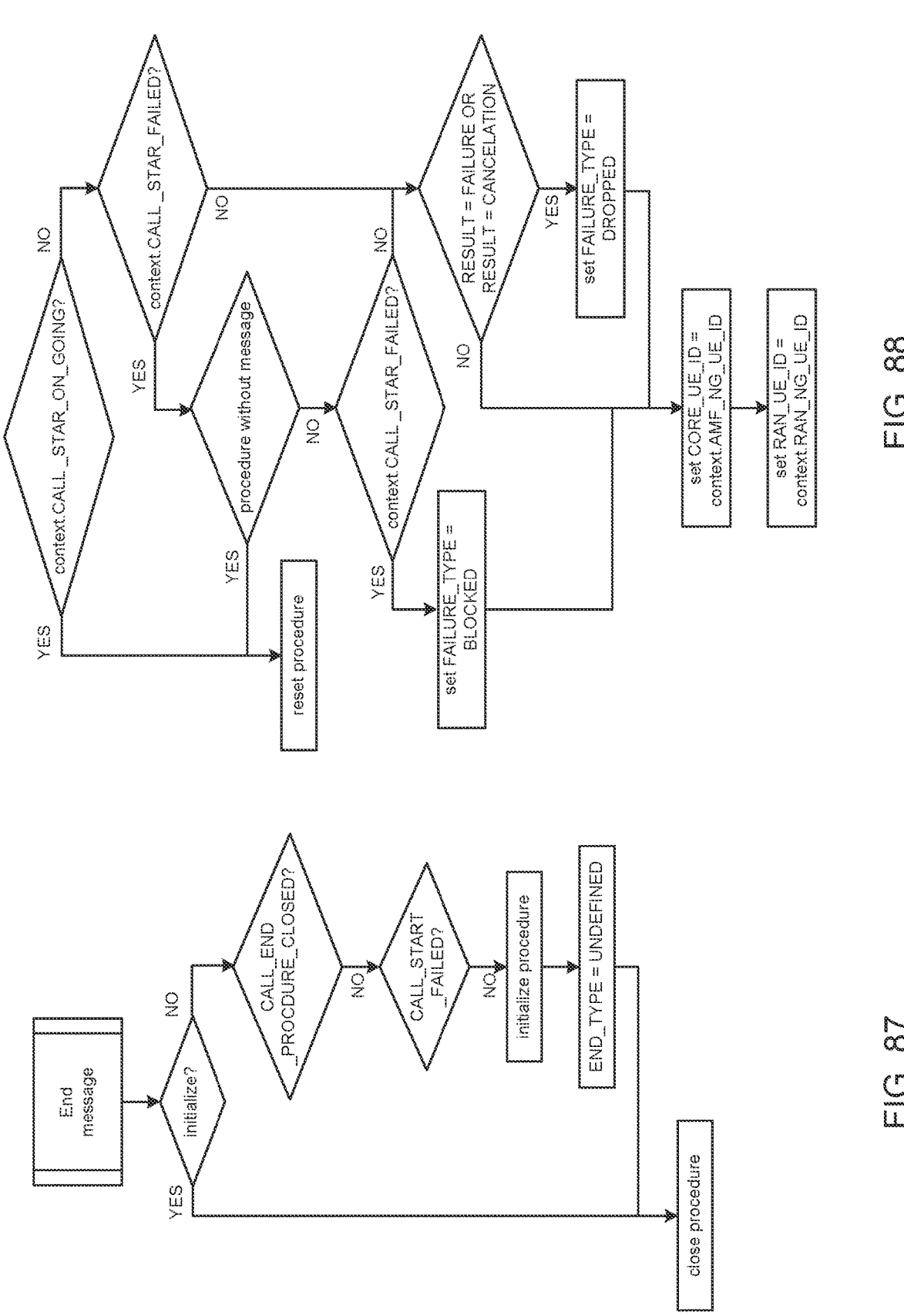
FIG. 87 is the flowchart of a 5G SA Call End for the unfinished call case.
FIG. 88 is the flowchart of a 5G SA Call End corresponding to the logic used to the close the procedure.

FIG. 87 shows the Call End decision algorithm for unfinished calls, i.e., those cases in which the End message arrives without having closed the Call End procedure.

FIG. 88 shows the logic to set FAILURE_TYPE field. Note there are cases in which the Call Start procedure fails and it includes messages that trigger the Call End procedure. FAILURE_TYPE help user to distinguish those cases.

Miscellaneous

This procedure will be sent to the output every x messages. Its main purpose is to store the messages not belonging to any defined procedure.

Output

The Parser generates its output according to these two principles:

the output will only consider the information processed by one cell (cell fragment)

the output will generate partial results of the call in the form of procedures, that is, logical subsets of the call such as 'Call Start', 'Handover', 'Call End'.

In the end all procedures can be correlated using a common identifier or [IMSI+timestamp], and once combined they will provide a global view of the whole user call. This way the Parser provides a more granular and detailed information about the call as well as having outputs closer to real time. Previous section described the processing of each procedure. Now we will describe the kind of information created as output for each one.

There will be two types of procedures:

asynchronous: generated when the related 'event' happens in the call synchronous: generated periodically. They will contain information observed during a certain period, such as power or quality measurements related to the serving cell, UL/DL volume transmitted, distance to the serving cell, etcetera.

The call will be divided in the following procedures depending on the technology.

4G Serving Cell Measurements

TABLE 5

| 4G Serving Cell Measurements procedure output | | |
|---|---|---|
| Field | Description | Type |
| Cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success | int32 |
| result_cause | In case the procedure fails, this field will be used to report the failure cause | int32 |
| message_flow | Messages involved in the procedure | string |
| active_qci | Bit mask indicating the QCI of the active eRABs during the measurement interval | bytes |

TABLE 5-continued

| 4G Serving Cell Measurements procedure output | | |
| --- | --- | --- |
| Field | Description | Type |
| avg_rsrp | average RSRP of the serving cell for al measurement reports included in the interval of interest. | float |
| max_rsrp | maximum RSRQ reported for the serving cell in all measurement reports included in the interval of interest | float |
| samples_rsrp | number of MRs with reported RSRP | int32 |
| avg_rsrq | Average RSRQ of the serving cell for al measurement reports included in the interval of interest | float |
| max_rsrq | Maximum RSRQ reported for the serving cell in all measurement reports included in the interval of interest | float |
| samples_rsrq | Number of MRs with reported RSRQ | int32 |
| first_ta | First TA reported during the time interval of interest | float |
| last_ta | Last TA reported during the time interval of interest | float |
| avg_ul_sinr | Average SINR of the serving cell for all messages with SINR included in the interval of interest | float |
| max_ul_sinr | Maximum SINR reported for the serving cell in all messages with SINR included in the interval of interest | float |
| samples_ul_sinr | Number of messages with SINR included | int32 |
| total_dl_bytes | Accumulated number of bytes sent in the downlink direction during the time interval of interest | int64 |
| total_ul_bytes | Accumulated number of bytes received in the uplink direction during the time interval of interest | int64 |
| avg_dl_throughput | Average value for the throughput in DL | float |
| max_dl_throughput | Maximum average DL throughput shows the maximum value reported in different throughput messages | float |
| avg_ul_throughput | Average value for the throughput in UL (including all eRABs) | float |
| max_ul_throughput | Maximum average UL throughput shows the maximum value reported in different throughput messages | float |
| avg_cqi | Average value for the CQI | float |
| max_cqi | Maximum CQI reported | int32 |
| samples_cqi | Number of CQI samples reported | int32 |
| avg_rank | Average value for the rank | float |
| max_rank | Maximum rank reported | int32 |
| samples_rank | Number of rank samples reported | int32 |
| transmission_mode | Transmission mode | int32 |
| avg_ccs | Avg CCs as the average number of carrier components used during the measurement interval | float |

5G Serving Cell Measurements

TABLE 6

| 5G Serving Cell Measurements procedure output | | |
| --- | --- | --- |
| Field | Description | Type |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| suci | Subscription Concealed Identifier, which is a privacy preserving identifier containing the concealed SUPI (Subscription Permanent Identifier) | string |

TABLE 6-continued

| Field | Description | Type |
|---|---|---|
| | 5G Serving Cell Measurements procedure output | |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Measure ends | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| active_5ci | Bit mask indicating the 5CI active at the measurement interval end time | binary |
| nr_serv_cell_meas_type | The measurement type: SSB-Cell, CSI-RS-Cell. Measurements may come in four different versions, ordered as follows from highest to lowest priority from our point of view: SSB per cell, SSB per index (beam), CSI per cell, CSI per index (beam) | int32 |
| avg_rsrp | average RSRP of the serving cell for al measurement reports included in the interval of interest. | float |
| max_rsrp | maximum RSRQ reported for the serving cell in all measurement reports included in the interval of interest | float |
| samples_rsrp | number of MRs with reported RSRP | int32 |
| avg_rsrq | Average RSRQ of the serving cell for al measurement reports included in the interval of interest | float |
| max_rsrq | Maximum RSRQ reported for the serving cell in all measurement reports included in the interval of interest | float |
| samples_rsrq | Number of MRs with reported RSRQ | int32 |
| first_ta | First TA reported during the time interval of interest | float |
| last_ta | Last TA reported during the time interval of interest | float |
| avg_ul_sinr | Average SINR of the serving cell for all messages with SINR included in the interval of interest | float |
| max_ul_sinr | Maximum SINR reported for the serving cell in all messages with SINR included in the interval of interest | float |
| samples_ul_sinr | Number of messages with SINR included | int32 |
| total_dl_bytes | Accumulated number of bytes sent in the downlink direction during the time interval of interest | int64 |
| total_ul_bytes | Accumulated number of bytes received in the uplink direction during the time interval of interest | int64 |
| avg_dl_throughput | Average value for the throughput in DL | float |
| max_dl_throughput | Maximum average DL throughput shows the maximum value reported in different throughput messages | float |
| avg_ul_throughput | Average value for the throughput in UL (including all eRABs) | float |
| max_ul_throughput | Maximum average UL throughput shows the maximum value reported in different throughput messages | float |
| avg_cqi | Average value for the CQI | float |
| max_cqi | Maximum CQI reported | int32 |
| samples_cqi | Number of CQI samples reported | int32 |

4G eRAB Establishment

TABLE 7

| Field | Description | Type |
|---|---|---|
| | 4G eRAB Establishment procedure output | |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |

TABLE 7-continued

| Field | Description | Type |
|---|---|---|
| 4G eRAB Establishment procedure output | | |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| active_qci | Bit mask indicating the QCI of the active eRABs at the end of the procedure | bytes |
| technology | The technology transmitting the eRAB under analysis. LTE will be the default value, but for EN-DC procedures those eRABs that are redirected to 5G-NR will show this value (5G-NR) as technology | int32 |
| erab_id | eRAB identifier | int32 |
| qci | QCI of the established eRAB | int32 |
| priority_level | Priority level of the established eRAB | int32 |

4G eRAB Release

TABLE 8

| Field | Description | Type |
|---|---|---|
| 4G eRAB Release procedure output | | |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| active_qci | Bit mask indicating the QCI of the active eRABs at the end of the procedure | bytes |

TABLE 8-continued

| | 4G eRAB Release procedure output | |
|---|---|---|
| Field | Description | Type |
| technology | The technology transmitting the eRAB under analysis. LTE will be the default value, but for EN-DC procedures those eRABs that are redirected to 5G-NR will show this value (5G-NR) as technology | int32 |
| erab_id | eRAB identifier | int32 |
| qci | QCI of the released eRAB | int32 |
| priority_level | Priority level of the released eRAB | int32 |
| release_cause | Include the cause reported in the e-rab release list included in the eRAB release command | int32 |
| erab_duration | End time - erab setup.start time for the same | int64 |

15

4G Re-establishment

TABLE 9

| | 4G Re-establishment procedure output | |
|---|---|---|
| Field | Description | Type |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| establishment_cause | Cause of reestablishment | int32 |
| cell_coverage | first RSRP measurement for the cell reported in the header. It should happen less than X seconds before the handover starts (where X is a configurable value set to 5 seconds by default) | float |
| cell_quality | first RSRQ measurement for the cell reported in the header. It should happen less than X seconds before the handover starts (where X is a configurable value set to 5 seconds by default) | float |
| timing_advance | first TA measurement for the cell reported in the header. It should happen less than X seconds before the handover starts (where X is a configurable value set to 5 seconds by default) | float |

4G Redirection

TABLE 10

| Field | Description | Type |
| --- | --- | --- |
| | 4G Redirection procedure output | |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success | int32 |
| result_cause | In case the procedure fails, this field will be used to report the failure cause | int32 |
| message_flow | Messages involved in the procedure | string |
| target_rat | Technology to which the user is redirected | int32 |
| target_freq | Frequency to which the user tries to connect when performing the redirection | int64 |
| rsrp | Nearest rsrp measurement for the cell reported in the header | float |
| rsrq | Nearest rsrq measurement for the cell reported in the header | float |
| ta | Nearest ta measurement for the cell reported in the header | float |

4G CS Fallback

TABLE 11

| Field | Description | Type |
| --- | --- | --- |
| | 4G CS-Fallback procedure output | |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |

TABLE 11-continued

| | 4G CS-Fallback procedure output | |
|---|---|---|
| Field | Description | Type |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the Serv Cell Meas ends | int32 |
| result | how the procedure ends: success | int32 |
| result_cause | In case the procedure fails, this field will be used to report the failure cause | int32 |
| message_flow | Messages involved in the procedure | string |
| trigger | Reason to initiate the CS Fallback | int32 |
| target_rat | Technology to which the user is redirected | int32 |
| target_freq | Frequency to which the user tries to connect when performing the redirection | int64 |
| voice_domain_preference | Voice Domain Preference of the subscriber | int32 |
| ue_srvcc_capability | Support of SRVCC Operation by the subscriber | int64 |
| rsrp | Nearest rsrp measurement for the cell reported in the header | float |
| rsrq | Nearest rsrq measurement for the cell reported in the header | float |
| ta | Nearest ta measurement for the cell reported in the header | float |

25

4G Handover

TABLE 12

| | 4G Handover procedure output | |
|---|---|---|
| Field | Description | Type |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the handover ends (incoming), handover starts (outgoing) | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| active_qci | Bit mask indicating the QCI of the active eRABs at the end of incoming handover or at the begining of outgoing handover | bytes |
| interface | If we are recording an X2 handover, an S1 handover or an RRC handover. | int32 |

TABLE 12-continued

| Field | Description | Type |
|---|---|---|
| | 4G Handover procedure output | |
| direction | Outgoing handover (handover that could end a call) or an incoming handover (handover that starts a call) | int32 |
| handover_type | If the handover is intra-RAT or inter-RAT, and it the last case the source/target technology. Note that RRC and X2 handover can only be intra-RAT | int32 |
| handover_cause | The reason to perform the handover | int32 |
| voice_handover | Set to true if the handover is performed when there are voice rabs established | boolean |
| source_cell_type_id | Type of identifier used (CGI, internal unique id) | int32 |
| source_cell | In case of outgoing handover, source cell will refer to the cell indicated in the header | string |
| source_cell_uid | Unique identifier of the cell | int64 |
| target_cell_type_id | Type of identifier used (CGI, internal unique id) | int32 |
| target_cell | In case of incoming handover, target cell will refer to the cell indicated in the header | string |
| target_cell_uid | Unique identifier of the cell | int64 |
| cond_ho | field indicating if it is a conditional handover i.e. request sent to several candidate cells | boolean |
| candidate_cell_number | in case of conditional handover, this field includes the number of cells to which the source eNB sends the handover request | int32 |
| candidate_cell_cgi_list | CGI for each candidate cell, if available | string |
| candidate_cell_freq_pci_list | Pair ARFCN-PCI for each candidate cell, if available. | string |
| cell_coverage | first RSRP measurement for the cell reported in the header. It should happen less than X seconds before the handover starts (where X is a configurable value set to 5 seconds by default) | float |
| cell_quality | first RSRQ measurement for the cell reported in the header. It should happen less than X seconds before the handover starts (where X is a configurable value set to 5 seconds by default) | float |
| timing_advance | first TA measurement for the cell reported in the header. It should happen less than X seconds before the handover starts (where X is a configurable value set to 5 seconds by default) | float |

35

4G Call Start

TABLE 12

| Field | Description | Type |
|---|---|---|
| | 4G Call Start | |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the procedure ends | int32 |

TABLE 12-continued

| 4G Call Start | | |
|---|---|---|
| Field | Description | Type |
| result | how the procedure ends: success, failure, cancellation, other, undefined | int32 |
| result_cause | In case the procedure fails, this field will be used to report the failure cause | int32 |
| message_flow | Messages involved in the procedure | string |
| Start_type | Type of establishment | Int32 |
| Establishment_cause | Establishment cause reported by any of the starting procedures. | string |
| gummei | Globally Unique MME Identifier (MCC-MNC-MMEGi-MMEC) | string |
| Initial_ue_identity | UE Identity used in the previous connection | string |
| cell_coverage | first RSRP measurement for the cell reported in the header. It should happen less than X seconds after the procedure | float |
| cell_quality | first RSRQ measurement for the cell reported in the header. It should happen less than X seconds after the procedure | float |
| timing_advance | first TA measurement for the cell reported in the header. It should happen less than X seconds after the procedure | float |

4G Call End

TABLE 12

| 4G Call End | | |
|---|---|---|
| Field | Description | Type |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the procedure starts | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| End_type | Type of release | Int32 |
| Failure_type | | Int32 |
| Ran_ue_id | enb_ue_s1ap_id or ran_ue_ngap_id depending on the technology. Uniquely identifies the UE association over the S1 interface within a eNB or NG interface within an gNB | string |
| Core_ue_id | mme_ue_s1ap_id or amf_ue_ngap_id depending on the technology. Uniquely identifies the UE association over the S1 interface within the MME or NG interface within the AMF | string |
| cell_coverage | last RSRP measurement for the cell reported in the header. It should happen less than X seconds before the procedure | float |

TABLE 12-continued

| | 4G Call End | |
| --- | --- | --- |
| Field | Description | Type |
| cell_quality | last RSRQ measurement for the cell reported in the header. It should happen less than X seconds before the procedure | float |
| timing_advance | lastTA measurement for the cell reported in the header. It should happen less than X seconds before the procedure | float |

5G SA Call Start

TABLE 12

| | 5G SA Call Start | |
| --- | --- | --- |
| Field | Description | Type |
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the procedure ends | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| Start_type | Type of establishment | Int32 |
| Establishment_cause | Establishment cause reported by any of the starting procedures. | string |
| gummei | Globally Unique MME Identifier (MCC-MNC-MMEGi-MMEC) | string |
| Initial_ue_identity | UE Identity used in the previous connection | string |
| cell_coverage | first RSRP measurement for the cell reported in the header. It should happen less than X seconds after the procedure | float |
| cell_quality | first RSRQ measurement for the cell reported in the header. It should happen less than X seconds after the procedure | float |
| timing_advance | first TA measurement for the cell reported in the header. It should happen less than X seconds after the procedure | float |

5G SA Call End

TABLE 12

5G SA Call End

| Field | Description | Type |
|---|---|---|
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the procedure starts | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |
| End_type | Type of release | Int32 |
| Failure_type | | Int32 |
| Ran_ue_id | enb_ue_s1ap_id or ran_ue_ngap_id depending on the technology. Uniquely identifies the UE association over the S1 interface within a eNB or NG interface within an gNB | string |
| Core_ue_id | mme_ue_s1ap_id or amf_ue_ngap_id depending on the technology. Uniquely identifies the UE association over the S1 interface within the MME or NG interface within the AMF | string |
| cell_coverage | last RSRP measurement for the cell reported in the header. It should happen less than X seconds before the procedure | float |
| cell_quality | last RSRQ measurement for the cell reported in the header. It should happen less than X seconds before the procedure | float |
| timing_advance | lastTA measurement for the cell reported in the header. It should happen less than X seconds before the procedure | float |

Miscellaneous

TABLE 13

Miscellaneous

| Field | Description | Type |
|---|---|---|
| cell | Unique cell id which this procedure is registered | int64 |
| cell_fragment_identifier | Cell fragment identifier | int64 |
| source_identifier | With cell_fragment_identifier unique identifier of the cell fragment | int32 |
| procedure_identifier | Procedure identifier | int64 |
| procedure_source_identifier | With procedure_identifier unique identifier of the procedure | int32 |
| start_timestamp_utc | Indicates the time at which the time interval starts in seconds | int64 |
| start_timestamp_utc_ns | Nanoseconds of the start time | int64 |
| start_time_zone_correction | Time zone correction of the start time | int32 |

TABLE 13-continued

| | Miscellaneous | |
|---|---|---|
| Field | Description | Type |
| start_timestamp_dst_cor | Day Light Save Time Correction of the start time | int32 |
| end_timestamp_utc | indicates the time at which the time interval ends in seconds | int64 |
| end_timestamp_utc_ns | nanoseconds of the end time | int64 |
| end_time_zone_correction | time zone correction of the end time | int32 |
| end_timestamp_dst_cor | Day Light Save Time Correction of the end time | int32 |
| duration | Time elapsed from start_time to end_time in milliseconds | int64 |
| procedure_type | Enumerate to identify the procedure type recorded in the registry | int32 |
| imsi | IMSI | string |
| ue_mcc | Mobile Country Code of the Home Public Land Mobile Network | string |
| ue_mnc | Mobile Network Code of the Home Public Land Mobile Network | string |
| imei | IMEI | string |
| svn | Handset Software Version | string |
| handset_tac | Type Allocation Code of the subscriber handset | string |
| connection_type | Aggregated service: voice, data . . . | int32 |
| service | Service at the moment the procedure starts | int32 |
| result | how the procedure ends: success, failure, cancellation, other, undefined | int32 |
| result_cause | In case the procedure fails, this field will be used to report the failure cause | int32 |
| message_flow | Messages involved in the procedure | string |

Procedure Message

TABLE 14

| | Procedure messages output | |
|---|---|---|
| Field | Description | Type |
| version | Format version of the following struct | uint8 |
| message_list | List of messages | — |
| >message_index | Message index under the cell fragment | uint32 |
| >utc_time_in_nanoseconds | UTC time of the message in ns | uint64 |
| >message_type | Enumerated to identify the message type | uint32 |
| >source_ne_type | Source network element type | uint8 |
| >source_ne_identifier | Source network element internal unique identifier | uint64 |
| >destination_ne_type | Destination network element type | uint8 |
| >destination_ne_identifier | Destination network element internal unique identifier | uint64 |
| >message_binary_length | Length of the message binary | uint16 |
| >message_binary | asn. 1 content for 3GPP messages, raw data for messages | bytes |

Process

FIG. 53 is a flowchart of a Call Data Record (CDR) generation procedure 100 for a Radio Access Network (RAN) parser. The process 100 contemplates implementation as a method having steps, via a processing device configured to implement the steps, via a cloud service configured to implement the steps, and/or as non-transitory computer-readable medium with instructions that, when executed, cause one or more processors to implement the steps.

The process 100 includes reading signaling messages as they arrive in a Radio Access Network (RAN) parser (step 102); for each signaling message, assigning the signaling message to a procedure, decoding the signaling message to obtain information required to generate a Call Data Record (CDR), and obtaining information on status of a procedure associated with the signaling message (step 104); and, based on the status of the procedure, one of (1) waiting on more signaling messages for the procedure and (2) determining the procedure has ended and generating the CDR based on the associated signaling messages (step 106).

The signaling messages can be in a vendor/technology agnostic format. The steps can include, when the call has ended based on an end message, storing the CDR and removing any information from memory.

The steps can include incrementally building the CDR based on signaling messages. A signaling message can be assigned to one or more procedures. The CDRs types that can be generated include handover, serving cell measurements, eRAB establishment and release, redirection, reestablishment and CS Fallback.

Figure 54:
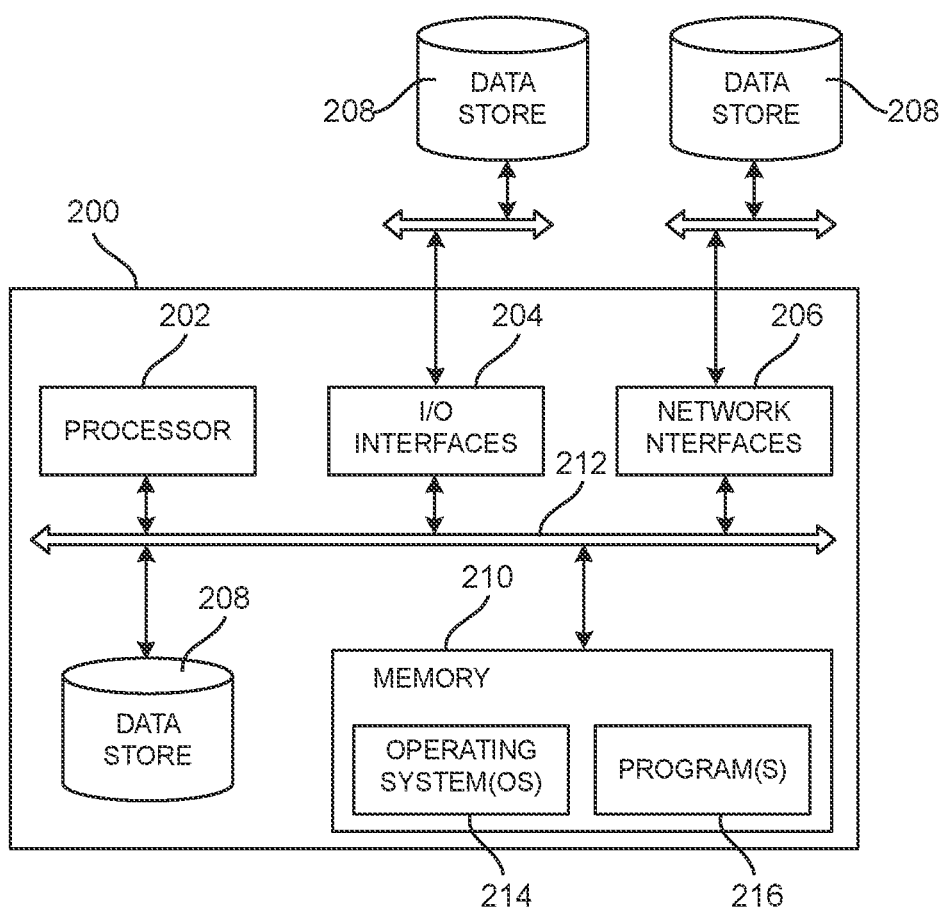
FIG. 54 is a block diagram of a processing system.

The signaling messages are associated with procedures involved in the call. The procedures can be correlated by a common identifier or the tuple international mobile sub-
scriber identity (IMSI) with a timestamp. Details of the
procedures can be based on associated signaling messages or
from information from correlated procedures. The proce-
dures can be asynchronous, generated when an event hap-
pens, or synchronous, generated periodically.
Processing System FIG. 54 is a block diagram of a processing system 200,
which may be used to implement the process 100. The
processing system 200 may be a digital computer that, in
terms of hardware architecture, generally includes a proces-
sor 202, input/output (I/O) interfaces 204, a network inter-
face 206, a data store 208, and memory 210. It should be
appreciated by those of ordinary skill in the art that FIG. 54
depicts the processing system 200 in an oversimplified
manner, and a practical embodiment may include additional
components and suitably configured processing logic to
support known or conventional operating features that are
not described in detail herein. The components (202, 204,
206, 208, and 210) are communicatively coupled via a local
interface 212. The local interface 212 may be, for example,
but not limited to, one or more buses or other wired or
wireless connections, as is known in the art. The local
interface 212 may have additional elements, which are
omitted for simplicity, such as controllers, buffers (caches),
drivers, repeaters, and receivers, among many others, to
enable communications. Further, the local interface 212 may
include address, control, and/or data connections to enable
appropriate communications among the aforementioned
components.

The processor 202 is a hardware device for executing
software instructions. The processor 202 may be any custom
made or commercially available processor, a Central Pro-
cessing Unit (CPU), an auxiliary processor among several
processors associated with the processing system 200, a
semiconductor-based microprocessor (in the form of a
microchip or chipset), or generally any device for executing
software instructions. When the processing system 200 is in
operation, the processor 202 is configured to execute soft-
ware stored within the memory 210, to communicate data to
and from the memory 210, and to generally control opera-
tions of the processing system 200 pursuant to the software
instructions. The I/O interfaces 204 may be used to receive
user input from and/or for providing system output to one or
more devices or components.

The network interface 206 may be used to enable the
processing system 200 to communicate on a network, such
as the Internet 104. The network interface 206 may include,
for example, an Ethernet card or adapter or a Wireless Local
Area Network (WLAN) card or adapter. The network inter-
face 206 may include address, control, and/or data connec-
tions to enable appropriate communications on the network.
A data store 208 may be used to store data. The data store
208 may include any of volatile memory elements (e.g.,
random access memory (RAM, such as DRAM, SRAM,
SDRAM, and the like)), nonvolatile memory elements (e.g.,
ROM, hard drive, tape, CDROM, and the like), and com-
binations thereof.

Moreover, the data store 208 may incorporate electronic,
magnetic, optical, and/or other types of storage media. In
one example, the data store 208 may be located internal to
the processing system 200, such as, for example, an internal
hard drive connected to the local interface 212 in the
processing system 200. Additionally, in another embodi-
ment, the data store 208 may be located external to the
processing system 200 such as, for example, an external
hard drive connected to the I/O interfaces 204 (e.g., SCSI or USB connection). In a further embodiment, the data store
208 may be connected to the processing system 200 through
a network, such as, for example, a network-attached file
server.

The memory 210 may include any of volatile memory
elements (e.g., random access memory (RAM, such as
DRAM, SRAM, SDRAM, etc.)), nonvolatile memory ele-
ments (e.g., ROM, hard drive, tape, CDROM, etc.), and
combinations thereof. Moreover, the memory 210 may
incorporate electronic, magnetic, optical, and/or other types
of storage media. Note that the memory 210 may have a
distributed architecture, where various components are situ-
ated remotely from one another but can be accessed by the
processor 202. The software in memory 210 may include
one or more software programs, each of which includes an
ordered listing of executable instructions for implementing
logical functions. The software in the memory 210 includes
a suitable Operating System (O/S) 214 and one or more
programs 216. The operating system 214 essentially controls
the execution of other computer programs, such as the one
or more programs 216, and provides scheduling, input-
output control, file and data management, memory manage-
ment, and communication control and related services. The
one or more programs 216 may be configured to implement
the various processes, algorithms, methods, techniques, etc.
described herein.

In an embodiment, one or more processing devices 200
can be configured in a cluster and/or in a cloud system, for
implementing the process 100. Cloud computing systems
and methods abstract away physical servers, storage, net-
working, etc., and instead offer these as on-demand and
elastic resources. The National Institute of Standards and
Technology (NIST) provides a concise and specific defini-
tion which states cloud computing is a model for enabling
convenient, on-demand network access to a shared pool of
configurable computing resources (e.g., networks, servers,
storage, applications, and services) that can be rapidly
provisioned and released with minimal management effort
or service provider interaction. Cloud computing differs
from the classic client-server model by providing applica-
tions from a server that are executed and managed by a
client's web browser or the like, with no installed client
version of an application required. The phrase "Software as
a Service" (SaaS) is sometimes used to describe application
programs offered through cloud computing. A common
shorthand for a provided cloud computing service (or even
an aggregation of all existing cloud services) is "the cloud."

CONCLUSION

It will be appreciated that some embodiments described
herein may include one or more generic or specialized
processors ("one or more processors") such as microproces-
sors; central processing units (CPUs); digital signal proces-
sors (DSPs): customized processors such as network pro-
cessors (NPs) or network processing units (NPUs), graphics
processing units (GPUs), or the like; field programmable
gate arrays (FPGAs); and the like along with unique stored
program instructions (including both software and firmware)
for control thereof to implement, in conjunction with certain
non-processor circuits, some, most, or all of the functions of
the methods and/or systems described herein. Alternatively,
some or all functions may be implemented by a state
machine that has no stored program instructions, or in one
or more application-specific integrated circuits (ASICs), in
which each function or some combinations of certain of the
functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
    reading signaling messages as they arrive in a Radio Access Network (RAN) parser;
    for each signaling message, assigning the signaling message to a procedure based on a context identified by a cell fragment identifier and source identifier, decoding the signaling message to obtain information required to generate a Call Data Record (CDR), and obtaining information on a current procedure state derived from message processing in the context associated with the signaling message; and
    based on the current procedure state, one of (1) waiting on more signaling messages for the procedure and (2) determining the procedure has ended and generating the CDR based on the associated signaling messages including closing the procedure and outputting it from the context.

2. The method of claim 1, wherein the signaling messages are in a vendor/technology agnostic format.

3. The method of claim 1, wherein the steps include, when the procedure has ended, queueing the CDR and removing any information from memory by detecting an end message associated with the context, with the end message comprising one of an RRC Connection Release, an S1AP UE Context Release Command, an NGAP UE Context Release Command, or a corresponding release complete message, and further performing a periodic clearing mechanism that removes contexts at a network-element level when the end message is missing.

4. The method of claim 1, wherein the steps include:
    incrementally building the CDR based on subsets of the signaling messages associated to the call fragment, including updating procedure timestamps, message-flow information, and procedure-specific parameters within the context as each signaling message is processed, and incorporating results of procedure closures triggered during message processing.

5. The method of claim 4, wherein the generated CDR types include any of call start, handover, call end, eRAB establishment and release, redirection, re-establishment, CS Fallback, Serving cell measurements and miscellaneous procedures.

6. The method of claim 1, wherein the signaling messages are associated with procedures involved in the call.

7. The method of claim 6, wherein the procedures are correlated by a common identifier or a tuple and an international mobile subscriber identity (IMSI) with a timestamp.

8. The method of claim 6, wherein details of the procedures are based on associated signaling messages or from information from other correlated procedures.

9. The method of claim 6, wherein the procedures are one of asynchronous generated when an event happens and synchronous that are generated periodically.

10. A processing system comprising:
    one or more processors; and
    memory storing instructions for programming the one or more processors to
        read signaling messages as they arrive in a Radio Access Network (RAN) parser;
        for each signaling message, assign the signaling message to a procedure based on a context identified by a cell fragment identifier and source identifier, decoding the signaling message to obtain information required to generate a Call Data Record (CDR), and obtaining information on a current procedure state derived from message processing in the context associated with the signaling message; and
        based on the current procedure state, one of (1) wait on more signaling messages for the procedure and (2) determine the procedure has ended and generating the CDR based on the associated signaling messages including closing the procedure and outputting it from the context.

11. The processing system of claim 10, wherein the signaling messages are in a vendor/technology agnostic format.

12. The processing system of claim 10, wherein the instructions further program the one or more processors to, when the procedure has ended, queue the CDR and removing any information from memory by detecting an end message associated with the context, with the end message comprising one of an RRC Connection Release, an S1AP UE Context Release Command, an NGAP UE Context Release Command, or a corresponding release complete message, and further performing a periodic cleaning mechanism that removes contexts at a network-element level when the end message is missing.

13. The processing system of claim 10, wherein the instructions further program the one or more processors to:
    incrementally build the CDR based on subsets of the signaling messages associated to the call fragment, including updating procedure timestamps, message-flow information, and procedure-specific parameters within the context as each signaling message is processed, and incorporating results of procedure closures triggered during message processing.

14. The processing system of claim 13, wherein the generated CDR types include any of call start, handover, call end, eRAB establishment and release, redirection, re-establishment, CS Fallback, Serving cell measurements and miscellaneous procedures.

15. The processing system of claim 10, wherein the signaling messages are associated with procedures involved in the call.

16. The processing system of claim 15, wherein the procedures are correlated by a common identifier or a tuple and an international mobile subscriber identity (IMSI) with a timestamp.

17. The processing system of claim 15, wherein details of the procedures are based on associated signaling messages or from information from other correlated procedures.

18. The processing system of claim 15, wherein the procedures are one of asynchronous generated when an event happens and synchronous that are generated periodically.

19. A non-transitory computer-readable medium comprising instructions for programming one or more processors to perform steps of:

reading signaling messages as they arrive in a Radio Access Network (RAN) parser;

for each signaling message, assigning the signaling message to a procedure based on a context identified by a cell fragment identifier and source identifier, decoding the signaling message to obtain information required to generate a Call Data Record (CDR), and obtaining information on a current procedure state derived from message processing in the context associated with the signaling message; and based on the current procedure state, one of (1) waiting on more signaling messages for the procedure and (2) determining the procedure has ended and generating the CDR based on the associated signaling messages including closing the procedure and outputting it from the context.

20. The non-transitory computer-readable medium of claim 19, wherein the steps include:

incrementally building the CDR based on subsets of the signaling messages associated to the call fragment, including updating procedure timestamps, message-flow information, and procedure-specific parameters within the context as each signaling message is processed, and incorporating results of procedure closures triggered during message processing.

\* \* \* \* \*